US009909064B2

(12) United States Patent
Gotoh et al.

(10) Patent No.: US 9,909,064 B2
(45) Date of Patent: Mar. 6, 2018

(54) COMPOUND HAVING TETRAHYDROPYRAN RING, LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Yasuyuki Gotoh, Tokyo (JP); Mayumi Goto, Chiba (JP); Michiko Sawada, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 15/285,799

(22) Filed: Oct. 5, 2016

(65) Prior Publication Data

US 2017/0101582 A1 Apr. 13, 2017

(30) Foreign Application Priority Data

Oct. 13, 2015 (JP) ................................ 2015-201726

(51) Int. Cl.

| | |
|---|---|
| ***G02F 1/1333*** | (2006.01) |
| ***C09K 19/34*** | (2006.01) |
| ***C09K 19/20*** | (2006.01) |
| *C09K 19/04* | (2006.01) |
| *C09K 19/12* | (2006.01) |
| *C09K 19/30* | (2006.01) |

(52) U.S. Cl.

CPC .......... *C09K 19/3402* (2013.01); *C09K 19/20* (2013.01); *C09K 2019/0466* (2013.01); *C09K 2019/122* (2013.01); *C09K 2019/123* (2013.01); *C09K 2019/301* (2013.01); *C09K 2019/3004* (2013.01); *C09K 2019/3027* (2013.01); *C09K 2019/3077* (2013.01); *C09K 2019/3422* (2013.01)

(58) Field of Classification Search

CPC ................ C09K 19/3402; C09K 19/20; C09K 2019/3422; C09K 2019/0466; C09K 2019/122; C09K 2019/123; C09K 2019/3004; C09K 2019/301; C09K 2019/3027; C09K 2019/3077; G02F 1/1333

USPC .............. 252/299.01, 299.6, 299.61; 428/1.1

See application file for complete search history.

(56) References Cited

U.S. PATENT DOCUMENTS

2013/0126783 A1 5/2013 Kubo

FOREIGN PATENT DOCUMENTS

| | | |
|---|---|---|
| CN | 104003964 | 8/2014 |
| WO | 2012/020643 | 2/2012 |

*Primary Examiner* — Geraldina Visconti

(74) *Attorney, Agent, or Firm* — Greenblum & Bernstein, P.L.C.

(57) ABSTRACT

A compound, represented by formula (1):

(1)

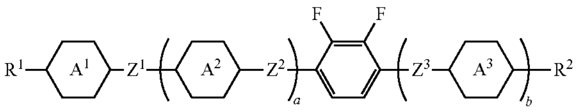

wherein, $R^1$ and $R^2$ are alkyl having 1 to 15 carbons or the like; ring $A^1$ is tetrahydropyran-2,5-diyl, and ring $A^2$ and ring $A^3$ are 2-fluoro-1,4-phenylene or 2-chloro-1,4-phenylene; $Z^1$, $Z^2$ and $Z^3$ are a single bond or the like; and a and b are 0 or 1, and a sum of a and b is 1.

12 Claims, No Drawings

COMPOUND HAVING TETRAHYDROPYRAN RING, LIQUID CRYSTAL COMPOSITION AND LIQUID CRYSTAL DISPLAY DEVICE

TECHNICAL FIELD

The invention relates to a liquid crystal compound, a liquid crystal composition and a liquid crystal display device. More specifically, the invention relates to a liquid crystal compound having a large negative dielectric anisotropy, a liquid crystal composition that contains the compound and has a nematic phase, and a liquid crystal display device including the composition.

A liquid crystal display device has been widely used for a display of a personal computer, a television and so forth. The device utilizes physical properties such as optical anisotropy and dielectric anisotropy of a liquid crystal compound. As an operating mode of the liquid crystal display device, such a mode exists as a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a vertical alignment (VA) mode, a fringe field switching (FFS) mode and a polymer sustained alignment (PSA) mode. A liquid crystal composition containing a polymer is used in a device having the PSA mode. In the composition, alignment of liquid crystal molecules can be controlled by the polymer.

In such a liquid crystal display device, a liquid crystal composition having suitable physical properties is used. In order to further improve characteristics of the device, the liquid crystal compound contained in the composition preferably has physical properties described in (1) to (8) below: (1) a high stability to heat and light, (2) a high clearing point, (3) a low minimum temperature of a liquid crystal phase, (4) a small viscosity (η), (5) a suitable optical anisotropy (Δn), (6) a large negative dielectric anisotropy (Δ∈), (7) a suitable elastic constant (K) and (8) a good compatibility with other liquid crystal compounds.

An effect of physical properties of the liquid crystal compound on the characteristics of the device is as described below. A compound having the high stability to heat and light as described in (1) increases a voltage holding ratio of the device. Thus, a service life of the device is elongated. A compound having the high clearing point as described in (2) extends a temperature range in which the device can be used. A compound having the low minimum temperature of the liquid crystal phase such as a nematic phase and a smectic phase as described in (3), particular a compound having the low minimum temperature of the nematic phase, also extends the temperature range in which the device can be used. A compound having the small viscosity as described in (4) shortens a response time of the device.

According to a design of the device, a compound having the suitable optical anisotropy, more specifically, a compound having a large optical anisotropy or a small optical anisotropy as described in (5) is required. When the response time is shortened by decreasing a cell gap of the device, a compound having the large optical anisotropy is suitable. A compound having the large negative dielectric anisotropy as described in (6) decreases a threshold voltage of the device. Thus, an electric power consumption of the device is reduced. On the other hand, a compound having a small dielectric anisotropy shortens the response time of the device by decreasing a viscosity of the composition. The compound extends the temperature range in which the device can be used by increasing a maximum temperature of the nematic phase.

With regard to (7), a compound having a large elastic constant shortens the response time of the device. A compound having a small elastic constant decreases the threshold voltage of the device. Therefore, the suitable elastic constant is required according to the characteristics that are desirably improved. A compound having the good compatibility with other liquid crystal compounds as described in (8) is preferred. The reason is that the physical properties of the composition are adjusted by mixing liquid crystal compounds having different physical properties.

A variety of liquid crystal compounds having a large negative dielectric anisotropy have been so far prepared. A variety of liquid crystal compounds having the large optical anisotropy have also been prepared. The reason is that good physical properties that are not found in conventional compounds are expected from a new compound. The reason is that the new compound may be occasionally provided with a suitable balance regarding at least two physical properties in the composition. In view of such a situation, with regard to the physical properties (1) to (8) described above, a compound having good physical properties and a suitable balance has been desired.

On page 233 of Patent literature No. 1, compound (S-1) is described.

(S-1)

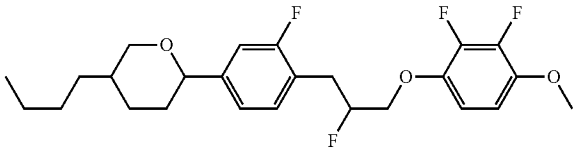

On page 9 of Patent literature No. 2, compound (S-2) is described.

(S-2)

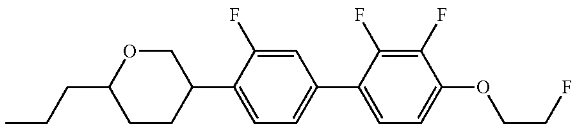

CITATION LIST

Patent Literature

Patent literature No. 1: WO 2012/020643 A.
Patent literature No. 2: CN 104003964 A.

SUMMARY OF INVENTION

Technical Problem

A first object is to provide a liquid crystal compound satisfying at least one of physical properties such as a high stability to heat and light, a high clearing point (or a high maximum temperature of a nematic phase), a low minimum temperature of a liquid crystal phase, a small viscosity, a suitable optical anisotropy, a large negative dielectric anisotropy, a suitable elastic constant and a good compatibility with other liquid crystal compounds. The object is to provide a compound having a larger negative dielectric anisotropy and a larger elastic constant ratio in comparison with a similar compound. A second object is to provide a liquid crystal composition that contains the compound and satisfies at least one of physical properties such as a high stability to heat and light, a high maximum temperature of a nematic phase, a low minimum temperature of the nematic phase, a small viscosity, a suitable optical anisotropy, a large negative dielectric anisotropy, a large specific resistance and a suitable elastic constant. The object is to provide a liquid crystal composition having a suitable balance regarding at least two of the physical properties. A third object is to provide a liquid crystal display device including the composition and having a wide temperature range in which the device can be used, a short response time, a large voltage holding ratio, a low threshold voltage, a large contrast ratio, a small flicker rate and a long service life.

Solution to Problem

The invention concerns a compound represented by formula (1), a liquid crystal composition containing the compound, and a liquid crystal display device including the composition:

(1)

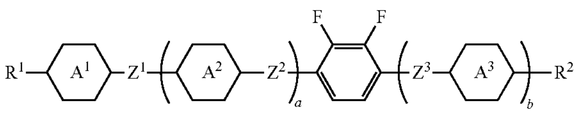

wherein, in formula (1), $R^1$ and $R^2$ are independently alkyl having 1 to 15 carbons, and in the alkyl, at least one piece of —$CH_2$— may be replaced by —O—, and at least one piece of —$CH_2CH_2$— may be replaced by —CH═CH—;

ring $A^1$ is tetrahydropyran-2,5-diyl, and ring $A^2$ and ring $A^3$ are independently 2-fluoro-1,4-phenylene or 2-chloro-1,4-phenylene;

$Z^1$, $Z^2$ and $Z^3$ are independently a single bond or alkylene having 1 to 4 carbons, and in the alkylene, at least one piece of —$CH_2$— may be replaced by —O—, —COO— or —OCO—, and at least one piece of —$CH_2CH_2$— may be replaced by —CH═CH— or —C≡C—; and a and b are independently 0 or 1, and a sum of a and b is 1.

Advantageous Effects of Invention

A first advantage is to provide a liquid crystal compound satisfying at least one of physical properties such as a high stability to heat and light, a high clearing point (or a high maximum temperature of a nematic phase), a low minimum temperature of a liquid crystal phase, a small viscosity, a suitable optical anisotropy, a large negative dielectric anisotropy, a suitable elastic constant and a good compatibility with other liquid crystal compounds. The advantage is to provide a compound having a larger negative dielectric anisotropy and a larger elastic constant ratio in comparison with a similar compound (see Comparative Example 1). A second advantage is to provide a liquid crystal composition that contains the compound and satisfies at least one of physical properties such as a high stability to heat and light, a high maximum temperature of a nematic phase, a low minimum temperature of the nematic phase, a small viscosity, a suitable optical anisotropy, a large negative dielectric anisotropy, a large specific resistance and a suitable elastic constant. The advantage is to provide a liquid crystal composition having a suitable balance regarding at least two of the physical properties. A third advantage is to provide a liquid crystal display device including the composition and having a wide temperature range in which the device can be used, a short response time, a large voltage holding ratio, a low threshold voltage, a large contrast ratio, a small flicker rate and a long service life.

DESCRIPTION OF EMBODIMENTS

Usage of terms herein is as described below. Terms "liquid crystal compound," "liquid crystal composition" and "liquid crystal display device" may be occasionally abbreviated as "compound," "composition" and "device," respectively. "Liquid crystal compound" is a generic term for a compound having a liquid crystal phase such as a nematic phase and a smectic phase, and a compound having no liquid crystal phase but to be added for the purpose of adjusting physical properties of a composition, such as a maximum temperature, a minimum temperature, viscosity and dielectric anisotropy. The compound has a six-membered ring such as 1,4-cyclohexylene and 1,4-phenylene, and has rod-like molecular structure. "Liquid crystal display device" is a generic term for a liquid crystal display panel and a liquid crystal display module. "Polymerizable compound" is a compound to be added for the purpose of forming a polymer in the composition.

The liquid crystal composition is prepared by mixing a plurality of liquid crystal compounds. An additive is added to the composition for the purpose of further adjusting the physical properties. The additive such as a polymerizable compound, a polymerization initiator, a polymerization inhibitor, an optically active compound, an antioxidant, an ultraviolet light absorber, a light stabilizer, a heat stabilizer, a dye and an antifoaming agent is added thereto when necessary. The liquid crystal compound and the additive are mixed in such a procedure. A proportion (content) of the liquid crystal compounds is expressed in terms of weight percent (% by weight) based on the weight of the liquid crystal composition containing no additive, even after the additive has been added. A proportion (amount of addition) of the additive is expressed in terms of weight percent (% by weight) based on the weight of the liquid crystal composition containing no additive. Weight parts per million (ppm) may be occasionally used. A proportion of the polymerization initiator and the polymerization inhibitor is exceptionally expressed based on the weight of the polymerizable compound.

"Clearing point" is a transition temperature between the liquid crystal phase and an isotropic phase in the liquid crystal compound. "Minimum temperature of the liquid crystal phase" is a transition temperature between a solid and the liquid crystal phase (the smectic phase, the nematic phase or the like) in the liquid crystal compound. "Maximum temperature of the nematic phase" is a transition temperature between the nematic phase and the isotropic phase in a mixture of the liquid crystal compound and a base liquid crystal or in the liquid crystal composition, and may be occasionally abbreviated as "maximum temperature." "Minimum temperature of the nematic phase" may be occasionally abbreviated as "minimum temperature." An expression "increases the dielectric anisotropy" means that the value positively increases for the composition having a positive dielectric anisotropy, and that the value negatively increases for the composition having a negative dielectric anisotropy. An expression "having a large voltage holding ratio" means that the device has a large voltage holding ratio at room temperature and also at a temperature close to the maximum temperature in an initial stage, and the device has the large voltage holding ratio at room temperature and also at a temperature close to the maximum temperature even after the device has been used for a long period of time. In the composition or the device, the characteristics may be occasionally examined before and after an aging test (including an acceleration deterioration test).

A compound represented by formula (1) may be occasionally abbreviated as "compound (1)." At least one compound selected from the group of compounds represented by formula (1) may be occasionally abbreviated as "compound (1)." "Compound (1)" means one compound, a mixture of two compounds or a mixture of three or more compounds represented by formula (1). A same rule applies also to any other compound represented by any other formula. In formulas (1) to (15), a symbol such as $A^1$, $B^1$ and $C^1$ surrounded by a hexagonal shape corresponds to ring $A^1$, ring $B^1$, ring $C^1$, respectively. The hexagonal shape represents a six-membered ring such as cyclohexane or benzene. The hexagonal shape may occasionally represent a condensed ring such as naphthalene or a bridged ring such as adamantane.

A symbol of terminal group $R^{11}$ is used in a plurality of compounds in chemical formulas of component compounds. In the compounds, two groups represented by two pieces of arbitrary $R^{11}$ may be identical or different. For example, in one case, $R^{11}$ of compound (2) is ethyl and $R^{11}$ of compound (3) is ethyl. In another case, $R^{11}$ of compound (2) is ethyl and $R^{11}$ of compound (3) is propyl. A same rule applies also to a symbol such as $R^{12}$, $R^{13}$ and $Z^1$. In compound (15), when i is 2, two of rings $E^1$ exists. In the compound, two groups represented by two of rings $E^1$ may be identical or different. A same rule applies also to two of arbitrary rings $E^1$ when i is larger than 2. A same rule applies also to other symbols.

An expression "at least one piece of 'A'" means that the number of 'A' is arbitrary. An expression "at least one piece of 'A' may be replaced by 'B'" means that, when the number of 'A' is 1, a position of 'A' is arbitrary, and also when the number of 'A' is 2 or more, positions thereof can be selected without restriction. A same rule applies also to an expression "at least one piece of 'A' is replaced by 'B'." An expression "at least one piece of 'A' may be replaced by 'B', 'C' or 'D'" includes a case where arbitrary 'A' is replaced by 'B', a case where arbitrary 'A' is replaced by 'C', and a case where arbitrary 'A' is replaced by 'D', and also a case where a plurality of pieces of 'A' are replaced by at least two pieces of 'B', 'C' and/or 'D'. For example, "alkyl in which at least one piece of $—CH_2—$ may be replaced by —O— or —CH═CH—" includes alkyl, alkoxy, alkoxyalkyl, alkenyl, alkoxyalkenyl and alkenyloxyalkyl. In addition, a case where two pieces of consecutive $—CH_2—$ are replaced by —O— to form —O—O— is not preferred. In alkyl or the like, a case where $—CH_2—$ of a methyl part ($—CH_2—H$) is replaced by —O— to form —O—H is not preferred, either.

An expression "$R^{11}$ and $R^{12}$ are independently alkyl having 1 to 10 carbons or alkenyl having 2 to 10 carbons, and in the alkyl and the alkenyl, at least one piece of $—CH_2—$ may be replaced by —O—, and in the groups, at least one piece of hydrogen may be replaced by fluorine" may be occasionally used. In the expression, "in the groups" may be interpreted according to wording. In the expression, "the groups" means alkyl, alkenyl, alkoxy, alkenyloxy or the like. More specifically, "the groups" represents all of the groups described before the wordings "in the groups".

Halogen means fluorine, chlorine, bromine and iodine. Preferred halogen is fluorine and chlorine. Further preferred halogen is fluorine. Alkyl of the liquid crystal compound is straight-chain alkyl or branched-chain alkyl, but includes no cyclic alkyl. In general, straight-chain alkyl is preferred to branched-chain alkyl. A same rule applies also to a terminal group such as alkoxy and alkenyl. With regard to a configuration of 1,4-cyclohexylene, trans is preferred to cis for increasing the maximum temperature. Then, 2-fluoro-1,4-phenylene means two divalent groups described below. In a chemical formula, fluorine may be leftward (L) or rightward (R). A same rule applies also to an asymmetrical divalent group formed by removing two pieces of hydrogen from a ring, such as tetrahydropyran-2,5-diyl.

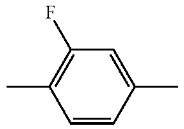
(L)

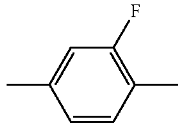
(R)

The invention includes items described below.

Item 1. A compound, represented by formula (1):

(1)

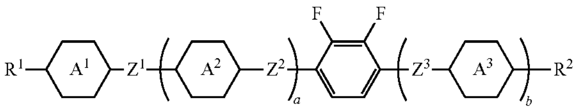

wherein, in formula (1), $R^1$ and $R^2$ are independently alkyl having 1 to 15 carbons, and in the alkyl, at least one piece of $—CH_2—$ may be replaced by —O—, and at least one piece of $—CH_2CH_2—$ may be replaced by —CH═CH—;

ring $A^1$ is tetrahydropyran-2,5-diyl, and ring $A^2$ and ring $A^3$ are independently 2-fluoro-1,4-phenylene or 2-chloro-1,4-phenylene;

$Z^1$, $Z^2$ and $Z^3$ are independently a single bond or alkylene having 1 to 4 carbons, and in the alkylene, at least one piece of $—CH_2—$ may be replaced by —O—, —COO— or —OCO—, and at least one piece of $—CH_2CH_2—$ may be replaced by —CH═CH— or —C≡C—; and a and b are independently 0 or 1, and a sum of a and b is 1.

Item 2. The compound according to item 1, wherein, in formula (1), $R^1$ and $R^2$ are independently alkyl having 1 to 12 carbons, alkoxy having 1 to 12 carbons, alkoxyalkyl having 2 to 12 carbons, alkenyl having 2 to 12 carbons or alkenyloxy having 2 to 12 carbons;

ring $A^1$ is tetrahydropyran-2,5-diyl, and ring $A^2$ and ring $A^3$ are independently 2-fluoro-1,4-phenylene or 2-chloro-1,4-phenylene;

$Z^1$, $Z^2$ and $Z^3$ are independently a single bond, —COO—, —OCO—, —$CH_2O$—, —$OCH_2$—, —$CH_2CH_2$—, —CH═CH—, —C≡C—, —$(CH_2)_4$— or —$CH_2CH$═$CHCH_2$—; and a and b are independently 0 or 1, and a sum of a and b is 1.

Item 3. The compound according to item 1, represented by formula (1-1) or (1-2):

(1-1)

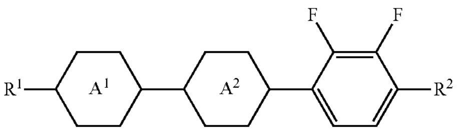

(1-2)

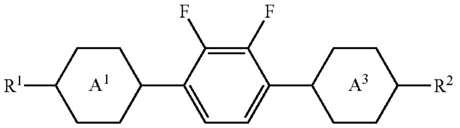

wherein, in formulas (1-1) and (1-2), $R^1$ and $R^2$ are independently alkyl having 1 to 12 carbons, alkoxy having 1 to 12 carbons, alkoxyalkyl having 2 to 12 carbons, alkenyl having 2 to 12 carbons or alkenyloxy having 2 to 12 carbons; and ring $A^1$ is tetrahydropyran-2,5-diyl, and ring $A^2$ and ring $A^3$ are 2-fluoro-1,4-phenylene.

Item 4. The compound according to item 1, represented by any one of formulas (1-3) to (1-10):

(1-3)

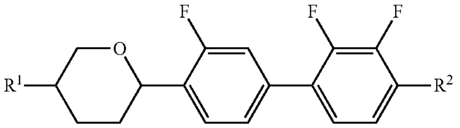

(1-4)

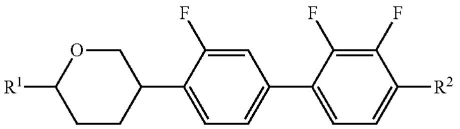

(1-5)

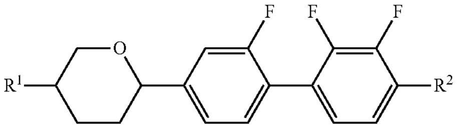

(1-6)

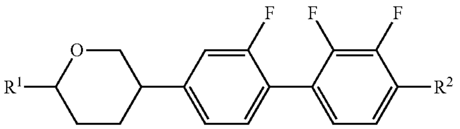

(1-7)

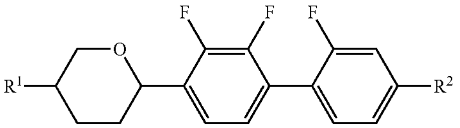

(1-8)

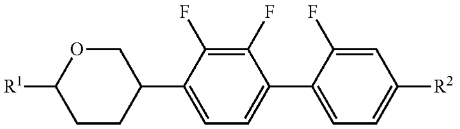

-continued (1-9)

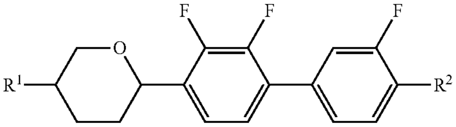

(1-10)

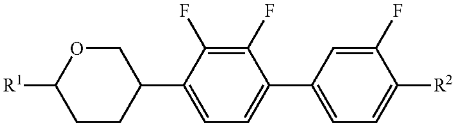

wherein, in formulas (1-3) to (1-10), $R^1$ and $R^2$ are independently alkyl having 1 to 12 carbons, alkoxy having 1 to 12 carbons, alkoxyalkyl having 2 to 12 carbons or alkenyl having 2 to 12 carbons.

Item 5. The compound according to item 4, wherein in formulas (1-3) to (1-10), $R^1$ is alkyl having 1 to 12 carbons, alkoxy having 1 to 12 carbons, alkoxyalkyl having 2 to 12 carbons or alkenyl having 2 to 12 carbons, and $R^2$ is alkoxy having 1 to 12 carbons.

Item 6. The compound according to item 4, represented by any one of formulas (1-3) to (1-6):

(1-3)

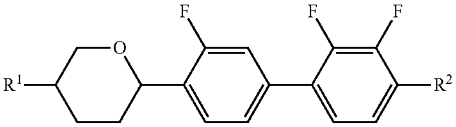

(1-4)

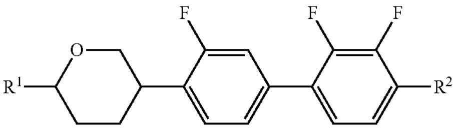

(1-5)

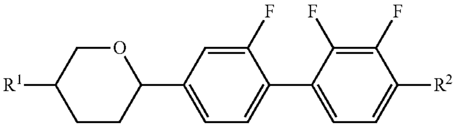

(1-6)

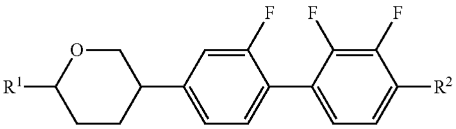

wherein, in formulas (1-3) to (1-6), $R^1$ is alkyl having 1 to 12 carbons or alkenyl having 2 to 12 carbons, and $R^2$ is alkoxy having 1 to 12 carbons.

Item 7. A liquid crystal composition, containing at least one compound according to any one of items 1 to 6.

Item 8. The liquid crystal composition according to item 7, further containing at least one compound selected from the group of compounds represented by formulas (2) to (4):

(2)

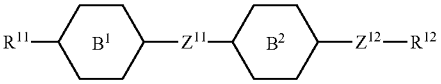

-continued (3)

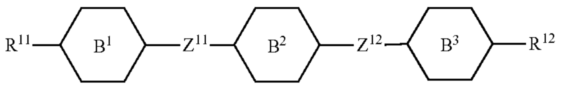

(4)

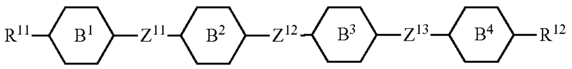

wherein, in formulas (2) to (4), $R^{11}$ and $R^{12}$ are independently alkyl having 1 to 10 carbons or alkenyl having 2 to 10 carbons, and in the alkyl and the alkenyl, at least one piece of $—CH_2—$ may be replaced by —O—, and in the groups, at least one piece of hydrogen may be replaced by fluorine;

ring $B^1$, ring $B^2$, ring $B^3$ and ring $B^4$ are independently 1,4-cyclohexylene, 1,4-phenylene, 2-fluoro-1,4-phenylene, 2,5-difluoro-1,4-phenylene or pyrimidine-2,5-diyl; and $Z^{11}$, $Z^{12}$ and $Z^{13}$ are independently a single bond, —COO—, $—CH_2CH_2—$, —CH═CH— or —C≡C—.

Item 9. The liquid crystal composition according to item 7 or 8, further containing at least one compound selected from the group of compounds represented by formulas (5) to (11):

wherein, in formulas (5) to (11), $R^{13}$, $R^{14}$ and $R^{15}$ are independently alkyl having 1 to 10 carbons or alkenyl having 2 to 10 carbons, and in the alkyl and the alkenyl, at least one piece of $—CH_2—$ may be replaced by —O—, and in the groups, at least one piece of hydrogen may be replaced by fluorine, and $R^{15}$ may be hydrogen or fluorine;

ring $C^1$, ring $C^2$, ring $C^3$ and ring $C^4$ are independently 1,4-cyclohexylene, 1,4-cyclohexenylene, 1,4-phenylene, 1,4-phenylene in which at least one piece of hydrogen is replaced by fluorine, tetrahydropyran-2,5-diyl or decahydronaphthalene-2,6-diyl;

ring $C^5$ and ring $C^6$ are independently 1,4-cyclohexylene, 1,4-cyclohexenylene, 1,4-phenylene, tetrahydropyran-2,5-diyl or decahydronaphthalene-2,6-diyl;

$Z^{14}$, $Z^{15}$, $Z^{16}$ and $Z^{17}$ are independently a single bond, —COO—, $—CH_2O—$, $—OCF_2—$, $—CH_2CH_2—$ or $—OCF_2CH_2CH_2—$;

$L^{11}$ and $L^{12}$ are independently fluorine or chlorine;

$S^{11}$ is hydrogen or methyl;

X is —CHF— or $—CF_2—$; and j, k, m, n, p, q, r and s are independently 0 or 1, a sum of k, m, n and p is 1 or 2, a sum of q, r and s is 0, 1, 2 or 3, and t is 1, 2 or 3.

(5)

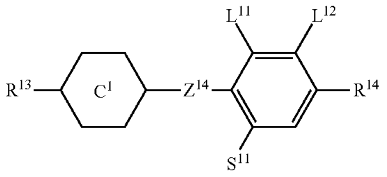

(6)

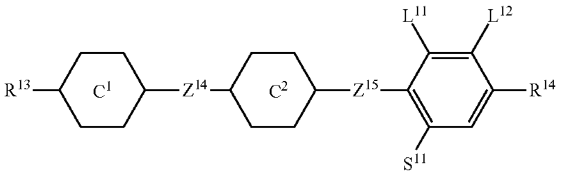

(7)

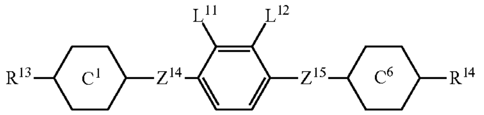

(8)

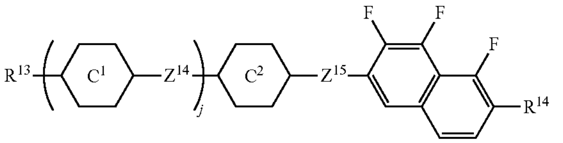

(9)

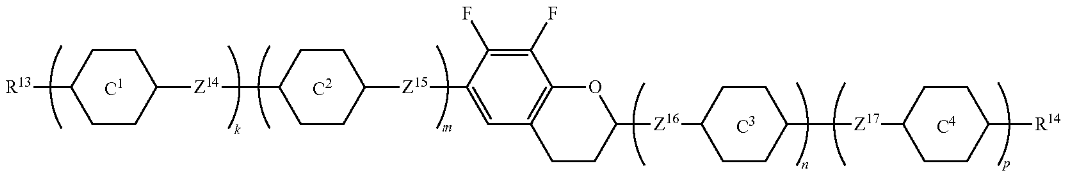

(10)

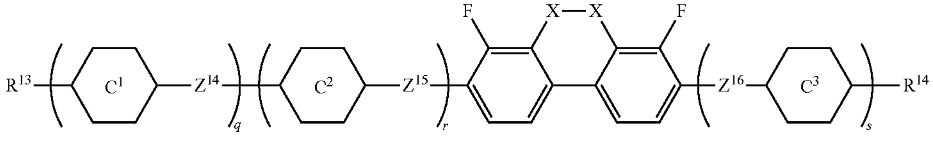

(11)

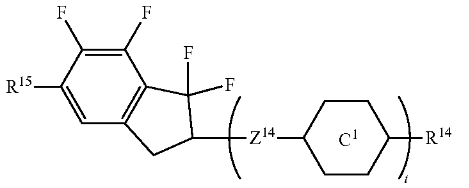

Item 10. The liquid crystal composition according to any one of items 7 to 9, further containing at least one compound selected from the group of compounds represented by formulas (12) to (14):

(12)

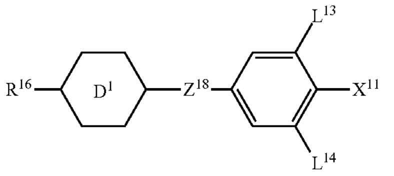

(13)

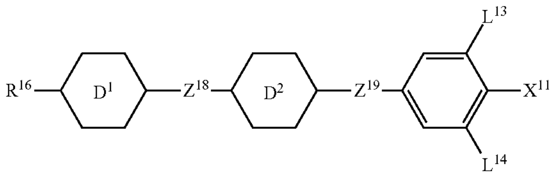

(14)

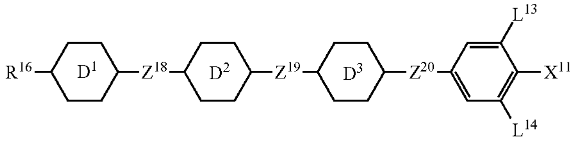

wherein, in formulas (12) to (14), $R^{16}$ is alkyl having 1 to 10 carbons or alkenyl having 2 to 10 carbons, and in the alkyl and the alkenyl, at least one piece of $—CH_2—$ may be replaced by —O—, and in the groups, at least one piece of hydrogen may be replaced by fluorine;

$X^{11}$ is fluorine, chlorine, $—CF_3$, $—CHF_2$, $—CH_2F$, $—OCF_3$, $—OCHF_2$, ring $D^1$, ring $D^2$ and ring $D^3$ are independently 1,4-cyclohexylene, 1,4-phenylene, 1,4-phenylene in which at least one piece of hydrogen is replaced by fluorine, tetrahydropyran-2,5-diyl, 1,3-dioxane-2,5-diyl or pyrimidine-2,5-diyl;

$Z^{18}$, $Z^{19}$ and $Z^{20}$ are independently a single bond, —COO—, $—CH_2O—$, $—CF_2O—$, $—OCF_2—$, $—CH_2CH_2—$, —CH═CH—, —C≡C— or $—(CH_2)_4—$; and $L^{13}$ and $L^{14}$ are independently hydrogen or fluorine.

Item 11. The liquid crystal composition according to any one of items 7 to 10, further containing at least one compound selected from the group of compounds represented by formula (15):

(15)

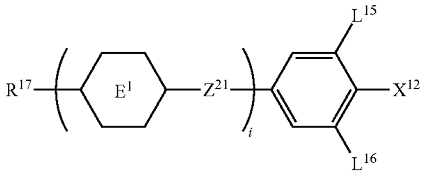

wherein, in formula (15), $R^{17}$ is alkyl having 1 to 10 carbons or alkenyl having 2 to 10 carbons, and in the alkyl and the alkenyl, at least one piece of $—CH_2—$ may be replaced by —O—, and in the groups, at least one piece of hydrogen may be replaced by fluorine;

$X^{12}$ is —C≡N or —C≡C—C≡N;

ring $E^1$ is 1,4-cyclohexylene, 1,4-phenylene, 1,4-phenylene in which at least one piece of hydrogen is replaced by fluorine, tetrahydropyran-2,5-diyl, 1,3-dioxane-2,5-diyl or pyrimidine-2,5-diyl;

$Z^{21}$ is a single bond, —COO—, $—CH_2O—$, $—CF_2O—$, $—OCF_2—$, $—CH_2CH_2—$ or —C≡C—;

$L^{15}$ and $L^{16}$ are independently hydrogen or fluorine; and i is 1, 2, 3 or 4.

Item 12. A liquid crystal display device, including the liquid crystal composition according to any one of items 7 to 11.

The invention further includes the following items: (a) the composition, further containing at least one optically active compound and/or polymerizable compound; and (b) the composition, further containing at least one antioxidant and/or an ultraviolet light absorber.

The invention still further includes the following items: (c) the composition, further containing one, two or at least three additives selected from the group of a polymerizable compound, a polymerization initiator, a polymerization inhibitor, an optically active compound, an antioxidant, an ultraviolet light absorber, a light stabilizer, a heat stabilizer, a dye and an antifoaming agent; and (d) the composition, wherein a maximum temperature of a nematic phase is about 70° C. or more, an optical anisotropy (measured at 25° C.) at a wavelength of 589 nanometers is about 0.08 or more, and a dielectric anisotropy (measured at 25° C.) at a frequency of 1 kHz is about −2 or less.

An aspect of compound (1), synthesis of compound (1), the liquid crystal composition and the liquid crystal display device will be described in the order.

1. Aspect of Compound (1)

Compound (1) has a feature of having 2-fluoro-1,4-phenylene (or 2-chloro-1,4-phenylene) and 2,3-difluoro-1,4-phenylene. The compound has no six-membered ring such as 1,4-cyclohexylene and 1,4-phenylene. Compound (1) has a feature of having a large negative dielectric anisotropy and a larger elastic constant ratio in comparison with a similar compound. Preferred examples of compound (1) will be described. Preferred examples of terminal group R, ring A and bonding group Z in compound (1) apply also to a subordinate formula of formula (1) for compound (1). In compound (1), physical properties can be arbitrarily adjusted by suitably combining the groups. Compound (1) may contain a larger amount of isotope such as $^2H$ (deuterium) and $^{13}C$ than the amount of natural abundance because no significant difference exists in the physical properties of the compound. In addition, symbols in compound (1) are defined according to item 1.

(1)

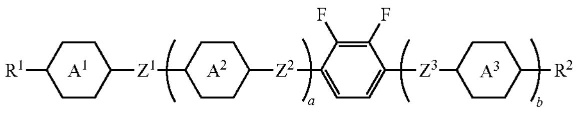

In formula (1), $R^1$ and $R^2$ are independently alkyl having 1 to 15 carbons, and in the alkyl, at least one piece of $—CH_2—$ may be replaced by —O—, and at least one piece of $—CH_2CH_2—$ may be replaced by —CH═CH—.

Preferred $R^1$ or $R^2$ is alkyl having 1 to 12 carbons, alkoxy having 1 to 12 carbons, alkoxyalkyl having 2 to 12 carbons, alkenyl having 2 to 12 carbons or alkenyloxy having 2 to 12 carbons. Further preferred $R^1$ is alkyl, alkoxy, alkoxyalkyl or alkenyl. Particularly preferred $R^1$ is alkyl or alkenyl. Further preferred $R^2$ is alkyl, alkoxy or alkoxyalkyl. Particularly preferred $R^2$ is alkoxy.

Preferred alkyl is $-CH_3$, $-C_2H_5$, $-C_3H_7$, $-C_4H_9$, $-C_5H_{11}$, $-C_6H_{13}$ or $-C_7H_{15}$.

Preferred alkoxy is $-OCH_3$, $-OC_2H_5$, $-OC_3H_7$, $-OC_4H_9$, $-OC_5H_{11}$, $-OC_6H_{13}$ or $-OC_7H_{15}$.

Preferred alkoxyalkyl is $-CH_2OCH_3$, $-CH_2OC_2H_5$, $-CH_2OC_3H_7$, $-(CH_2)_2-OCH_3$, $-(CH_2)_2-OC_2H_5$, $-(CH_2)_2-OC_3H_7$, $-(CH_2)_3-OCH_3$, $-(CH_2)_4-OCH_3$ or $-(CH_2)_5-OCH_3$.

Preferred alkenyl is $-CH{=}CH_2$, $-CH{=}CHCH_3$, $-CH_2CH{=}CH_2$, $-CH{=}CHC_2H_5$, $-CH_2CH{=}CHCH_3$, $-(CH_2)_2-CH{=}CH_2$, $-CH{=}CHC_3H_7$, $-CH_2CH{=}CHC_2H_5$, $-(CH_2)_2-CH{=}CHCH_3$ or $-(CH_2)_3-CH{=}CH_2$.

Preferred alkenyloxy is $-OCH{=}CH_2$, $-OCH_2CH{=}CH_2$, $-OCH_2CH{=}CHCH_3$ or $-OCH_2CH{=}CHC_2H_5$.

Preferred $R^1$ or $R^2$ is $-CH_3$, $-C_2H_5$, $-C_3H_7$, $-C_4H_9$, $-C_5H_{11}$, $-C_6H_{13}$, $-OCH_3$, $-OC_2H_5$, $-OC_3H_7$, $-OC_4H_9$, $-OC_5H_{11}$, $-CH_2OCH_3$, $-CH_2OC_2H_5$, $-CH_2OC_3H_7$, $-CH_2OC_4H_9$, $-C_2H_4OCH_3$, $-C_2H_4OC_2H_5$, $-C_2H_4OC_3H_7$, $-C_3H_6OCH_3$, $-C_3H_6OC_2H_5$, $-C_3H_6OC_3H_7$, $-CH{=}CH_2$, $-CH{=}CHCH_3$, $-(CH_2)_2-CH{=}CH_2$, $-CH_2CH{=}CHC_2H_5$, $-(CH_2)_2-CH{=}CHCH_3$, $-OCH_2CH{=}CH_2$, $-OCH_2CH{=}CHCH_3$ or $-OCH_2CH{=}CHC_2H_5$. Further preferred $R^1$ is $-CH_3$, $-C_2H_5$, $-C_3H_7$, $-C_4H_9$, $-C_5H_{11}$, $-OCH_3$, $-OC_2H_5$, $-OC_3H_7$, $-OC_4H_9$, $-OC_5H_{11}$, $-CH_2OCH_3$, $-CH_2OC_2H_5$, $-CH_2OC_3H_7$, $-C_2H_4OCH_3$, $-C_2H_4OC_2H_5$, $-CH{=}CH_2$, $-CH{=}CHCH_3$, $-(CH_2)_2-CH{=}CH_2$, $-CH_2CH{=}CHC_2H_5$ or $-(CH_2)_2-CH{=}CHCH_3$. Particularly preferred $R^1$ is $-CH_3$, $-C_2H_5$, $-C_3H_7$, $-C_4H_9$, $-C_5H_{11}$, $-CH{=}CH_2$, $-CH{=}CHCH_3$, $-(CH_2)_2-CH{=}CH_2$, $-CH_2CH{=}CHC_2H_5$ or $-(CH_2)_2-CH{=}CHCH_3$. Further preferred $R^2$ is $-CH_3$, $-C_2H_5$, $-C_3H_7$, $-C_4H_9$, $-C_5H_{11}$, $-OCH_3$, $-OC_2H_5$, $-OC_3H_7$, $-OC_4H_9$, $-OC_5H_{11}$, $-CH_2OCH_3$, $-CH_2OC_2H_5$, $-CH_2OC_3H_7$, $-C_2H_4OCH_3$ or $-C_2H_4OC_2H_5$. Particularly preferred $R^2$ is $-OCH_3$, $-OC_2H_5$, $-OC_3H_7$, $-OC_4H_9$ or $-OC_5H_{11}$.

$R^1$ preferably has a straight chain, but may has a branched chain. When $R^1$ has the straight chain, a temperature range of the liquid crystal phase is wide and the viscosity is small. When $R^1$ has the branched chain, compatibility with other liquid crystal compounds is good. A compound in which $R^1$ is optically active is useful as a chiral dopant. A reverse twisted domain to be generated in the liquid crystal display device can be prevented by adding the compound to the composition. A compound in which $R^1$ is not optically active is useful as a component of the composition. When $R^1$ is alkenyl, a preferred configuration depends on a position of a double bond. An alkenyl compound having the preferred configuration has the small viscosity, the high maximum temperature or the wide temperature range of the liquid crystal phase.

A preferred configuration of $-CH{=}CH-$ in the alkenyl depends on a position of a double bond. A trans configuration is preferred in alkenyl having the double bond in an odd-numbered position, such as $-CH{=}CHCH_3$, $-CH{=}CHC_2H_5$, $-CH{=}CHC_3H_7$, $-CH{=}CHC_4H_9$, $-C_2H_4CH{=}CHCH_3$ and $-C_2H_4CH{=}CHC_2H_5$. A cis configuration is preferred in alkenyl having the double bond in an even-numbered position, such as $-CH_2CH{=}CHCH_3$, $-CH_2CH{=}CHC_2H_5$ and $-CH_2CH{=}CHC_3H_7$. The alkenyl compound having a preferred configuration has a high clearing point or a wide temperature range of the liquid crystal phase. A detailed description is found in Mol. Cryst. Liq. Cryst., 1985, 131, 109 and Mol. Cryst. Liq. Cryst., 1985, 131 and 327.

In formula (1), ring $A^1$ is tetrahydropyran-2,5-diyl, and ring $A^2$ and ring $A^3$ are independently 2-fluoro-1,4-phenylene or 2-chloro-1,4-phenylene. Oxygen in tetrahydropyran-2,5-diyl may be leftward (L) or rightward (R). In ring $A^2$ or ring $A^3$, 2-fluoro-1,4-phenylene is preferred to 2-chloro-1,4-phenylene.

In formula (1), $Z^1$, $Z^2$ and $Z^3$ are independently a single bond or alkylene having 1 to 4 carbons, and in the alkylene, at least one piece of $-CH_2-$ may be replaced by $-O-$, $-COO-$ or $-OCO-$, and at least one piece of $-CH_2CH_2-$ may be replaced by $-CH{=}CH-$ or $-C{\equiv}C-$.

Preferred $Z^1$, $Z^2$ or $Z^3$ is a single bond, $-COO-$, $-OCO-$, $-CH_2O-$, $-OCH_2-$, $-CH_2CH_2-$, $-CH{=}CH-$, $-C{\equiv}C-$, $-(CH_2)_4-$ or $-CH_2CH{=}CHCH_2-$. Further preferred $Z^1$, $Z^2$ or $Z^3$ is a single bond, $-CH_2O-$ or $-OCH_2-$. Most preferred $Z^1$, $Z^2$ or $Z^3$ is a single bond.

In formula (1), a and b are independently 0 or 1, and a sum of a and b is 1. A preferred compound in compounds (1) is compound (1-1) or (1-2).

Compound (1-2) is preferred to compound (1-1) from a viewpoint of magnitude of a dielectric anisotropy. In a direction of tetrahydropyran-2,5-diyl, a leftward direction is preferred to a rightward direction from the viewpoint of magnitude of the dielectric anisotropy. More specifically, compound (1-4), (1-6), (1-8) or (1-10) is preferred to a compound (compound (1-3), (1-5), (1-7) or (1-9)) corresponding thereto. Compounds (1-3) to (1-6) are preferred to compounds (1-7) to (1-10) from the viewpoint of magnitude of the dielectric anisotropy.

2. Synthesis of Compound (1)

A synthesis method of compound (1) will be described. Compound (1) can be prepared by suitably combining methods in synthetic organic chemistry. A method for introducing an objective terminal group, ring and bonding group into a starting material is described in books such as "Organic Syntheses" (John Wiley & Sons, Inc.), "Organic Reactions" (John Wiley & Sons, Inc.), "Comprehensive Organic Synthesis" (Pergamon Press) and "New Experimental Chemistry Course (Shin Jikken Kagaku Koza in Japanese)" (Maruzen Co., Ltd.).

2-1. Formation of Bonding Group Z

First, a scheme is shown with regard to a method of forming bonding group Z. Next, reactions described in the scheme in methods (1) to (11) are described. In the scheme, $MSG^1$ (or $MSG^2$) is a monovalent organic group having at least one ring. The monovalent organic groups represented by a plurality of $MSG^1$ (or $MSG^2$) used in the scheme may be identical or different. Compounds (1A) to (1J) correspond to compound (1).

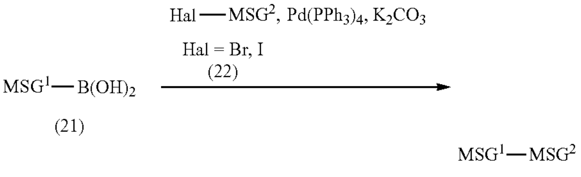

(21)

(1A)

-continued

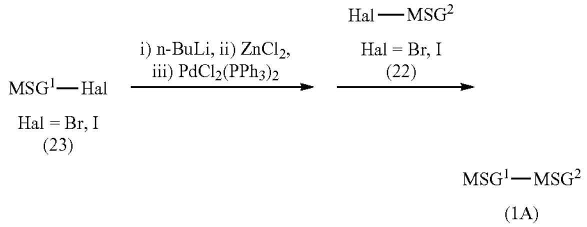

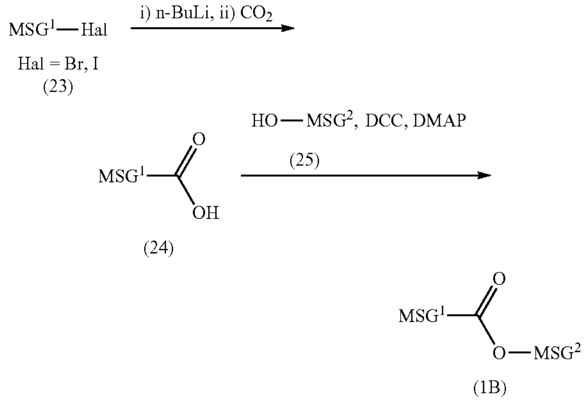

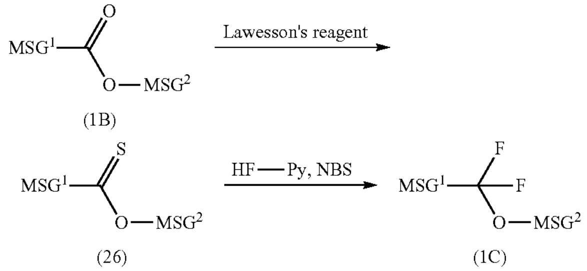

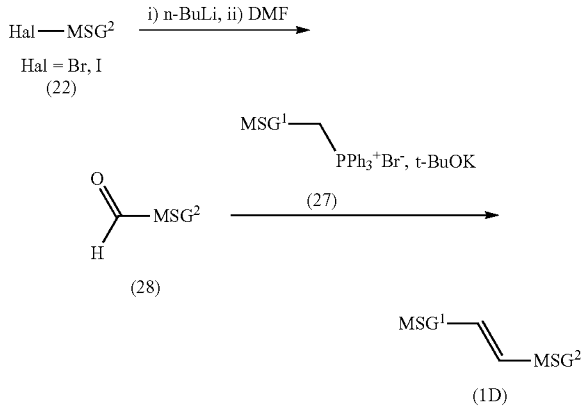

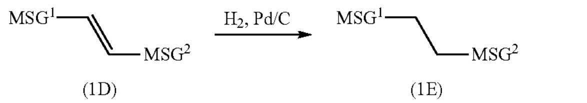

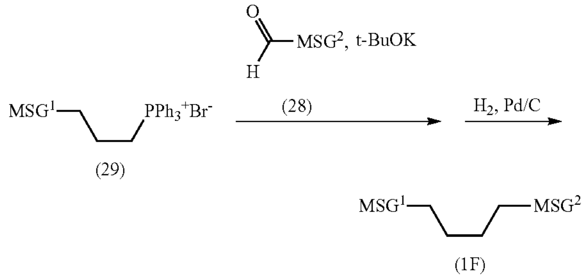

-continued

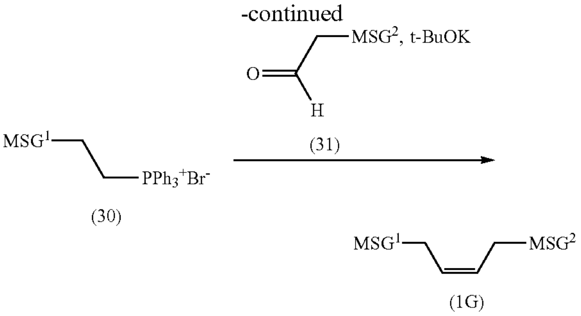

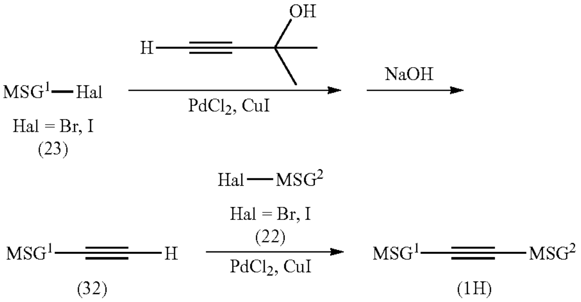

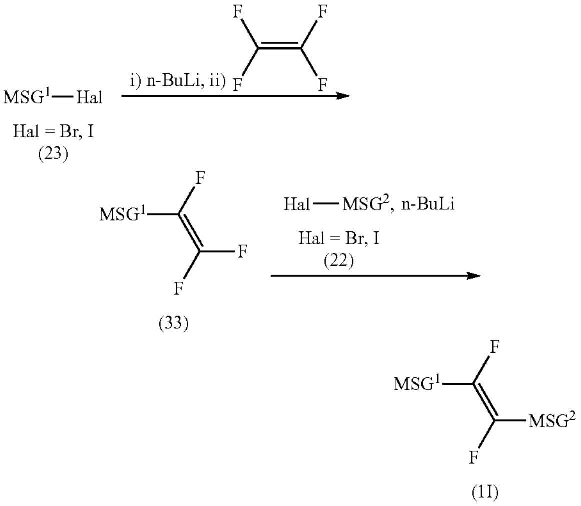

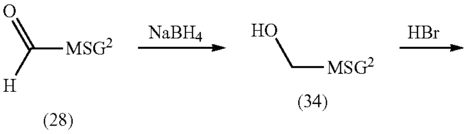

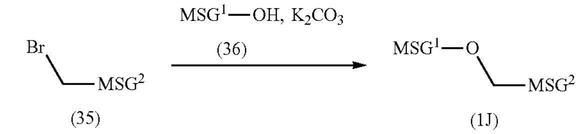

(1) Formation of a Single Bond

Compound (1A) is prepared by allowing aryl boronic acid (21) to react with halide (22), in the presence of carbonate and a catalyst such as tetrakis(triphenylphosphine)palladium. Compound (1A) is also prepared by allowing halide (23) to react with n-butyllithium and subsequently with zinc chloride, and further with halide (22) in the presence of a catalyst such as dichlorobis(triphenylphosphine)palladium.

(2) Formation of —COO—

Carboxylic acid (24) is obtained by allowing halide (23) to react with n-butyllithium and subsequently with carbon dioxide. Compound (1B) is prepared by dehydration of compound (25) and carboxylic acid (24) in the presence of 1,3-dicyclohexylcarbodiimide (DCC) and 4-dimethylaminopyridine (DMAP).

(3) Formation of $—CF_2O—$

Thionoester (26) is obtained by treating compound (1B) with a thiation reagent such as Lawesson's reagent. Compound (1C) is prepared by fluorinating thionoester (26) with a hydrogen fluoride-pyridine complex and N-bromosuccinimide (NBS). Refer to M. Kuroboshi et al., Chem. Lett., 1992, 827. Compound (1C) is also prepared by fluorinating thionoester (26) with (diethylamino)sulfur trifluoride (DAST). Refer to W. H. Bunnelle et al., J. Org. Chem. 1990, 55, 768. The bonding group can also be formed according to the method described in Peer. Kirsch et al., Angew. Chem. Int. Ed. 2001, 40, 1480.

(4) Formation of —CH═CH—

Aldehyde (28) is obtained by treating halide (22) with n-butyllithium and then allowing the treated halide to react with N,N-dimethylformamide (DMF). Phosphorus ylide is generated by treating phosphonium salt (27) with a base such as potassium t-butoxide. Compound (1D) is prepared by allowing the phosphorus ylide to react with aldehyde (28). A cis isomer may be generated depending on reaction conditions, and the cis isomer is isomerized into a trans isomer when necessary.

(5) Formation of $—CH_2CH_2—$

Compound (1E) is prepared by hydrogenating compound (1D) in the presence of a catalyst such as palladium on carbon.

(6) Formation of $—(CH_2)_4—$

A compound having $—(CH_2)_2—CH═CH—$ is obtained by using phosphonium salt (29) in place of phosphonium salt (27) according to the method in method (4). Compound (1F) is prepared by performing catalytic hydrogenation of the compound obtained.

(7) Formation of $—CH_2CH═CHCH_2—$

Compound (1G) is prepared by using phosphonium salt (30) in place of phosphonium salt (27) and aldehyde (31) in place of aldehyde (28) according to the method of the method (4). A trans isomer may be generated depending on reaction conditions, and the trans isomer is isomerized to a cis isomer when necessary.

(8) Formation of —C≡C—

Compound (32) is obtained by allowing halide (23) to react with 2-methyl-3-butyn-2-ol in the presence of a catalyst including dichloropalladium and copper halide, and then performing deprotection under basic conditions. Compound (1H) is prepared by allowing compound (32) to react with halide (22) in the presence of the catalyst including dichloropalladium and copper halide.

(9) Formation of —CF═CF—

Compound (33) is obtained by treating halide (23) with n-butyllithium and then allowing the treated halide to react with tetrafluoroethylene. Compound (1I) is prepared by treating halide (22) with n-butyllithium, and then allowing the treated halide to react with compound (33).

(10) Formation of $—OCH_2—$

Compound (34) is obtained by reducing aldehyde (28) with a reducing agent such as sodium borohydride. Bromide (35) is obtained by brominating compound (34) with hydrobromic acid or the like. Compound (1J) is prepared by allowing bromide (35) to react with compound (36) in the presence of a base such as potassium carbonate.

(11) Formation of $—CF_2CF_2—$

A compound having $—(CF_2)_2—$ is obtained by fluorinating diketone (—COCO—) with sulfur tetrafluoride, in the presence of a hydrogen fluoride catalyst, according to the method described in J. Am. Chem. Soc., 2001, 123, 5414.

2-2. Formation of Ring A

A starting material is commercially available or a formation method is well known with regard to a ring such as 1,4-cyclohexylene, 1,4-phenylene, 2-fluoro-1,4-phenylene or 2,3-difluoro-1,4-phenylene. Refer to paragraphs 0084 to 0107 in JP 2013-241397 A with regard to formation of tetrahydropyran-2,5-diyl.

3. Liquid Crystal Composition 3-1. Component Compound

A liquid crystal composition of the invention is described. The composition contains at least one compound (1) as component (a). The composition may contain two, three or more compounds (1). A component in the composition may be only compound (1). In order to develop good physical properties, the composition preferably contains at least one of compounds (1) in the range of about 1% by weight to about 50% by weight. In a composition having a negative dielectric anisotropy, a preferred content of compound (1) is in the range of about 5% by weight to about 60% by weight. In a composition having a positive dielectric anisotropy, a preferred content of compound (1) is about 30% by weight or less.

TABLE 1

Component compounds of composition

| Component | Component compounds | Dielectric anisotropy |
| --- | --- | --- |
| Component (a) | Compound (1) | Negatively large |
| Component (b) | Compound (2) to compound (4) | Small |
| Component (c) | Compound (5) to compound (11) | Negatively large |
| Component (d) | Compound (12) to compound (14) | Positively large |
| Component (e) | Compound (15) | Positively large |

The composition contains compound (1) as component (a). The composition preferably further contains a liquid crystal compound selected from components (b) to (e) described in Table 1. When the composition is prepared, being selected from components (b) to (e) is preferred by taking into account a positive or negative dielectric anisotropy and magnitude of the dielectric anisotropy. The composition may contain a liquid crystal compound different from compounds (1) to (15). The composition may not contain such a liquid crystal compound.

Component (b) includes a compound in which two terminal groups are alkyl or the like. Specific preferred examples of components (b) include compounds (2-1) to (2-11), compounds (3-1) to (3-19) and compounds (4-1) to (4-7). In the compounds, $R^{11}$ and $R^{12}$ are independently alkyl having 1 to 10 carbons or alkenyl having 2 to 10 carbons, and in the alkyl and the alkenyl, at least one piece of $—CH_2—$ may be replaced by —O—, and in the groups, at least one piece of hydrogen may be replaced by fluorine.

(2-1)

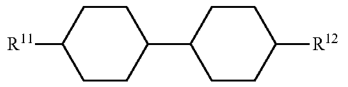

(2-2)

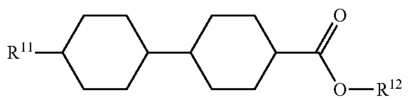

-continued
(2-3)
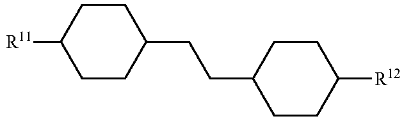
(2-4)
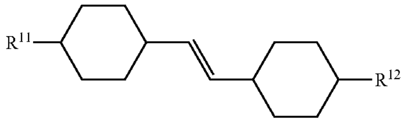
(2-5)
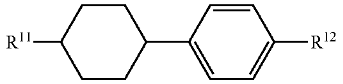
(2-6)
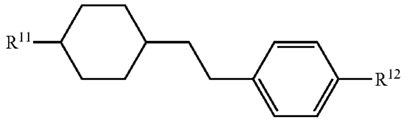
(2-7)
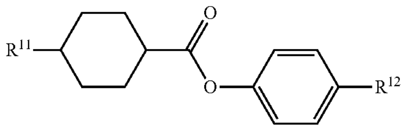
(2-8)
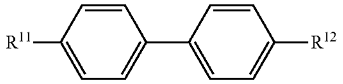
(2-9)
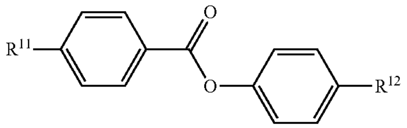
(2-10)
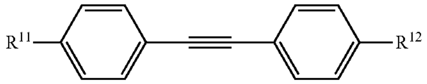
(2-11)
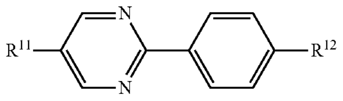
(3-1)
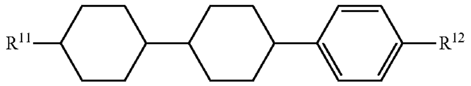
(3-2)
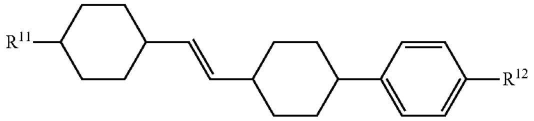
(3-3)
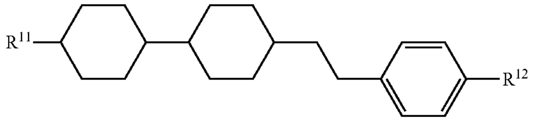
(3-4)
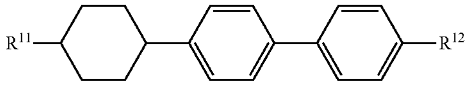
-continued
(3-5)
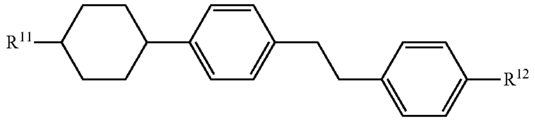
(3-6)
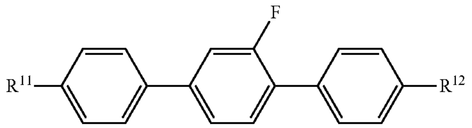
(3-7)
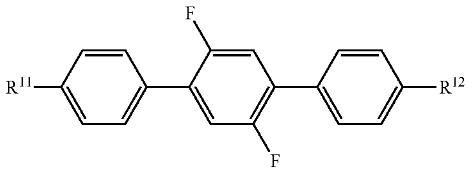
(3-8)
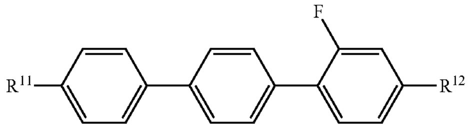
(3-9)
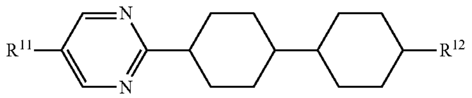
(3-10)
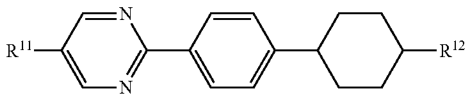
(3-11)
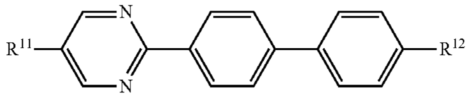
(3-12)
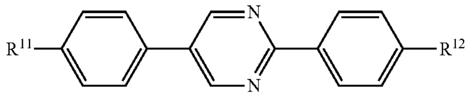
(3-13)
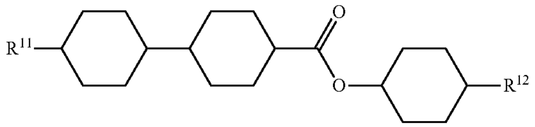
(3-14)
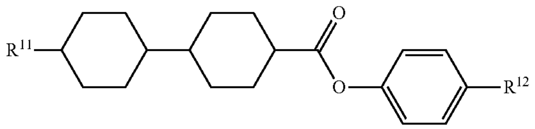
(3-15)
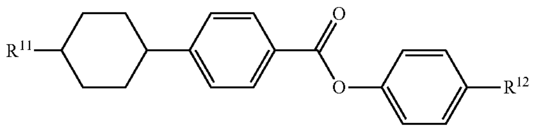

-continued (3-16)

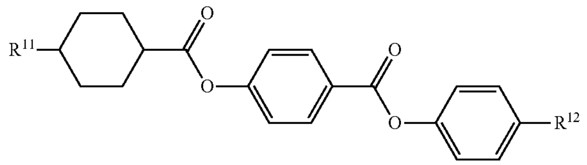

(3-17)

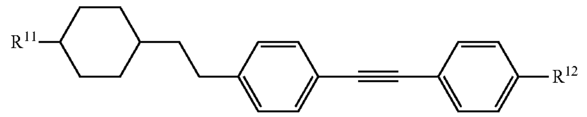

(3-18)

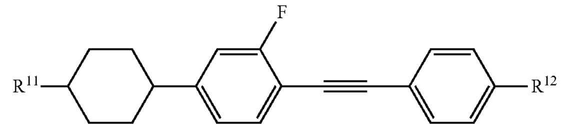

(3-19)

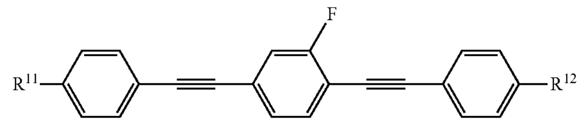

(4-1)

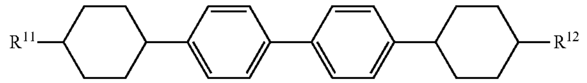

(4-2)

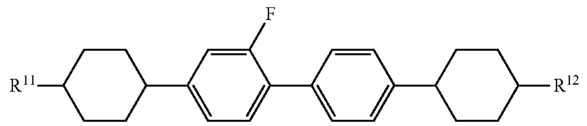

(4-3)

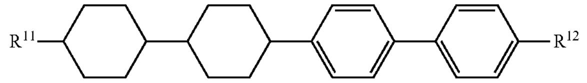

(4-4)

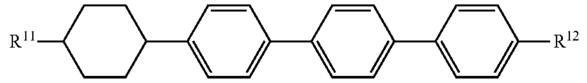

(4-5)

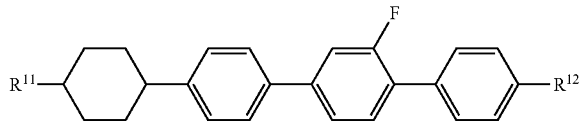

(4-6)

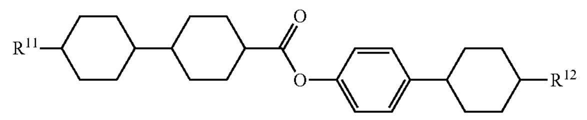

(4-7)

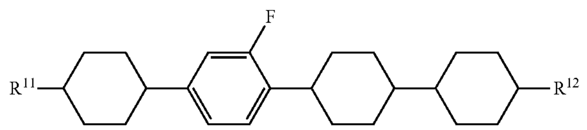

Component (b) has a small dielectric anisotropy. Component (b) is close to neutrality. Compound (2) is effective in decreasing viscosity or adjusting optical anisotropy. Compounds (3) and (4) are effective in extending the temperature range of the nematic phase by increasing the maximum temperature, or in adjusting the optical anisotropy.

As a content of component (b) is increased, the viscosity of the composition is decreased, and the dielectric anisotropy is decreased. Thus, as long as a desired value of threshold voltage of the device is met, the content is preferably as large as possible. When a composition for the IPS mode, the VA mode or the like is prepared, the content of component (b) is preferably about 30% by weight or more, and further preferably about 40% by weight or more, based on the weight of the liquid crystal composition.

Component (c) includes compounds (5) to (11). The compounds have phenylene in which hydrogen in lateral positions are replaced by two pieces of halogen, such as 2,3-difluoro-1,4-phenylene. Specific preferred examples of components (c) include compounds (5-1) to (5-8), compounds (6-1) to (6-17), compound (7-1), compounds (8-1) to (8-3), compounds (9-1) to (9-11), compounds (10-1) to (10-3) and compounds (11-1) to (11-3). In the compounds, $R^{13}$, $R^{14}$ and $R^{15}$ are independently alkyl having 1 to 10 carbons or alkenyl having 2 to 10 carbons, and in the alkyl and the alkenyl, at least one piece of $—CH_2—$ may be replaced by —O—, and in the groups, at least one piece of hydrogen may be replaced by fluorine, and $R^{15}$ may be hydrogen or fluorine.

(5-1)

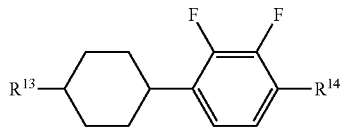

(5-2)

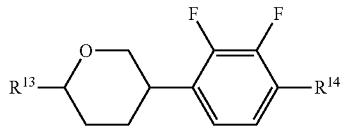

(5-3)

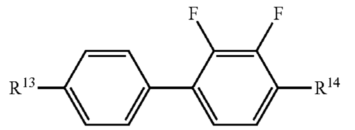

(5-4)

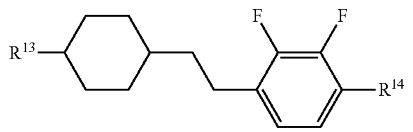

(5-5)

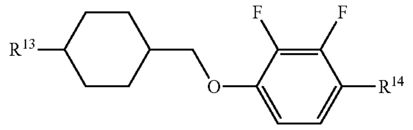

(5-6)

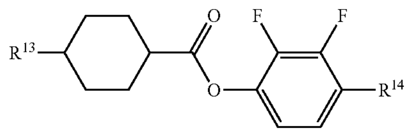

-continued
(5-7)
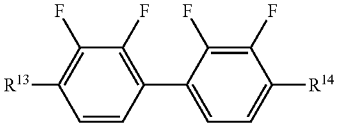
(5-8)
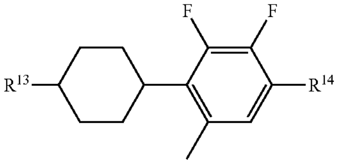
(6-1)
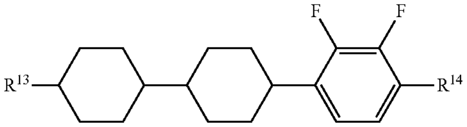
(6-2)
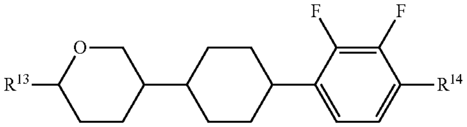
(6-3)
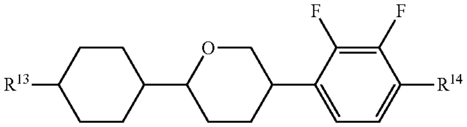
(6-4)
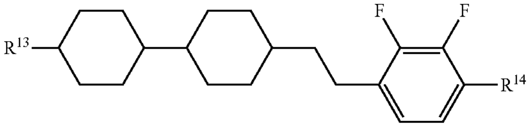
(6-5)
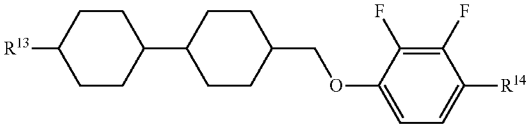
(6-6)
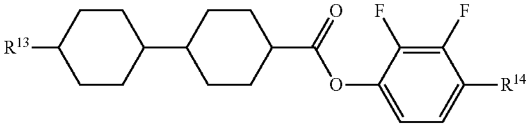
(6-7)
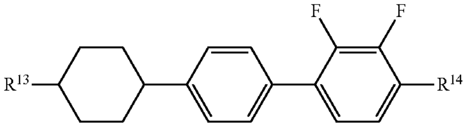
(6-8)
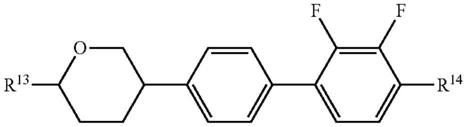
(6-9)
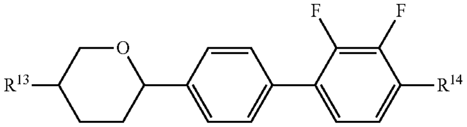
-continued
(6-10)
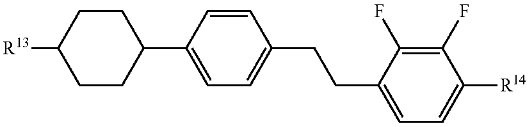
(6-11)
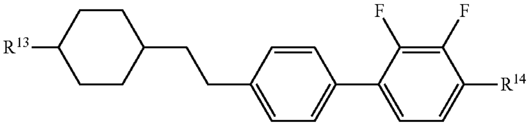
(6-12)
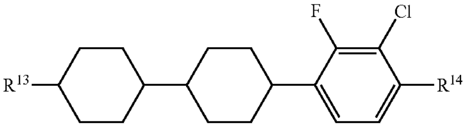
(6-13)
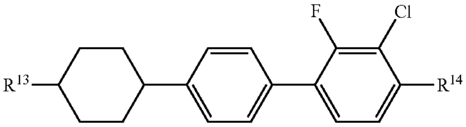
(6-14)
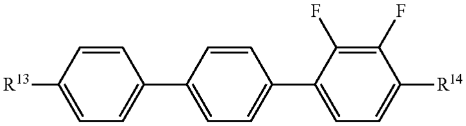
(6-15)
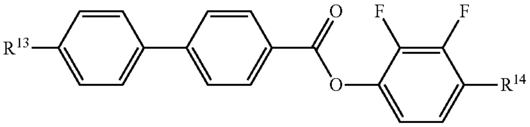
(6-16)
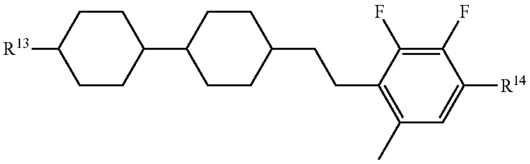
(6-17)
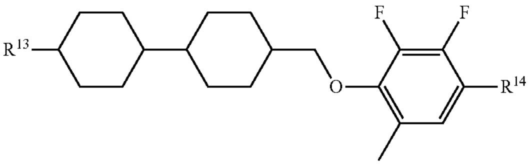
(7-1)
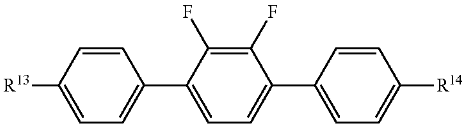
(8-1)
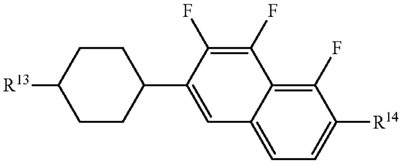

-continued
(8-2)
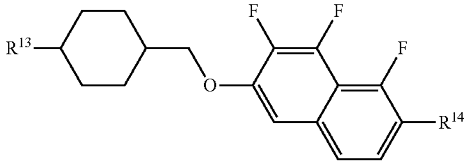
(8-3)
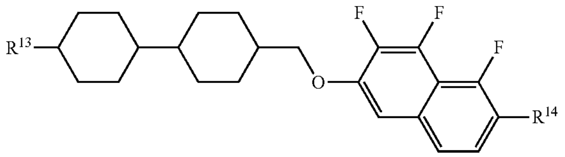
(9-1)
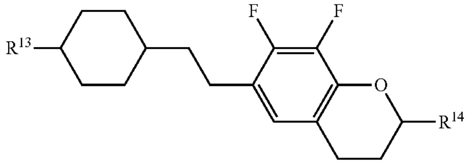
(9-2)
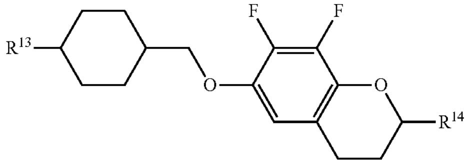
(9-3)
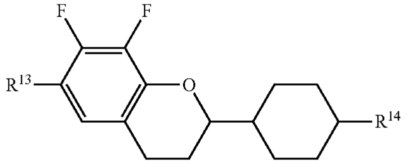
(9-4)
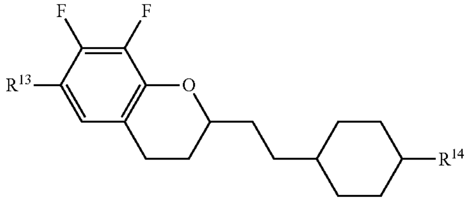
(9-5)
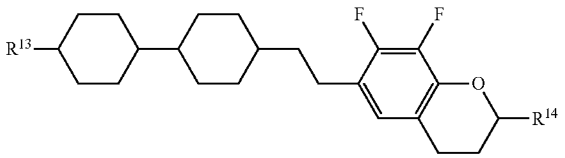
(9-6)
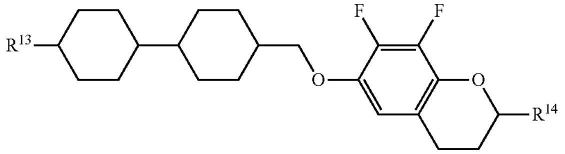
-continued
(9-7)
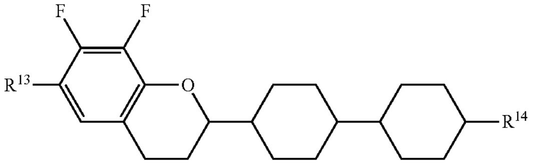
(9-8)
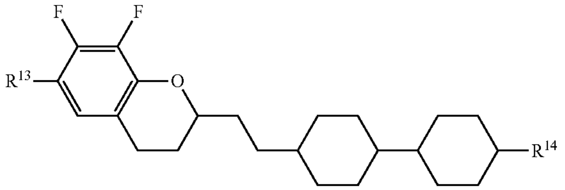
(9-9)
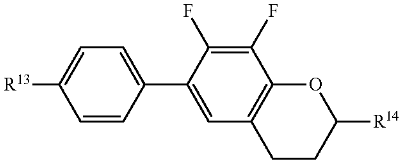
(9-10)
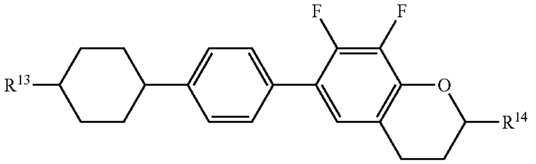
(9-11)
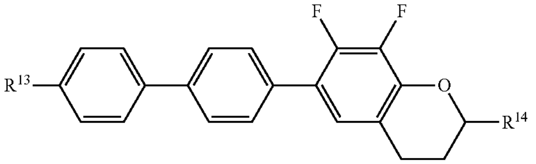
(10-1)
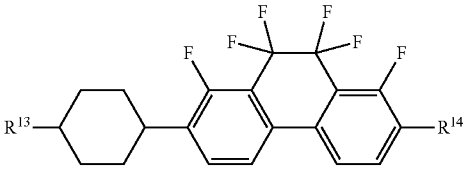
(10-2)
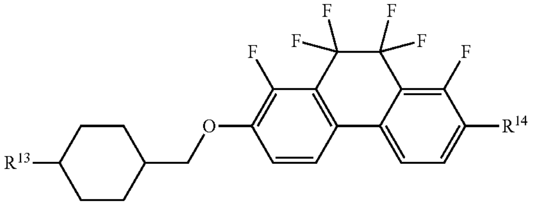
(10-3)
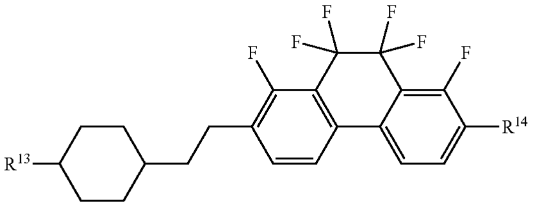

-continued (11-1)

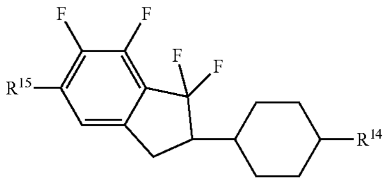

(11-2)

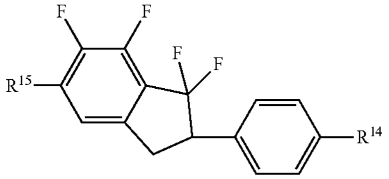

(11-3)

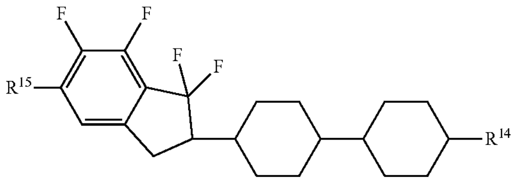

Component (c) has a large negative dielectric anisotropy. Component (c) is used when a composition for the IPS mode, the VA mode, the PSA mode or the like is prepared. As a content of component (c) is increased, the dielectric anisotropy of the composition is negatively increased, but the viscosity is increased. Thus, as long as a desired value of threshold voltage of the device is met, the content is preferably as small as possible. When the dielectric anisotropy at a degree of −5 is taken into account, the content is preferably about 40% by weight or more in order to allow a sufficient voltage driving.

Among types of component (c), compound (5) is a bicyclic compound, and therefore is effective in decreasing the viscosity, adjusting the optical anisotropy or increasing the dielectric anisotropy. Compounds (5) and (6) are a tricyclic compound, and therefore are effective in increasing the maximum temperature, the optical anisotropy or the dielectric anisotropy. Compounds (8) to (11) are effective in increasing the dielectric anisotropy.

When a composition for the IPS mode, the VA mode, the PSA mode or the like is prepared, the content of component (c) is preferably about 40% by weight or more, and further preferably in the range of about 50% by weight to about 95% by weight, based on the weight of the liquid crystal composition. When component (c) is added to a composition having the positive dielectric anisotropy, the content of component (c) is preferably about 30% by weight or less. Addition of component (c) allows adjustment of the elastic constant of the composition and adjustment of a voltage-transmittance curve of the device.

Component (d) is a compound having a halogen-containing group or a fluorine-containing group at a right terminal. Specific preferred examples of components (d) include compounds (12-1) to (12-16), compounds (13-1) to (13-113) and compounds (14-1) to (14-57). In the compounds, $R^{16}$ is alkyl having 1 to 10 carbons or alkenyl having 2 to 10 carbons, and in the alkyl and the alkenyl, at least one piece of $—CH_2—$ may be replaced by —O—, and in the groups, at least one piece of hydrogen may be replaced by fluorine. $X^{11}$ is fluorine, chlorine, $—OCF_3$, $—OCHF_2$, $—CF_3$, $—CHF_2$, $—CH_2F$, $—OCF_2CHF_2$ or $—OCF_2CHFCF_3$.

(12-1)

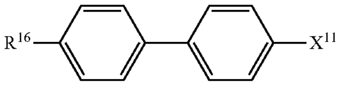

(12-2)

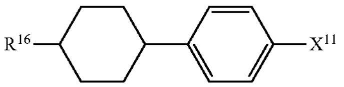

(12-3)

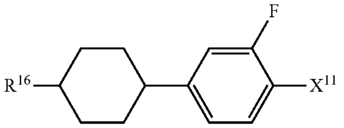

(12-4)

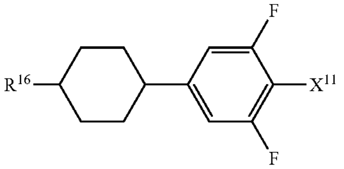

(12-5)

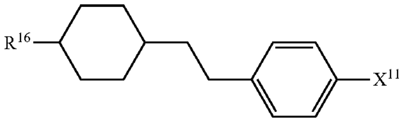

(12-6)

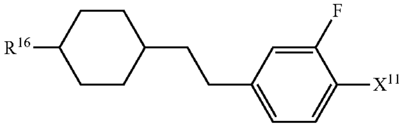

(12-7)

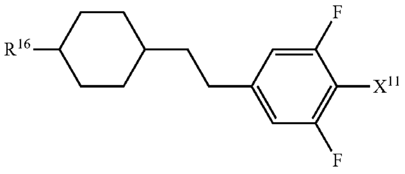

(12-8)

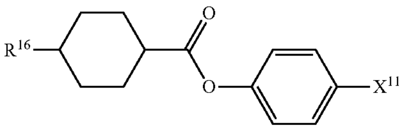

(12-9)

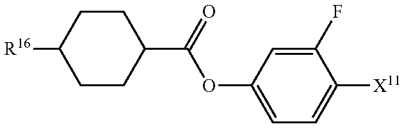

(12-10)

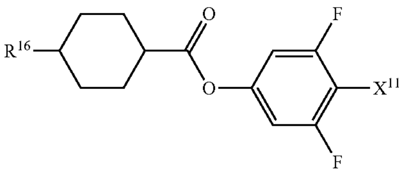

(12-11)

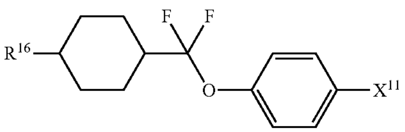

-continued
(12-12)
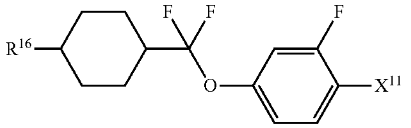
(12-13)
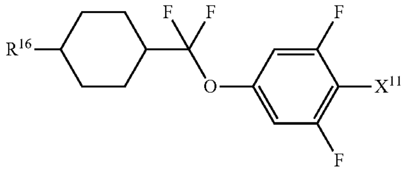
(12-14)
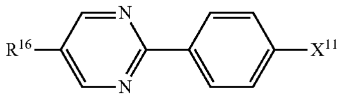
(12-15)
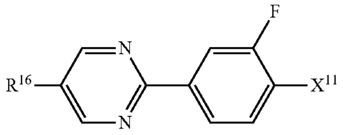
(12-16)
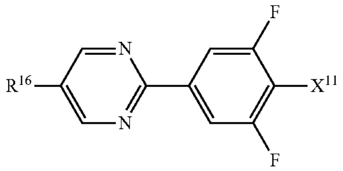
(13-1)
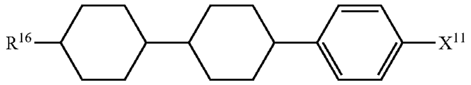
(13-2)
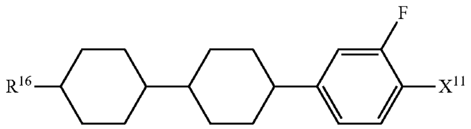
(13-3)
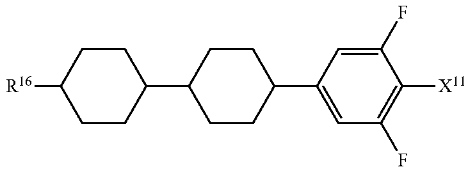
(13-4)
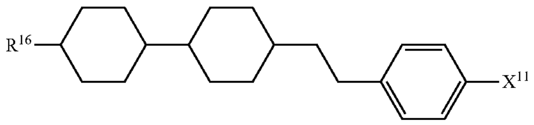
(13-5)
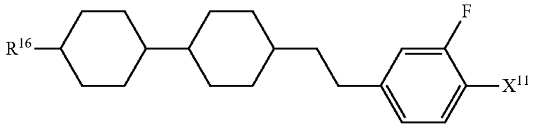
-continued
(13-6)
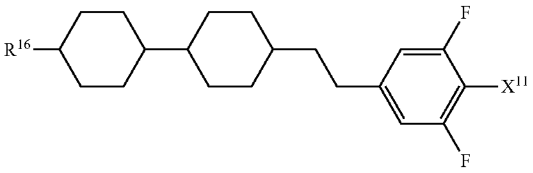
(13-7)
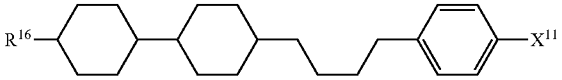
(13-8)
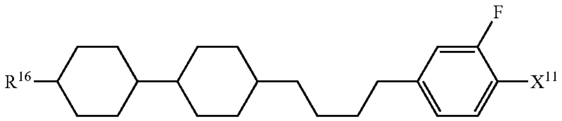
(13-9)
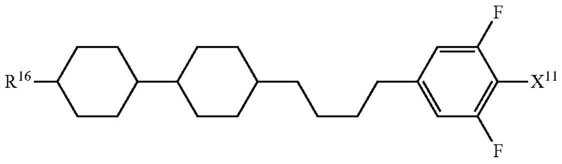
(13-10)
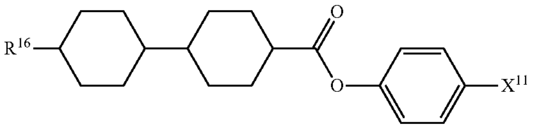
(13-11)
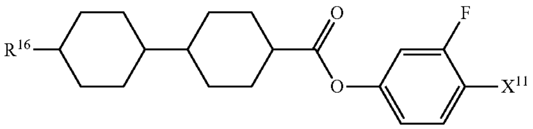
(13-12)
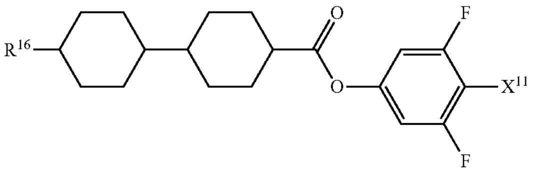
(13-13)
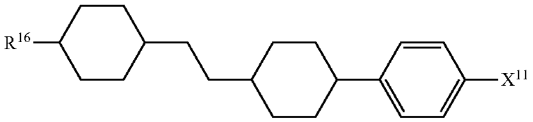
(13-14)
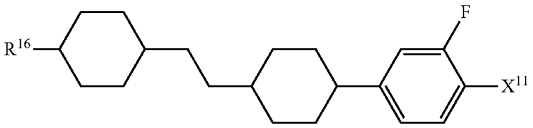

-continued
(13-15)
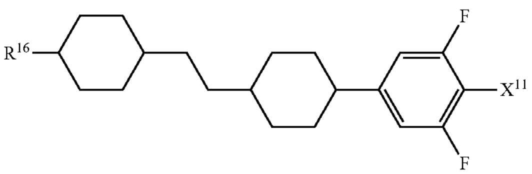
(13-16)
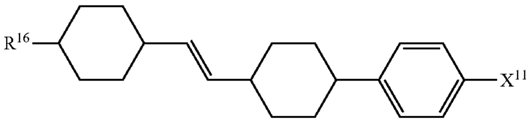
(13-17)
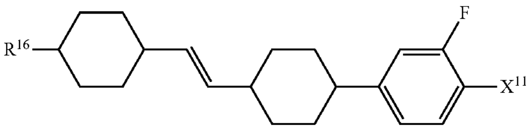
(13-18)
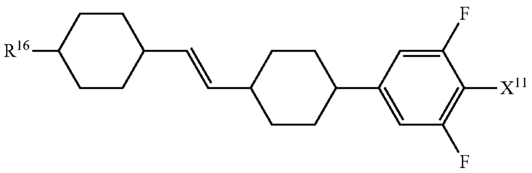
(13-19)
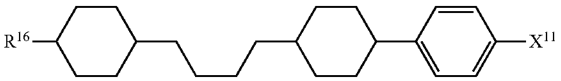
(13-20)
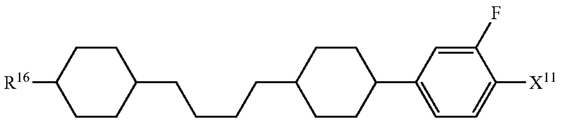
(13-21)
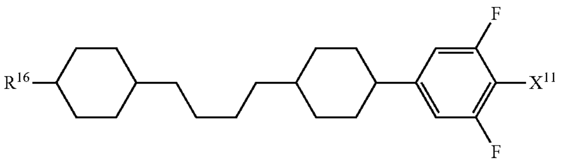
(13-22)
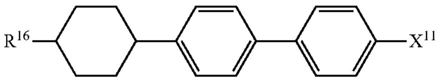
(13-23)
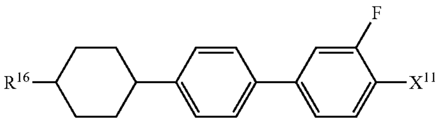
(13-24)
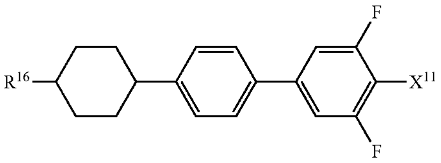
-continued
(13-25)
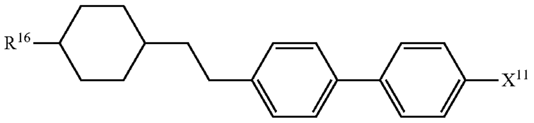
(13-26)
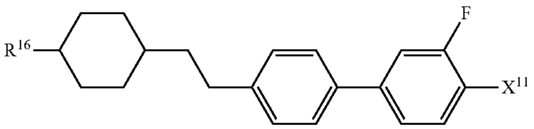
(13-27)
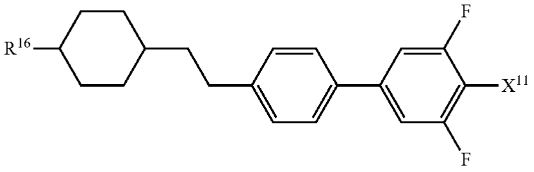
(13-28)
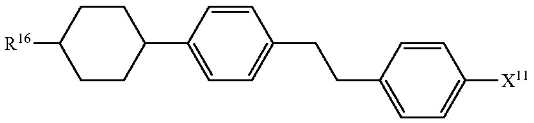
(13-29)
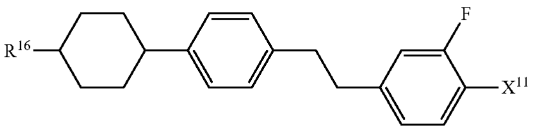
(13-30)
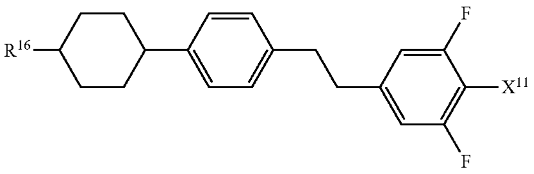
(13-31)
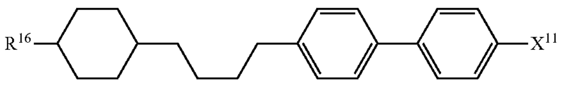
(13-32)
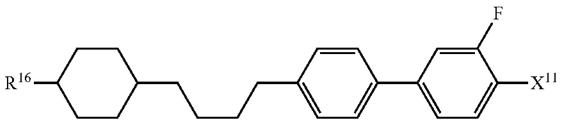
(13-33)
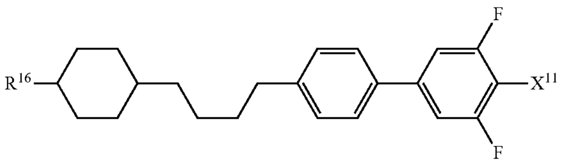
(13-34)
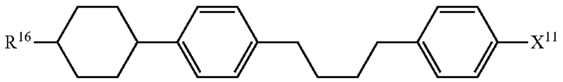

-continued
(13-35)
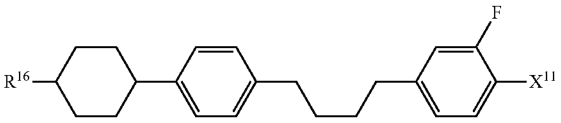
(13-36)
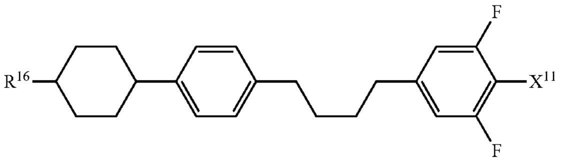
(13-37)
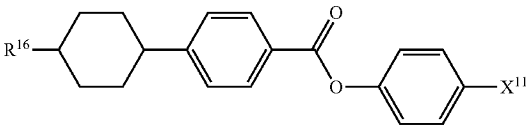
(13-38)
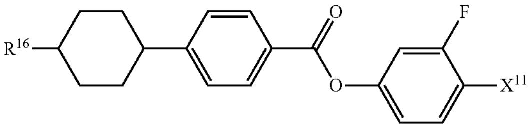
(13-39)
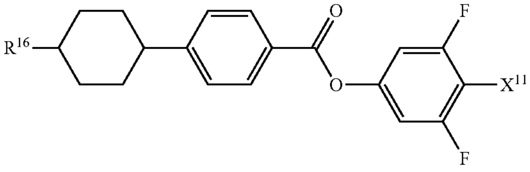
(13-40)
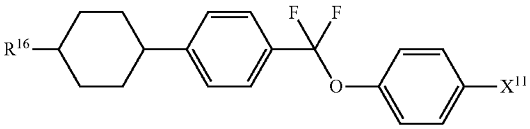
(13-41)
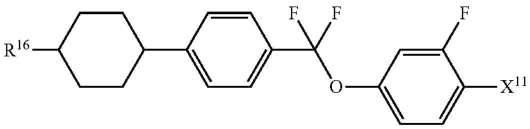
(13-42)
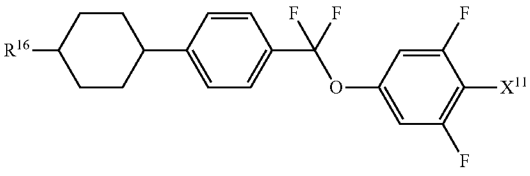
(13-43)
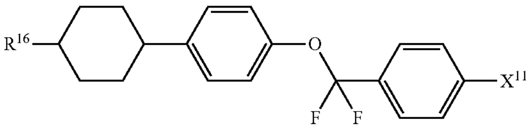
-continued
(13-44)
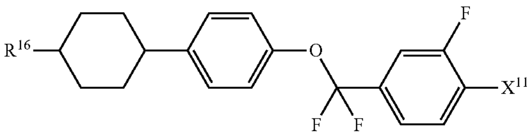
(13-45)
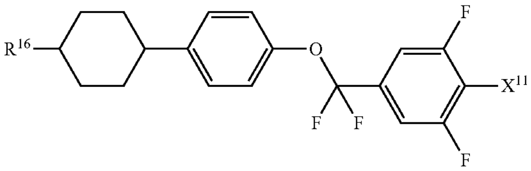
(13-46)
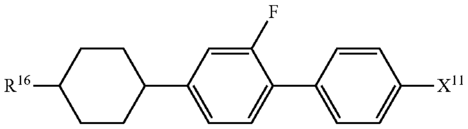
(13-47)
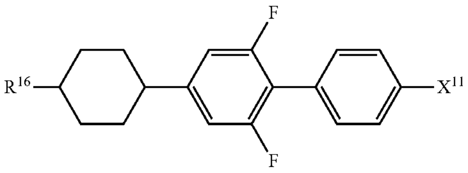
(13-48)
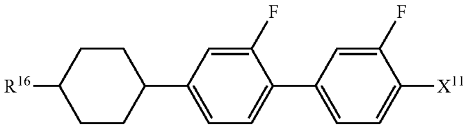
(13-49)
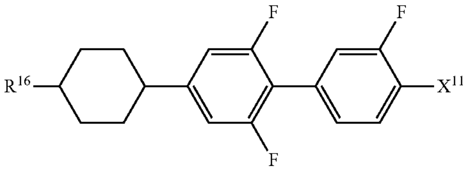
(13-50)
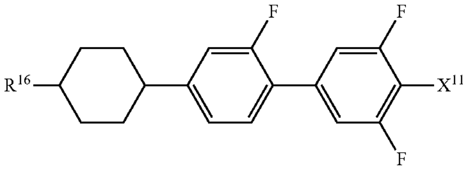
(13-51)
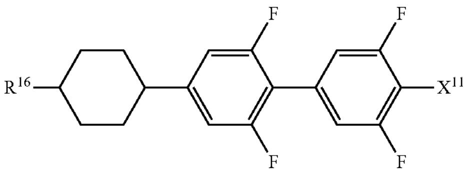
(13-52)
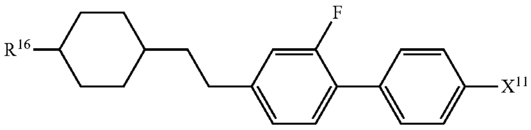

-continued
(13-53)
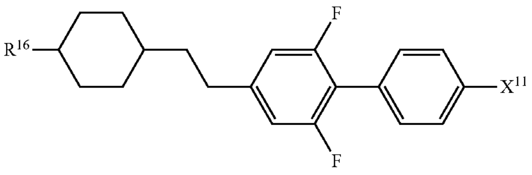
(13-54)
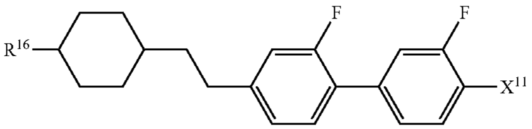
(13-55)
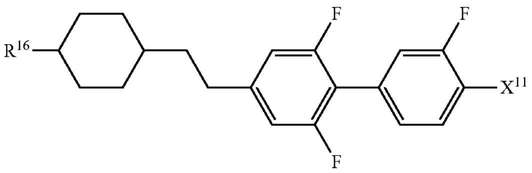
(13-56)
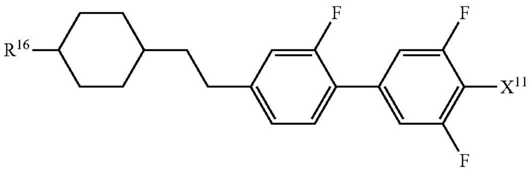
(13-57)
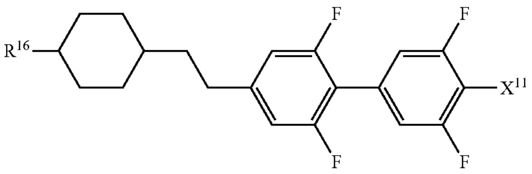
(13-58)
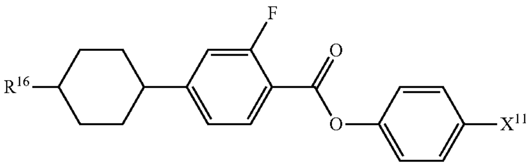
(13-59)
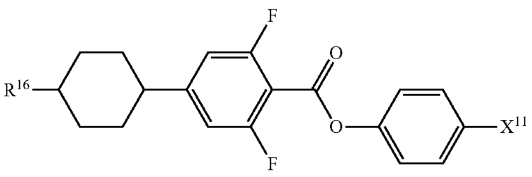
(13-60)
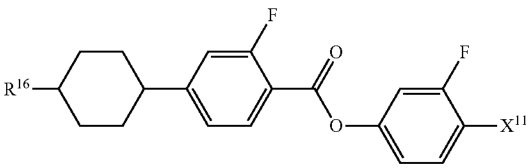
-continued
(13-61)
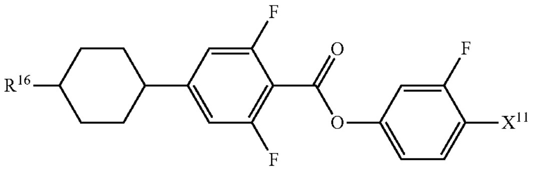
(13-62)
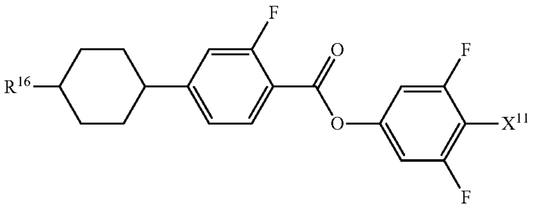
(13-63)
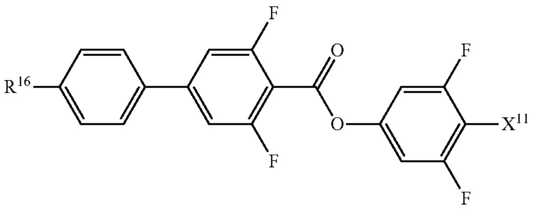
(13-64)
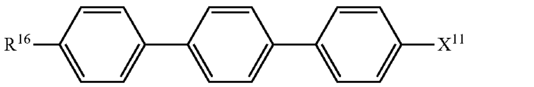
(13-65)
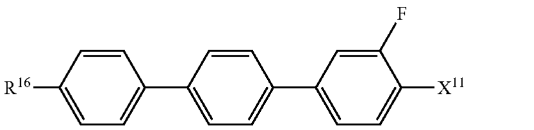
(13-66)
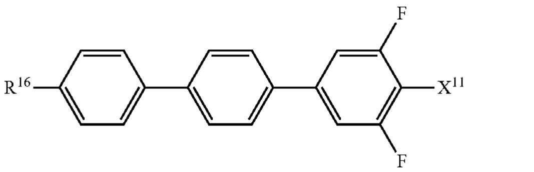
(13-67)
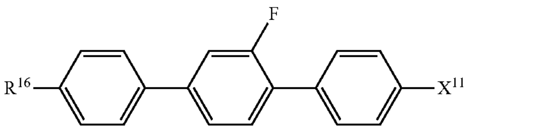
(13-68)
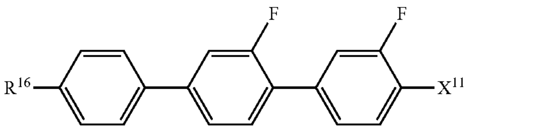

-continued
(13-69)
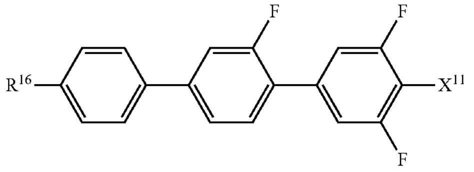
(13-70)
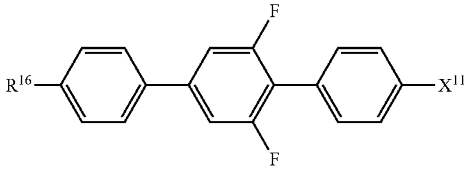
(13-71)
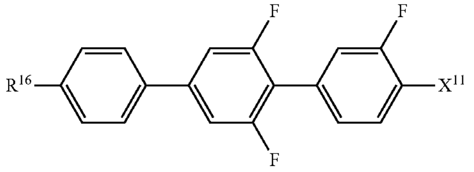
(13-72)
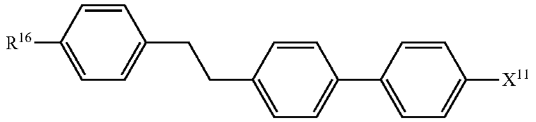
(13-73)
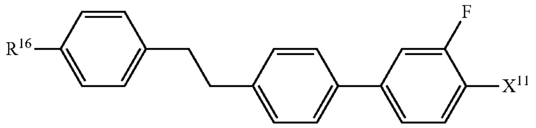
(13-74)
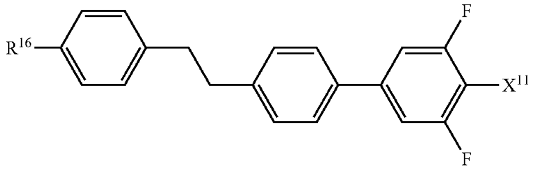
(13-75)
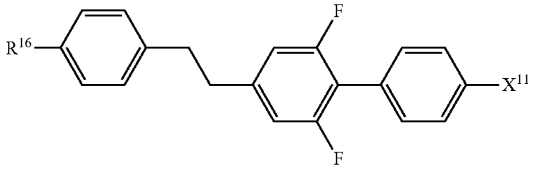
(13-76)
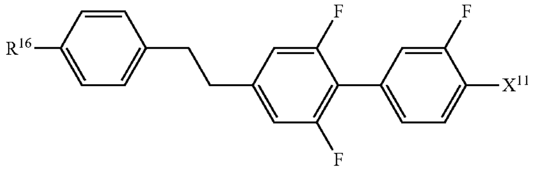
-continued
(13-77)
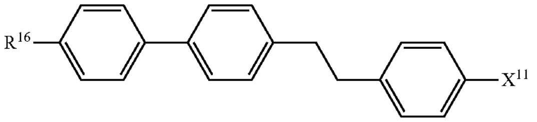
(13-78)
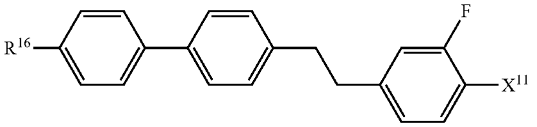
(13-79)
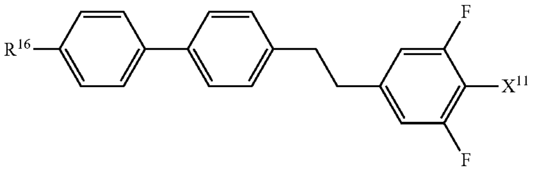
(13-80)
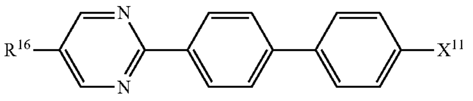
(13-81)
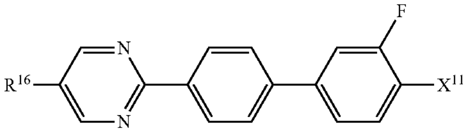
(13-82)
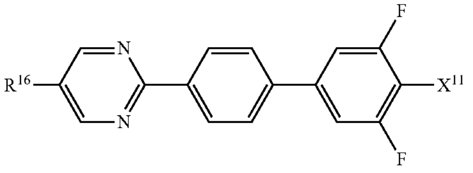
(13-83)
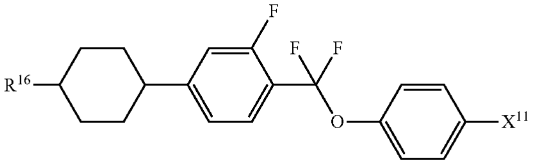
(13-84)
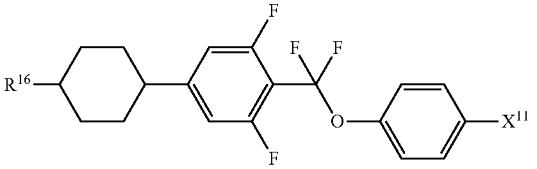
(13-85)
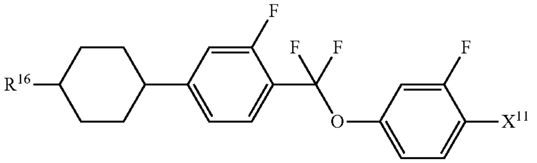

-continued
(13-86)
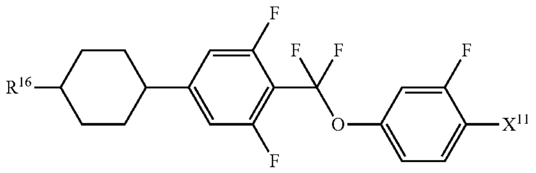
(13-87)
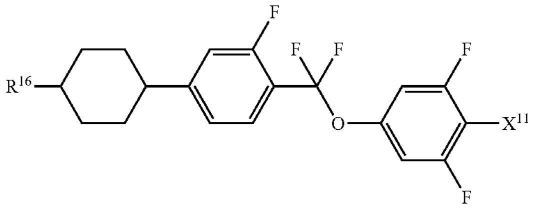
(13-88)
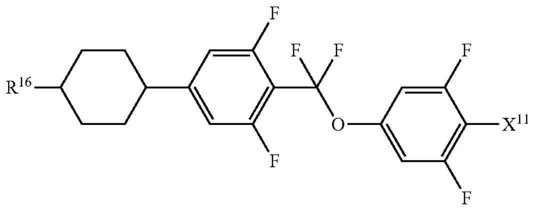
(13-89)
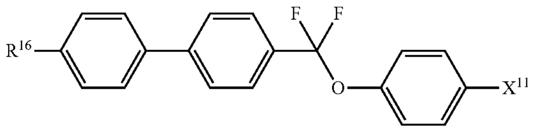
(13-90)
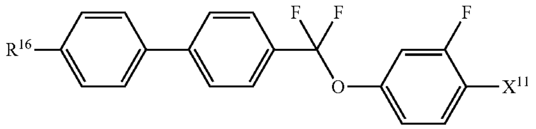
(13-91)
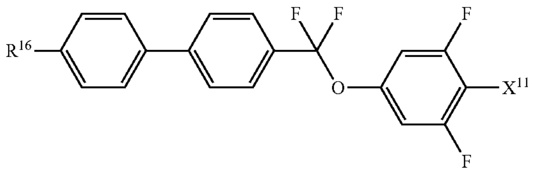
(13-92)
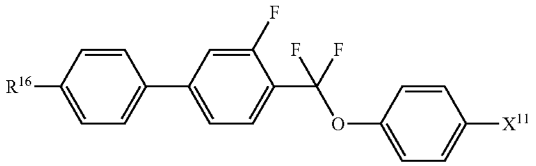
(13-93)
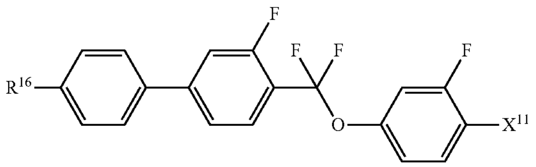
-continued
(13-94)
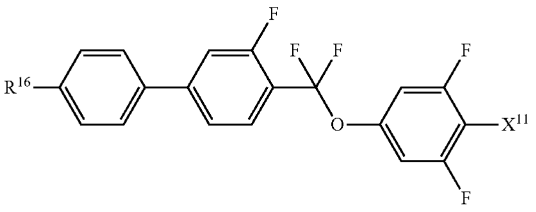
(13-95)
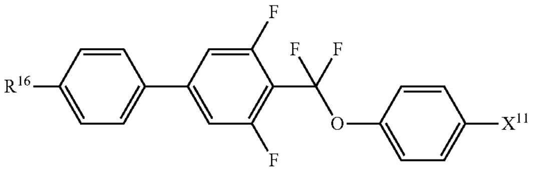
(13-96)
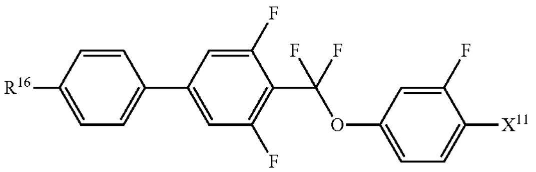
(13-97)
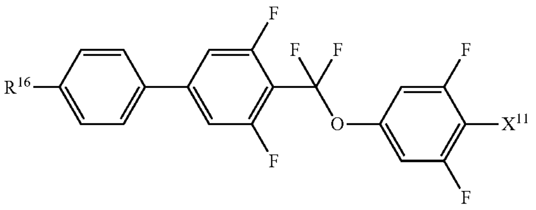
(13-98)
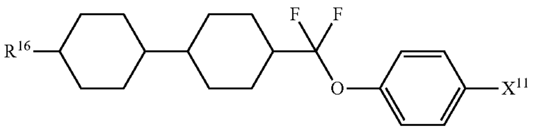
(13-99)
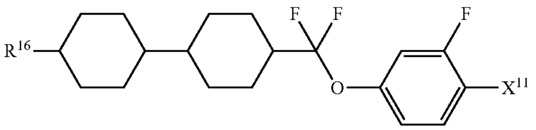
(13-100)
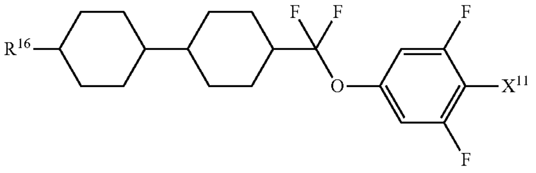
(13-101)
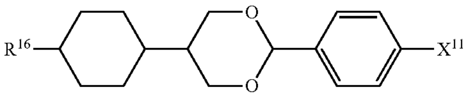

-continued
(13-102)
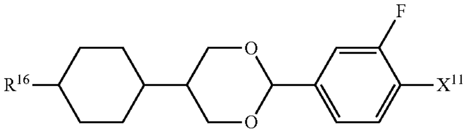
(13-103)
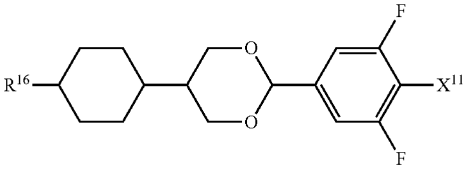
(13-104)
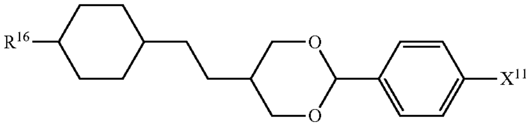
(13-105)
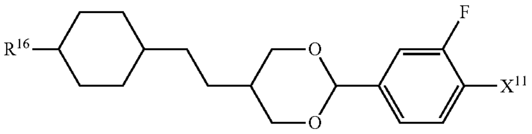
(13-106)
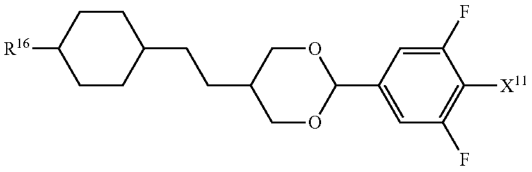
(13-107)
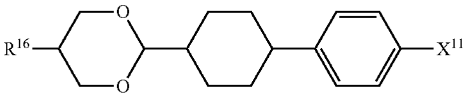
(13-108)
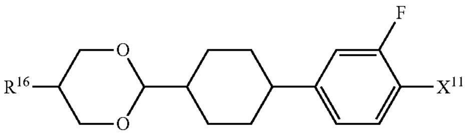
(13-109)
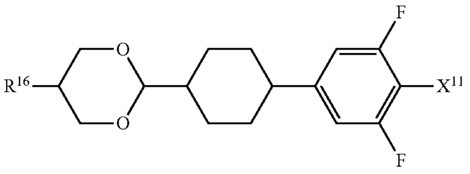
(13-110)
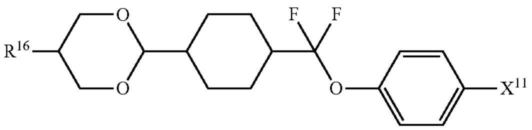
-continued
(13-111)
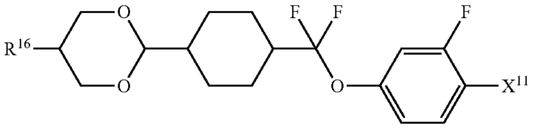
(13-112)
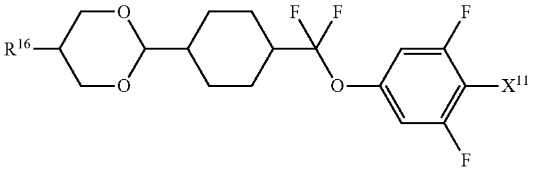
(13-113)
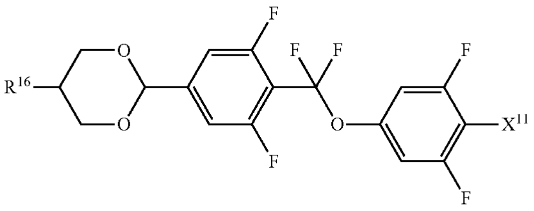
(14-1)
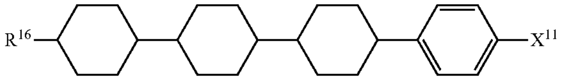
(14-2)
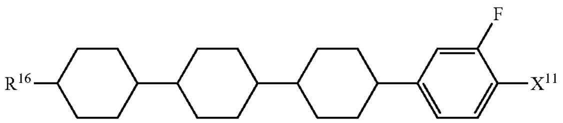
(14-3)
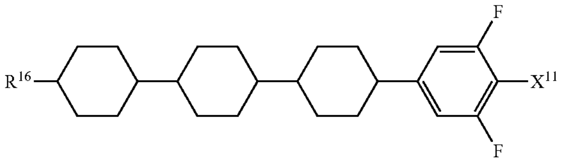
(14-4)
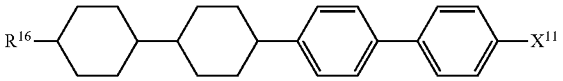
(14-5)
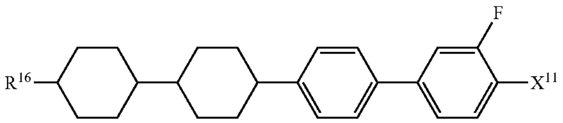
(14-6)
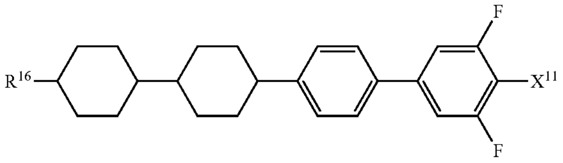

-continued
(14-7)
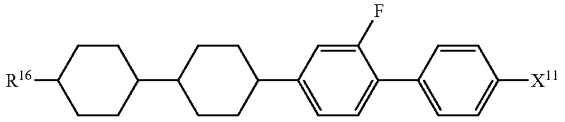
(14-8)
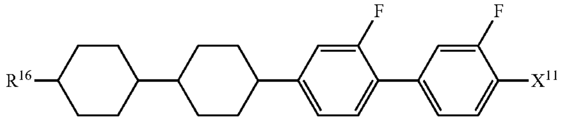
(14-9)
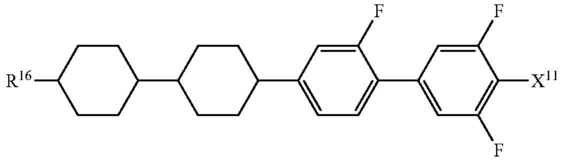
(14-10)
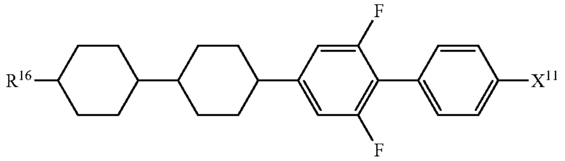
(14-11)
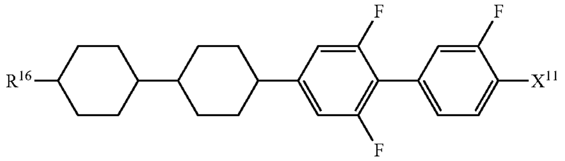
(14-12)
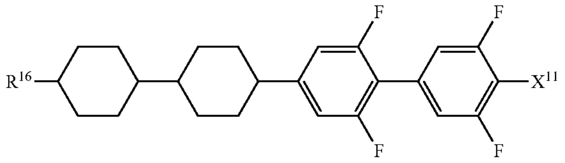
(14-13)
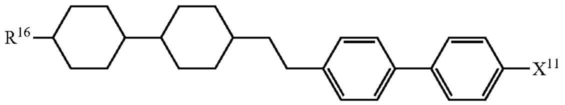
(14-14)
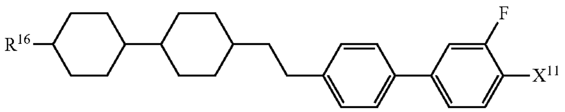
(14-15)
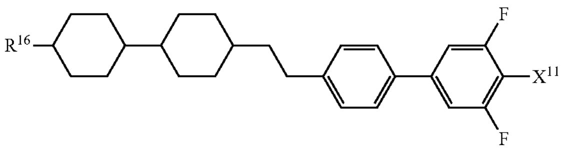
-continued
(14-16)
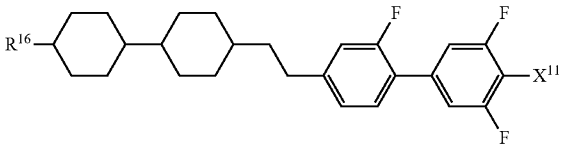
(14-17)
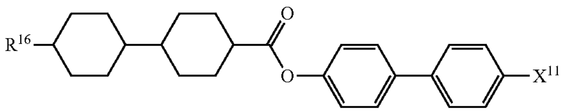
(14-18)
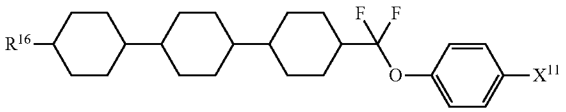
(14-19)
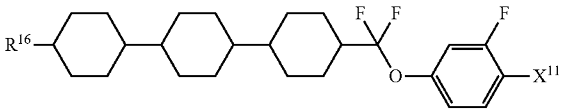
(14-20)
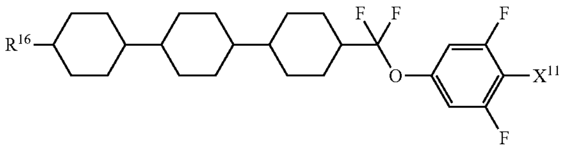
(14-21)
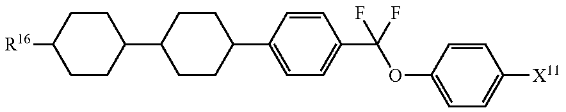
(14-22)
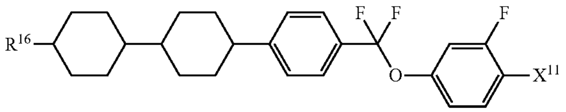
(14-23)
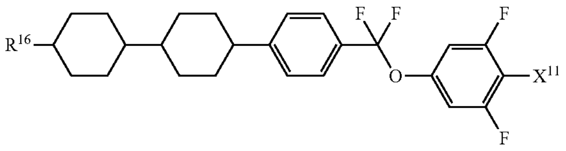
(14-24)
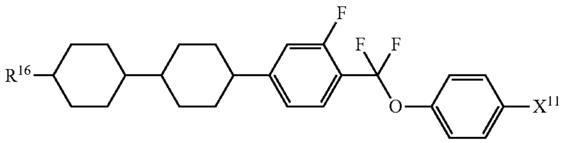
(14-25)
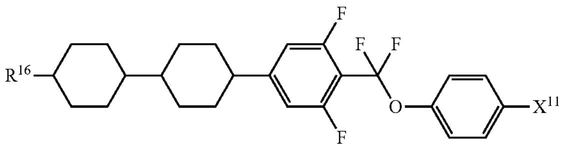

-continued
(14-26)
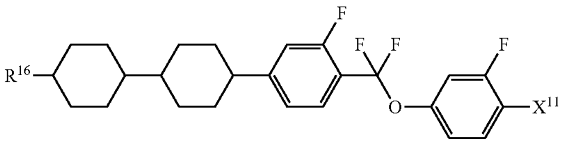
(14-27)
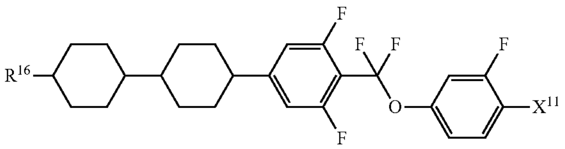
(14-28)
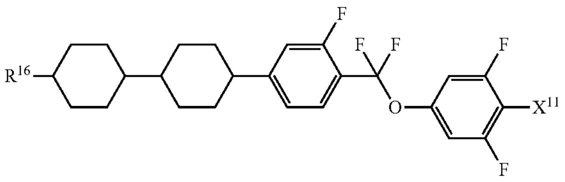
(14-29)
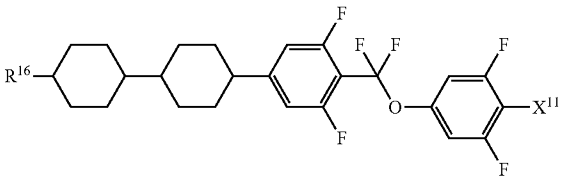
(14-30)
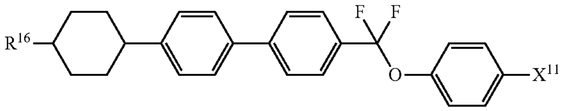
(14-31)
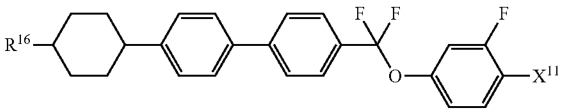
(14-32)
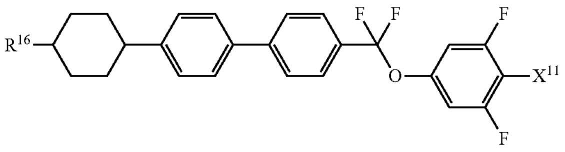
(14-33)
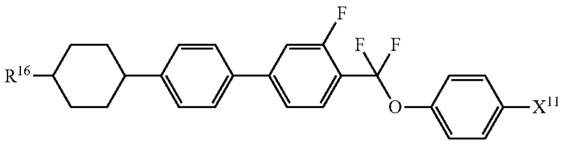
(14-34)
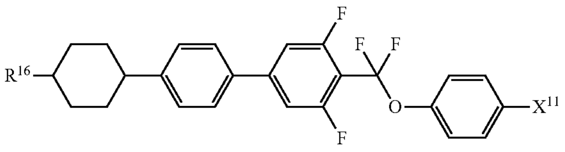
-continued
(14-35)
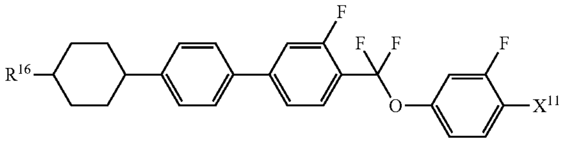
(14-36)
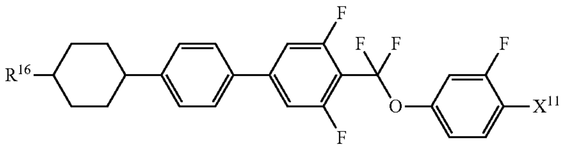
(14-37)
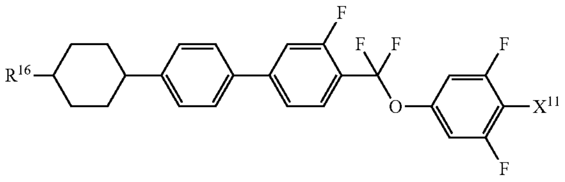
(14-38)
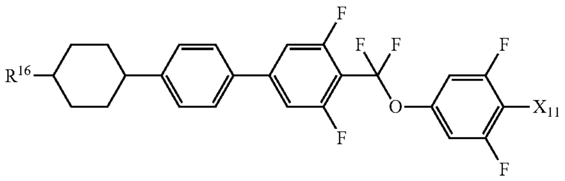
(14-39)
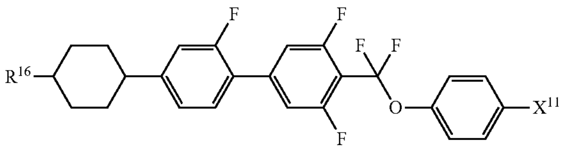
(14-40)
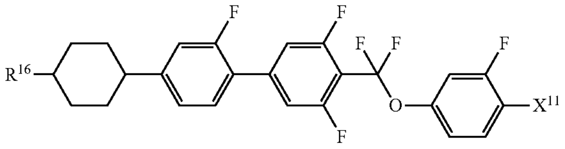
(14-41)
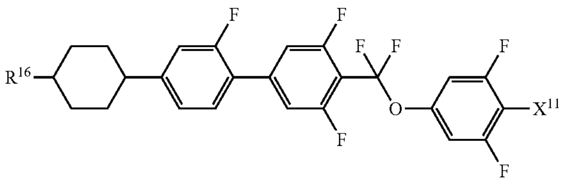
(14-42)
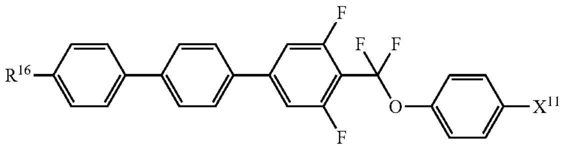

-continued (14-43)

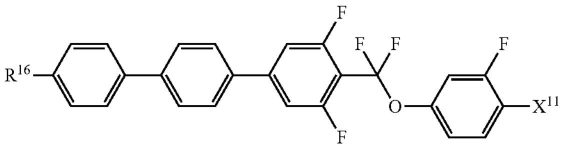

(14-44)

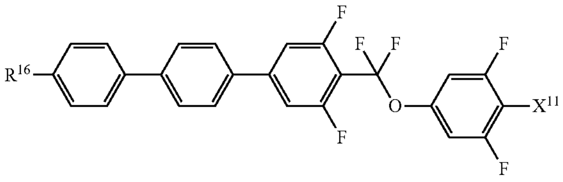

(14-45)

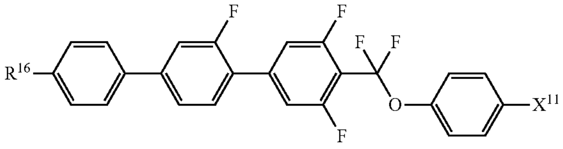

(14-46)

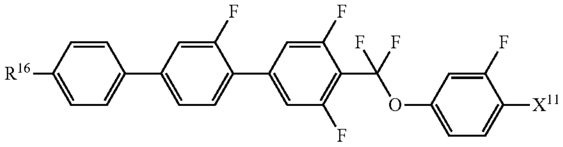

(14-47)

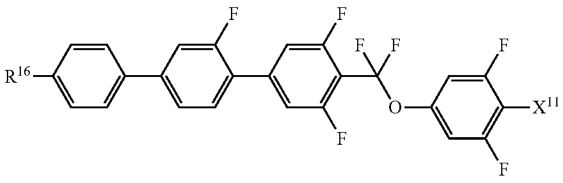

(14-48)

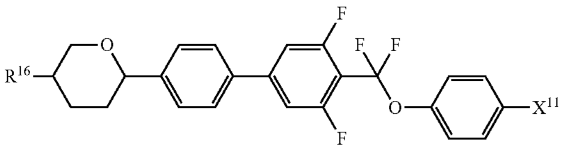

(14-49)

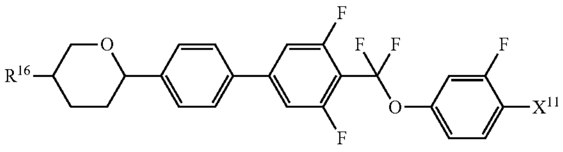

(14-50)

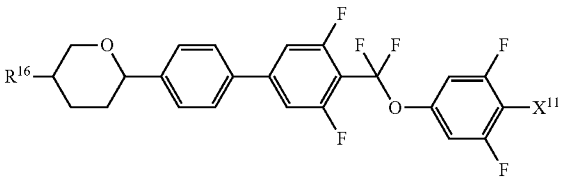

-continued (14-51)

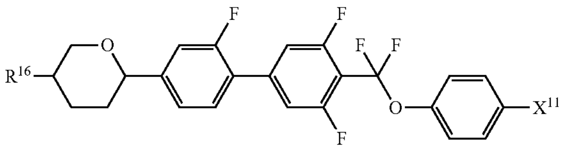

(14-52)

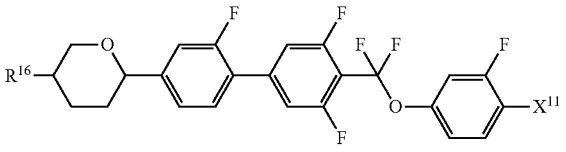

(14-53)

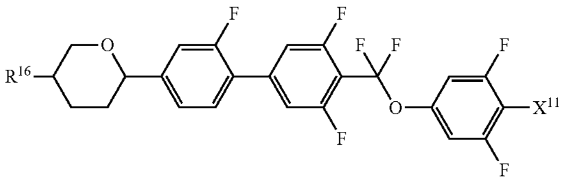

(14-54)

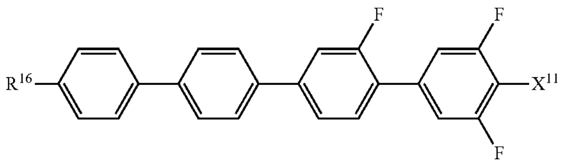

(14-55)

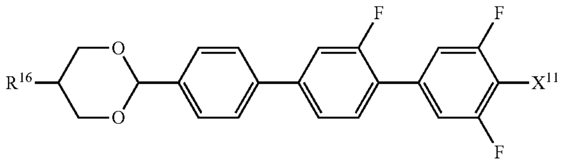

(14-56)

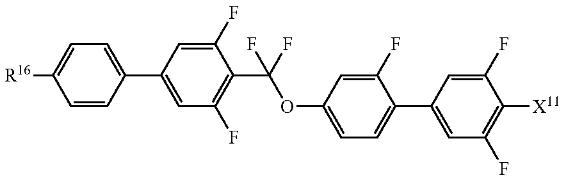

(14-57)

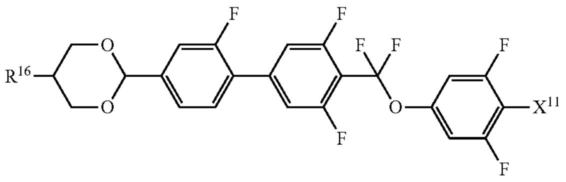

Component (d) has the positive dielectric anisotropy, and very good stability to heat and light, and therefore is used when a composition for the IPS mode, the FFS mode, the OCB mode or the like is prepared. A content of component (d) is suitably in the range of about 1% by weight to about 99% by weight, preferably in the range of about 10% by weight to about 97% by weight, and further preferably in the range of about 40% by weight to about 95% by weight, based on the weight of the liquid crystal composition. When component (d) is added to a composition having the negative dielectric anisotropy, the content of component (d) is preferably about 30% by weight or less. Addition of component (d) allows adjustment of the elastic constant of the composition and adjustment of the voltage-transmittance curve of the device.

Component (e) is compound (15) in which a right-terminal group is —C≡N or —C≡C—C≡N. Specific preferred examples of components (e) include compounds (15-1) to (15-64). In the compounds, $R^{17}$ is alkyl having 1 to 10 carbons or alkenyl having 2 to 10 carbons, and in the alkyl and the alkenyl, at least one piece of $—CH_2—$ may be replaced by —O—, and in the groups, at least one piece of hydrogen may be replaced by fluorine. $X^{12}$ is —C≡N or —C≡C—C≡N.

(15-1)

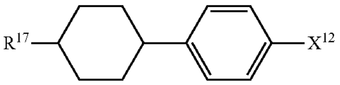

(15-2)

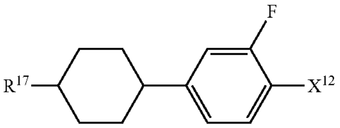

(15-3)

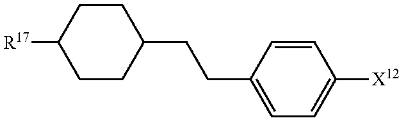

(15-4)

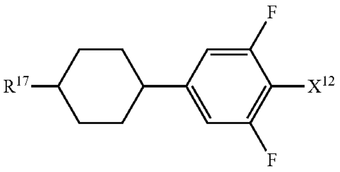

(15-5)

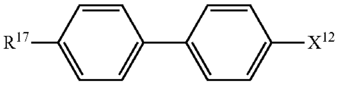

(15-6)

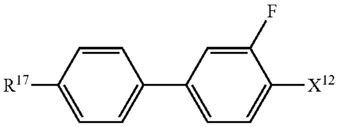

(15-7)

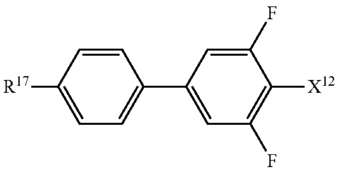

(15-8)

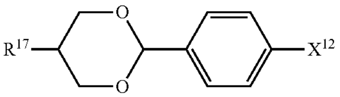

(15-9)

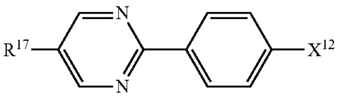

-continued (15-10)

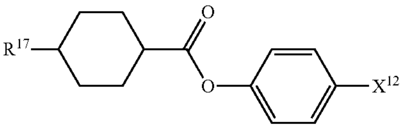

(15-11)

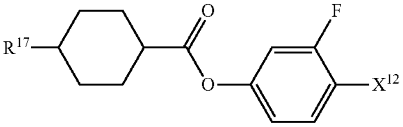

(15-12)

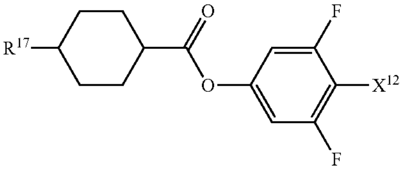

(15-13)

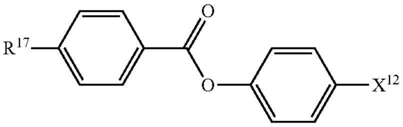

(15-14)

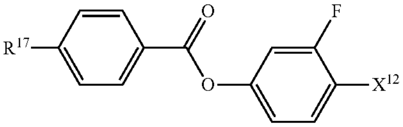

(15-15)

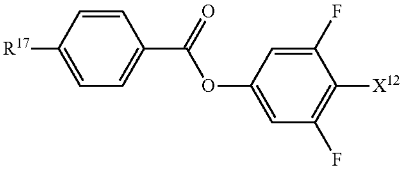

(15-16)

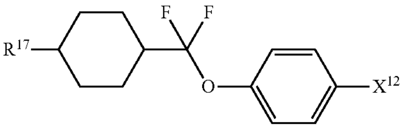

(15-17)

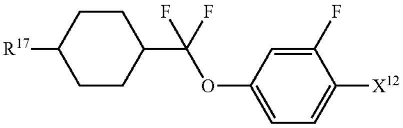

(15-18)

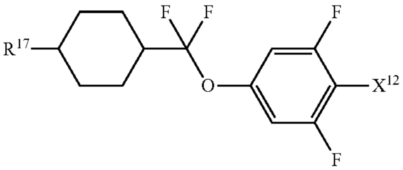

(15-19)

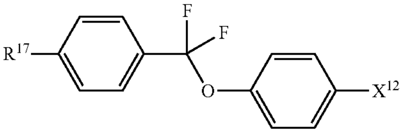

-continued
(15-20)
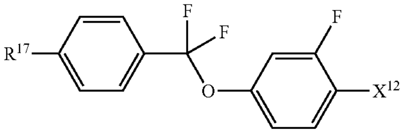
(15-21)
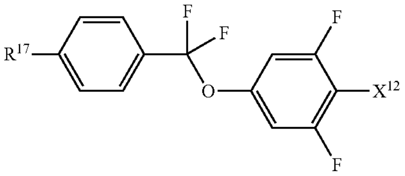
(15-22)
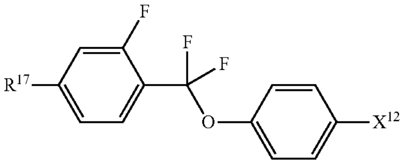
(15-23)
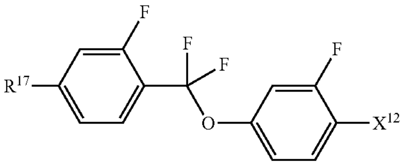
(15-24)
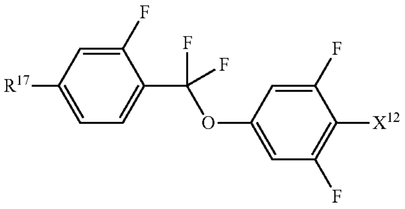
(15-25)
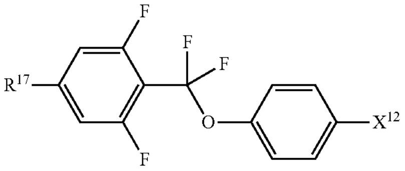
(15-26)
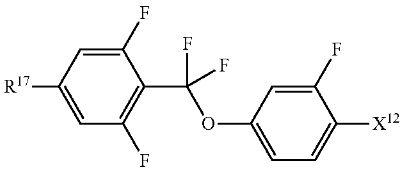
(15-27)
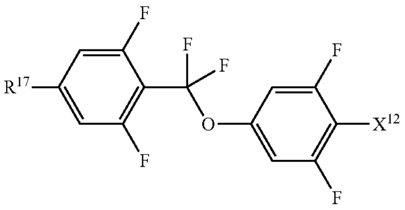
(15-28)
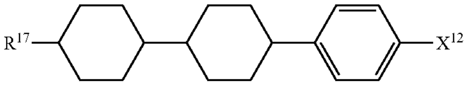
-continued
(15-29)
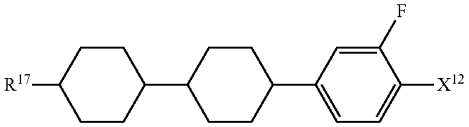
(15-30)
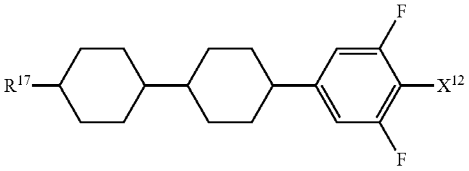
(15-31)
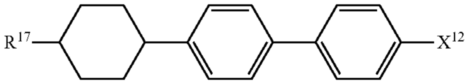
(15-32)
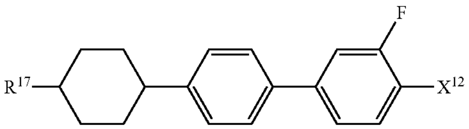
(15-33)
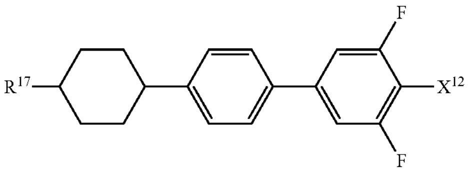
(15-34)
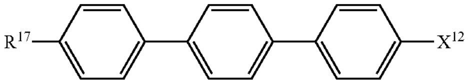
(15-35)
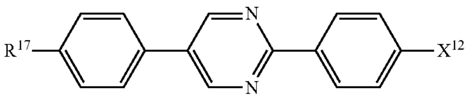
(15-36)
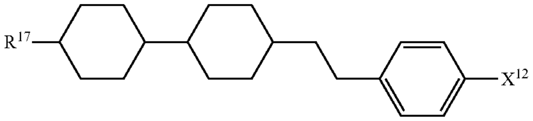
(15-37)
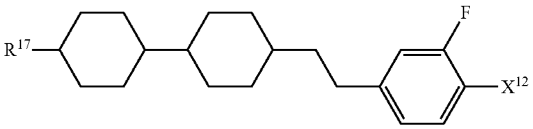
(15-38)
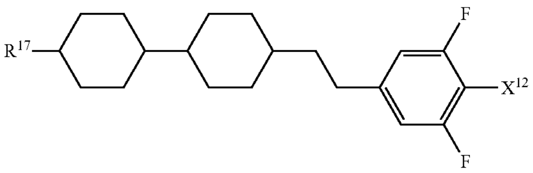

-continued
(15-39)
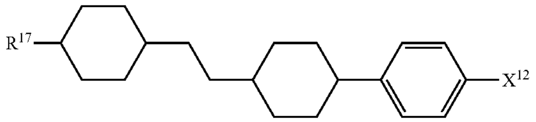
(15-40)
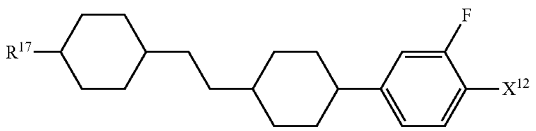
(15-41)
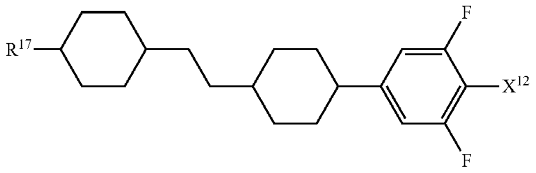
(15-42)
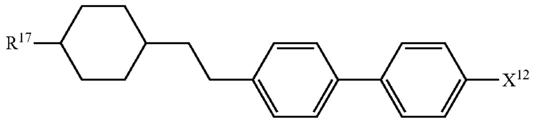
(15-43)
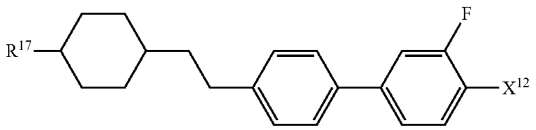
(15-44)
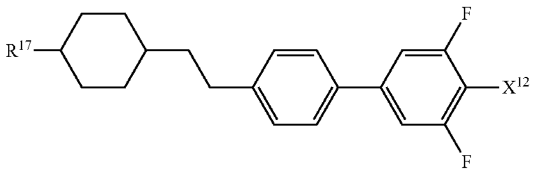
(15-45)
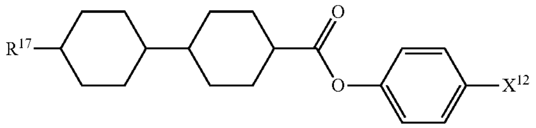
(15-46)
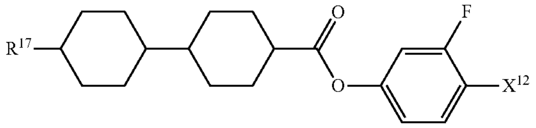
(15-47)
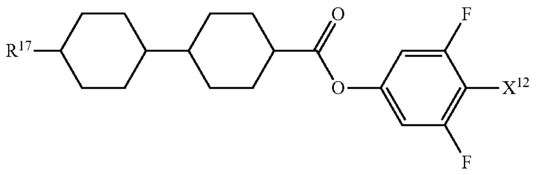
-continued
(15-48)
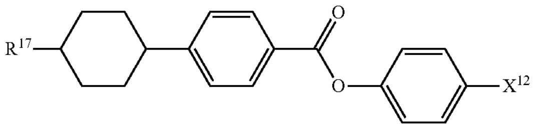
(15-49)
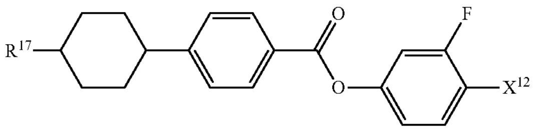
(15-50)
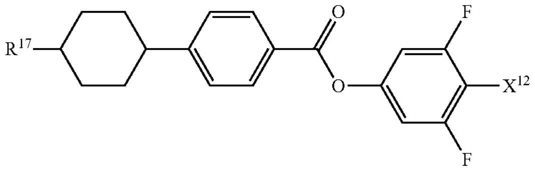
(15-51)
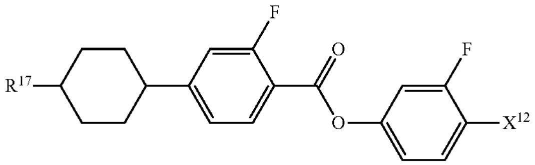
(15-52)
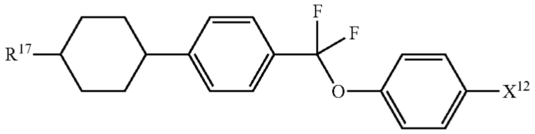
(15-53)
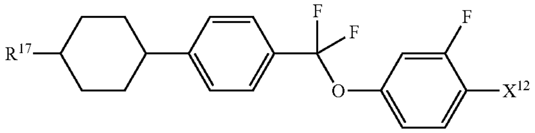
(15-54)
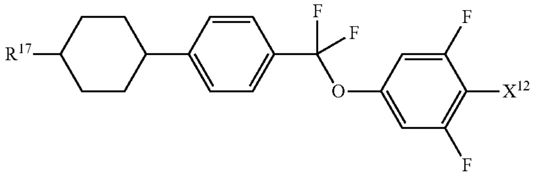
(15-55)
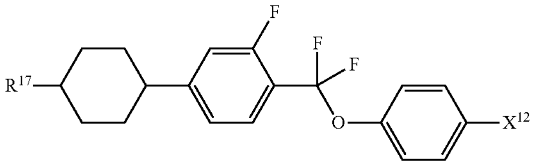
(5-56)
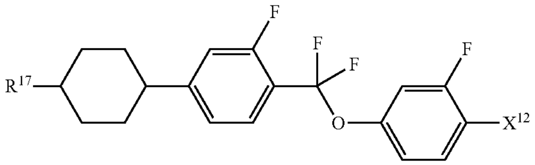

-continued (15-57)

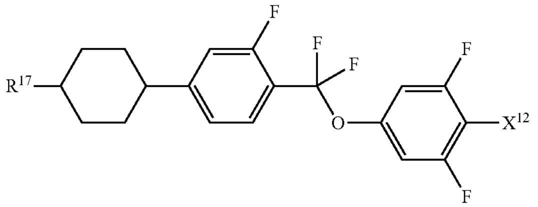

(15-58)

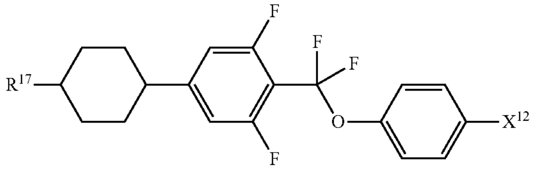

(15-59)

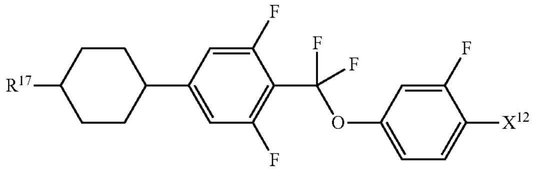

(15-60)

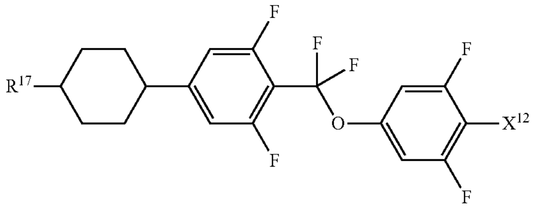

(15-61)

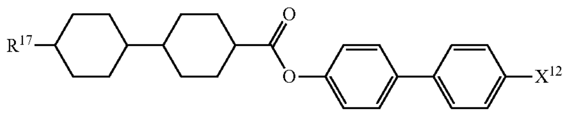

(15-62)

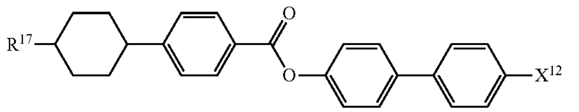

(15-63)

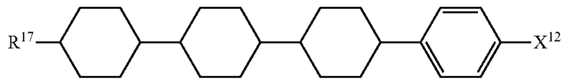

(15-64)

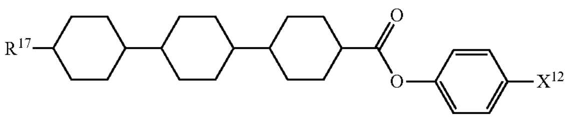

Component (e) has the positive dielectric anisotropy and a value thereof is large, and therefore is used when a composition for the TN mode or the like is prepared. Addition of component (e) can increase the dielectric anisotropy of the composition. Component (e) is effective in extending the temperature range of the liquid crystal phase, adjusting the viscosity or adjusting the optical anisotropy. Component (e) is also useful for adjustment of the voltage-transmittance curve of the device.

When a composition for the TN mode or the like is prepared, a content of component (e) is suitably in the range of about 1% by weight to about 99% by weight, preferably in the range of about 10% by weight to about 97% by weight, and further preferably in the range of about 40% by weight to about 95% by weight, based on the weight of the liquid crystal composition. When component (e) is added to a composition having the negative dielectric anisotropy, the content of component (e) is preferably about 30% by weight or less. Addition of component (e) allows adjustment of the elastic constant of the composition and adjustment of the voltage-transmittance curve of the device.

A combination of a compound suitably selected from components (b) to (e) described above and compound (1) allows preparation of the liquid crystal composition that satisfies at least one of physical properties such as a high stability to heat and light, a high maximum temperature, a low minimum temperature, a small viscosity, a suitable optical anisotropy (namely, a large optical anisotropy or a small optical anisotropy), a large positive or negative dielectric anisotropy, a large specific resistance and a suitable elastic constant (namely, a large elastic constant or a small elastic constant). A device including such a composition has a wide temperature range in which the device can be used, a short response time, a large voltage holding ratio, a low threshold voltage, a large contrast ratio, a small flicker rate and a long service life.

If the device is used for a long period of time, a flicker may be occasionally generated on a display screen. The flicker rate (%) can be represented by a formula (|luminance when applying a positive voltage−luminance when applying a negative voltage|)/(average luminance)×100. In a device having the flicker rate in the range of about 0% to about 1%, a flicker is hardly generated on the display screen even if the device is used for a long period of time. The flicker is associated with image persistence, and is presumed to be generated according to a difference in electric potential between a positive frame and a negative frame in driving at alternating current. The composition containing compound (1) is also useful for a decrease in generation of the flicker.

3-2. Additive

A liquid crystal composition is prepared according to a publicly known method. For example, the component compounds are mixed and dissolved in each other by heating. According to an application, an additive may be added to the composition. Specific examples of the additives include the polymerizable compound, the polymerization initiator, the polymerization inhibitor, the optically active compound, the antioxidant, the ultraviolet light absorber, the light stabilizer, the heat stabilizer, the dye and the antifoaming agent. Such additives are well known to those skilled in the art, and described in literature.

In a liquid crystal display device having the polymer sustained alignment (PSA) mode, the composition contains a polymer. The polymerizable compound is added for the purpose of forming the polymer in the composition. First, a composition to which a small amount of polymerizable compound is added is injected into the device. Next, the composition is irradiated with ultraviolet light while voltage is applied between substrates of the device. The polymerizable compound is polymerized to form a network structure of the polymer in the composition. In the composition, alignment of liquid crystal molecules can be controlled by the polymer, and therefore the response time of the device is shortened and also image persistence is improved.

Specific preferred examples of polymerizable compounds include acrylate, methacrylate, a vinyl compound, a vinyloxy compound, propenyl ether, an epoxy compound (oxirane, oxetane) and vinyl ketone. Further preferred examples include a compound having at least one piece of acryloyloxy, and a compound having at least one piece of methacryloyloxy. Still further preferred examples also include a compound having both acryloyloxy and methacryloyloxy.

Still further preferred examples include compounds (M-1) to (M-18). In the compounds, $R^{25}$ to $R^{31}$ are independently hydrogen or methyl; $R^{32}$, $R^{33}$ and $R^{34}$ are independently hydrogen or alkyl having 1 to 5 carbons, and at least one of $R^{32}$, $R^{33}$ and $R^{34}$ is alkyl having 1 to 5 carbons; s, v and x are independently 0 or 1; and t and u are independently an integer from 1 to 10. $L^{21}$ to $L^{26}$ are independently hydrogen or fluorine; and $L^{27}$ and $L^{28}$ are independently hydrogen, fluorine or methyl.

(M-1)

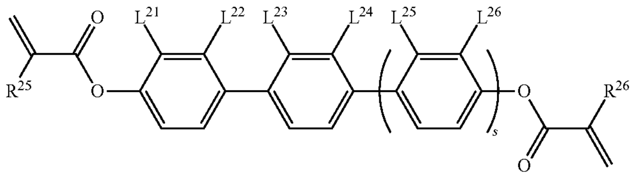

(M-2)

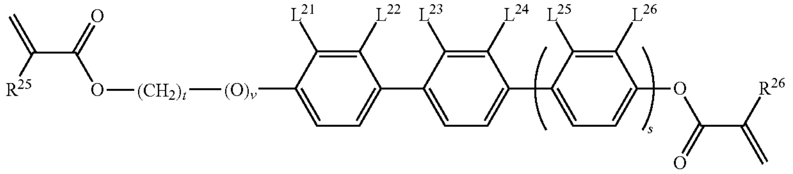

(M-3)

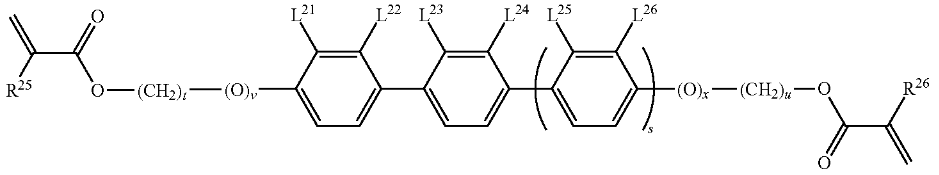

(M-4)

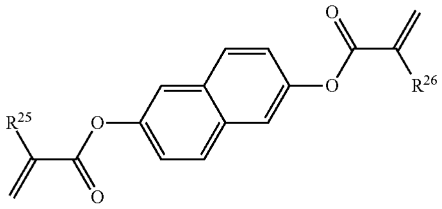

(M-5)

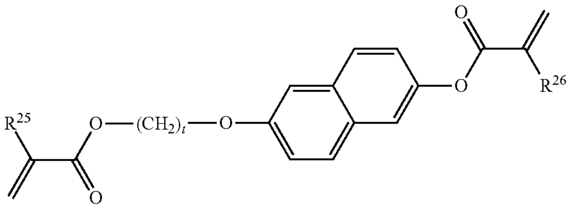

(M-6)

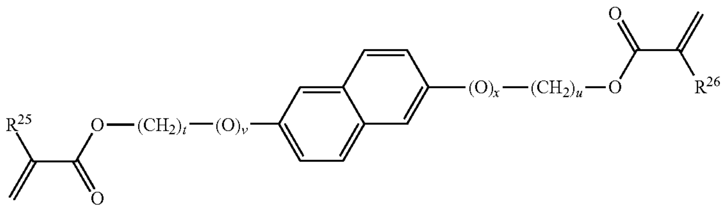

(M-7)

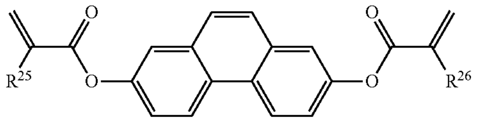

(M-8)

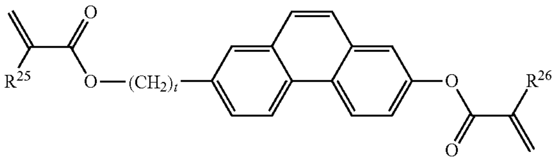

-continued
(M-9)
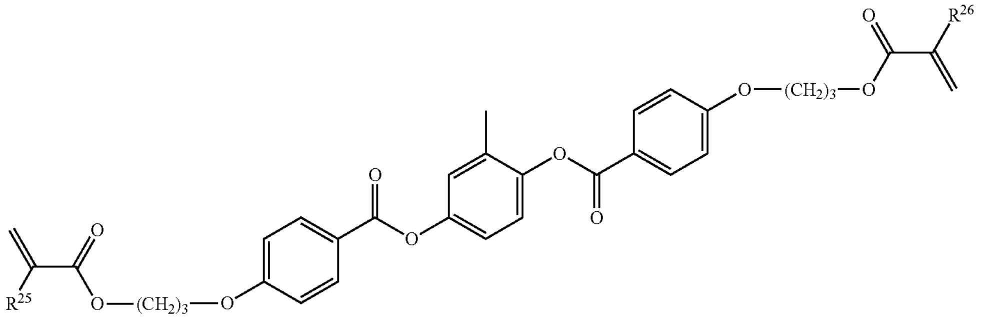
(M-10)
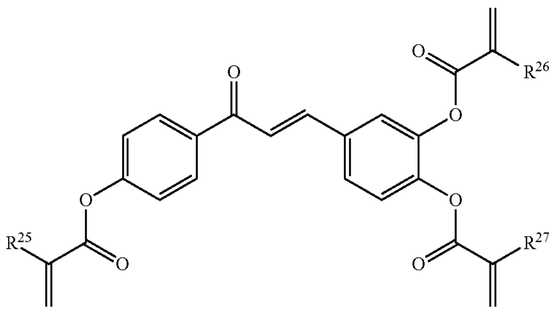
(M-11)
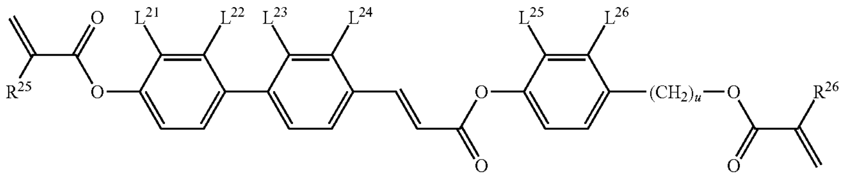
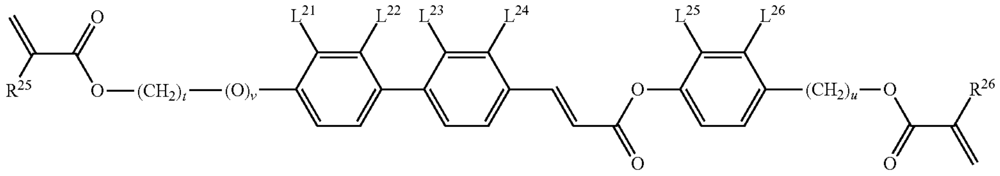
(M-13)
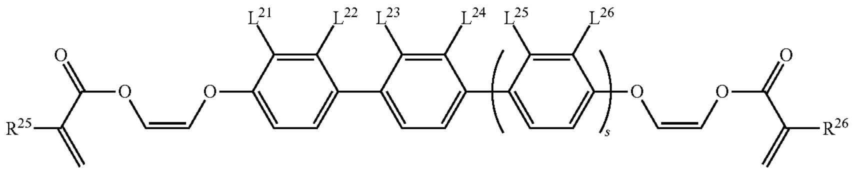
(M-14)
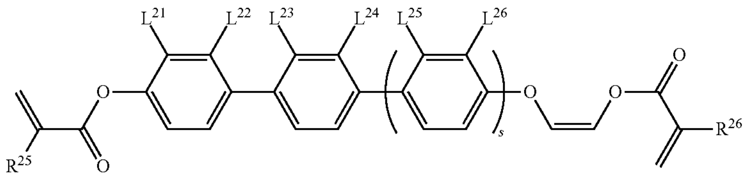

-continued (M-15)

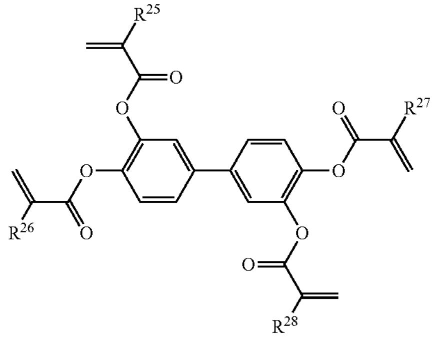

(M-16)

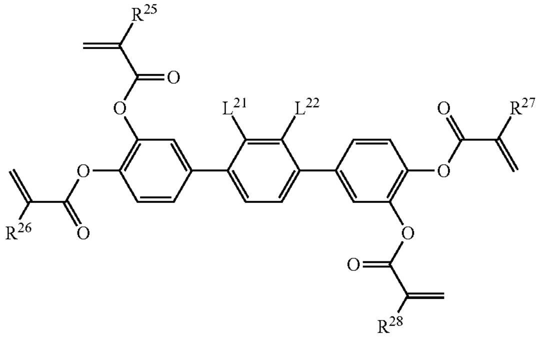

(M-17)

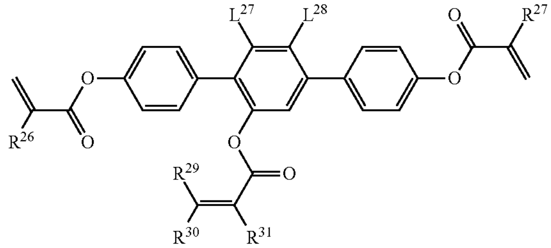

(M-18)

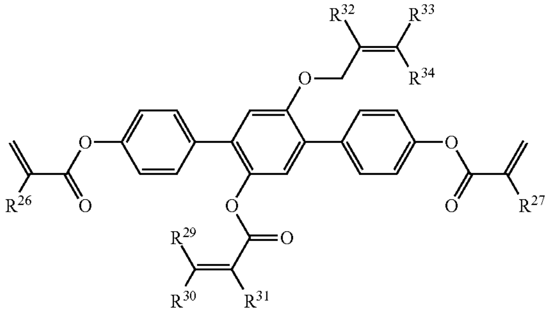

The polymerizable compound can be rapidly polymerized by adding the polymerization initiator. An amount of a remaining polymerizable compound can be decreased by optimizing a reaction temperature. Specific examples of a photoradical polymerization initiators include TPO, 1173 and 4265 from Darocur series of BASF SE, and 184, 369, 500, 651, 784, 819, 907, 1300, 1700, 1800, 1850 and 2959 from Irgacure series thereof.

Additional examples of the photoradical polymerization initiator include 4-methoxyphenyl-2,4-bis(trichloromethyl) triazine, 2-(4-butoxystyryl)-5-trichloromethyl-1,3,4-oxadiazole, 9-phenylacridine, 9,10-benzphenazine, a benzophenone-Michler's ketone mixture, a hexaarylbiimidazole-mercaptobenzimidazole mixture, 1-(4-isopropylphenyl)-2-hydroxy-2-methylpropane-1-one, benzyl dimethyl ketal, 2-methyl-1-[4-(methylthio)phenyl]-2-morpholinopropane-1-one, a mixture of 2,4-diethylxanthone and methyl p-dimethylaminobenzoate and a mixture of benzophenone and methyltriethanolamine.

After the photoradical polymerization initiator is added to the liquid crystal composition, polymerization can be performed by irradiation with ultraviolet light while an electric field is applied. However, an unreacted polymerization initiator or a decomposition product of the polymerization initiator may cause a poor display such as the image persistence in the device. In order to prevent such an event, photopolymerization may be performed with no addition of the polymerization initiator. A preferred wavelength of irradiation light is in the range of about 150 nanometers to about 500 nanometers. A further preferred wavelength is in the range of about 250 nanometers to about 400 nanometers, and a most preferred wavelength is in the range of about 300 nanometers to about 400 nanometers.

Upon storing the polymerizable compound, the polymerization inhibitor may be added thereto for preventing polymerization. The polymerizable compound is ordinarily added to the composition without removing the polymerization inhibitor. Examples of the polymerization inhibitor include hydroquinone, a hydroquinone derivative such as methylhydroquinone, 4-t-butylcatechol, 4-methoxyphenol and phenothiazine.

The optically active compound is effective in inducing a helical structure in liquid crystal molecules to give a required twist angle, and thereby preventing a reverse twist. A helical pitch can be adjusted by adding the optically active compound thereto. Two or more optically active compounds may be added for the purpose of adjusting temperature dependence of the helical pitch. Specific preferred examples of the optically active compounds include compounds (Op-1) to (Op-18) described below. In compound (Op-18), ring J is 1,4-cyclohexylene or 1,4-phenylene, and $R^{28}$ is alkyl having 1 to 10 carbons.

(Op-1)

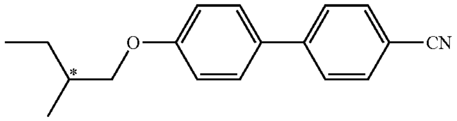

(Op-2)

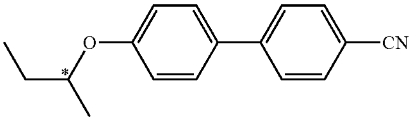

-continued
(Op-3)
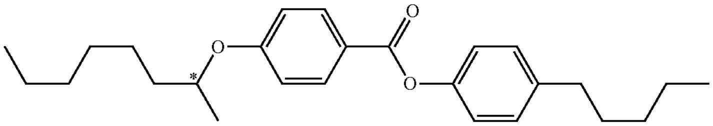
(Op-4)
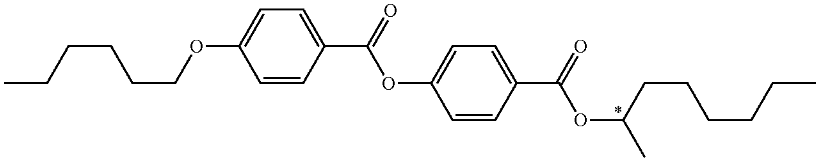
(Op-5)
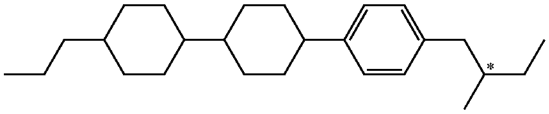
(Op-6)
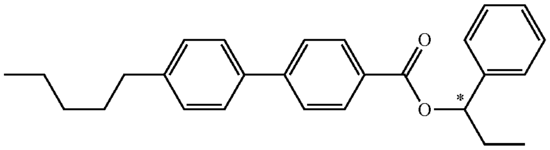
(Op-7)
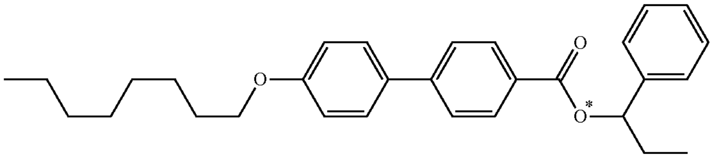
(Op-8)
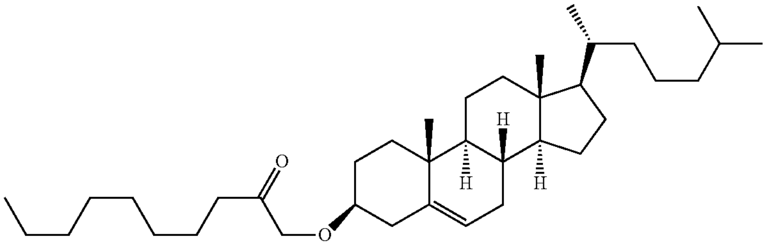
(Op-9)
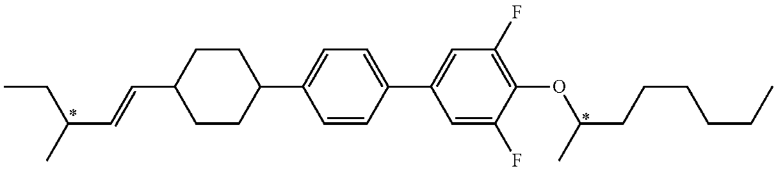
(Op-10)
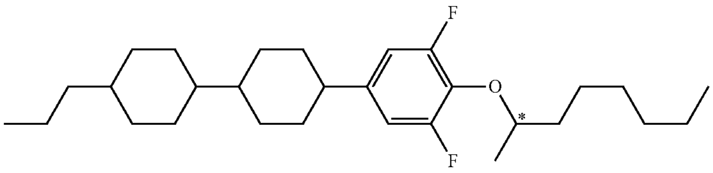
(Op-11)
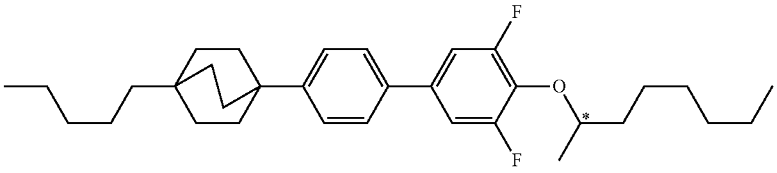
(Op-12)
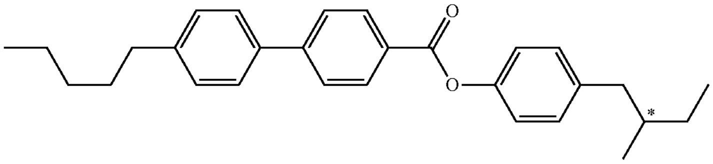

-continued (Op-13)

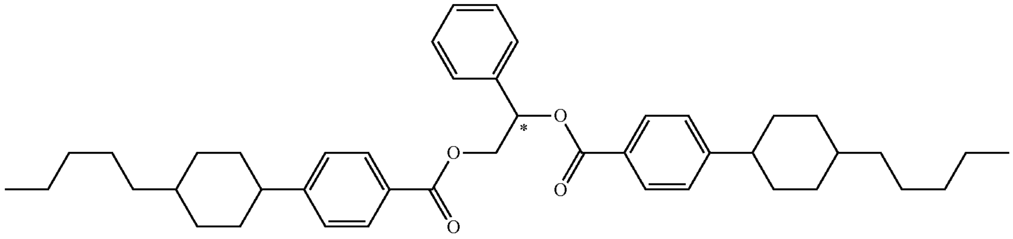

(Op-14)

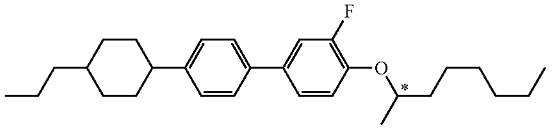

(Op-15)

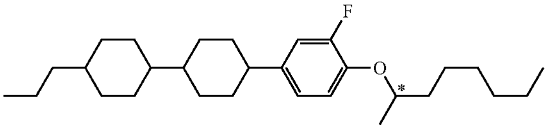

(Op-16)

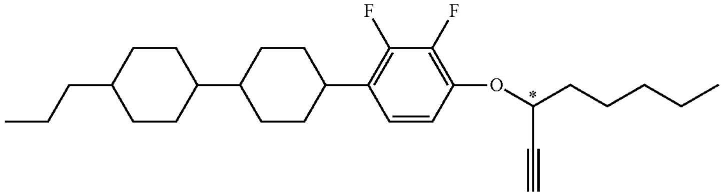

(Op-17)

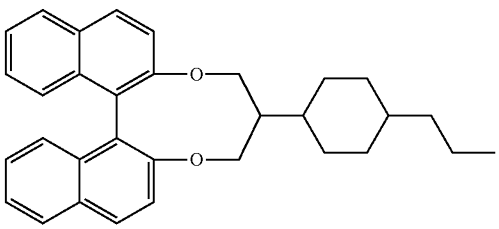

(Op-18)

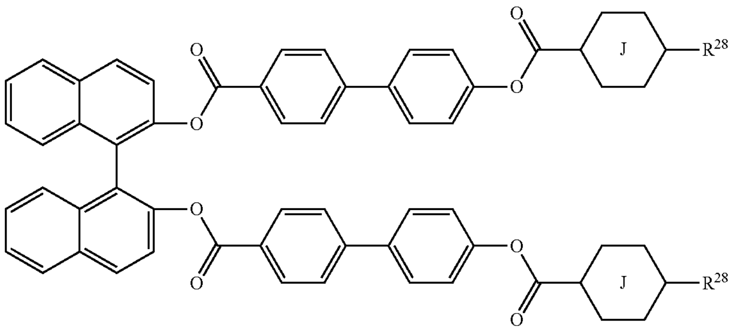

The antioxidant is effective for maintaining the large voltage holding ratio. Specific preferred examples of the antioxidants include compounds (AO-1) and (AO-2) described below; and Irganox 415, Irganox 565, Irganox 1010, Irganox 1035, Irganox 3114 and Irganox 1098 (trade names; BASF SE). The ultraviolet light absorber is effective for preventing a decrease of the maximum temperature. Preferred examples of the ultraviolet light absorbers include a benzophenone derivative, a benzoate derivative and a triazole derivative, and specific examples include compounds (AO-3) and (AO-4) described below; Tinuvin 329, Tinuvin P, Tinuvin 326, Tinuvin 234, Tinuvin 213, Tinuvin 400, Tinuvin 328 and Tinuvin 99-2 (trade names; BASF SE); and 1,4-diazabicyclo[2.2.2]octane (DABCO).

The light stabilizer such as an amine having steric hindrance is preferred for maintaining the large voltage holding ratio. Specific preferred examples of the light stabilizers include compounds (AO-5), (AO-6) and (AO-7) described below; Tinuvin 144, Tinuvin 765 and Tinuvin 770df (trade names; BASF SE); and LA-77Y and LA-77G (trade names; ADEKA Corporation). The heat stabilizer is also effective for maintaining the large voltage holding ratio, and specific preferred examples include Irgafos 168 (trade name; BASF SE). A dichroic dye such as an azo dye or an anthraquinone dye is added to the composition to be adapted for a device having a guest host (GH) mode. The antifoaming agent is effective for preventing foam formation. Specific preferred examples of the antifoaming agents include dimethyl silicone oil and methylphenyl silicone oil.

(AO-1)

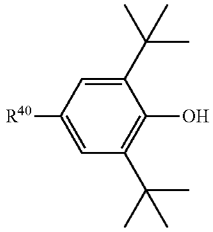

(AO-2)

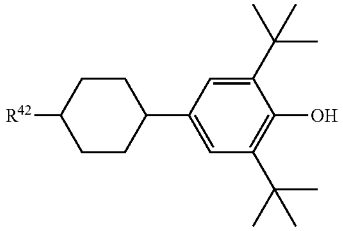

(AO-3)

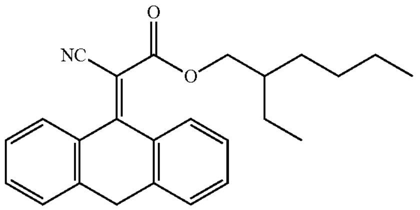

(AO-4)

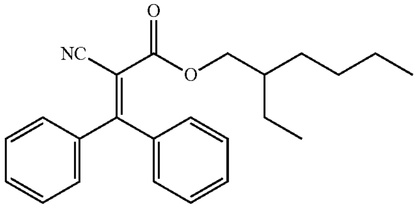

(AO-5)

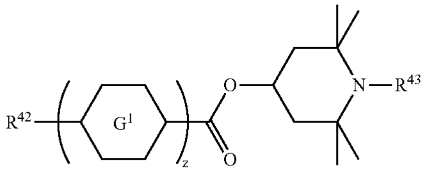

(AO-6)

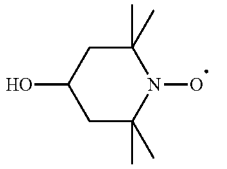

(AO-7)

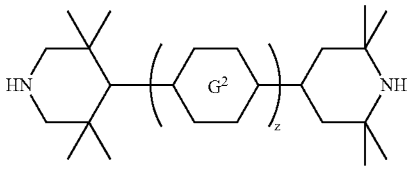

In compound (AO-1), $R^{40}$ is alkyl having 1 to 20 carbons, alkoxy having 1 to 20 carbons, —$COOR^{41}$ or —$CH_2CH_2COOR^{41}$, in which $R^{41}$ is alkyl having 1 to 20 carbons. In compounds (AO-2) and (AO-5), $R^{42}$ is alkyl having 1 to 20 carbons. In compound (AO-5), $R^{43}$ is hydrogen, methyl or O. (oxygen radical); ring $G^1$ is 1,4-cyclohexylene or 1,4-phenylene; in compound (AO-7), ring $G^2$ is 1,4-cyclohexylene, 1,4-phenylene or 1,4-phenylene in which at least one piece of hydrogen is replaced by fluorine; and in compounds (AO-5) and (AO-7), z is 1, 2 or 3.

4. Liquid Crystal Display Device

The liquid crystal composition can be used for the liquid crystal display device having an operating mode such as the PC mode, the TN mode, the STN mode, the OCB mode and the PSA mode, and driven by an active matrix mode. The composition can also be used for the liquid crystal display device having the operating mode such as the PC mode, the TN mode, the STN mode, the OCB mode, the VA mode and the IPS mode, and driven by a passive matrix mode. The devices can be applied to any of a reflective type, a transmissive type and a transflective type.

The composition is also suitable for a nematic curvilinear aligned phase (NCAP) device, and the composition is microencapsulated herein. The composition can also be used for a polymer dispersed liquid crystal display device (PDLCD) and a polymer network liquid crystal display device (PNLCD). In the compositions, a lot of polymerizable compounds are added. On the other hand, when a proportion of the polymerizable compound is about 10% by weight or less based on the weight of the liquid crystal composition, the liquid crystal display device having the PSA mode can be prepared. A preferred proportion is in the range of about 0.1% by weight to about 2% by weight. A further preferred proportion is in the range of about 0.2% by weight to about 1.0% by weight. The device having the PSA mode can be driven by the driving mode such as the active matrix mode and the passive matrix mode. Such devices can be applied to any of the reflective type, the transmissive type and the transflective type.

EXAMPLES

1. Example of Compound (1)

The invention will be described in greater detail by way of Examples. The Examples include a typical example, and therefore the invention is not limited by the Examples. Compound (1) was prepared according to procedures described below. The synthesized compound was identified by methods such as an NMR analysis. Physical properties of the compound and the composition and characteristics of a device were measured by methods described below.

NMR analysis: For measurement, DRX-500 made by Bruker BioSpin Corporation was used. In $^1$H-NMR measurement, a sample was dissolved in a deuterated solvent such as $CDCl_3$, and measurement was carried out under conditions of room temperature, 500 MHz and 16 times of accumulation. Tetramethylsilane was used as an internal standard. In $^{19}$F-NMR measurement, $CFCl_3$ was used as an internal standard, and measurement was carried out under conditions of 24 times of accumulation. In explaining nuclear magnetic resonance spectra obtained, s, d, t, q, quin, sex and m stand for a singlet, a doublet, a triplet, a quartet, a quintet, a sextet and a multiplet, and br being broad, respectively.

Gas chromatographic analysis: For measurement, GC-2010 Gas Chromatograph made by Shimadzu Corporation was used. As a column, a capillary column DB-1 (length 60 m, bore 0.25 mm, film thickness 0.25 μm) made by Agilent Technologies, Inc. was used. As a carrier gas, helium (1 mL/minute) was used. A temperature of a sample vaporizing chamber and a temperature of a detector (FID) were set to 300° C. and 300° C., respectively. A sample was dissolved in acetone and prepared to be a 1 weight % solution, and then 1 microliter of the solution obtained was injected into the sample vaporizing chamber. As a recorder, GC Solution System made by Shimadzu Corporation or the like was used.

HPLC Analysis: For measurement, Prominence (LC-20AD; SPD-20A) made by Shimadzu Corporation was used. As a column, YMC-Pack ODS-A (length 150 mm, bore 4.6 mm, particle diameter 5 μm) made by YMC Co., Ltd. was used. As an eluate, acetonitrile and water were appropriately mixed and used. As a detector, a UV detector, an RI detector, a CORONA detector or the like was appropriately used. When the UV detector was used, a detection wavelength was set at 254 nanometers. A sample was dissolved in acetonitrile and prepared to be a 0.1 weight % solution, and then 1 microliter of the solution was injected into a sample chamber. As a recorder, C-R7Aplus made by Shimadzu Corporation was used.

Ultraviolet-Visible Spectrophotometry: For measurement, PharmaSpec UV-1700 made by Shimadzu Corporation was used. A detection wavelength was adjusted in the range of 190 nanometers to 700 nanometers. A sample was dissolved in acetonitrile and prepared to be a 0.01 mmol/L solution, and was measured in a quartz cell (a light path length: 1 cm).

Sample for measurement: Upon measuring phase structure and a transition temperature (a clearing point, a melting point, a polymerization starting temperature or the like), a compound itself was used as a sample. Upon measuring physical properties such as a maximum temperature of a nematic phase, viscosity, optical anisotropy and dielectric anisotropy, a mixture of a compound and a base liquid crystal was used as a sample.

When the sample prepared by mixing the compound with the base liquid crystal was used, an extrapolated value was calculated according to the following equation and the calculated value was described: [extrapolated value]=(100×[measured value of a sample]−[% by weight of a base liquid crystal]×[measured value of the base liquid crystal])/[% by weight of a compound].

Components and proportions in base liquid crystal (A) were as described below.

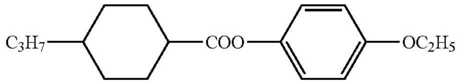
17.2%

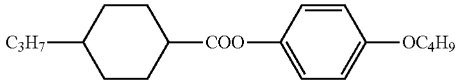
27.6%

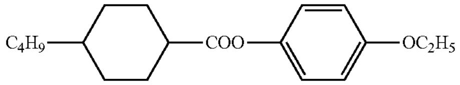
20.7%

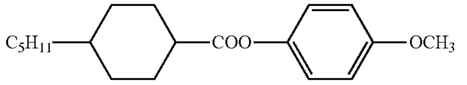
20.7%

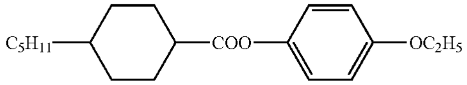
13.8%

A ratio of the compound to base liquid crystal (A) was adjusted to (15% by weight:85% by weight). When crystals (or a smectic phase) precipitated at 25° C. at the ratio, a ratio of the compound to base liquid crystal (A) was changed in the order of (10% by weight:90% by weight), (5% by weight:95% by weight) and (1% by weight:99% by weight), and the sample was measured at a ratio at which no crystal (or no smectic phase) precipitated at 25° C. In addition, unless otherwise noted, the ratio of the compound to base liquid crystal (A) was (15% by weight:85% by weight).

Measuring method: Physical properties were measured according to methods described below. Most of the methods are described in the Standard of Japan Electronics and Information Technology Industries Association (JEITA) discussed and established in JEITA (JEITA ED-2521B). A modified method was also applied. No thin film transistor (TFT) was attached to a TN device used for measurement.

(1) Phase structure: A sample was placed on a hot plate in a melting point apparatus (FP-52 Hot Stage made by Mettler-Toledo International Inc.) equipped with a polarizing microscope. A state of phase and a change thereof were observed with the polarizing microscope while the sample was heated at a rate of 3° C. per minute, and a kind of the phase was specified.

(2) Transition temperature (° C.): For measurement, a differential scanning calorimeter, Diamond DSC System, made by PerkinElmer, Inc., or a high sensitivity differential scanning calorimeter, X-DSC7000, made by SII NanoTechnology Inc. was used. A sample was heated and then cooled at a rate of 3° C. per minute, and a starting point of an endothermic peak or an exothermic peak caused by a phase change of the sample was determined by extrapolation, and thus a transition temperature was determined. A polymerization starting temperature and a melting point of a compound were also measured using the apparatus. Temperature at which a compound undergoes transition from a solid to a liquid crystal phase such as the smectic phase and the nematic phase may be occasionally abbreviated as "minimum temperature of the liquid crystal phase." Temperature at which the compound undergoes transition from the liquid crystal phase to liquid may be occasionally abbreviated as "clearing point."

A crystal was expressed as C. When the crystals were distinguishable into two kinds, each of the crystals was expressed as $C_1$ or $C_2$. The smectic phase or the nematic phase was expressed as S or N. When a phase was distinguishable such as smectic A phase, smectic B phase, smectic C phase and smectic F, the phase was expressed as $S_A$, $S_B$, $S_C$ and $S_F$, respectively. A liquid (isotropic) was expressed as I. A transition temperature was expressed as "C, 50.0; N, 100.0; I," for example. The expression indicates that a transition temperature from the crystals to the nematic phase is 50.0° C., and a transition temperature from the nematic phase to the liquid is 100.0° C.

(3) Compatibility of compound: Samples in which the base liquid crystal and the compound were mixed for proportions of the compounds to be 20% by weight, 15% by weight, 10% by weight, 5% by weight, 3% by weight or 1% by weight were prepared. The samples were put in glass vials, and kept in freezers at −20° C. or −30° C. for a predetermined period of time. Whether a nematic phase of the samples was maintained or crystals (or a smectic phase) precipitated was observed. Conditions on which the nematic phase was maintained were used as a measure of the compatibility. Proportions of the compounds and each temperature in the freezers may be occasionally changed when necessary.

(4) Maximum temperature of nematic phase ($T_{NI}$ or NI; ° C.): A sample was placed on a hot plate in a melting point apparatus equipped with a polarizing microscope, and heated at a rate of 1° C. per minute. Temperature when part of the sample began to change from a nematic phase to an isotropic liquid was measured. When the sample was a mixture of compound (1) and the base liquid crystal, the maximum temperature was expressed in terms of a symbol $T_{NI}$. The value was calculated using the extrapolation method described above. When the sample was a mixture of compound (1) and a compound selected from compounds (2) to (15), a measured value was expressed in terms of a symbol NI. A maximum temperature of the nematic phase may be occasionally abbreviated as "maximum temperature."

(5) Minimum temperature of nematic phase ($T_C$; ° C.): Samples each having a nematic phase were put in glass vials and kept in freezers at temperatures of 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_c$ was expressed as $T_c$<−20° C. A minimum temperature of the nematic phase may be occasionally abbreviated as "minimum temperature."

(6) Viscosity (bulk viscosity; η; measured at 20° C.; mPa·s): For measurement, a cone-plate (E type) rotational viscometer made by Tokyo Keiki Inc. was used.

(7) Optical anisotropy (refractive index anisotropy; measured at 25° C.; Δn): Measurement was carried out by an Abbe refractometer with a polarizing plate mounted on an ocular, using light at a wavelength of 589 nanometers. A surface of a main prism was rubbed in one direction, and then a sample was added dropwise onto the main prism. A refractive index (n||) was measured when a direction of polarized light was parallel to a direction of rubbing. A refractive index (n⊥) was measured when the direction of polarized light was perpendicular to the direction of rubbing. A value of optical anisotropy (Δn) was calculated from an equation: Δn=n||−n⊥.

(8) Specific resistance (ρ; measured at 25° C.; Ωcm): Into a vessel equipped with electrodes, 1.0 milliliter of a sample was injected. A direct current voltage (10 V) was applied to the vessel, and a direct current after 10 seconds was measured. Specific resistance was calculated from the following equation: (specific resistance)={(voltage)×(electric capacity of a vessel)}/{(direct current)×(dielectric constant of vacuum)}.

(9) Voltage holding ratio (VHR-1; measured at 25° C.; %): A TN device used for measurement had a polyimide alignment film, and a distance (cell gap) between two glass substrates was 5 micrometers. A sample was put in the device, and then the device was sealed with an ultraviolet-curable adhesive. The device was charged by applying a pulse voltage (60 microseconds at 5 V). A decaying voltage was measured for 16.7 milliseconds with a high-speed voltmeter, and area A between a voltage curve and a horizontal axis in a unit cycle was determined. Area B was an area without decay. A voltage holding ratio is expressed in terms of a percentage of area A to area B.

(10) Voltage holding ratio (VHR-2; measured at 80° C.; %): A voltage holding ratio was measured by a method described above except that the voltage holding ratio was measured at 80° C. in place of 25° C. The results were expressed in terms of a symbol VHR-2.

(11) Flicker rate (measured at 25° C.; %): For measurement, 3298F Multimedia Display Tester made by Yokogawa Electric Corporation was used. A light source was an LED. A sample was put in a normally black mode FFS device in which a distance (cell gap) between two glass substrates was 3.5 micrometers and a rubbing direction was anti-parallel. The device was sealed with an ultraviolet-curable adhesive. Voltage was applied to the device, and a voltage having a maximum amount of light transmitted through the device was measured. A flicker rate displayed thereon was read by bringing a sensor unit close to the device while voltage was applied to the device.

The measuring method of the characteristics may be different between a sample having a positive dielectric anisotropy and a sample having a negative dielectric anisotropy. When the dielectric anisotropy was negative, the measuring method was described in sections (12) to (16).

(12) Viscosity (rotational viscosity; γ1; measured at 25° C.; mPa·s): Measurement was carried out according to a method described in M. Imai et al., Molecular Crystals and Liquid Crystals, Vol. 259, 37 (1995). A sample was put in a VA device in which a distance (cell gap) between two glass substrates was 20 micrometers. Voltage was applied stepwise to the device in the range of 39 V to 50 V at an increment of 1 V. After a period of 0.2 second with no voltage application, voltage was repeatedly applied under conditions of only one rectangular wave (rectangular pulse; 0.2 second) and no voltage application (2 seconds). A peak current and a peak time of transient current generated by the applied voltage were measured. A value of rotational viscosity was obtained from the measured values and equation (8) on page 40 of the paper presented by M. Imai et al. In dielectric anisotropy required for the calculation, a value measured according to items of dielectric anisotropy described below was used.

(13) Dielectric anisotropy (Δ∈; measured at 25° C.): A value of dielectric anisotropy was calculated from an equation: Δ∈=∈||−∈⊥. A dielectric constant (∈|| and ∈⊥) was measured as described below.

(1) Measurement of dielectric constant (∈||): An ethanol (20 mL) solution of octadecyltriethoxysilane (0.16 mL) was applied to a well-cleaned glass substrate. After rotating the glass substrate with a spinner, the glass substrate was heated at 150° C. for 1 hour. A sample was put in a VA device in which a distance (cell gap) between two glass substrates was 4 micrometers, and the device was sealed with an ultraviolet-curable adhesive. Sine waves (0.5 V, 1 kHz) were applied to the device, and after 2 seconds, a dielectric constant (∈||) of the liquid crystal molecules in a major axis direction was measured.

(2) Measurement of dielectric constant (∈⊥): A polyimide solution was applied to a well-cleaned glass substrate. After calcining the glass substrate, rubbing treatment was applied to the alignment film obtained. A sample was put in a TN device in which a distance (cell gap) between two glass substrates was 9 micrometers and a twist angle was 80 degrees. Sine waves (0.5 V, 1 kHz) were applied to the device, and after 2 seconds, a dielectric constant (∈⊥) of the liquid crystal molecules in a minor axis direction was measured.

(14) Elastic constant (spray elastic constant $K_{11}$ and bend elastic constant $K_{33}$; measured at 25° C.; pN): For measurement, Elastic Constant Measurement System Model EC-1 made by TOYO Corporation was used. A sample was put in a vertical alignment device in which a distance (cell gap) between two glass substrates was 20 micrometers. An electric charge of 20 V to 0 V was applied to the device, and electrostatic capacity (C) and applied voltage (V) were measured. The measured values were fitted to equation (2.98) and equation (2.101) on page 75 of "Liquid Crystal Device Handbook" (Ekisho Debaisu Handobukku, in Japanese; The Nikkan Kogyo Shimbun, Ltd.), and a value of elastic constant was obtained from equation (2.100).

(15) Threshold voltage (Vth; measured at 25° C.; V): For measurement, an LCD-5100 luminance meter made by Otsuka Electronics Co., Ltd. was used. A light source was a halogen lamp. A sample was put in a normally black mode VA device in which a distance (cell gap) between two glass substrates was 4 micrometers and a rubbing direction was anti-parallel, and the device was sealed with an ultraviolet-curable adhesive. A voltage (60 Hz, rectangular waves) to be applied to the device was stepwise increased from 0 V to 20 V at an increment of 0.02 V. On the occasion, the device was irradiated with light from a direction perpendicular to the device, and an amount of light transmitted through the device was measured. A voltage-transmittance curve was prepared, in which the maximum amount of light corresponds to 100% transmittance and the minimum amount of light corresponds to 0% transmittance. A threshold voltage was expressed in terms of a voltage at 10% transmittance.

(16) Response time (T; measured at 25° C.; ms): For measurement, an LCD-5100 luminance meter made by Otsuka Electronics Co., Ltd. was used. A light source was a halogen lamp. A low-pass filter was set to 5 kHz. A sample was put in a normally black mode PVA device in which a distance (cell gap) between two glass substrates was 3.2 micrometers and a rubbing direction was anti-parallel. The device was sealed with an ultraviolet-curable adhesive. The device was applied with a voltage of a little exceeding a threshold voltage for 1 minute, and then was irradiated with an ultraviolet light of 23.5 mW/cm$^2$ for 8 minutes, while applying a voltage of 5.6 V. Rectangular waves (60 Hz, 10 V, 0.5 second) were applied to the device. On the occasion, the device was irradiated with light from a direction perpendicular to the device, and an amount of light transmitted through the device was measured. The maximum amount of light corresponds to 100% transmittance, and the minimum amount of light corresponds to 0% transmittance. A response time was expressed in terms of time required for a change from 90% transmittance to 10% transmittance (fall time; millisecond).

Raw material: Solmix (registered trade name) A-11 is a mixture of ethanol (85.5%), methanol (13.4%) and isopropanol (1.1%), and was purchased from Japan Alcohol Trading Co., Ltd. Tetrahydrofuran may be occasionally abbreviated as THF.

Synthesis Example 1

Synthesis of Compound (1-3-50)

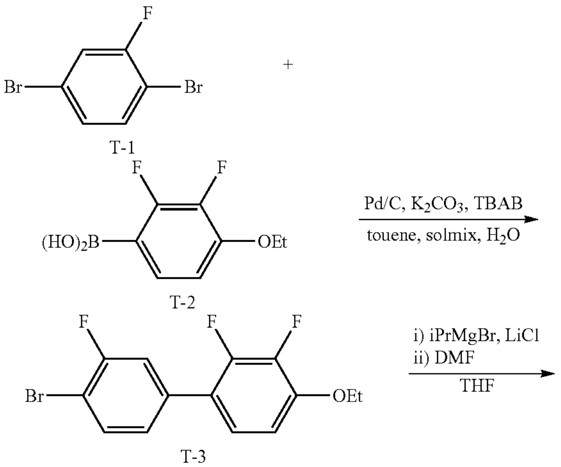

T-1
T-2
T-3

-continued

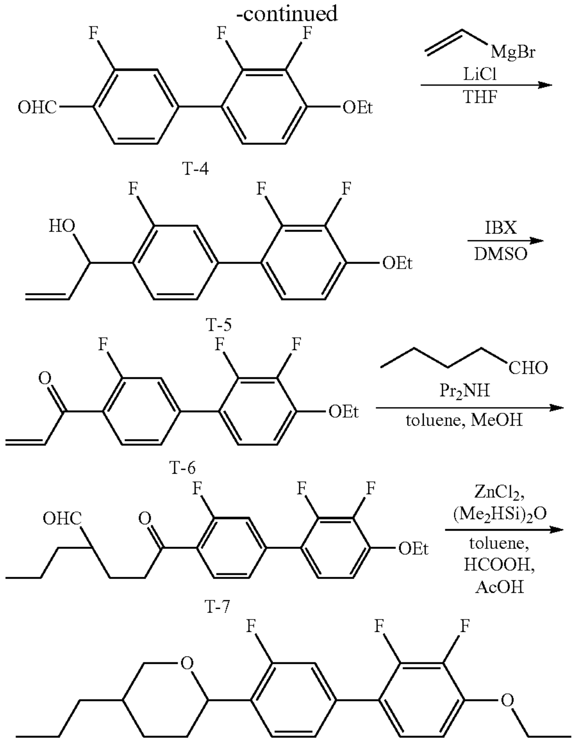

T-4
T-5
T-6
T-7
(1-3-50)

First Step:

A mixture of compound (T-1) (4.51 g, 17.8 mmol) prepared according to a publicly known method, compound (T-2) (3.59 g, 17.8 mmol) prepared according to a publicly known method, potassium carbonate (4.91 g, 35.6 mmol), tetrabutylammonium bromide (1.15 g, 3.56 mmol), palladium on carbon (0.157 g), toluene (20 mL), solmix (20 mL) and water (20 mL) was refluxed for 6 hours. The resulting reaction mixture was cooled down to room temperature, and a palladium residue was filtered off. Ordinary post-treatment was applied thereto, and the residue was purified by silica gel chromatography to obtain compound (T-3) (5.65 g, 17.1 mmol; 96%).

Second Step:

A THF (45 mL) solution of compound (T-3) (5.65 g, 17.1 mmol) was cooled down to −70° C., and a THF solution of i-PrMgCl—LiCl (1.3 M; 14.44 mL, 18.8 mmol) was added dropwise thereto. The resulting mixture was stirred at −70° C. for 3 hours, and then a THF (10 mL) solution of N,N-dimethylformamide (1.72 mL, 22.2 mmol) was added dropwise thereto. The resulting mixture was stirred at −70° C. for 1 hour, and then the resulting reaction mixture was returned to room temperature, and poured into an aqueous solution of sodium thiosulfate. Ordinary post-treatment was applied thereto, and the residue was purified by silica gel chromatography to obtain compound (T-4) (4.78 g, 17.1 mmol; quantitatively).

Third Step:

A THF solution of bromomagnesium bromide (1.31 M; 13.68 mL, 17.9 mmol) was added dropwise to a THF (45 mL) solution of lithium chloride (0.760 g, 17.9 mmol), and the resulting mixture was stirred at room temperature for 1 hour. The resulting reaction mixture was cooled down to 0° C., and a THF (15 mL) solution of compound (T-4) (4.78 g, 17.1 mmol) was added dropwise thereto. The resulting reaction mixture was returned to room temperature, and stirred for 7 hours, and then poured into 1 M hydrochloric acid. Ordinary post-treatment was applied thereto, and the residue was purified by silica gel chromatography to obtain compound (T-5) (5.26 g, 17.1 mmol; quantitatively).

Fourth Step:

A DMSO (15 mL) solution of compound (T-5) (5.26 g, 17.1 mmol) was added dropwise to a DMSO (40 mL) solution of 2-iodoxybenzoic acid (63%; 9.49 g, 21.3 mmol), and the resulting mixture was stirred at room temperature for 4 hours. Water and toluene were added to the resulting reaction mixture, the residue was removed by filtration, and an aqueous solution of sodium sulfite was added to the filtrate. Ordinary post-treatment was applied thereto, and the residue was purified by silica gel chromatography to obtain compound (T-6) (5.23 g, 17.1 mmol; quantitatively).

Fifth Step:

A toluene (10 mL) solution of dipropylamine (2.81 mL, 20.5 mmol) was added dropwise to a toluene (40 mL) solution of valeraldehyde (1.82 mL, 17.1 mmol), and the resulting mixture was refluxed for 14 hours. The resulting reaction mixture was cooled down to room temperature, and ordinary post-treatment was applied thereto. A crude product was dissolved in methanol (25 mL) and toluene (10 mL), a toluene (15 mL) solution of compound (T-6) (5.23 g, 17.1 mmol) was added thereto, and the resulting mixture was heated to 50° C., and stirred for 8 hours. The resulting reaction mixture was cooled down to room temperature, and 1 N HCl was added thereto. Ordinary post-treatment was applied thereto, and the residue was purified by silica gel chromatography to obtain compound (T-7) (5.69 g, 14.5 mmol; 85%).

Sixth Step:

Zinc chloride (1.98 g, 14.5 mmol), and 1,1,3,3-tetramethyldisiloxane (12.21 mL, 79.8 mmol) were added dropwise to a mixture of compound (T-7) (5.69 g, 14.5 mmol), toluene (20 mL), formic acid (15 mL) and acetic acid (15 mL), and the resulting mixture was stirred at room temperature for 8 hours. The resulting reaction mixture was poured into water, ordinary post-treatment was applied thereto, and the residue was purified by silica gel chromatography and recrystallization to obtain compound (1-3-50) (2.85 g, 7.54 mmol; 52%).

$^1$H-NMR ($CDCl_3$; δ ppm): 7.54 (1H, t, J=7.8 Hz), 7.28 (1H, d, J=8.1 Hz), 7.17 (1H, d, J=11.4 Hz), 7.07 (1H, ddd, J=2.4 Hz, 7.6 Hz, 8.4 Hz), 6.79 (1H, ddd, J=1.8 Hz, 8.1 Hz, 8.1 Hz), 4.61 (1H, dd, J=1.6, 11.2 Hz), 4.16 (2H, q, J=7.1 Hz), 4.12-4.09 (1H, m), 3.23 (1H, t, J=11.2 Hz), 2.01-1.92 (2H, m), 1.75-1.66 (1H, m), 1.63-1.55 (1H, m), 1.48 (3H, t, J=7.0 Hz), 1.44-1.27 (3H, m), 1.22-1.09 (2H, m), 0.92 (3H, t, J=7.3 Hz).

Phase transition temperature: C, 99.4; N, 125.1; I. Maximum temperature ($T_{NI}$)=113.0° C.; dielectric anisotropy (Δ∈)=−6.3; optical anisotropy (Δn)=0.174. Elastic constant ratio ($K_{33}/K_{11}$)=1.39.

Synthesis Example 2

Synthesis of Compound (1-5-50)

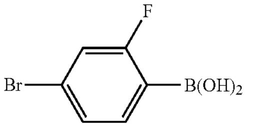

T-8

+

-continued

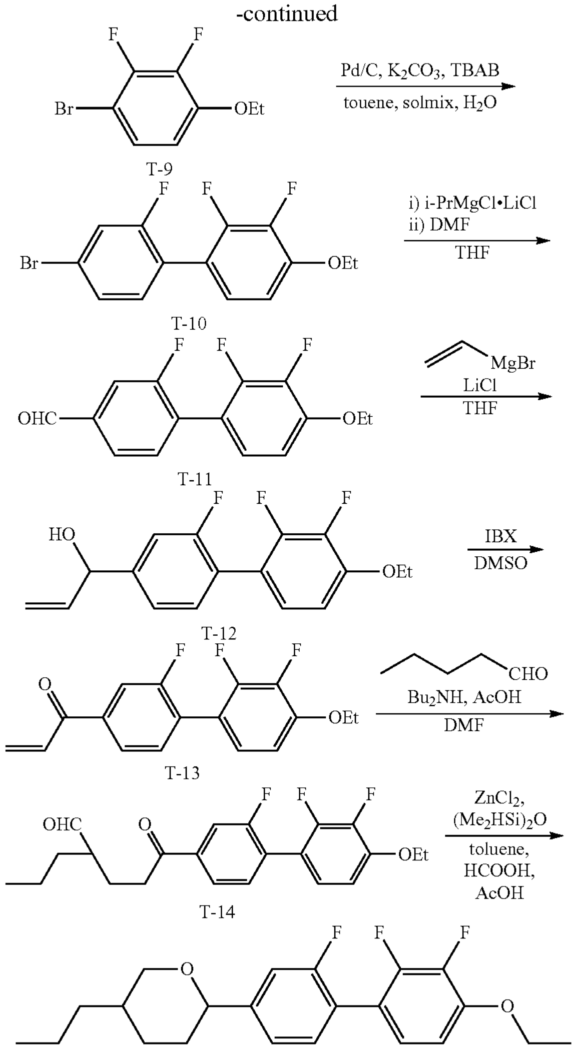

T-9 T-10 T-11 T-12 T-13 T-14

(1-5-50)

First Step:

A mixture of compound (T-8) (4.89 g, 22.3 mmol) prepared according to a publicly known method, compound (T-9) (4.81 g, 20.3 mmol) prepared according to a publicly known method, potassium carbonate (5.61 g, 40.6 mmol), tetrabutylammonium bromide (1.31 g, 4.06 mmol), palladium on carbon (0.179 g), toluene (20 mL), solmix (20 mL) and water (20 mL) was refluxed for 5 hours. The resulting reaction mixture was cooled down to room temperature, and a palladium residue was filtered off. Ordinary post-treatment was applied thereto, and the residue was purified by silica gel chromatography to obtain compound (T-10) (6.72 g, 20.3 mmol; 99%).

Second Step:

A THF (50 mL) solution of compound (T-10) (6.72 g, 20.3 mmol) was cooled down to −70° C., and a THF solution of i-PrMgCl—LiCl (1.3 M; 17.17 mL, 22.3 mmol) was added dropwise thereto. The resulting mixture was stirred at −70° C. for 2.5 hours, and then a THF (10 mL) solution of N,N-dimethylformamide (2.04 mL, 26.4 mmol) was added dropwise thereto. The resulting mixture was stirred at −70° C. for 1 hour, and then the resulting reaction mixture was returned to room temperature, and poured into an aqueous solution of sodium thiosulfate. Ordinary post-treatment was applied thereto, and the residue was purified by silica gel chromatography to obtain compound (T-11) (4.55 g, 16.2 mmol; 80%).

Third Step:

A THF solution of bromomagnesium bromide (13.3 mL, 17.0 mmol, 1.31 M) was added dropwise to a THF (45 mL) solution of lithium chloride (0.722 g, 17.0 mmol), and the resulting mixture was stirred at room temperature for 1 hour. The resulting reaction mixture was cooled down to 0° C., and a THF (15 mL) solution of compound (T-11) (4.55 g, 16.2 mmol) was added dropwise thereto. The resulting reaction mixture was returned to room temperature, and stirred for 8 hours, and then poured into 1 M hydrochloric acid. Ordinary post-treatment was applied thereto, and the residue was purified by silica gel chromatography to obtain compound (T-12) (5.00 g, 16.2 mmol; quantitatively).

Fourth Step:

A DMSO (15 mL) solution of compound (T-12) (5.00 g, 16.2 mmol; quantitatively) was added dropwise to a DMSO (40 mL) solution of 2-iodoxybenzoic acid (63%; 9.02 g, 20.3 mmol), and the resulting mixture was stirred at room temperature for 3 hours. Water and toluene were added to the resulting reaction mixture, a residue was removed by filtration, and an aqueous solution of sodium sulfite was added to the filtrate. Ordinary post-treatment was applied thereto, and the residue was purified by silica gel chromatography to obtain compound (T-13) (4.97 g, 16.2 mmol; quantitatively).

Fifth Step:

A DMF (10 mL) solution of dibutyl amine (3.31 mL, 19.5 mmol) was added dropwise to a DMF (40 mL) solution of valeraldehyde (1.75 mL, 16.2 mmol), and the resulting mixture was refluxed for 10 hours. The resulting reaction mixture was cooled down to room temperature, and ordinary post-treatment was applied thereto. A crude product was dissolved in DMF (50 mL), a DMF (15 mL) solution of compound (T-13) (4.97 g, 16.2 mmol) was added thereto, and the resulting mixture was heated to 50° C., and stirred for 10 hours. The resulting reaction mixture was cooled down to room temperature, and acetic acid was added thereto. Ordinary post-treatment was applied thereto, and the residue was purified by silica gel chromatography to obtain compound (T-14) (5.35 g, 13.6 mmol; 84%).

Sixth Step:

Zinc chloride (1.86 g, 13.6 mmol) and 1,1,3,3-tetramethyldisiloxane (11.5 mL, 75.0 mmol) were added to a mixture of compound (T-14) (5.35 g, 13.6 mmol), toluene (20 mL), formic acid (15 mL) and acetic acid (15 mL), and the resulting mixture was stirred at room temperature for 10 hours. The resulting reaction mixture was poured into water, ordinary post-treatment was applied thereto, and the residue was purified by silica gel chromatography and recrystallization to obtain compound (1-5-50) (2.84 g, 7.50 mmol; 55%).

1H-NMR ($CDCl_3$; δ ppm): 7.03 (1H, t, J=7.6 Hz), 7.18 (2H, d, J=9.4 Hz), 7.02 (1H, ddd, J=2.2 Hz, 8.1 Hz, 8.1 Hz), 6.79 (1H, ddd, J=1.8 Hz, 8.0 Hz, 8.1 Hz), 4.30 (1H, dd, J=2.1, 11.4 Hz), 4.16 (2H, q, J=7.1 Hz), 4.12-4.08 (1H, m), 3.22 (1H, t, J=11.2 Hz), 2.03-1.99 (1H, m), 1.94-1.89 (1H, m), 1.73-1.65 (1H, m), 1.64-1.56 (1H, m), 1.48 (3H, t, J=7.0 Hz), 1.41-1.24 (3H, m), 1.22-1.09 (2H, m), 0.92 (3H, t, J=7.2 Hz).

Phase transition temperature: C, 96.4; N, 112.2; I. Maximum temperature ($T_{NI}$)=108.3° C.; dielectric anisotropy (Δs)=−6.5; optical anisotropy (Δn)=0.167. Elastic constant ratio ($K_{33}/K_{11}$)=1.46.

Synthesis Example 3

Synthesis of Compound (1-4-50)

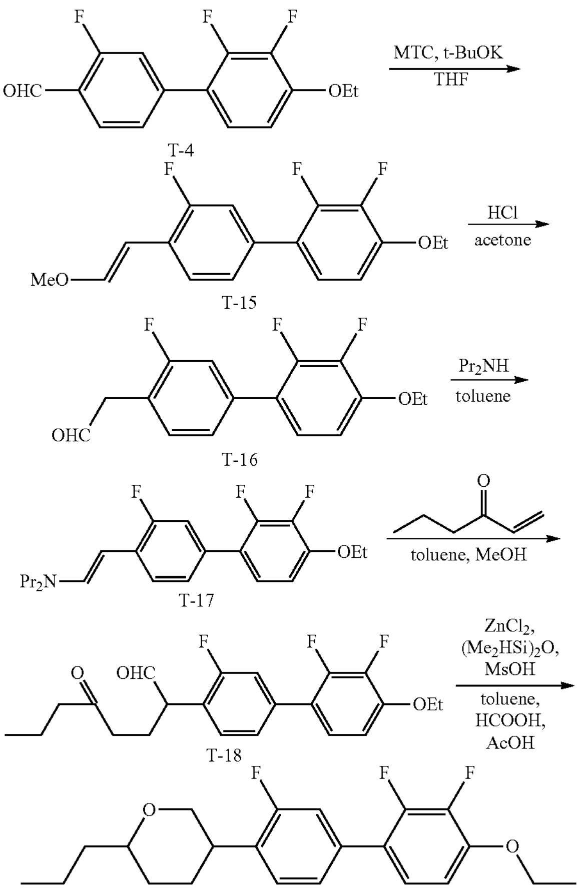

(1-4-50)

First Step:

A THF (120 mL) solution of (methoxymethyl)triphenylphosphonium chloride (10.3 g, 30.0 mmol) was cooled down to −30° C., potassium t-butoxide (3.36 g, 30.0 mmol) was added dropwise thereto, and the resulting mixture was stirred for 1 hour. A THF (20 mL) solution of compound (T-4) (7.00 g, 25.0 mmol) was added dropwise thereto, and the resulting mixture was returned to room temperature while stirring the mixture. The resulting reaction mixture was poured into water, ordinary post-treatment was applied thereto, and the residue was purified by silica gel chromatography to obtain compound (T-15) (7.63 g, 25.0 mmol; quantitatively).

Second Step:

Then, 4 N HCl (4.6 mL) was added dropwise to an acetone (70 mL) solution of compound (T-15) (7.63 g, 25.0 mmol), and the resulting mixture was stirred at room temperature for 1 hour. The resulting reaction mixture was poured into water, ordinary post-treatment was applied thereto, and the residue was purified by silica gel chromatography to obtain compound (T-16) (7.22 g, 24.5 mmol; 98%).

Third Step:

A toluene (10 mL) solution of dipropylamine (4.03 mL, 29.4 mmol) was added dropwise to a toluene (30 mL) solution of compound (T-16) (7.22 g, 24.5 mmol), and the resulting mixture was refluxed for 14 hours. Ordinary post-treatment was applied thereto, and the residue was purified by silica gel chromatography to obtain compound (T-17) (10.6 g, 28.1 mmol; 98%).

Fourth Step:

A toluene (10 mL) solution of 1-hexene-3-one (2.87 mL, 24.5 mmol) was added dropwise to a toluene (20 mL) and methanol (30 mL) solution of compound (T-17) (10.6 g, 28.1 mmol). The resulting reaction mixture was heated to 50° C., and stirred for 10 hours. The resulting reaction mixture was cooled down to room temperature, and 1 N HCl was added thereto. Ordinary post-treatment was applied thereto, and the residue was purified by silica gel chromatography to obtain compound (T-18) (7.82 g, 19.9 mmol; 71%).

Fifth Step:

Zinc chloride (3.34 g, 24.5 mmol) and 1,1,3,3-tetramethyldisiloxane (21.68 mL, 123 mmol) were added to a mixture of compound (T-18) (7.82 g, 19.9 mmol), toluene (40 mL), formic acid (30 mL) and acetic acid (30 mL), the resulting mixture was stirred, and further methanesulfonic acid (1.59 mL, 24.5 mmol) was added thereto, and the resulting mixture was stirred at room temperature for 14 hours. The resulting reaction mixture was poured into water, ordinary post-treatment was applied thereto, and the residue was purified by silica gel chromatography and recrystallization to obtain compound (1-4-50) (5.11 g, 13.5 mmol; 68%).

1H-NMR ($CDCl_3$; δ ppm): 7.25-7.24 (2H, m), 7.19 (2H, d, J=11.5 Hz), 7.07 (1H, ddd, J=2.4 Hz, 8.6 Hz, 8.7 Hz), 6.79 (1H, ddd, J=1.8 Hz, 8.2 Hz, 8.2 Hz), 4.16 (2H, q, J=7.0 Hz), 4.08-4.04 (1H, m), 3.48 (1H, t, J=11.1 Hz), 3.39-3.35 (1H, m), 3.21-3.15 (1H, m), 2.05-2.00 (1H, m), 1.88-1.77 (2H, m), 1.62-1.35 (5H, m), 1.48 (3H, t, J=7.1 Hz), 0.95 (3H, t, J=7.1 Hz).

Phase transition temperature: C, 73.7; N, 108.3; I. Maximum temperature ($T_{NI}$)=101.6° C.; dielectric anisotropy ($\Delta\epsilon$)=−6.4; optical anisotropy ($\Delta n$)=0.174. Elastic constant ratio ($K_{33}/K_{11}$)=1.22.

Synthesis Example 4

Synthesis of Compound (1-6-50)

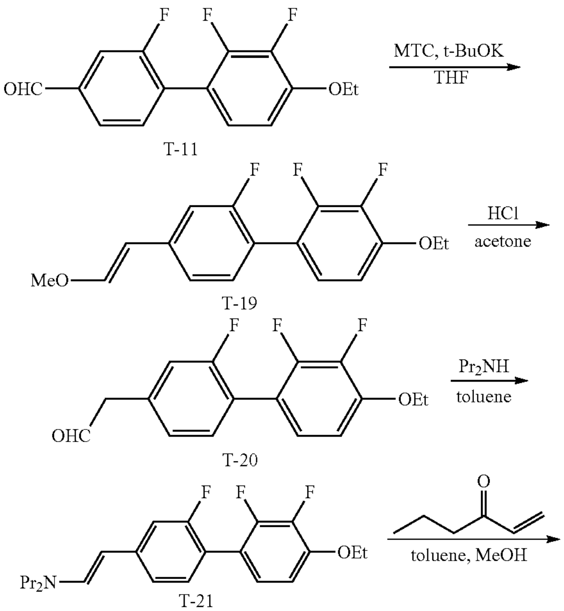

T-11

T-19

T-20

T-21

-continued

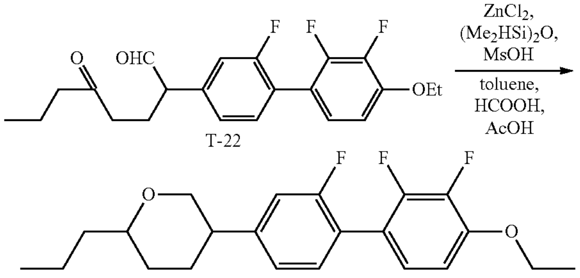

T-22

(1-6-50)

First Step:

A THF (130 mL) solution of (methoxymethyl)triphenylphosphonium chloride (11.7 g, 34.3 mmol) was cooled down to −30° C., potassium t-butoxide (4.19 g, 34.3 mmol) was added thereto, and the resulting mixture was stirred for 1 hour. A THF (30 mL) solution of compound (T-11) (8.00 g, 28.6 mmol) was added dropwise thereto, and the resulting mixture was returned to room temperature while stirring the mixture. The resulting reaction mixture was poured into water, ordinary post-treatment was applied thereto, and the residue was purified by silica gel chromatography to obtain compound (T-19) (8.80 g, 28.6 mmol; quantitatively).

Second Step:

Then, 4 N HCl (4.9 mL) was added dropwise to an acetone (75 mL) solution of compound (T-19) (8.80 g, 28.6 mmol), and the resulting mixture was stirred at room temperature for 1 hour. The resulting reaction mixture was poured into water, ordinary post-treatment was applied thereto, and the residue was purified by silica gel chromatography to obtain compound (T-20) (8.40 g, 28.6 mmol; quantitatively).

Third Step:

A toluene (15 mL) solution of dipropylamine (4.70 mL, 34.3 mmol) was added dropwise to a toluene (40 mL) solution of compound (T-20) (8.40 g, 28.6 mmol), and the resulting mixture was refluxed for 14 hours. Ordinary post-treatment was applied thereto, and the residue was purified by silica gel chromatography to obtain compound (T-21) (10.3 g, 27.2 mmol; 95%).

Fourth Step:

A toluene (20 mL) solution of 1-hexene-3-one (2.87 mL, 24.5 mmol) was added to a toluene (10 mL) and methanol (30 mL) solution of compound (T-21) (10.3 g, 27.2 mmol), and the resulting mixture was heated to 50° C., and stirred for 10 hours. The resulting reaction mixture was cooled down to room temperature, and 1 N HCl was added thereto. Ordinary post-treatment was applied thereto, and the residue was purified by silica gel chromatography to obtain compound (T-22) (7.39 g, 18.8 mmol; 69%).

Fifth Step:

Zinc chloride (3.89 g, 28.6 mmol) and 1,1,3,3-tetramethyldisiloxane (25.2 mL, 143 mmol) were added to a mixture of compound (T-22) (7.39 g, 18.8 mmol), toluene (40 mL), formic acid (30 mL) and acetic acid (30 mL), the resulting mixture was stirred, and further methanesulfonic acid (1.85 mL, 28.6 mmol) was added thereto, and the resulting mixture was stirred at room temperature for 14 hours. The resulting reaction mixture was poured into water, ordinary post-treatment was applied thereto, and the residue was purified by silica gel chromatography and recrystallization to obtain compound (1-6-50) (5.08 g, 13.4 mmol; 71%).

$^1$H-NMR ($CDCl_3$; δ ppm): 7.28 (2H, t, J=7.8 Hz), 7.06-6.99 (3H, m), 6.79 (1H, ddd, J=1.7 Hz, 8.1 Hz, 8.1 Hz), 4.16 (2H, q, J=7.0 Hz), 4.07-4.04 (1H, m), 3.42 (1H, t, J=11.2 Hz), 3.37-3.33 (1H, m), 2.89-2.83 (1H, m), 2.11-2.04 (1H, m), 1.82-1.71 (2H, m), 1.59-1.37 (5H, m), 1.48 (3H, t, J=7.1 Hz), 0.95 (3H, t, J=7.0 Hz).

Phase transition temperature: C, 78.3; N, 84.1; I. Maximum temperature ($T_{NI}$)=84.3° C.; dielectric anisotropy (Δ∈)=−7.2; optical anisotropy (Δn)=0.160. Elastic constant ratio ($K_{33}/K_{11}$)=1.46.

Comparative Example 1

For comparison, compound (A) and compound (B) as described below were selected. Compounds (A) and (B) were prepared as described in Mol. Cryst. Liq. Cryst., 2011, 542, P 538.

(A)

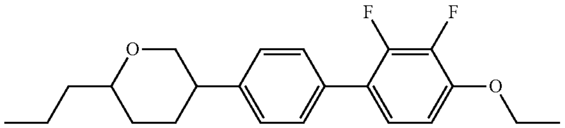

$^1$H-NMR ($CDCl_3$; δ ppm): 7.47 (2H, d, J=8.0 Hz), 7.42 (2H, d, J=8.0 Hz), 7.08 (1H, ddd, J=2.4 Hz, 7.6 Hz, 8.4 Hz), 6.78 (1H, ddd, J=1.6 Hz, 7.5 Hz, 8.4 Hz), 4.31 (1H, dd, J=1.8, 11.5 Hz), 4.15 (2H, q, J=7.0 Hz), 4.10 (1H, ddd, J=2.0 Hz, 4.2 Hz, 11.2 Hz), 3.23 (1H, dd, J=11.1 Hz, 11.2 Hz), 2.01-1.96 (1H, m), 1.93-1.86 (1H, m), 1.76-1.59 (2H, m), 1.48 (3H, t, J=7.0 Hz), 1.43-1.23 (3H, m), 1.22-1.07 (2H, m), 0.92 (3H, t, J=7.0 Hz)

Physical properties of compound (A) were as described below.

Phase transition temperature: C, 72.0; N, 137.8; I. Maximum temperature ($T_{NI}$)=124.6° C.; dielectric anisotropy (Δ∈)=−6.2; optical anisotropy (Δn)=0.180. Elastic constant ratio ($K_{33}/K_{11}$)=1.13.

(B)

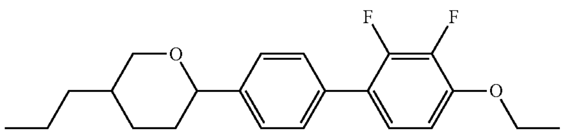

$^1$H-NMR ($CDCl_3$; δ ppm): 7.45 (2H, dd, J=1.2 Hz, 8.2 Hz), 7.27 (2H, d, J=8.2 Hz), 7.08 (1H, ddd, J=2.2 Hz, 7.6 Hz, 8.4 Hz), 6.79 (1H, ddd, J=1.6 Hz, 7.7 Hz, 8.4 Hz), 4.16 (2H, q, J=7.0 Hz), 4.05 (1H, ddd, J=2.2 Hz, 4.2 Hz, 11.2 Hz), 3.44 (1H, dd, J=11.2 Hz, 11.2 Hz), 3.36 (1H, m), 3.36 (1H, m), 2.11-2.04 (1H, m), 1.84-1.74 (2H, m), 1.61-1.36 (8H, m), 0.95 (3H, t, J=7.0 Hz)

Physical properties of compound (B) were as described below.

Phase transition temperature: C, 82.9; N, 160.2; I. Maximum temperature ($T_{NI}$)=145.3° C.; dielectric anisotropy (Δ∈)=−5.9; optical anisotropy (Δn)=0.180. Elastic constant ratio ($K_{33}/K_{11}$)=1.20.

Physical properties of compounds prepared in Synthesis Examples 1 to 4 and Comparative Examples 1 and 2 are summarized in Table 2. The compounds in Synthesis Examples 1 to 4 were found to have a larger negative dielectric anisotropy (Δ∈) than comparative compounds (A) and (B). The compounds in Synthesis Examples 1 to 4 were also found to have a larger elastic constant ratio ($K_{33}/K_{11}$). From the results, compound (1) can be concluded to simultaneously satisfy a larger negative dielectric anisotropy and a larger elastic constant ratio in comparison with a similar compound. A compound having a large negative dielectric anisotropy decreases a threshold voltage of the device. A compound having a large elastic constant ratio makes a voltage-transmittance curve of the device steep, and increases a contrast ratio. Accordingly, compound (1) is superior to the comparative compounds.

TABLE 2

List of physical properties of prepared compounds

| Examples | Compounds | Maximum temperature ($T_{NI}$) | Dielectric anisotropy (Δϵ) | Optical anisotropy (Δn) | Elastic constant ratio (K33/K11) |
|---|---|---|---|---|---|
| Synthesis Example 1 | 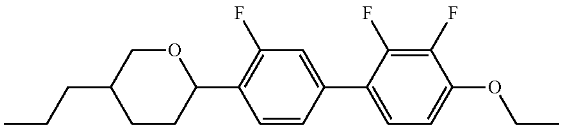 [SMILES: CCCC1CCC(c2ccc(-c3ccc(OCC)c(F)c3F)cc2F)CO1] (1-3-50) | 113.0° C. | −6.3 | 0.174 | 1.39 |
| Synthesis Example 2 | 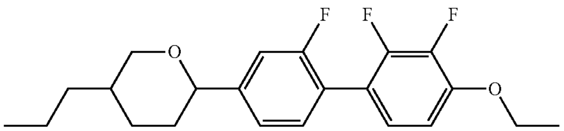 [SMILES: CCCC1CCC(c2ccc(-c3ccc(OCC)c(F)c3F)c(F)c2)CO1] (1-5-50) | 108.3° C. | −6.5 | 0.167 | 1.46 |
| Synthesis Example 3 | 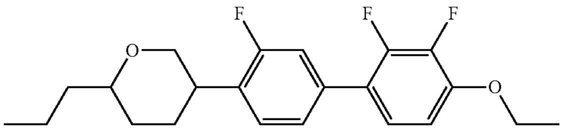 (1-4-50) | 101.6° C. | −6.4 | 0.174 | 1.22 |

TABLE 2-continued

| List of physical properties of prepared compounds | | | | | |
|---|---|---|---|---|---|
| Examples | Compounds | Maximum temperature ($T_{NI}$) | Dielectric anisotropy ($\Delta\epsilon$) | Optical anisotropy ($\Delta n$) | Elastic constant ratio (K33/K11) |
| Synthesis Example 4 | 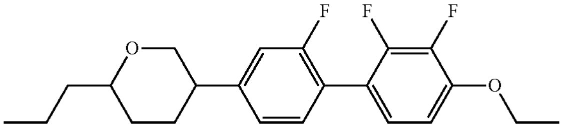 (1-6-50) | 84.3° C. | −7.2 | 0.160 | 1.46 |
| Comparative Example 1 | 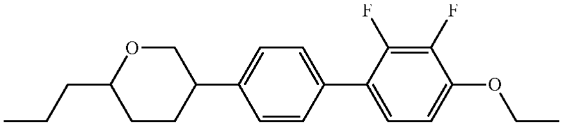 [SMILES: CCCC1CCC(c2ccc(-c3ccc(OCC)c(F)c3F)cc2)CO1] (A) | 124.6° C. | −6.2 | 0.180 | 1.20 |
| Comparative Example 2 | 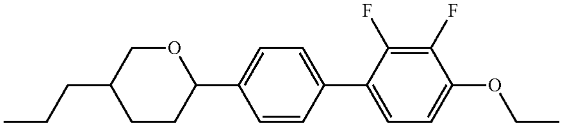 [SMILES: CCCC1CCC(c2ccc(-c3ccc(OCC)c(F)c3F)cc2)OC1] (B) | 141.9° C. | −5.3 | 0.184 | 1.13 |

Compounds shown below can be prepared with reference to the methods described in Synthesis Examples, and the section of "2. Synthesis of compound (1)."

(1-3-1)

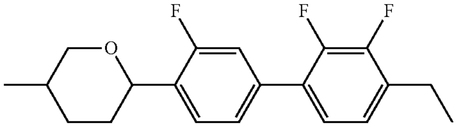

(1-3-2)

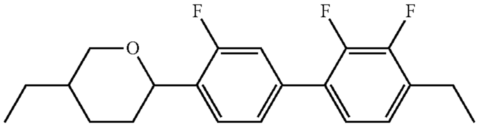

(1-3-3)

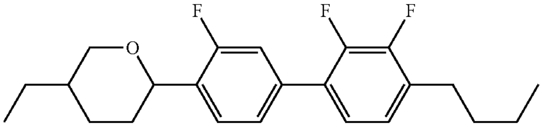

(1-3-4)

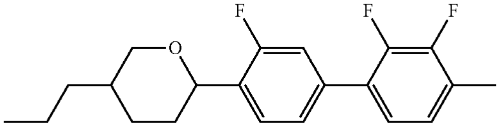

(1-3-5)

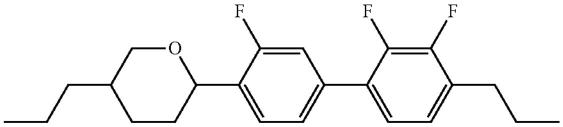

-continued (1-3-6)

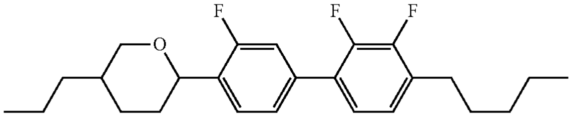

(1-3-7)

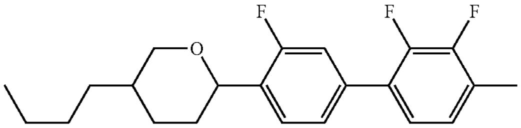

(1-3-8)

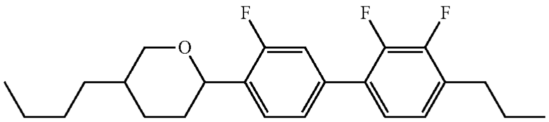

(1-3-9)

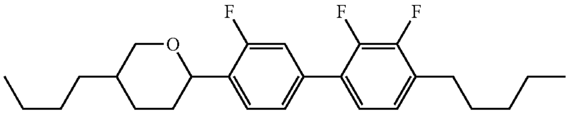

(1-3-10)

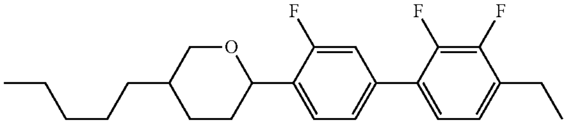

(1-3-11)

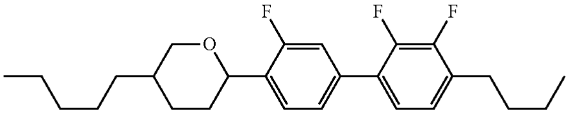

-continued
(1-3-12)
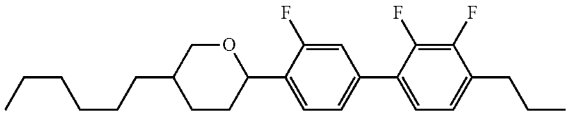
(1-3-13)
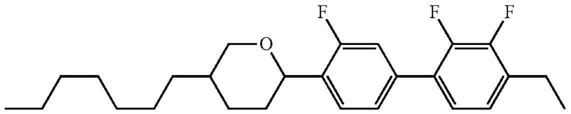
(1-3-14)
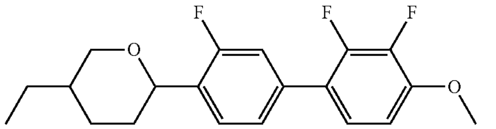
(1-3-15)
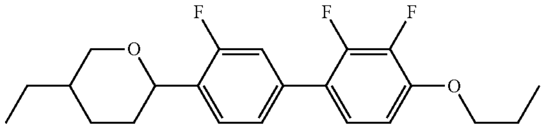
(1-3-16)
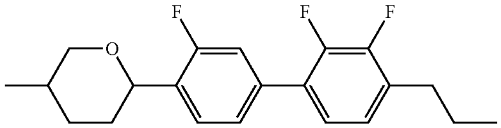
(1-3-17)
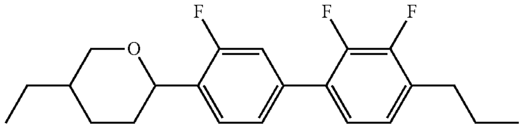
(1-3-18)
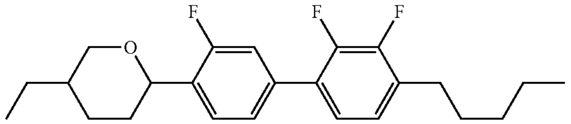
(1-3-19)
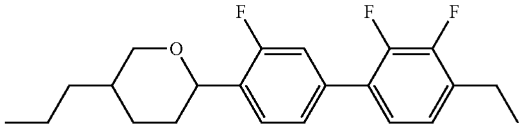
(1-3-20)
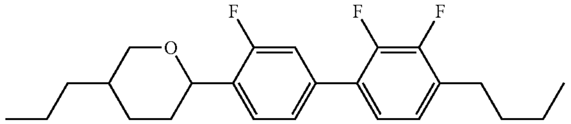
(1-3-21)
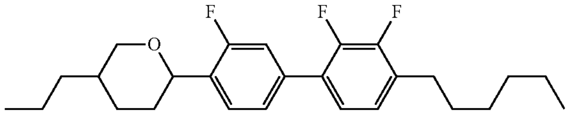
-continued
(1-3-22)
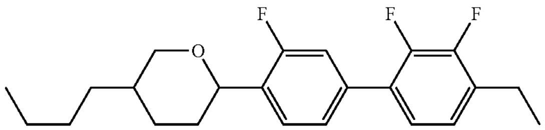
(1-3-23)
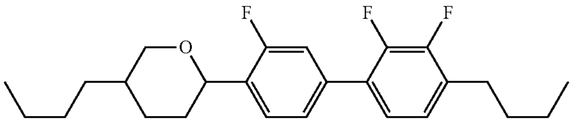
(1-3-24)
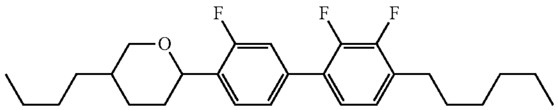
(1-3-25)
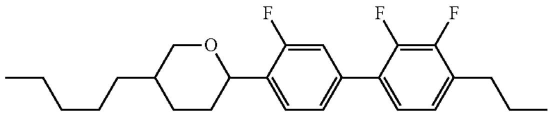
(1-3-26)
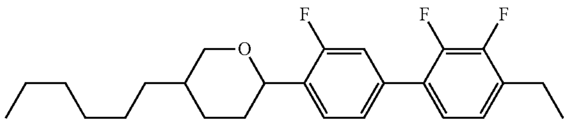
(1-3-27)
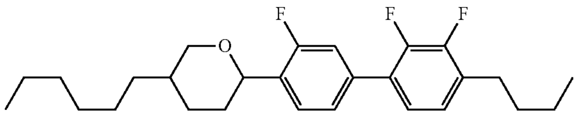
(1-3-28)
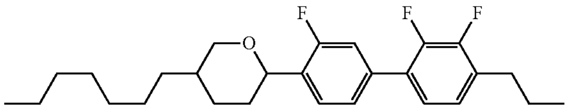
(1-3-29)
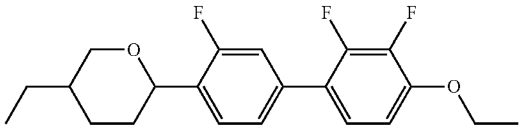
(1-3-30)
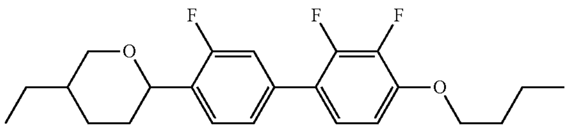
(1-3-31)
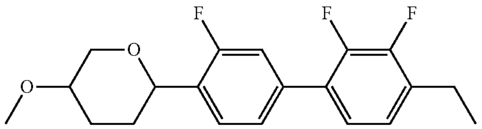

-continued
(1-3-32)
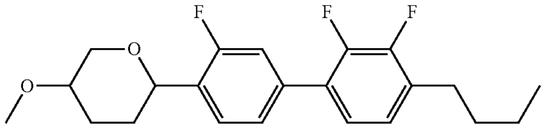
(1-3-33)
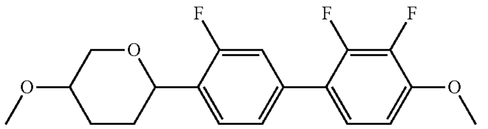
(1-3-34)
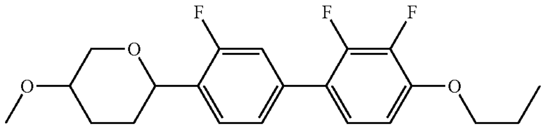
(1-3-35)
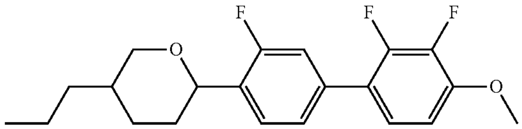
(1-3-36)
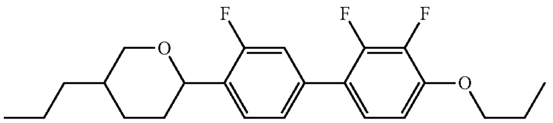
(1-3-37)
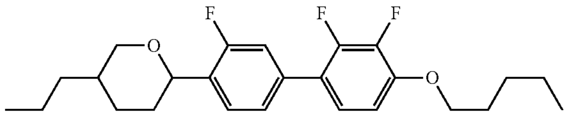
(1-3-38)
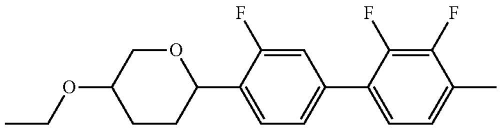
(1-3-39)
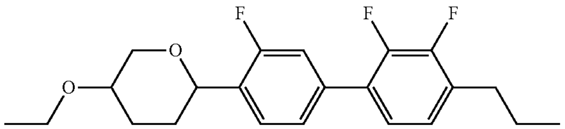
(1-3-40)
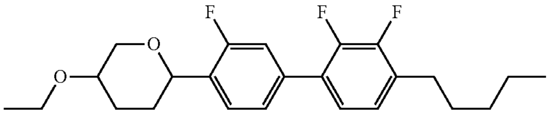
(1-3-41)
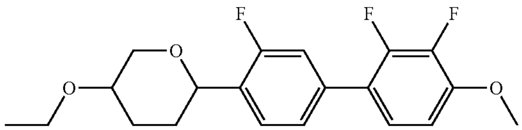
-continued
(1-3-42)
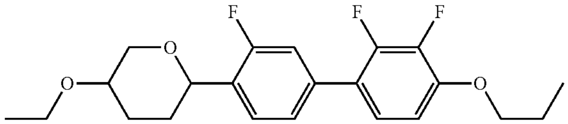
(1-3-43)
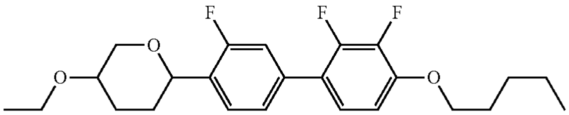
(1-3-44)
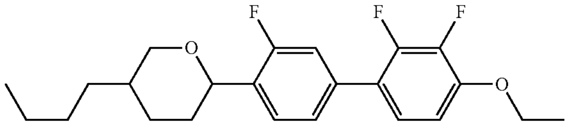
(1-3-45)
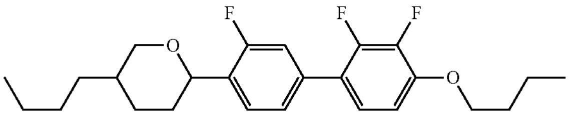
(1-3-46)
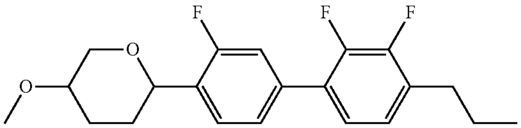
(1-3-47)
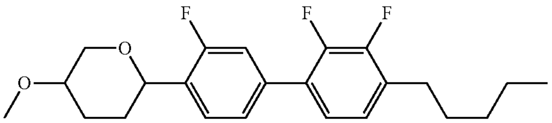
(1-3-48)
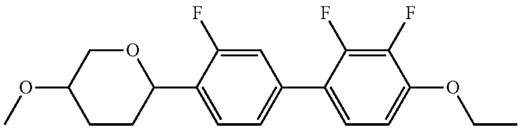
(1-3-49)
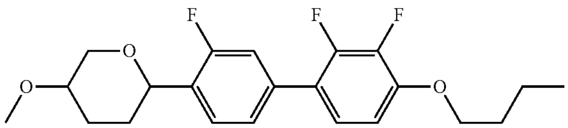
(1-3-50)
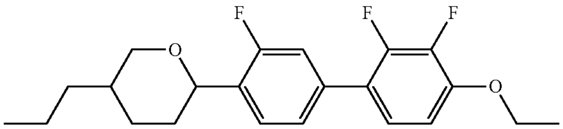
C 99.4 N 125.1 I
$T_{NI}$ = 113.0° C., $\Delta_\varepsilon$ = -6.3, $\Delta n$ = 0.174
(1-3-51)
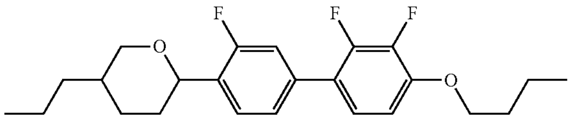

-continued
(1-3-52)
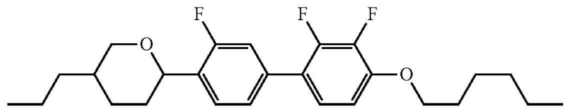
(1-3-53)
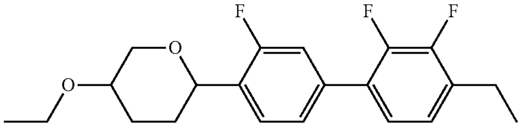
(1-3-54)
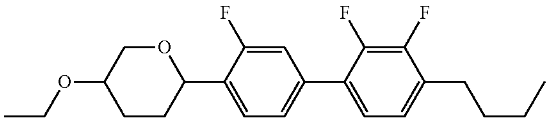
(1-3-55)
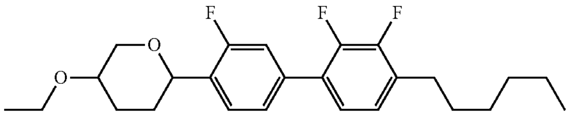
(1-3-56)
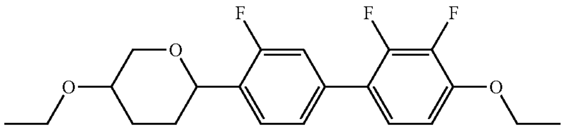
(1-3-57)
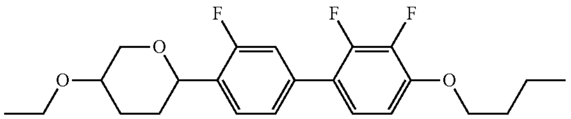
(1-3-58)
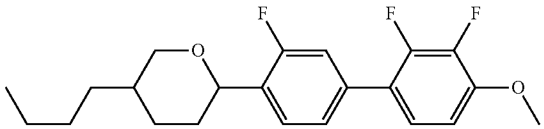
(1-3-59)
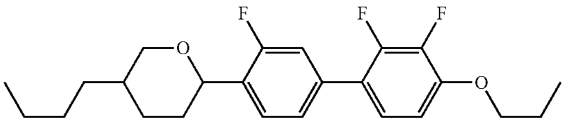
(1-3-60)
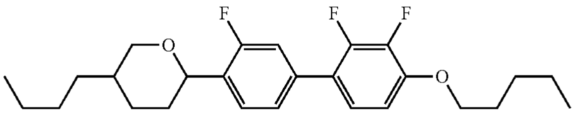
(1-3-61)
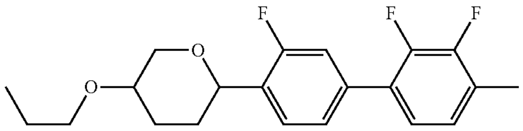
-continued
(1-3-62)
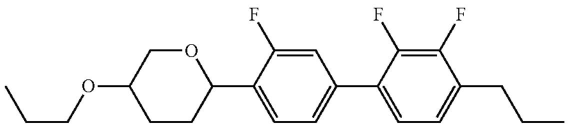
(1-3-63)
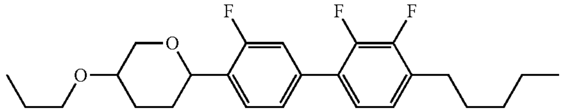
(1-3-64)
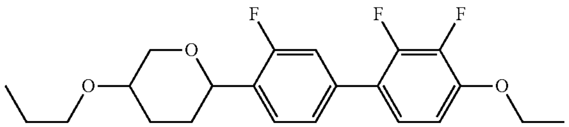
(1-3-65)
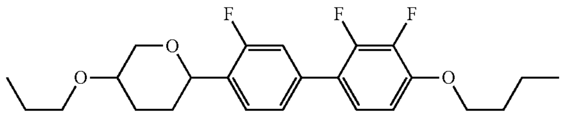
(1-3-66)
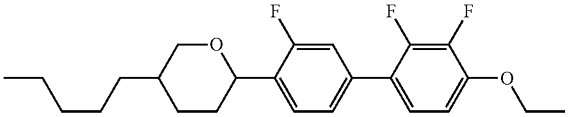
(1-3-67)
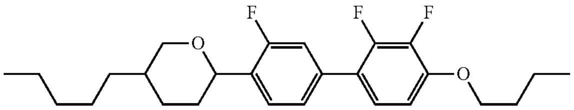
(1-3-68)
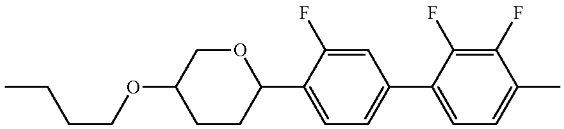
(1-3-69)
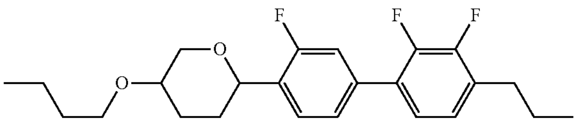
(1-3-70)
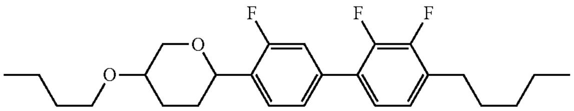
(1-3-71)
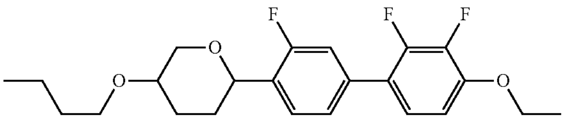
(1-3-72)
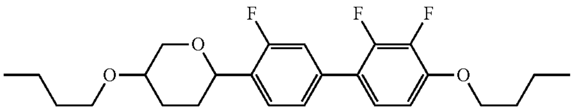

-continued
(1-3-73)
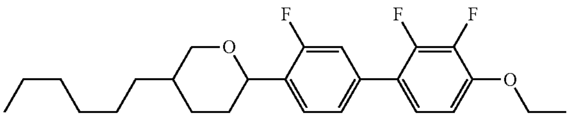
(1-3-74)
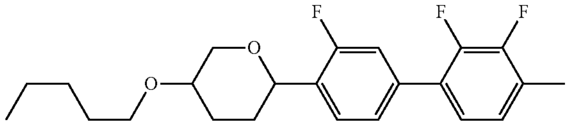
(1-3-75)
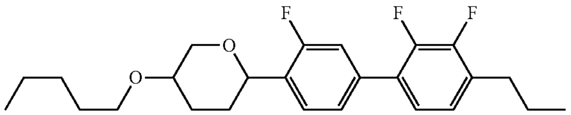
(1-3-76)
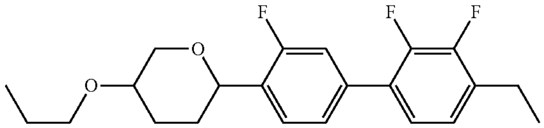
(1-3-77)
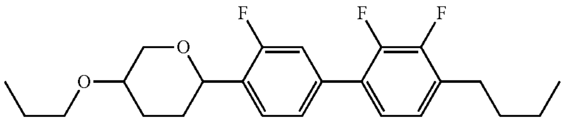
(1-3-78)
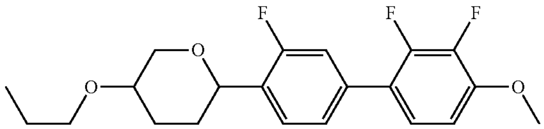
(1-3-79)
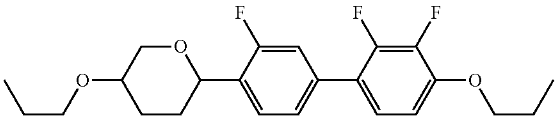
(1-3-80)
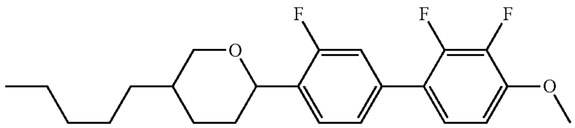
(1-3-81)
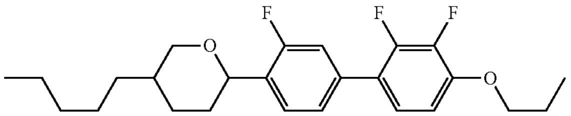
(1-3-82)
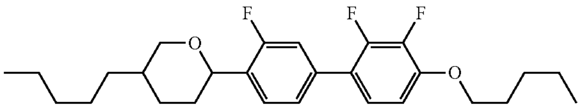
-continued
(1-3-83)
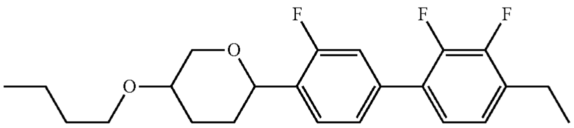
(1-3-84)
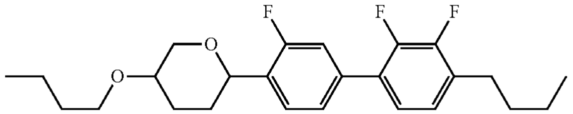
(1-3-85)
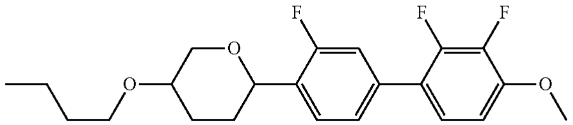
(1-3-86)
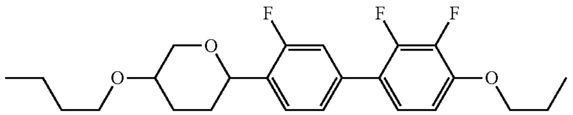
(1-3-87)
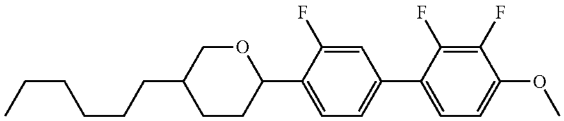
(1-3-88)
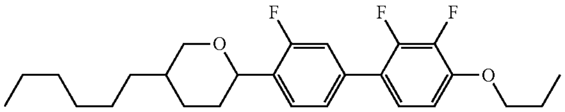
(1-3-89)
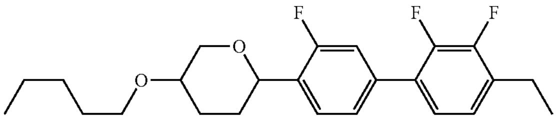
(1-3-90)
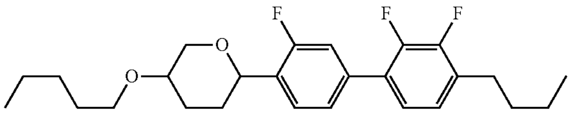
(1-3-91)
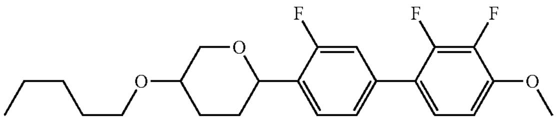
(1-3-92)
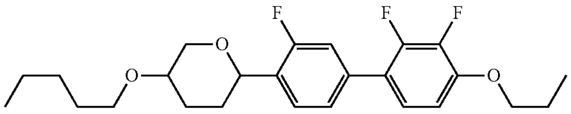
(1-3-93)
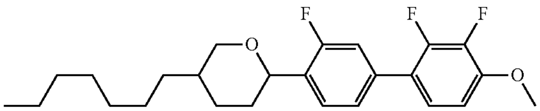

-continued
(1-3-94)
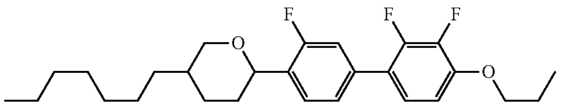
(1-3-95)
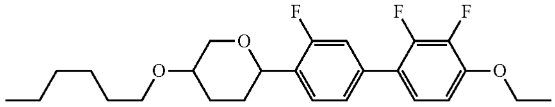
(1-3-96)
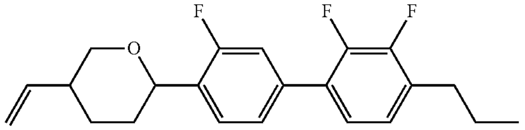
(1-3-97)
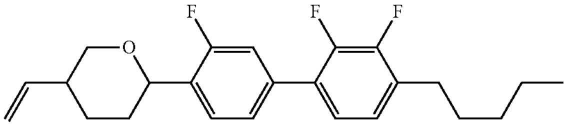
(1-3-98)
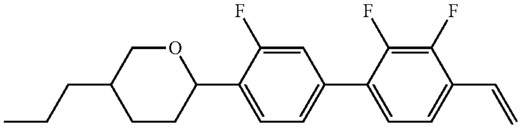
(1-3-99)
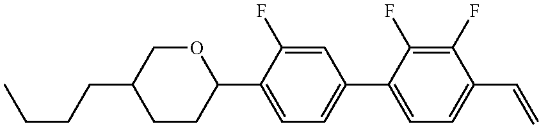
(1-3-100)
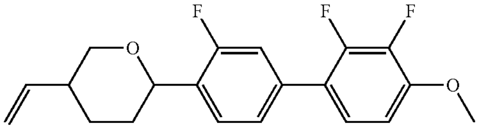
(1-3-101)
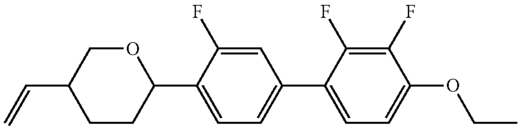
(1-3-102)
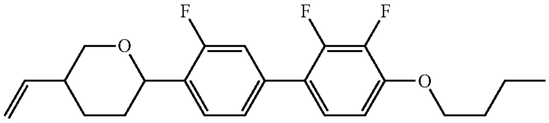
(1-3-103)
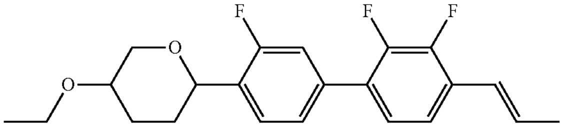
-continued
(1-3-104)
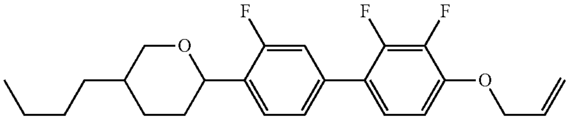
(1-3-105)
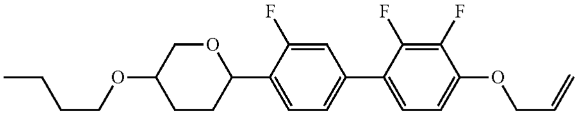
(1-3-106)
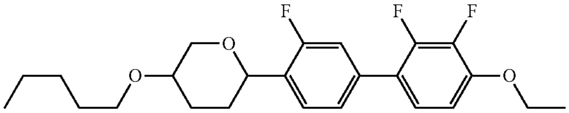
(1-3-107)
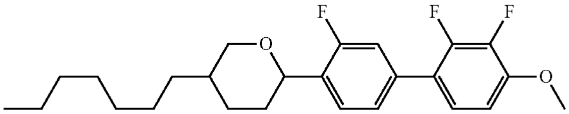
(1-3-108)
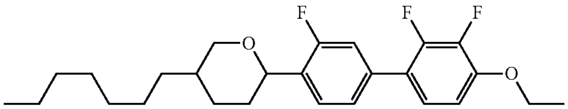
(1-3-109)
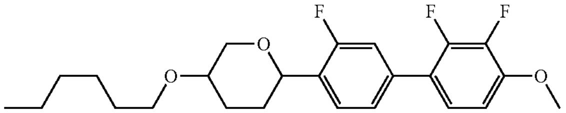
(1-3-110)
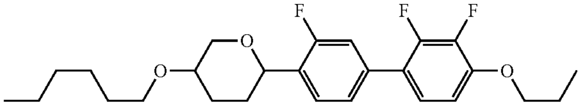
(1-3-111)
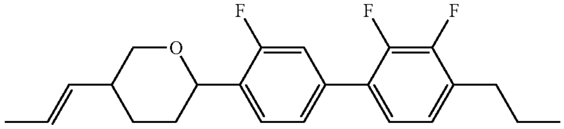
(1-3-112)
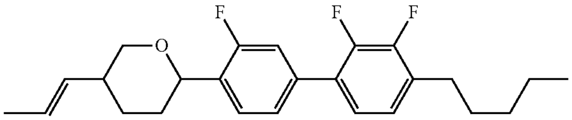
(1-3-113)
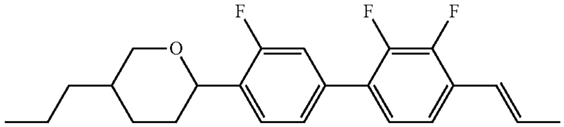
(1-3-114)
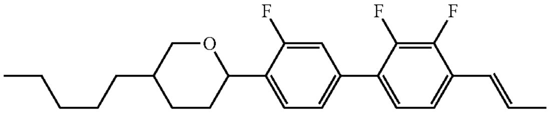

-continued
(1-3-115)
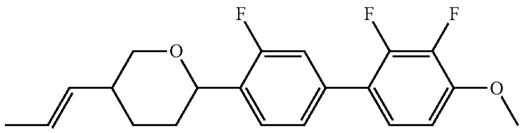
(1-3-116)
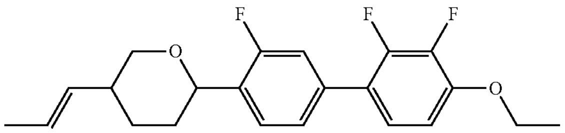
(1-3-117)
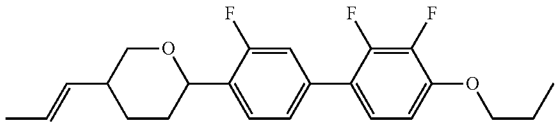
(1-3-118)
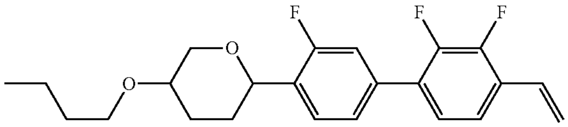
(1-3-119)
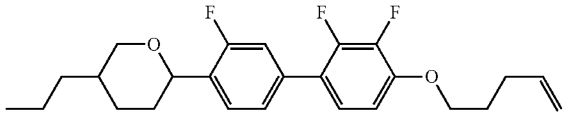
(1-3-120)
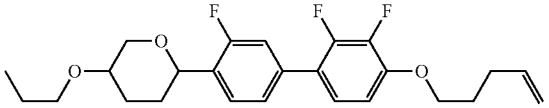
(1-3-121)
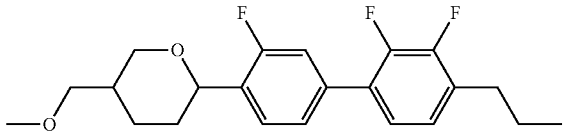
(1-3-122)
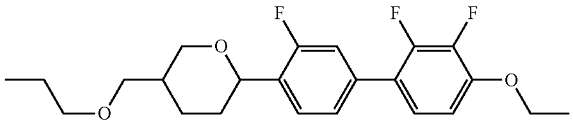
(1-3-123)
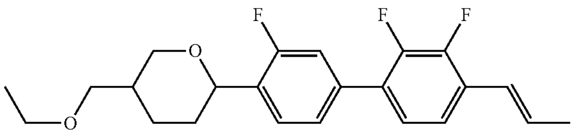
(1-3-124)
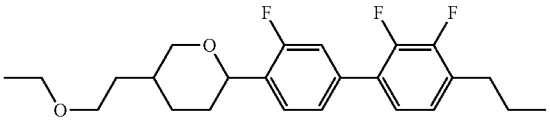
-continued
(1-3-125)
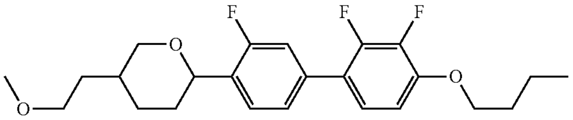
(1-3-126)
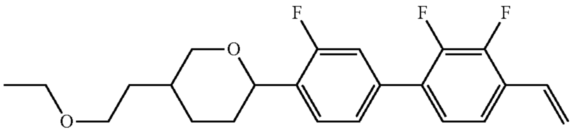
(1-3-127)
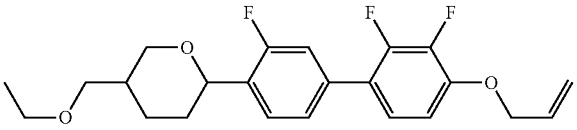
(1-3-128)
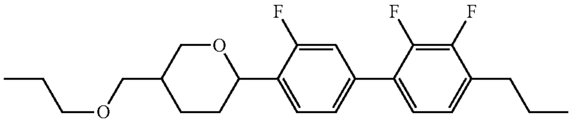
(1-3-129)
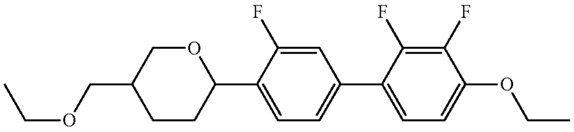
(1-3-130)
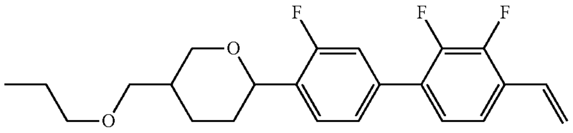
(1-3-131)
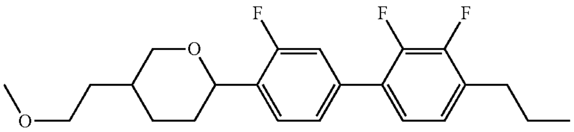
(1-3-132)
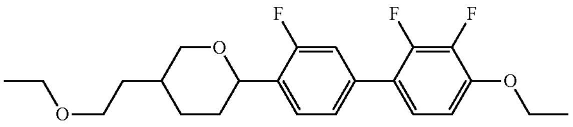
(1-3-133)
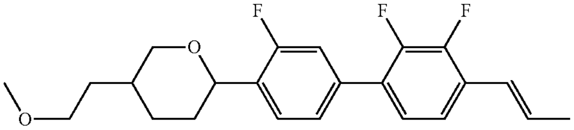
(1-3-134)
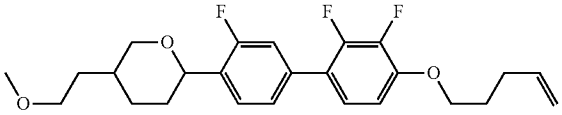

-continued
(1-4-1)
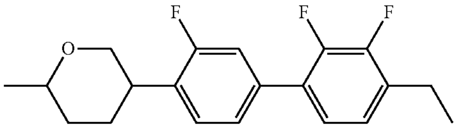
(1-4-2)
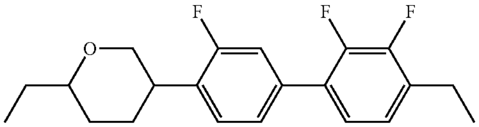
(1-4-3)
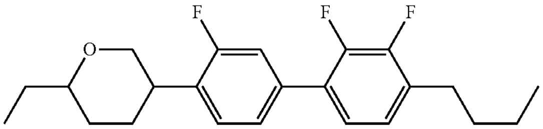
(1-4-4)
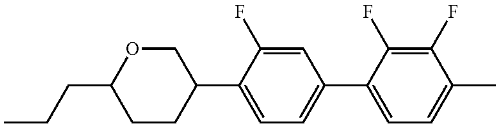
(1-4-5)
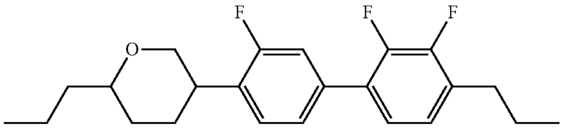
(1-4-6)
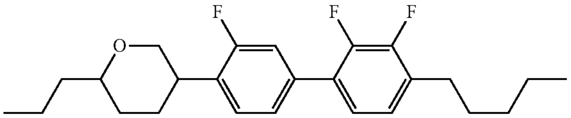
(1-4-7)
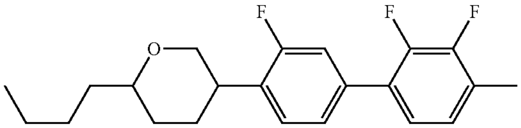
(1-4-8)
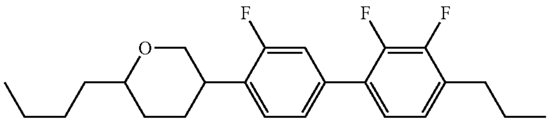
(1-4-9)
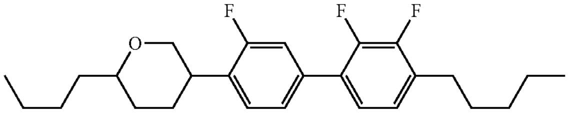
(1-4-10)
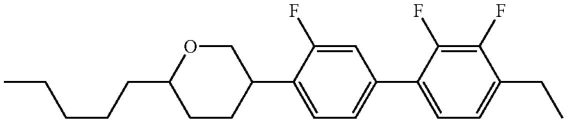
-continued
(1-4-11)
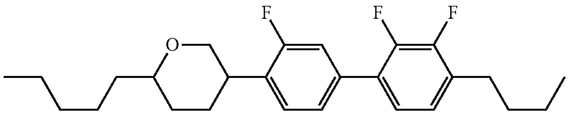
(1-4-12)
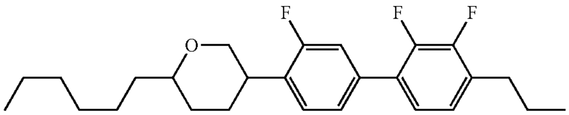
(1-4-13)
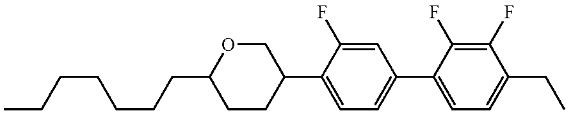
(1-4-14)
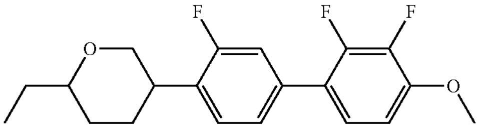
(1-4-15)
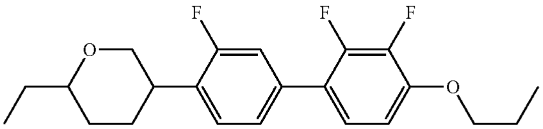
(1-4-16)
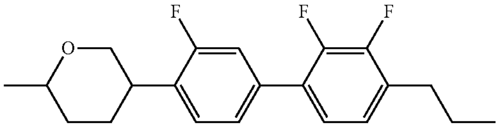
(1-4-17)
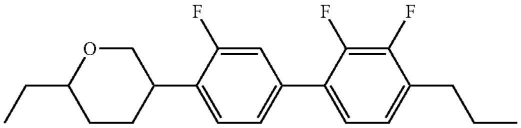
(1-4-18)
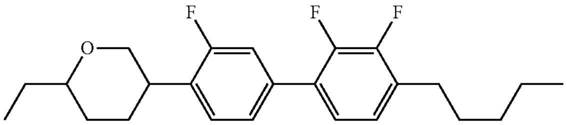
(1-4-19)
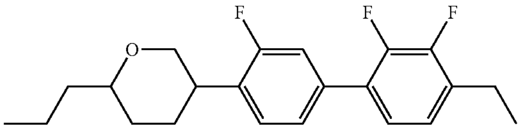
(1-4-20)
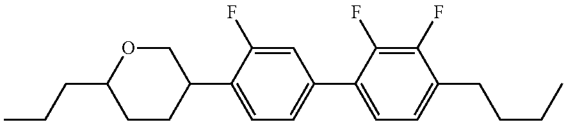

-continued
(1-4-21)
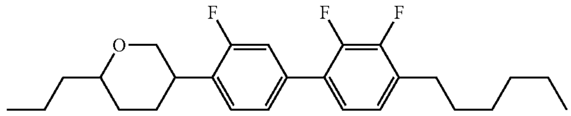
(1-4-22)
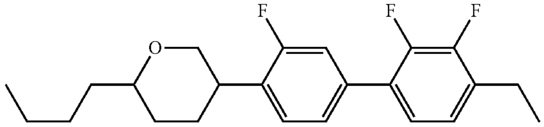
(1-4-23)
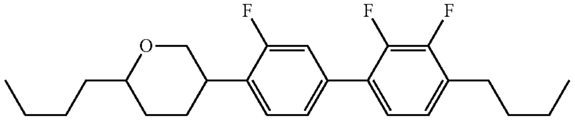
(1-4-24)
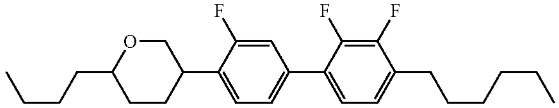
(1-4-25)
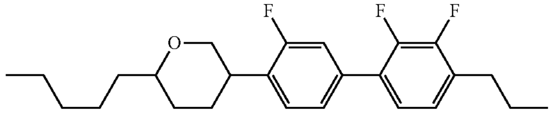
(1-4-26)
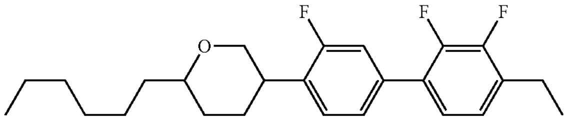
(1-4-27)
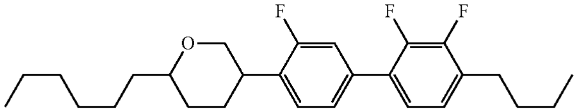
(1-4-28)
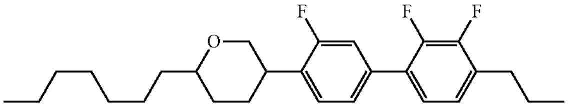
(1-4-29)
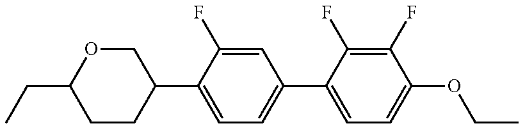
(1-4-30)
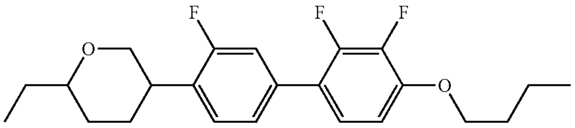
-continued
(1-4-31)
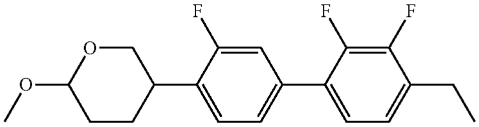
(1-4-32)
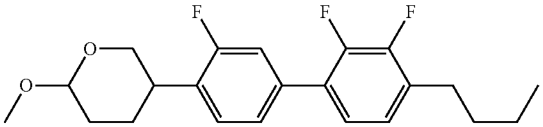
(1-4-33)
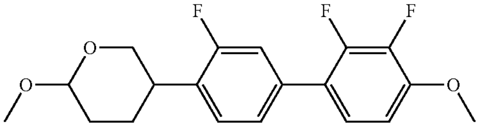
(1-4-34)
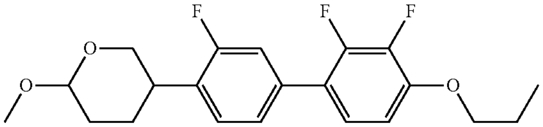
(1-4-35)
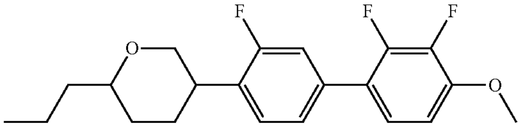
(1-4-36)
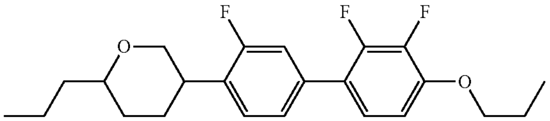
(1-4-37)
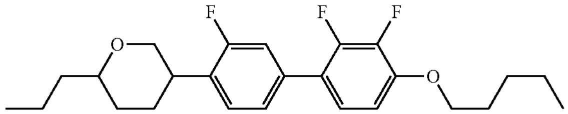
(1-4-38)
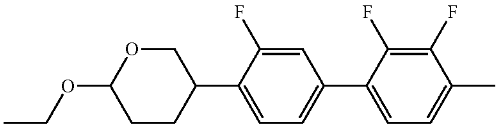
(1-4-39)
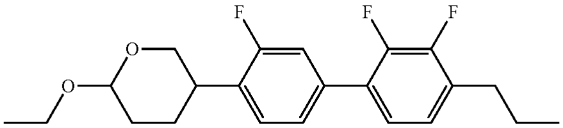
(1-4-40)
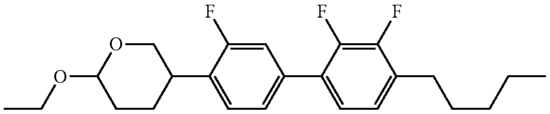

-continued
(1-4-41)
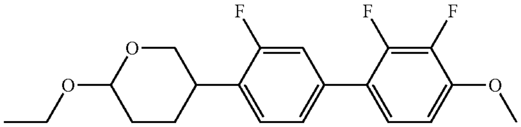
(1-4-42)
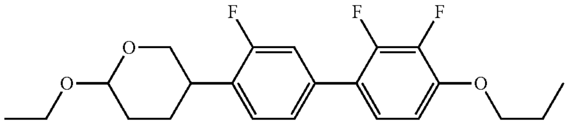
(1-4-43)
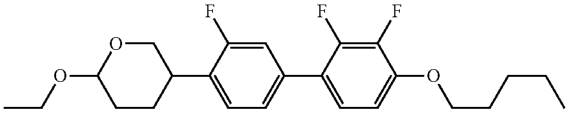
(1-4-44)
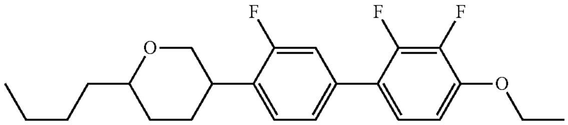
(1-4-45)
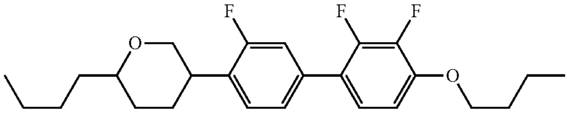
(1-4-46)
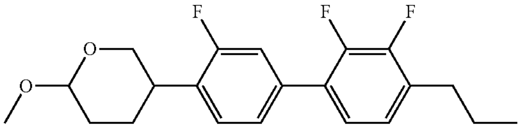
(1-4-47)
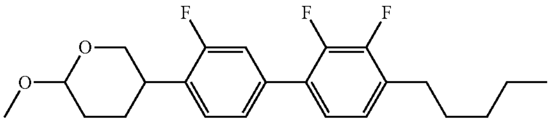
(1-4-48)
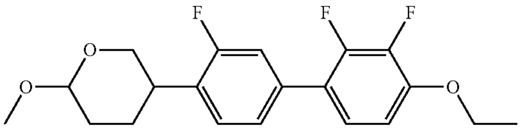
(1-4-49)
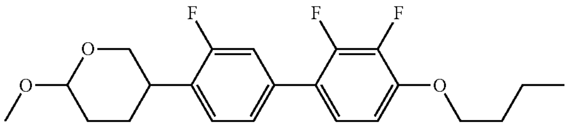
(1-4-50)
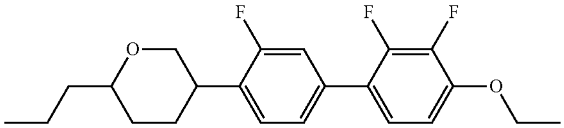
C 73.7 N 108.3 I
$T_{NI}$ = 101.6° C., $\Delta\varepsilon$ = -6.4, $\Delta n$ = 0.174
-continued
(1-4-51)
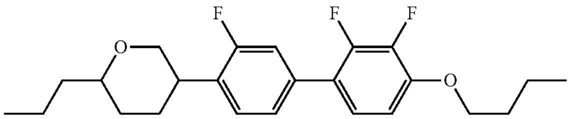
(1-4-52)
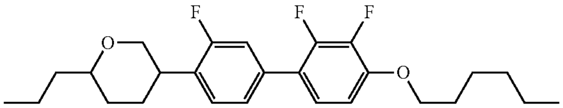
(1-4-53)
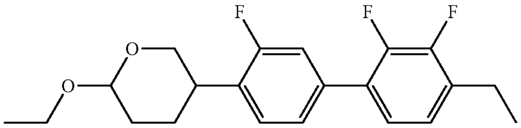
(1-4-54)
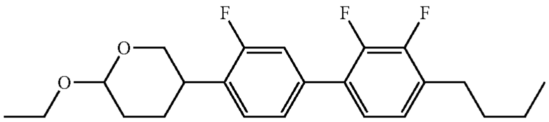
(1-4-55)
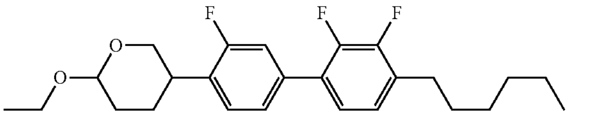
(1-4-56)
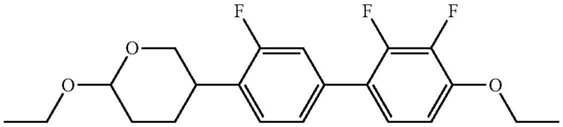
(1-4-57)
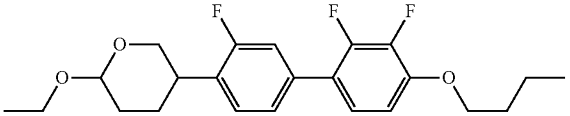
(1-4-58)
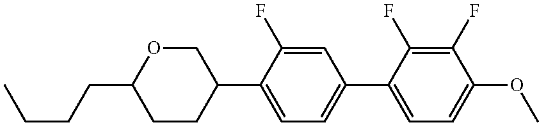
(1-4-59)
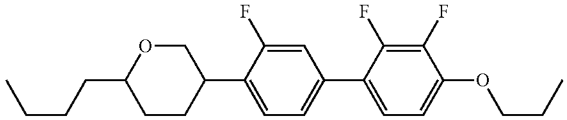
(1-4-60)
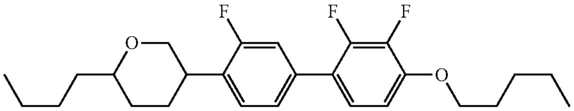

-continued
(1-4-61)
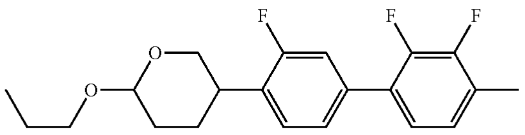
(1-4-62)
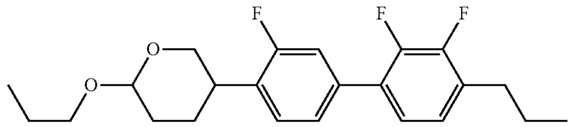
(1-4-63)
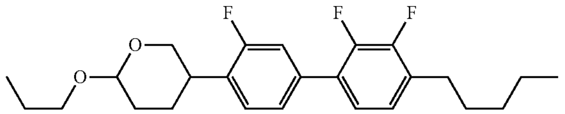
(1-4-64)
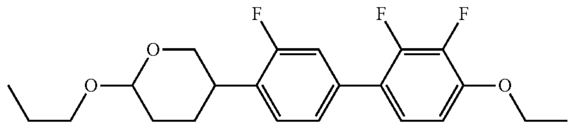
(1-4-65)
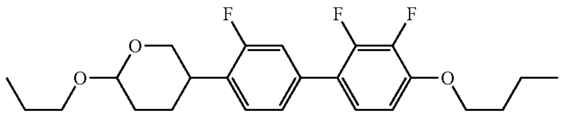
(1-4-66)
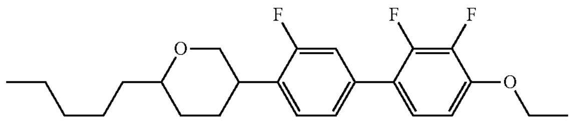
(1-4-67)
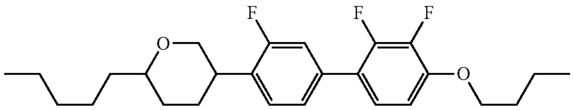
(1-4-68)
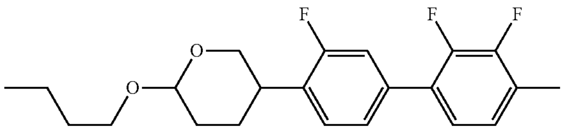
(1-4-69)
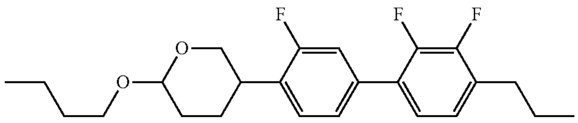
(1-4-70)
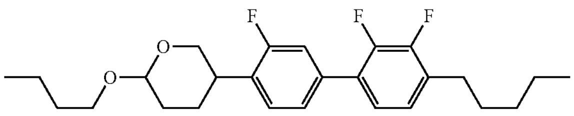
-continued
(1-4-71)
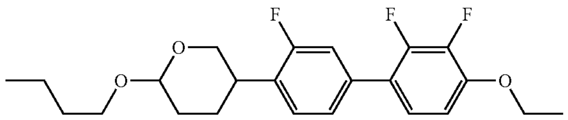
(1-4-72)
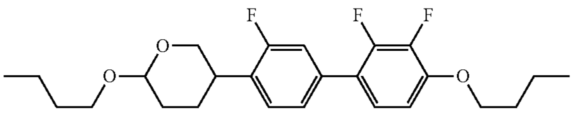
(1-4-73)
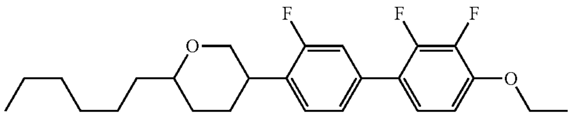
(1-4-74)
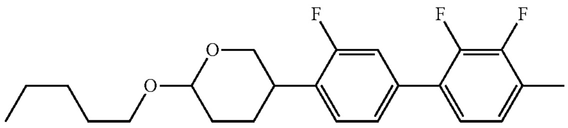
(1-4-75)
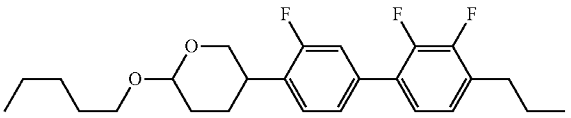
(1-4-76)
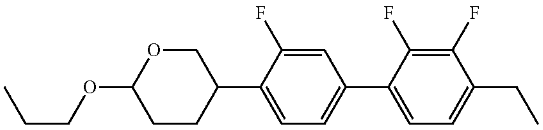
(1-4-77)
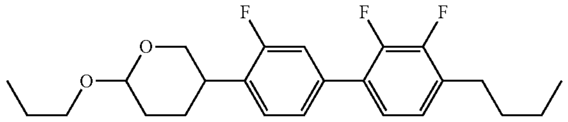
(1-4-78)
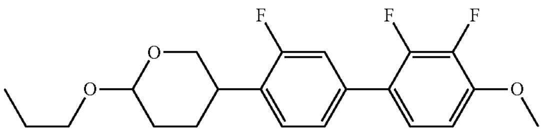
(1-4-79)
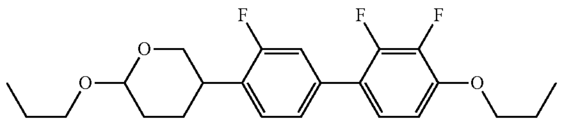
(1-4-80)
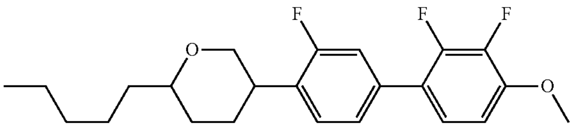

-continued
(1-4-81)
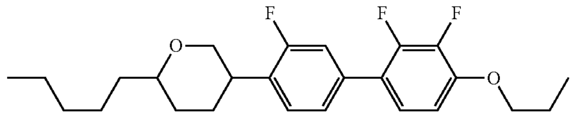
(1-4-82)
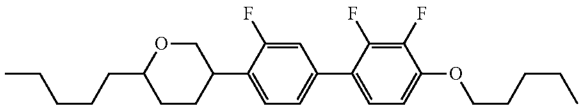
(1-4-83)
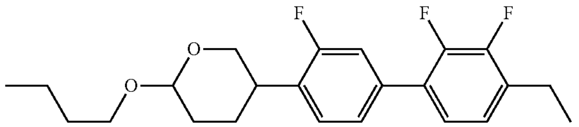
(1-4-84)
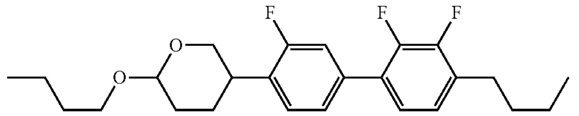
(1-4-85)
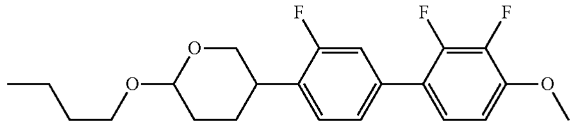
(1-4-86)
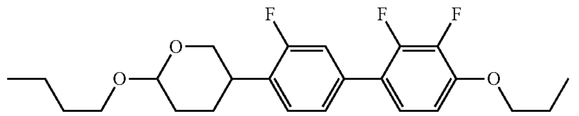
(1-4-87)
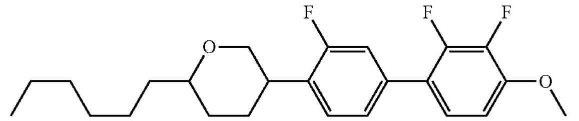
(1-4-88)
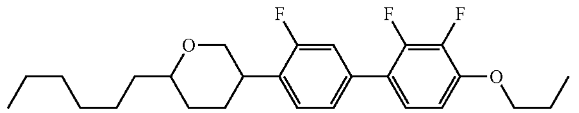
(1-4-89)
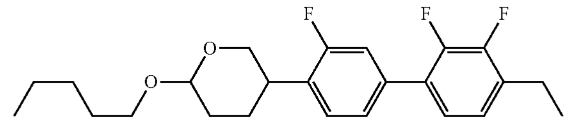
(1-4-90)
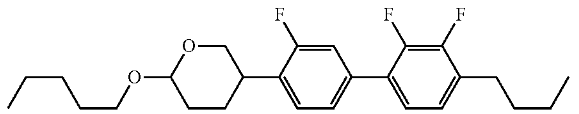
(1-4-91)
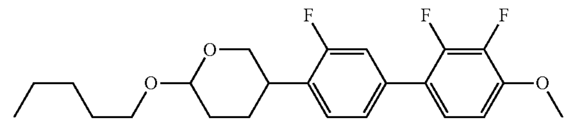
-continued
(1-4-92)
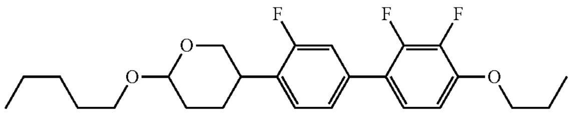
(1-4-93)
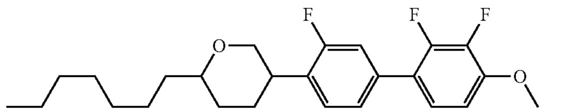
(1-4-94)
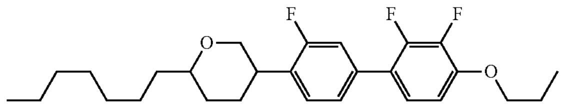
(1-4-95)
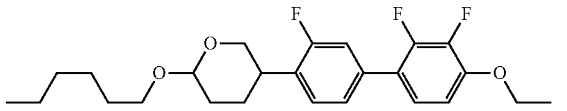
(1-4-96)
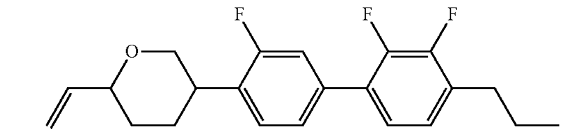
(1-4-97)
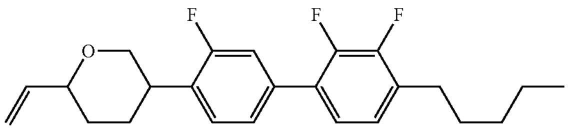
(1-4-98)
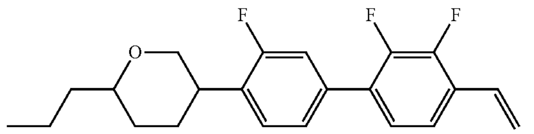
(1-4-99)
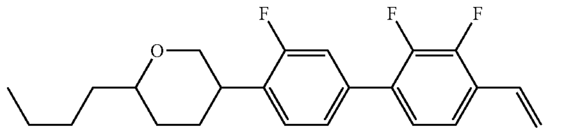
(1-4-100)
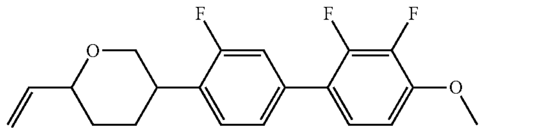
(1-4-101)
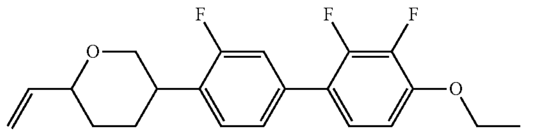

-continued
(1-4-102)
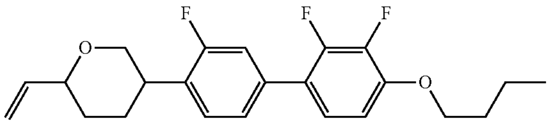
(1-4-103)
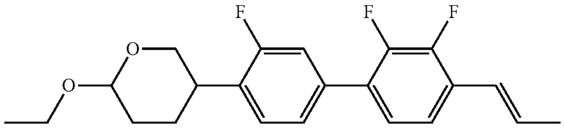
(1-4-104)
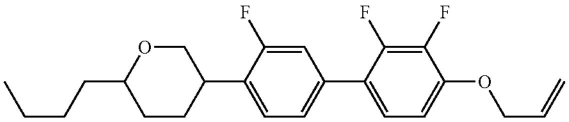
(1-4-105)
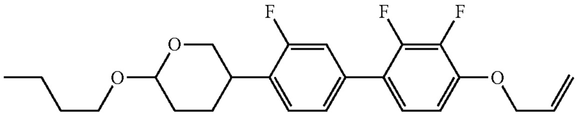
(1-4-106)
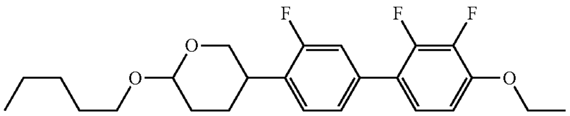
(1-4-107)
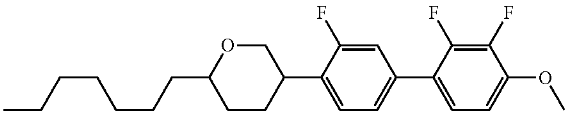
(1-4-108)
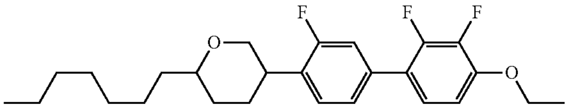
(1-4-109)
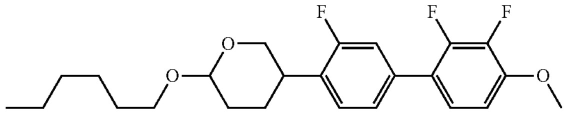
(1-4-110)
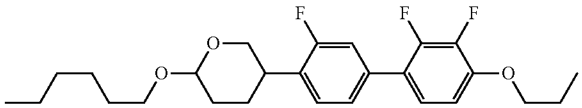
(1-4-111)
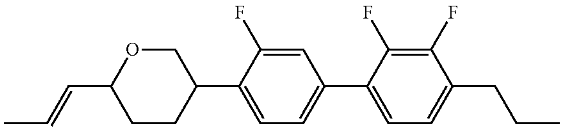
(1-4-112)
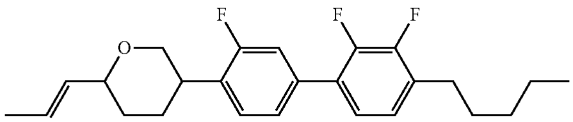
-continued
(1-4-113)
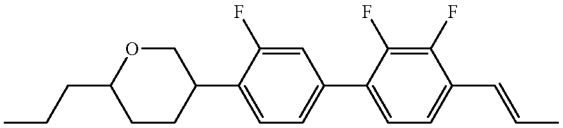
(1-4-114)
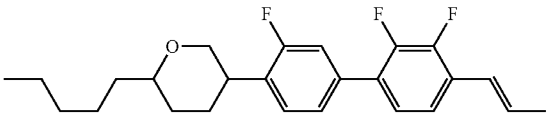
(1-4-115)
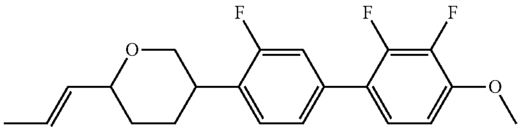
(1-4-116)
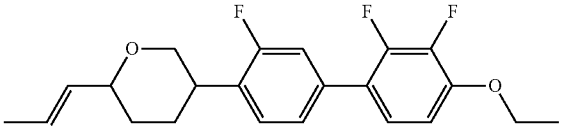
(1-4-117)
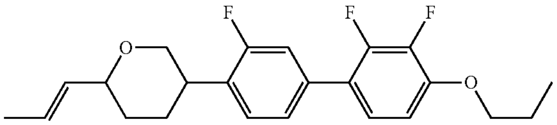
(1-4-118)
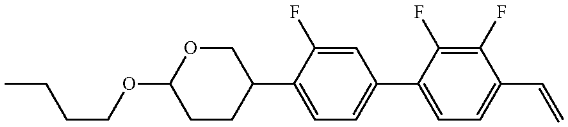
(1-4-119)
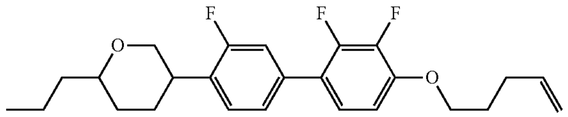
(1-4-120)
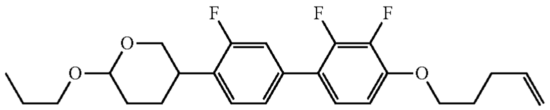
(1-4-121)
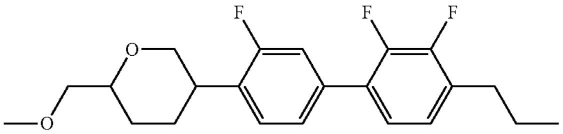
(1-4-122)
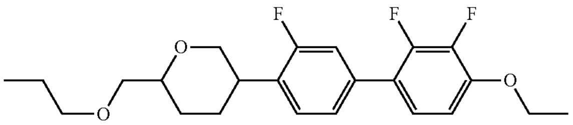

-continued
(1-4-123)
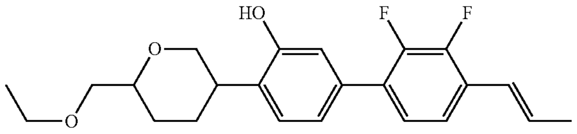
(1-4-124)
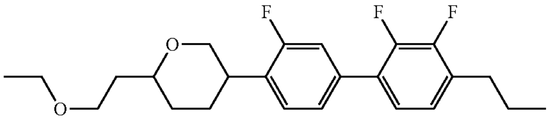
(1-4-125)
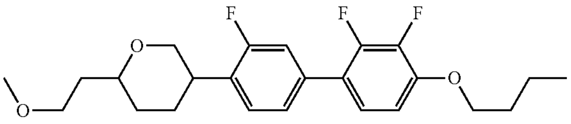
(1-4-126)
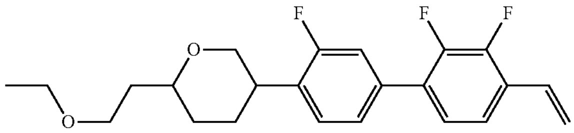
(1-4-127)
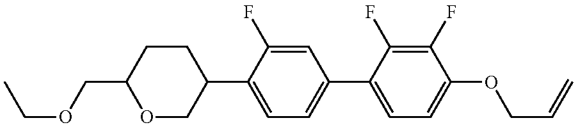
(1-4-128)
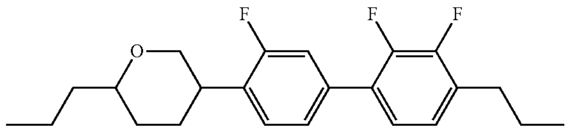
(1136)
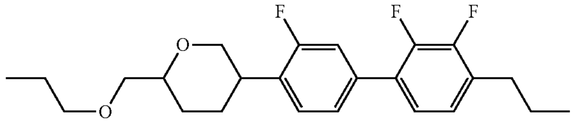
(1-4-137)
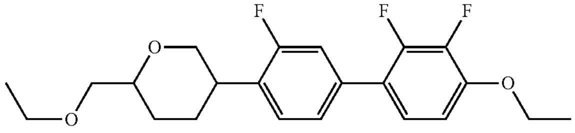
(1-4-138)
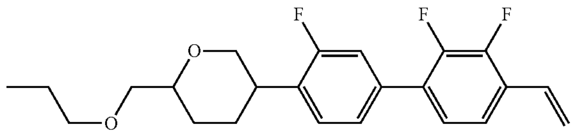
(1-4-139)
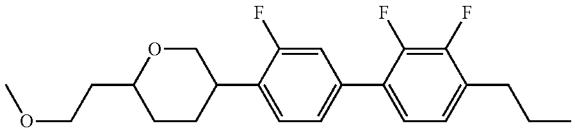
-continued
(1-4-140)
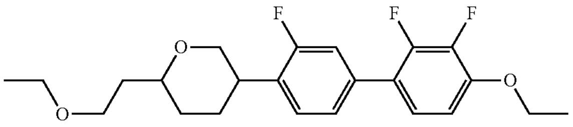
(1-4-141)
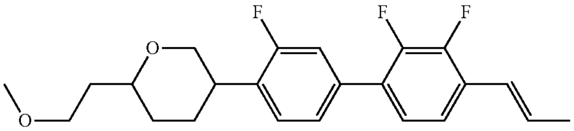
(1-4-142)
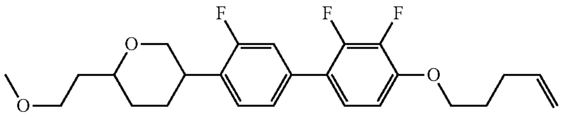
(1-4-143)
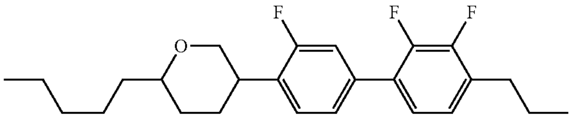
(1-5-1)
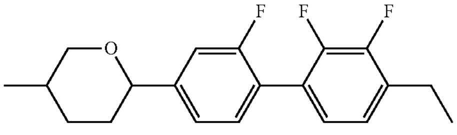
(1-5-2)
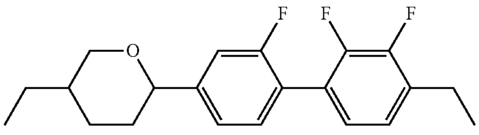
(1-5-3)
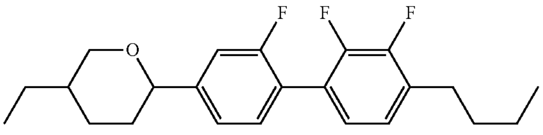
(1-5-4)
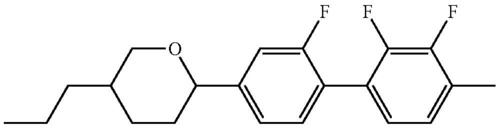
(1-5-5)
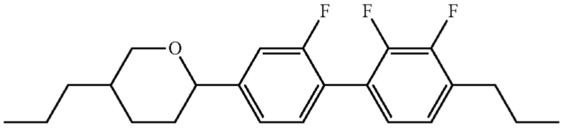
(1-5-6)
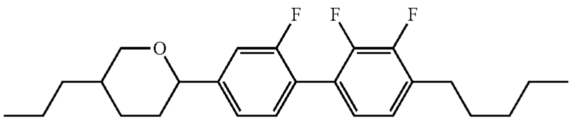

-continued
(1-5-7)
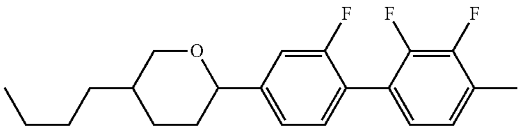
(1-5-8)
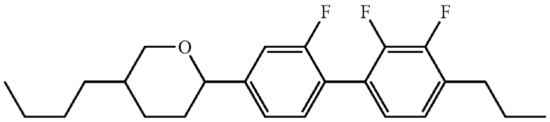
(1-5-9)
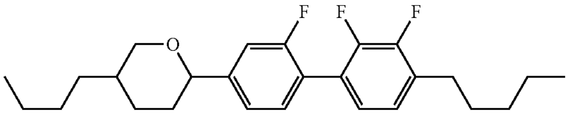
(1-5-10)
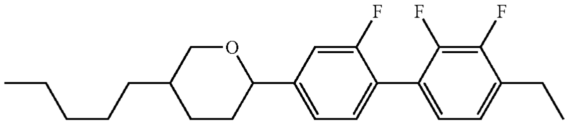
(1-5-11)
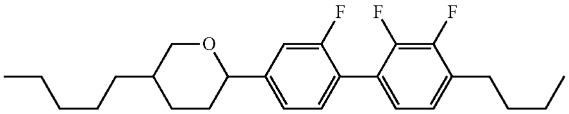
(1-5-12)
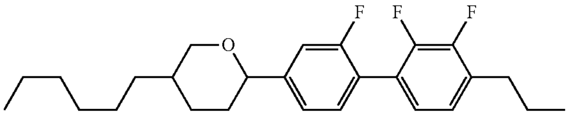
(1-5-13)
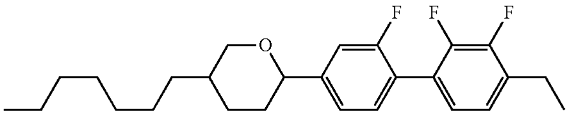
(1-5-14)
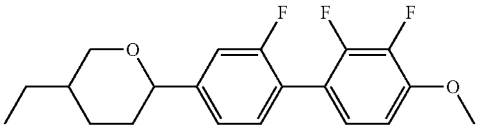
(1-5-15)
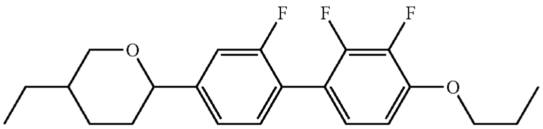
(1-5-16)
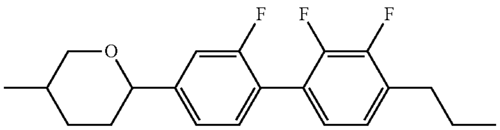
-continued
(1-5-17)
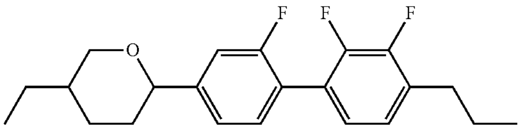
(1-5-18)
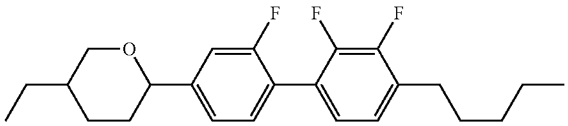
(1-5-19)
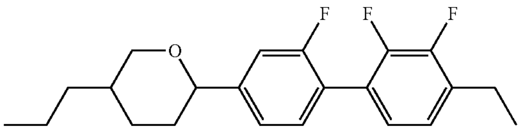
(1-5-20)
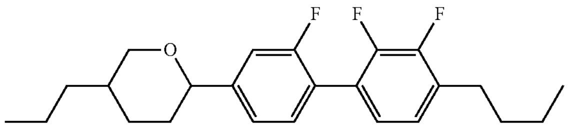
(1-5-21)
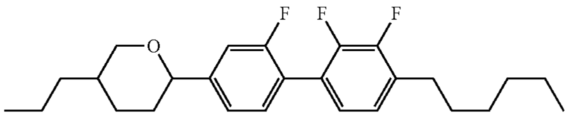
(1-5-22)
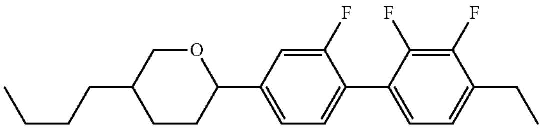
(1-5-23)
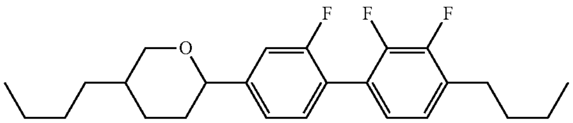
(1-5-24)
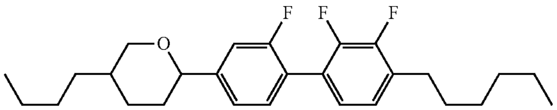
(1-5-25)
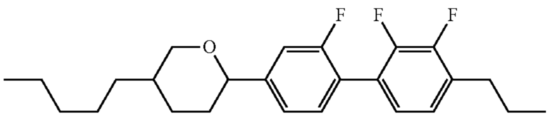
(1-5-26)
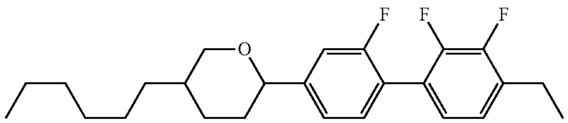

-continued
(1-5-27)
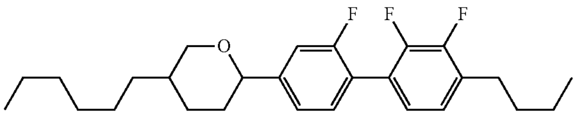
(1-5-28)
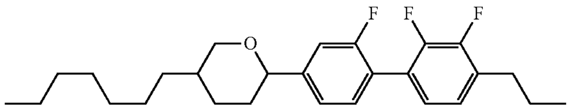
(1-5-29)
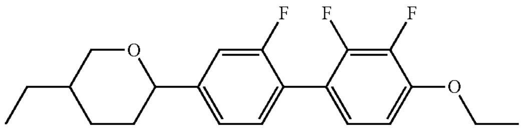
(1-5-30)
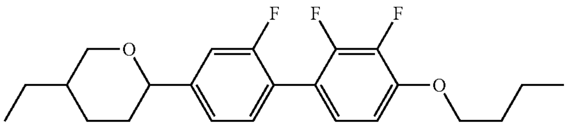
(1-5-31)
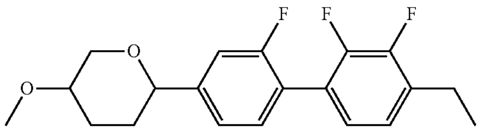
(1-5-32)
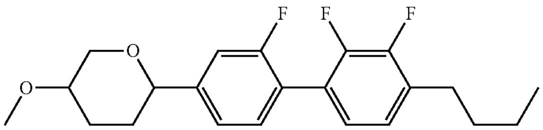
(1-5-33)
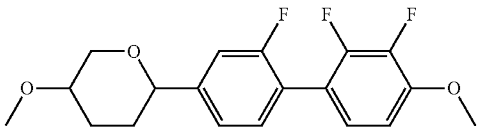
(1-5-34)
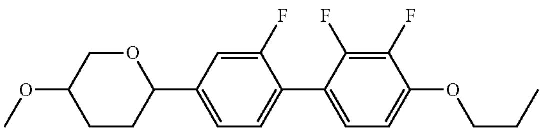
(1-5-35)
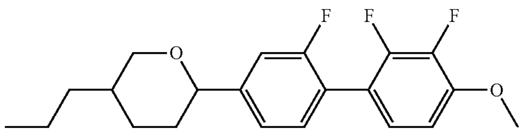
(1-5-36)
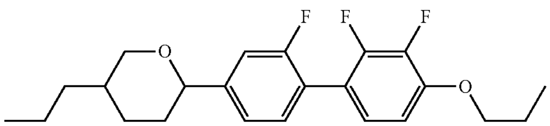
-continued
(1-5-37)
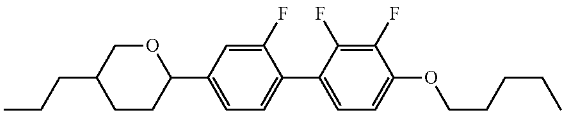
(1-5-38)
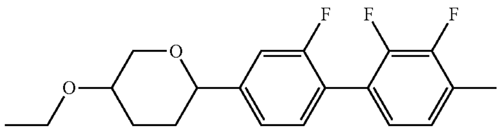
(1-5-39)
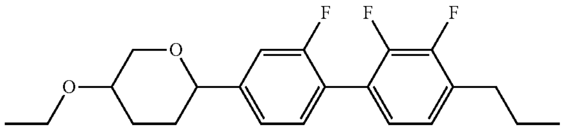
(1-5-40)
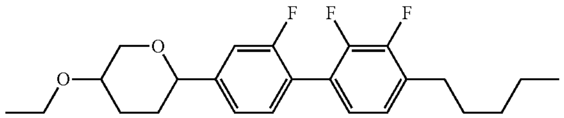
(1-5-41)
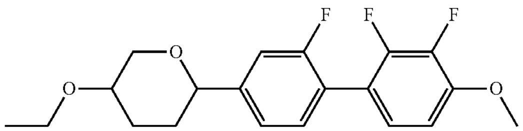
(1-5-42)
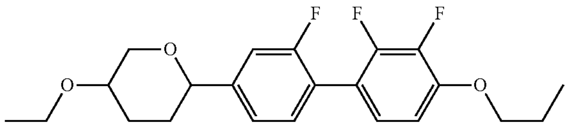
(1-5-43)
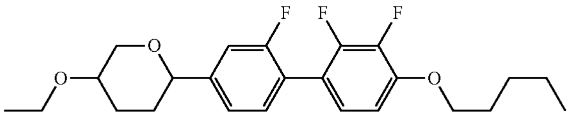
(1-5-44)
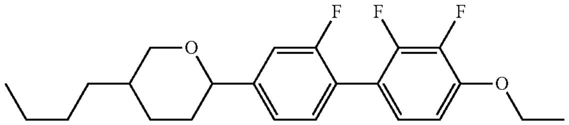
(1-5-45)
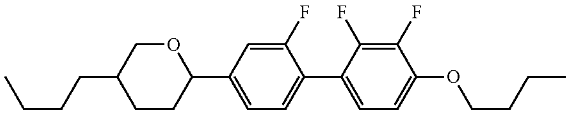
(1-5-46)
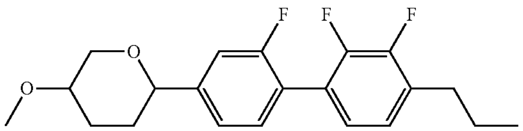

-continued
(1-5-47)
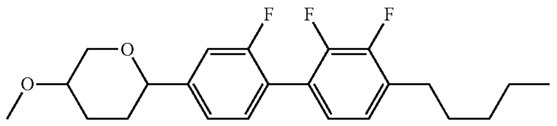
(1-5-48)
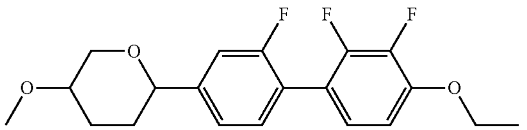
(1-5-49)
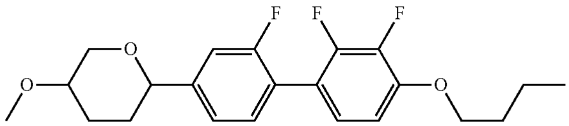
(1-5-50)
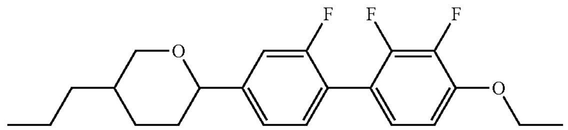
C 96.4 N 112.2 I
$T_{NI}$ = 108.3° C., $\Delta_\varepsilon$ = -6.5, $\Delta n$ = 0.167
(1-5-51)
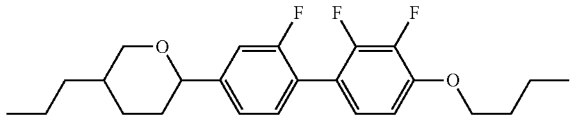
(1-5-52)
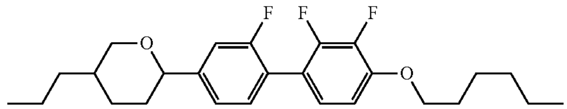
(1-5-53)
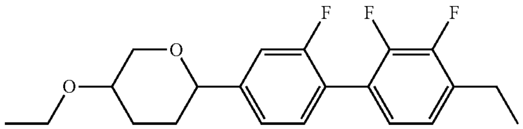
(1-5-54)
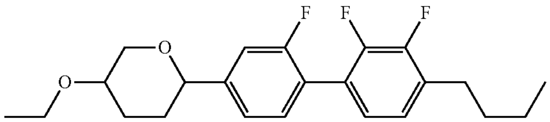
(1-5-55)
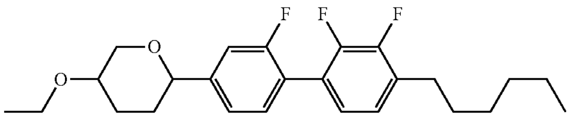
(1-5-56)
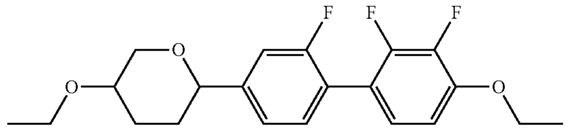
-continued
(1-5-57)
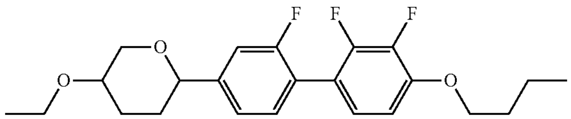
(1-5-58)
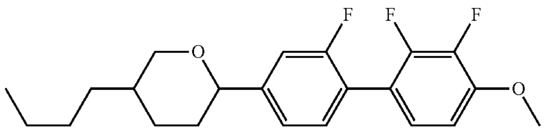
(1-5-59)
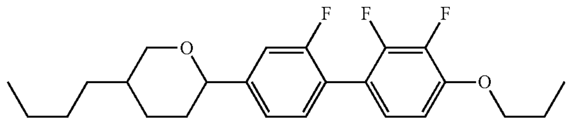
(1-5-60)
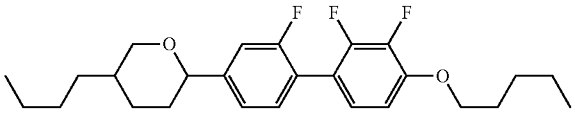
(1-5-61)
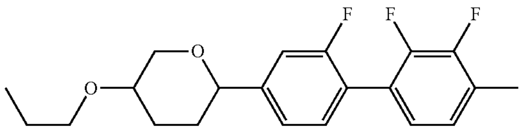
(1-5-62)
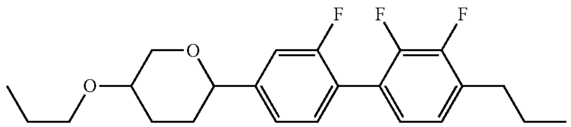
(1-5-63)
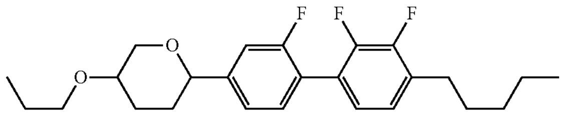
(1-5-64)
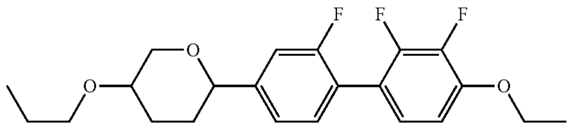
(1-5-65)
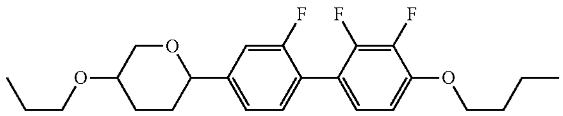
(1-5-66)
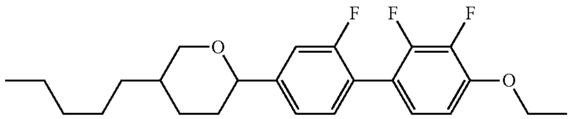

-continued
(1-5-67)
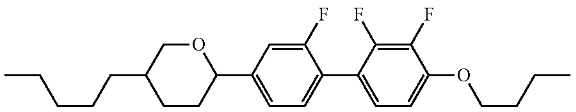
(1-5-68)
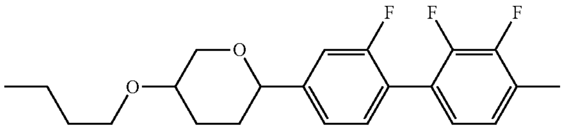
(1-5-69)
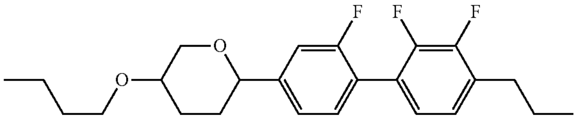
(1-5-70)
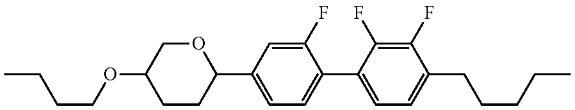
(1-5-71)
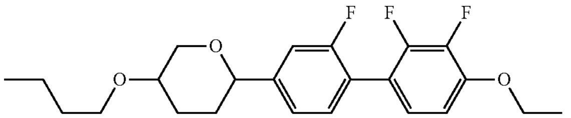
(1-5-72)
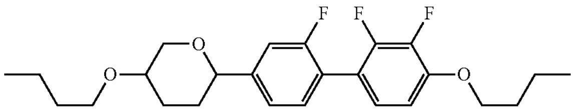
(1-5-73)
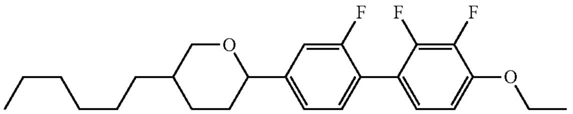
(1-5-74)
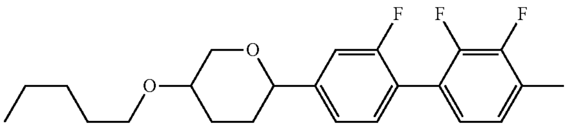
(1-5-75)
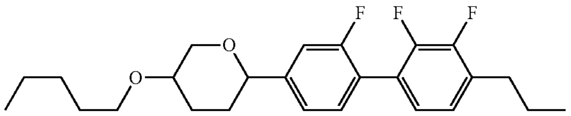
(1-5-76)
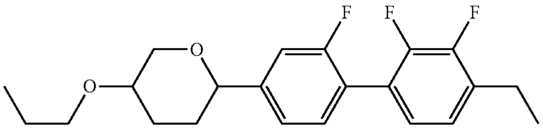
(1-5-77)
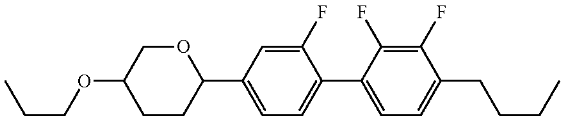
-continued
(1-5-78)
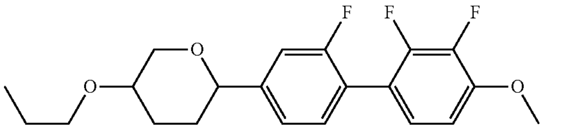
(1-5-79)
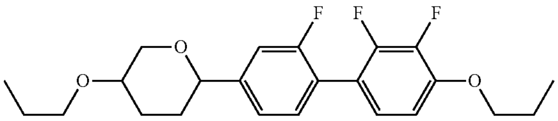
(1-5-80)
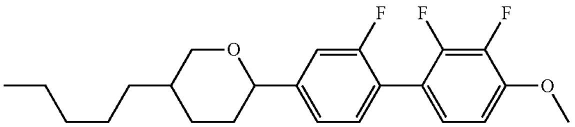
(1-5-81)
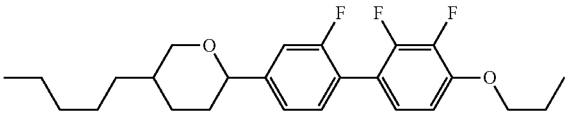
(1-5-82)
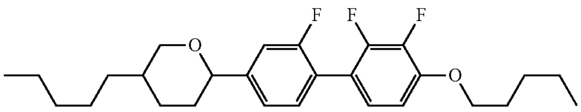
(1-5-83)
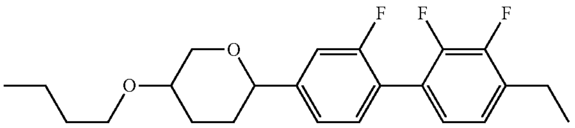
(1-5-84)
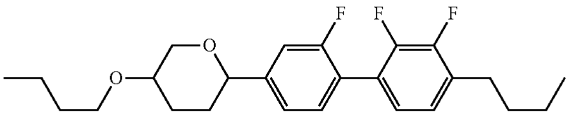
(1-5-85)
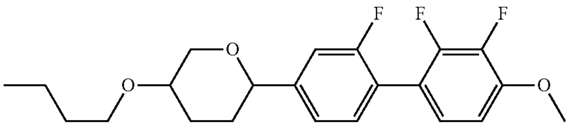
(1-5-86)
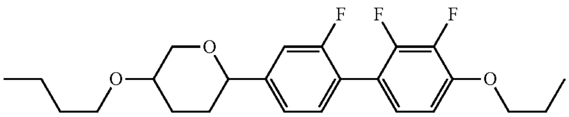
(1-5-87)
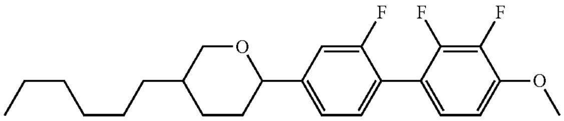

-continued
(1-5-88)
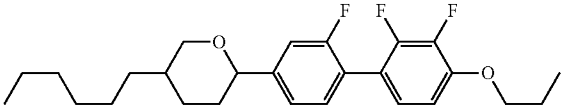
(1-5-89)
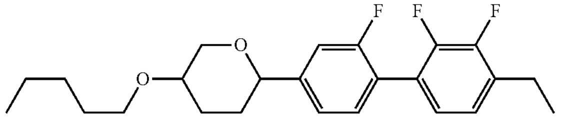
(1-5-90)
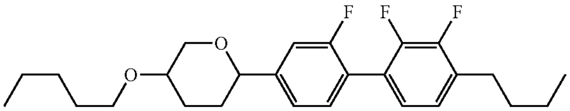
(1-5-91)
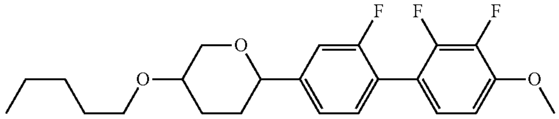
(1-5-92)
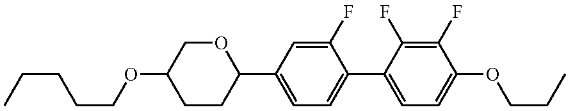
(1-5-93)
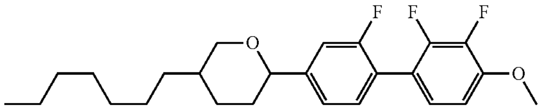
(1-5-94)
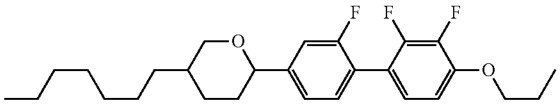
(1-5-95)
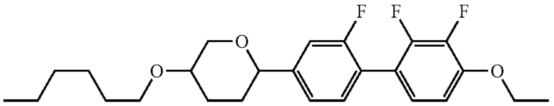
(1-5-96)
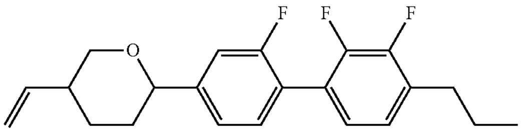
(1-5-97)
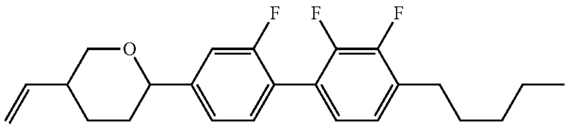
(1-5-98)
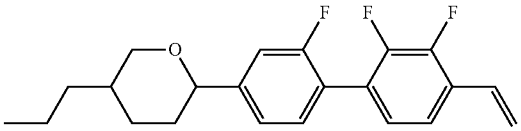
-continued
(1-5-99)
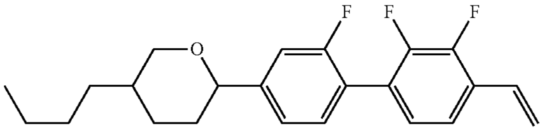
(1-5-100)
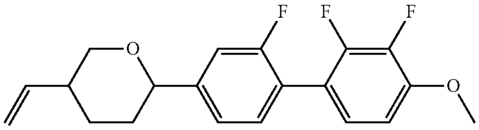
(1-5-101)
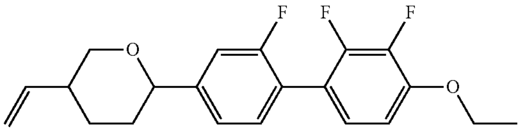
(1-5-102)
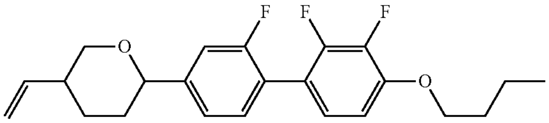
(1-5-103)
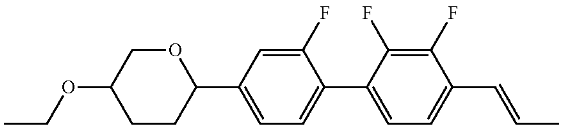
(1-5-104)
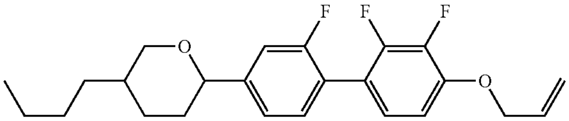
(1-5-105)
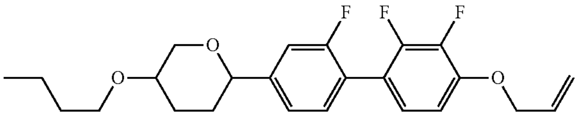
(1-5-106)
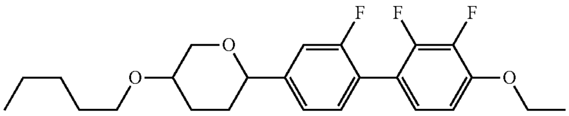
(1-5-107)
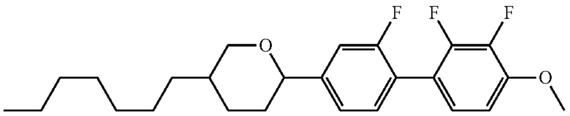
(1-5-108)
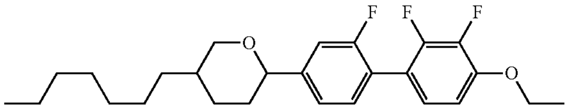

-continued
(1-5-109)
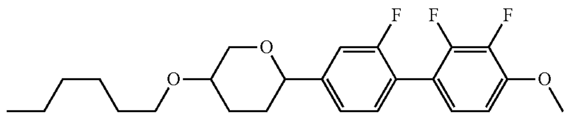
(1-5-110)
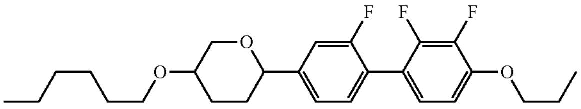
(1-5-111)
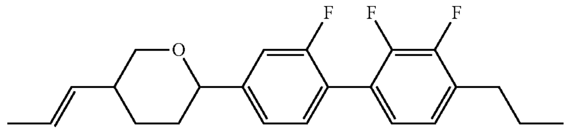
(1-5-112)
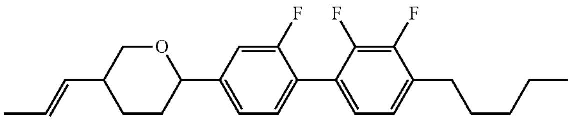
(1-5-113)
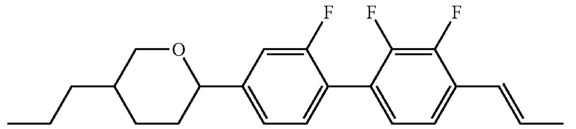
(1-5-114)
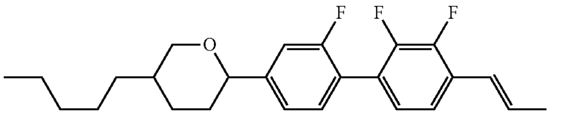
(1-5-115)
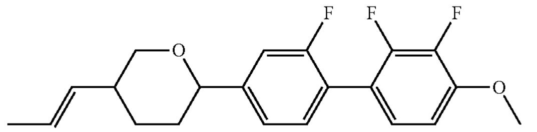
(1-5-116)
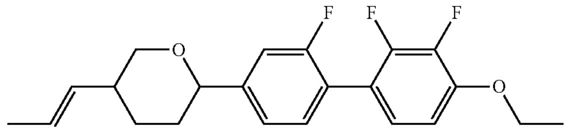
(1-5-117)
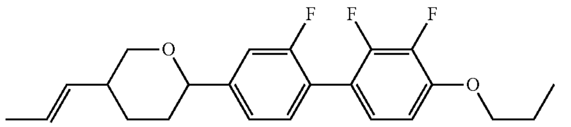
(1-5-118)
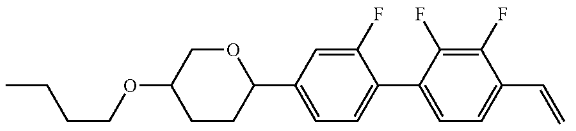
-continued
(1-5-119)
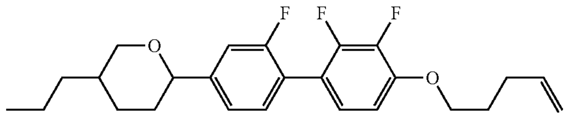
(1-5-120)
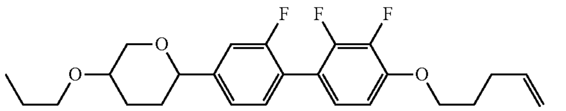
(1-5-121)
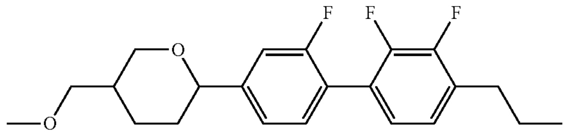
(1-5-122)
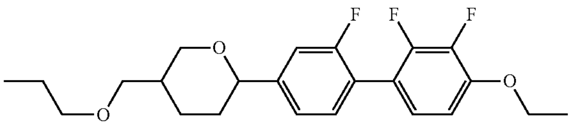
(1-5-123)
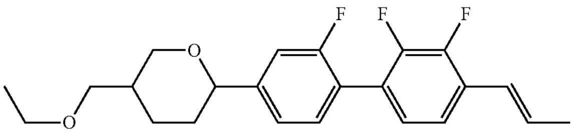
(1-5-124)
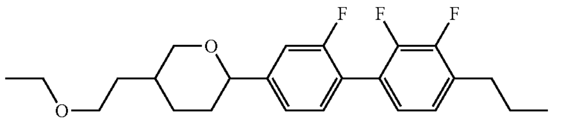
(1-5-125)
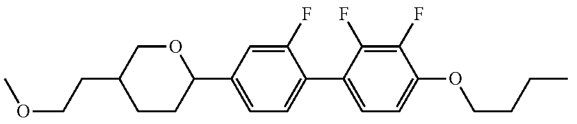
(1-5-126)
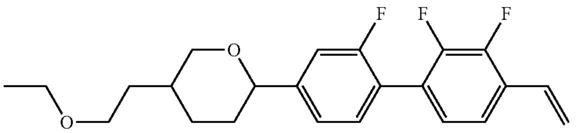
(1-5-127)
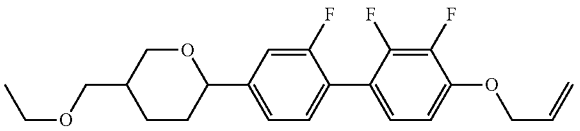
(1-5-128)
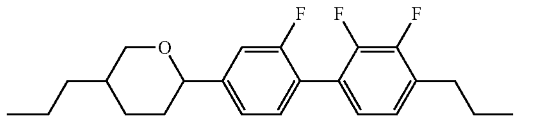

-continued
(1-5-136)
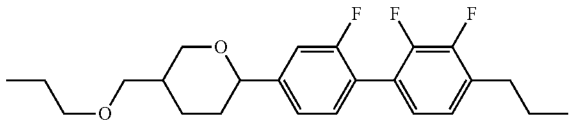
(1-5-137)
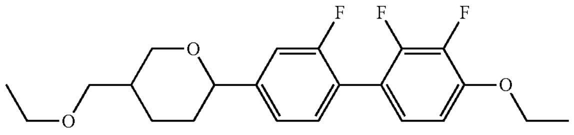
(1-5-138)
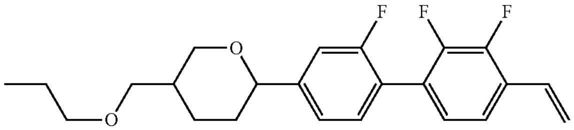
(1-5-139)
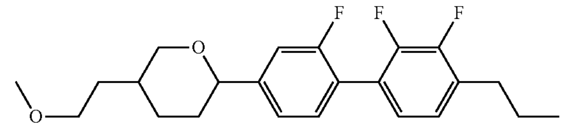
(1-5-140)
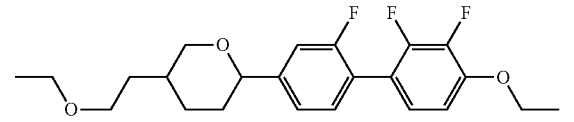
(1-5-141)
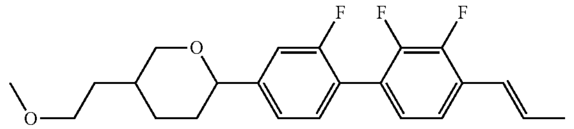
(1-5-142)
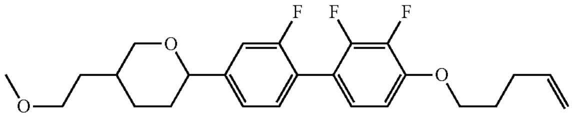
(1-5-143)
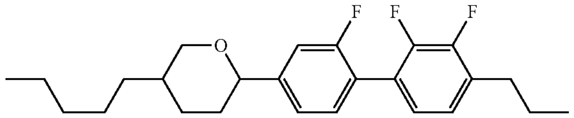
(1-6-1)
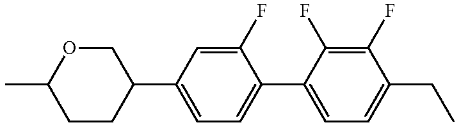
(1-6-2)
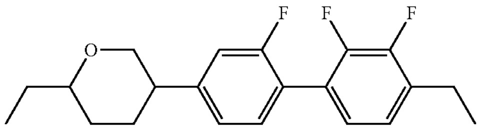
-continued
(1-6-3)
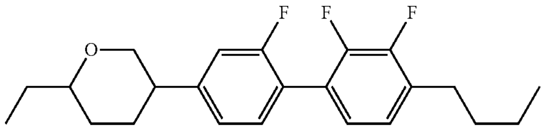
(1-6-4)
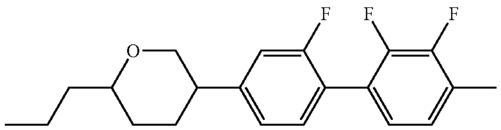
(1-6-5)
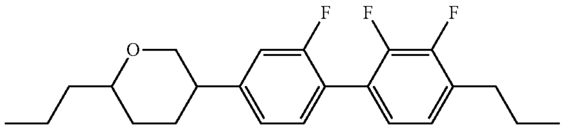
(1-6-6)
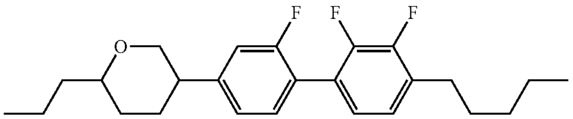
(1-6-7)
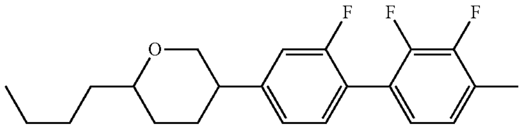
(1-6-8)
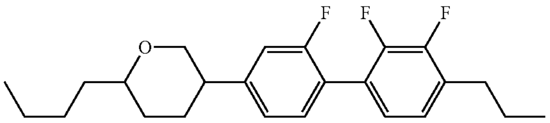
(1-6-9)
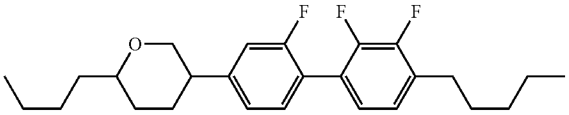
(1-6-10)
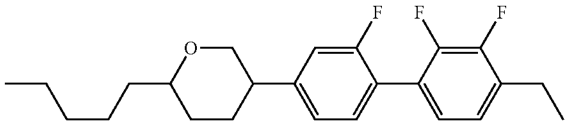
(1-6-11)
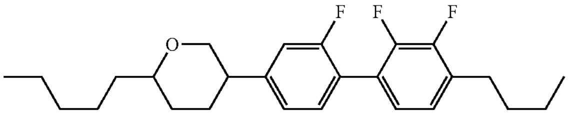
(1-6-12)
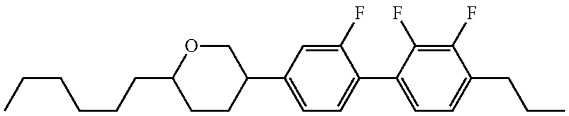

-continued
(1-6-13)
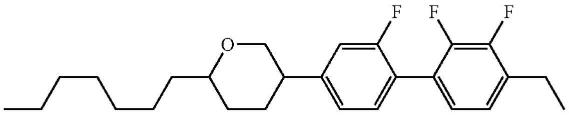
(1-6-14)
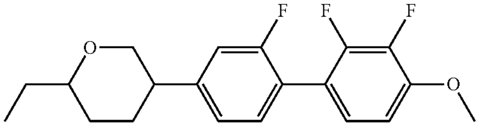
(1-6-15)
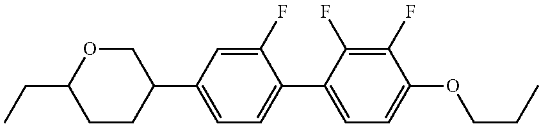
(1-6-16)
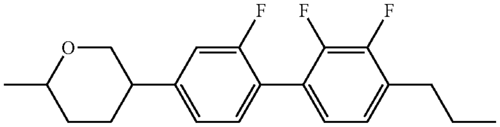
(1-6-17)
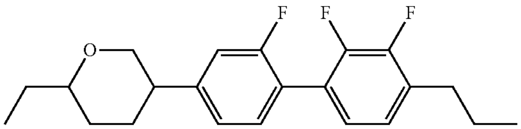
(1-6-18)
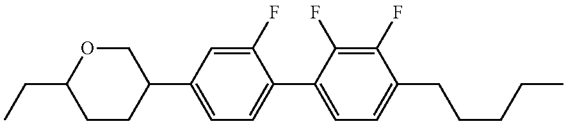
(1-6-19)
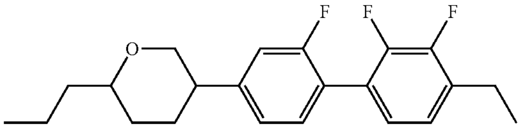
(1-6-20)
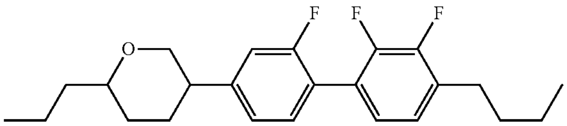
(1-6-21)
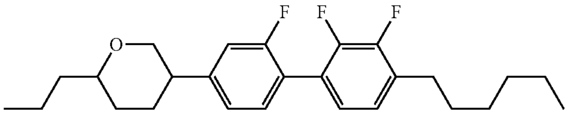
(1-6-22)
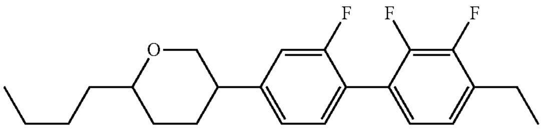
-continued
(1-6-23)
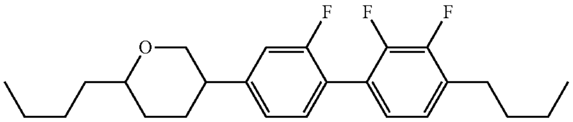
(1-6-24)
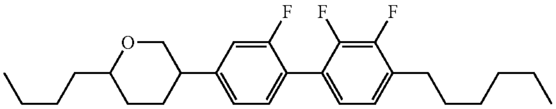
(1-6-25)
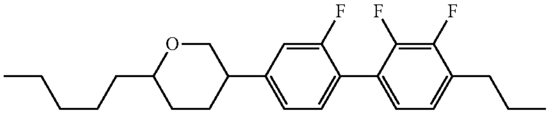
(1-6-26)
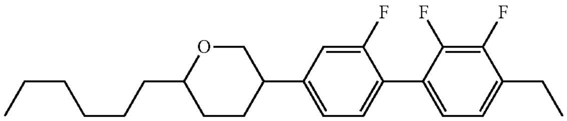
(1-6-27)
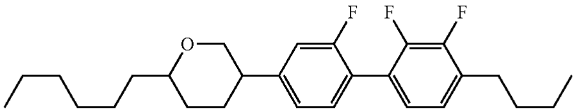
(1-6-28)
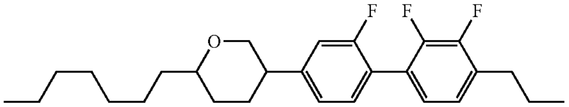
(1-6-29)
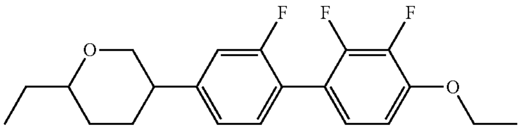
(1-6-30)
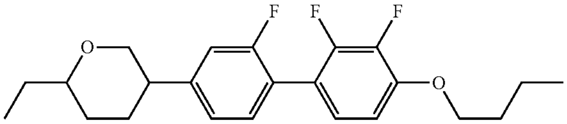
(1-6-31)
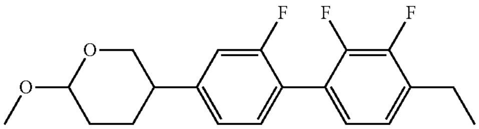
(1-6-32)
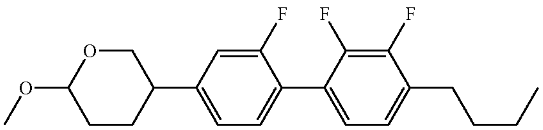

-continued
(1-6-33)
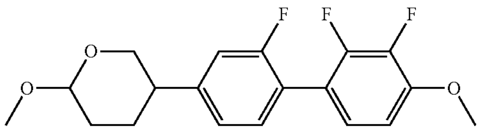
(1-6-34)
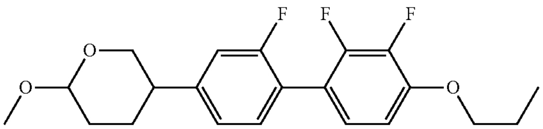
(1-6-35)
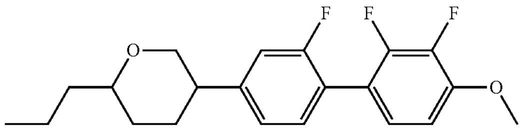
(1-6-36)
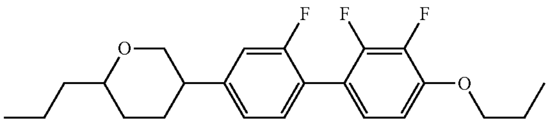
(1-6-37)
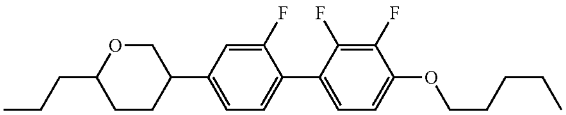
(1-6-38)
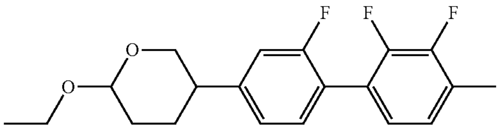
(1-6-39)
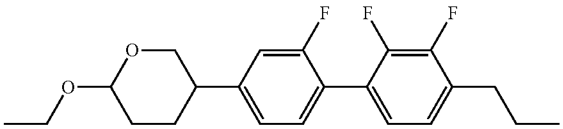
(1-6-40)
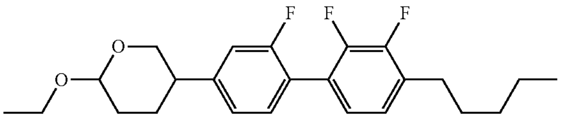
(1-6-41)
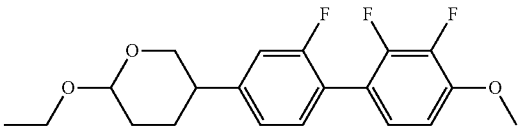
(1-6-42)
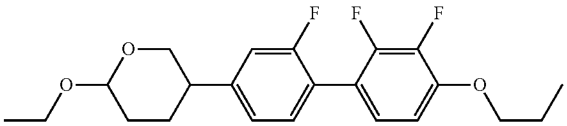
-continued
(1-6-43)
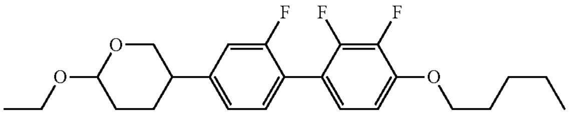
(1-6-44)
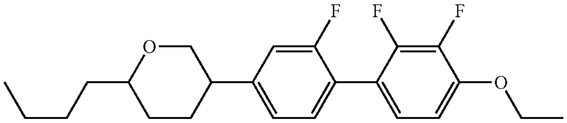
(1-6-45)
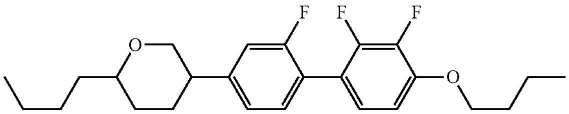
(1-6-46)
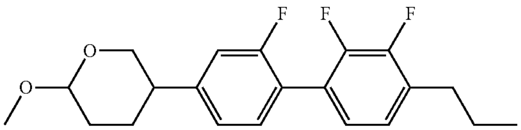
(1-6-47)
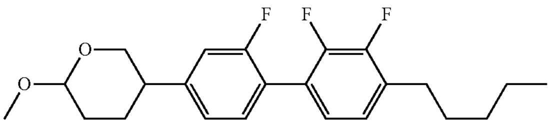
(1-6-48)
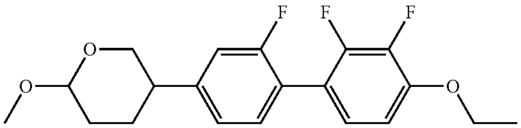
(1-6-49)
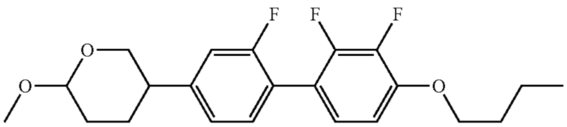
(1-6-50)
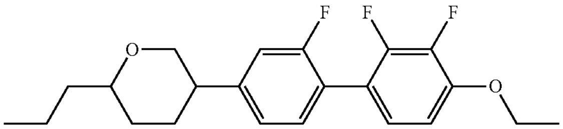
↑ C 78.3 N 84.1 I
$T_{NI}$ = 84.3° C., $\Delta_\varepsilon$ = -7.18, $\Delta n$ = 0.160
(1-6-51)
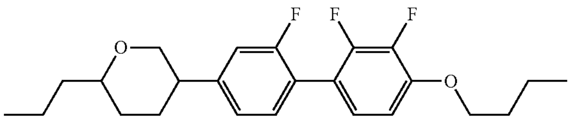
(1-6-52)
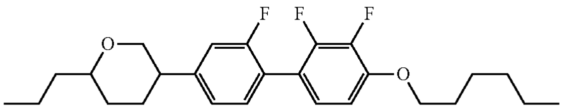

-continued
(1-6-53)
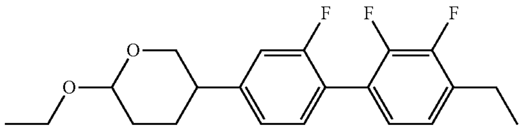
(1-6-54)
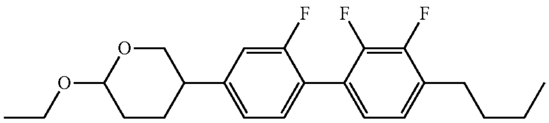
(1-6-55)
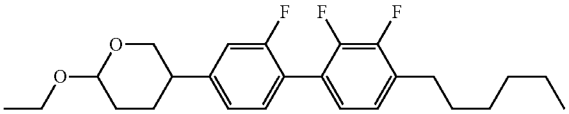
(1-6-56)
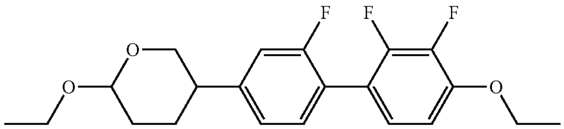
(1-6-57)
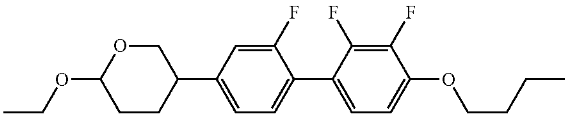
(1-6-58)
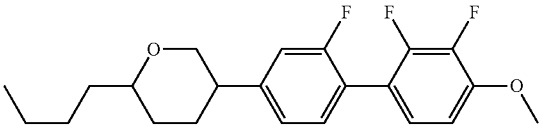
(1-6-59)
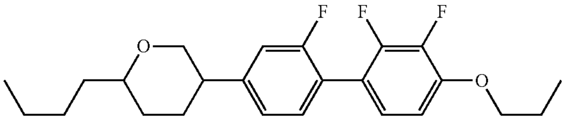
(1-6-60)
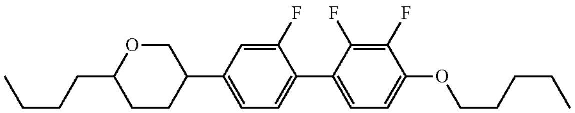
(1-6-61)
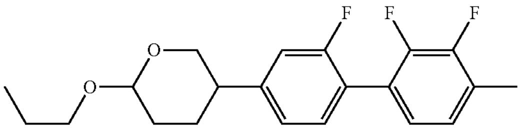
(1-6-62)
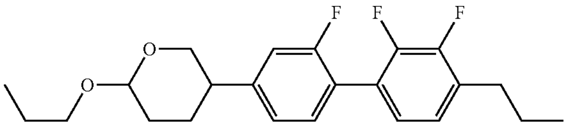
-continued
(1-6-63)
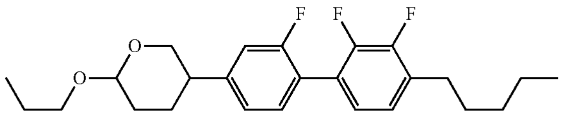
(1-6-64)
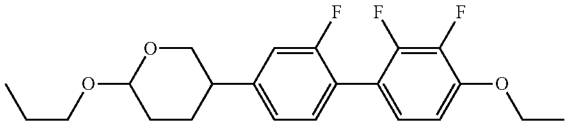
(1-6-65)
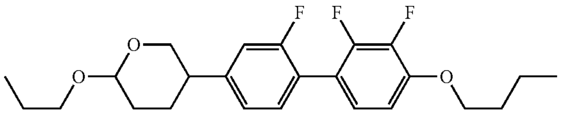
(1-6-66)
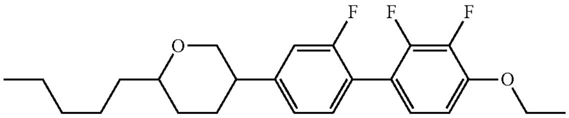
(1-6-67)
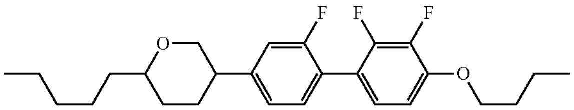
(1-6-68)
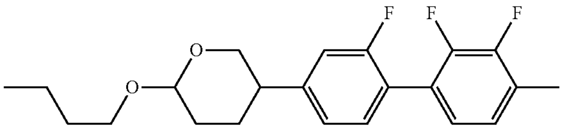
(1-6-69)
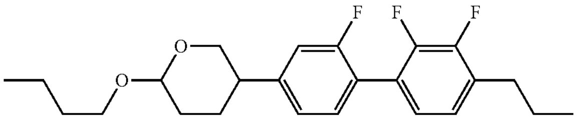
(1-6-70)
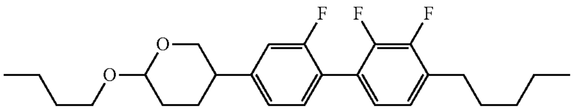
(1-6-71)
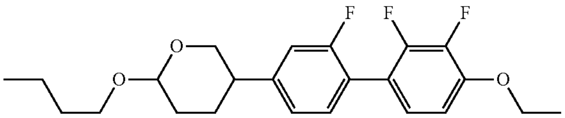
(1-6-72)
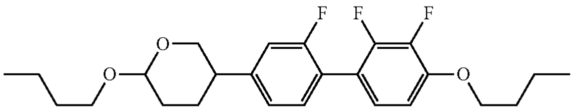
(1-6-73)
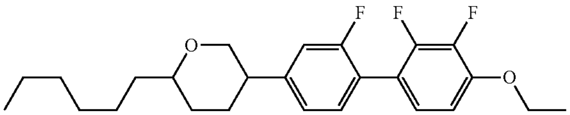

-continued
(1-6-74)
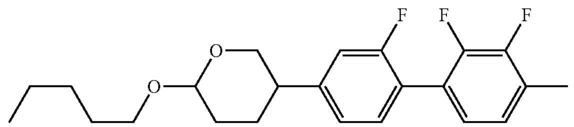
(1-6-75)
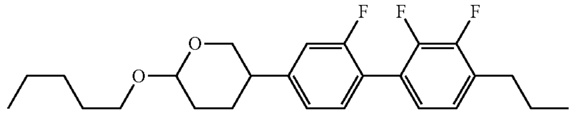
(1-6-76)
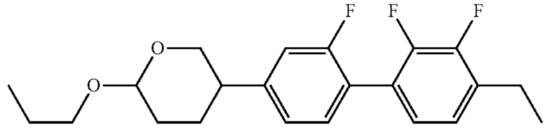
(1-6-77)
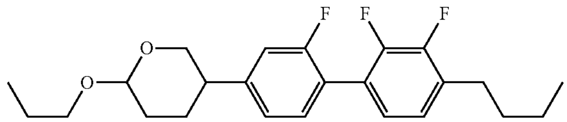
(1-6-78)
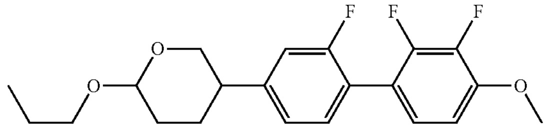
(1-6-79)
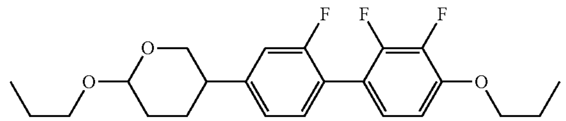
(1-6-80)
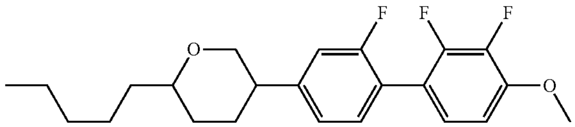
(1-6-81)
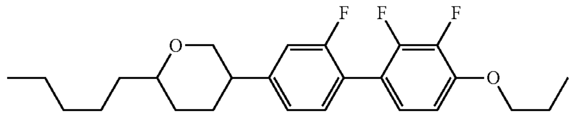
(1-6-82)
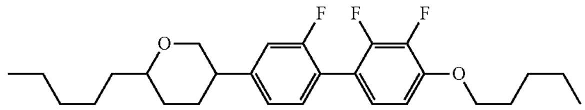
(1-6-83)
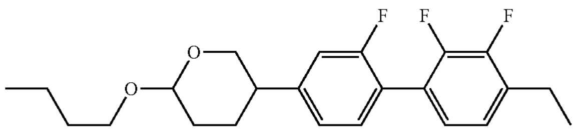
-continued
(1-6-84)
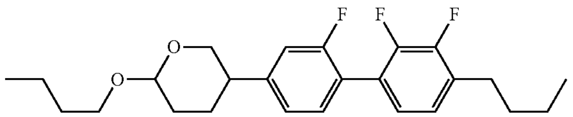
(1-6-85)
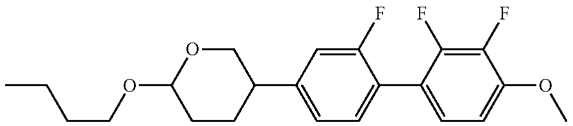
(1-6-86)
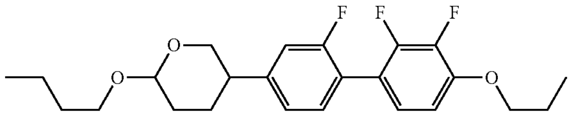
(1-6-87)
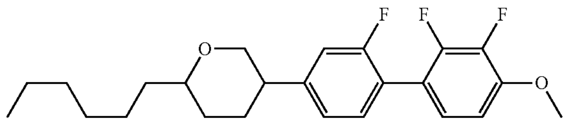
(1-6-88)
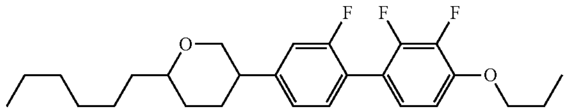
(1-6-89)
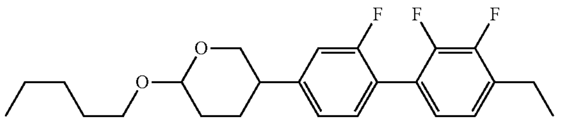
(1-6-90)
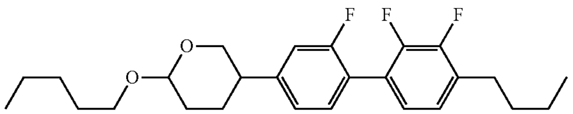
(1-6-91)
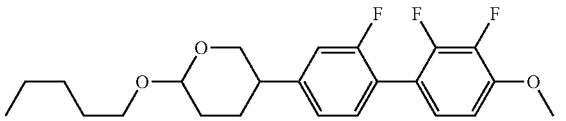
(1-6-92)
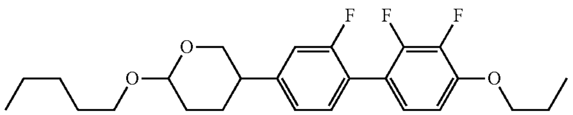
(1-6-93)
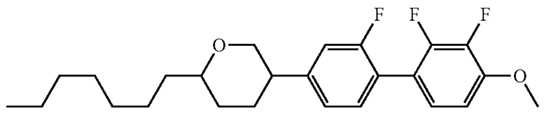
(1-6-94)
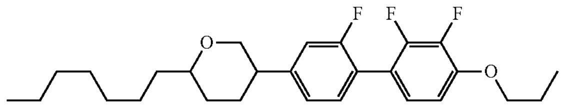

-continued
(1-6-95)
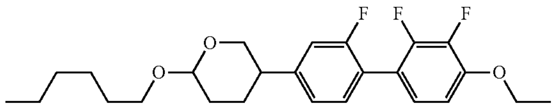
(1-6-96)
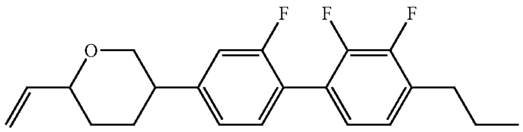
(1-6-97)
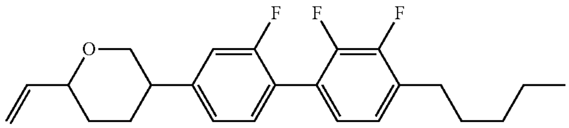
(1-6-98)
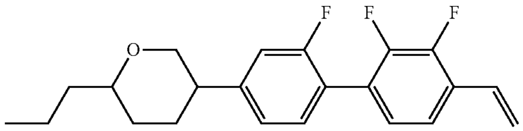
(1-6-99)
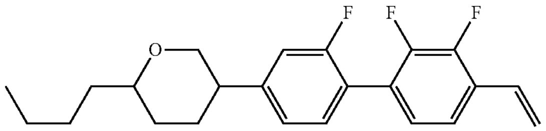
(1-6-100)
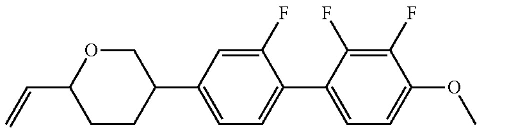
(1-6-101)
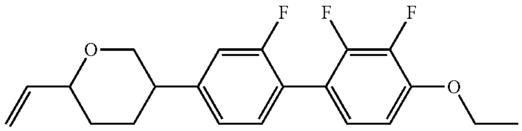
(1-6-102)
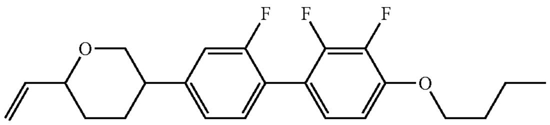
(1-6-103)
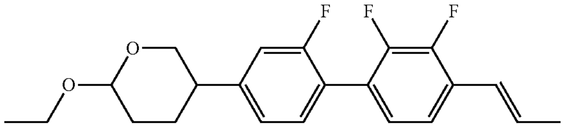
(1-6-104)
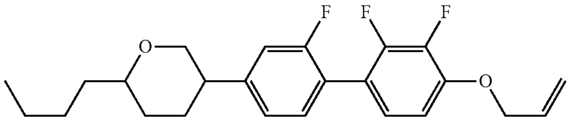
-continued
(1-6-105)
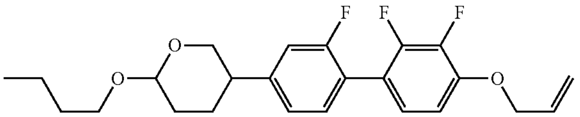
(1-6-106)
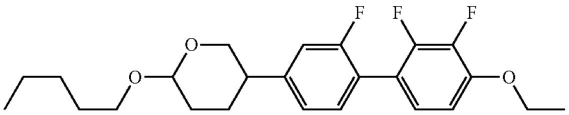
(1-6-107)
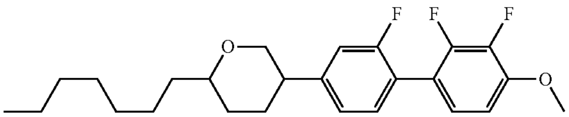
(1-6-108)
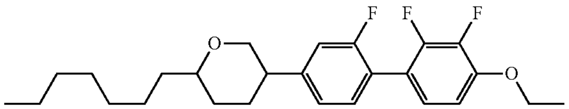
(1-6-109)
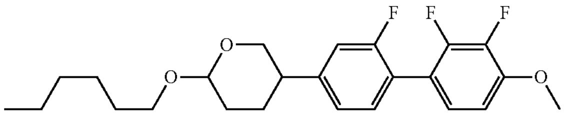
(1-6-110)
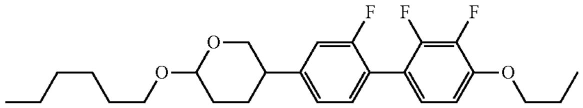
(1-6-111)
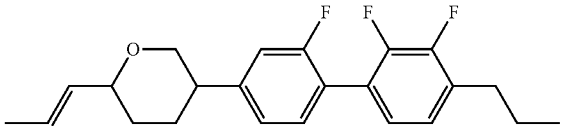
(1-6-112)
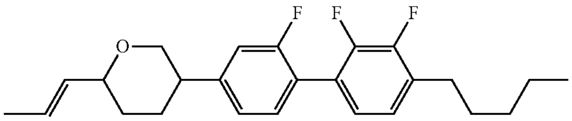
(1-6-113)
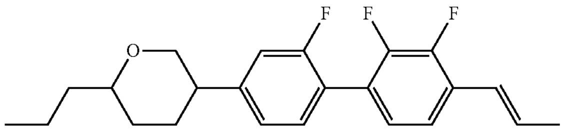
(1-6-114)
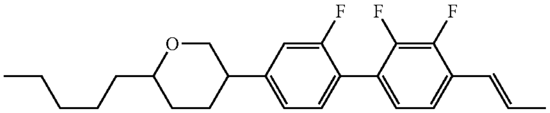
(1-6-115)
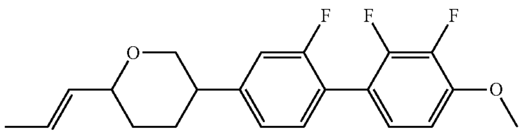

-continued
(1-6-116)
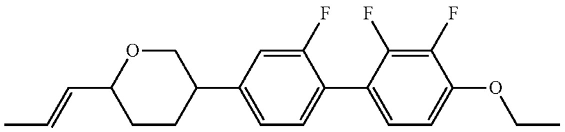
(1-6-117)
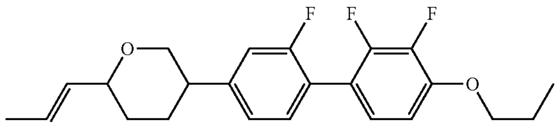
(1-6-118)
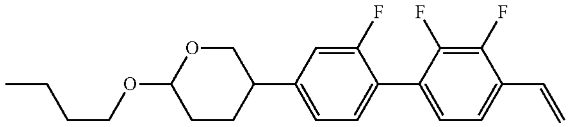
(1-6-119)
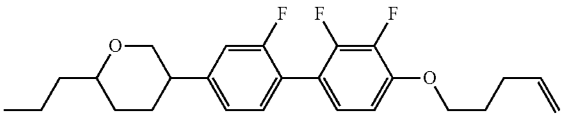
(1-6-120)
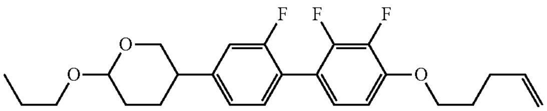
(1-6-121)
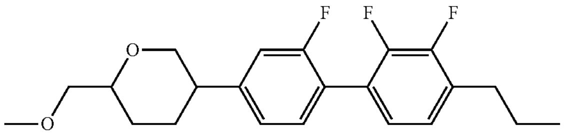
(1-6-122)
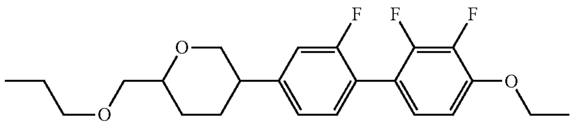
(1-6-123)
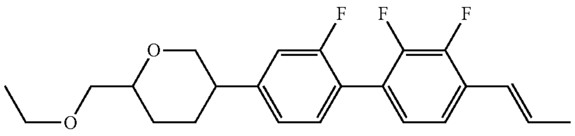
(1-6-124)
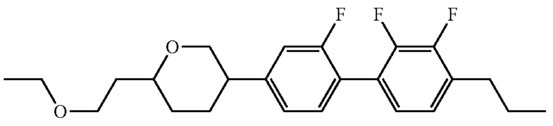
(1-6-125)
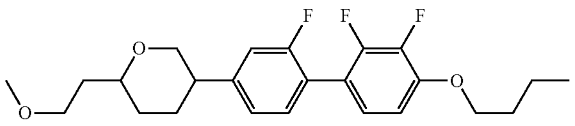
-continued
(1-6-126)
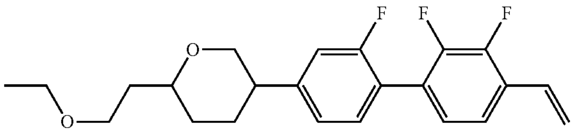
(1-6-127)
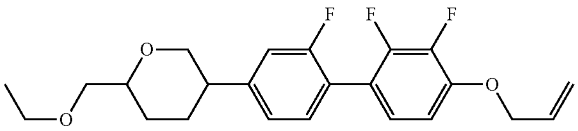
(1-6-128)
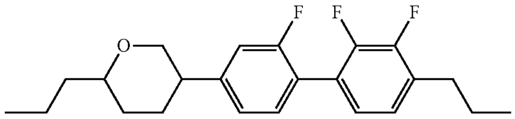
(1-6-136)
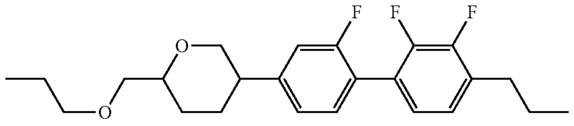
(1-6-137)
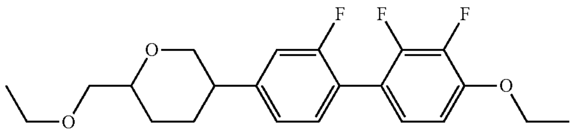
(1-6-138)
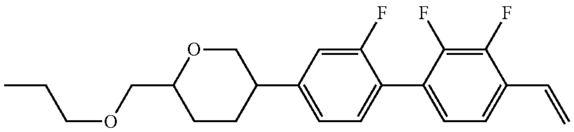
(1-6-139)
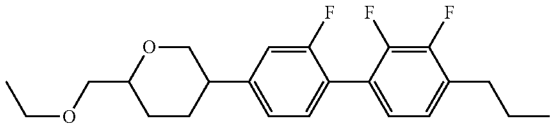
(1-6-140)
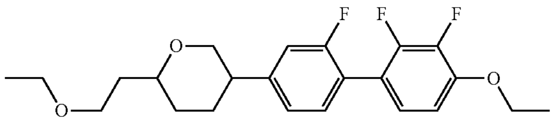
(1-6-141)
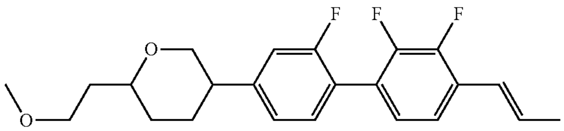
(1-6-142)
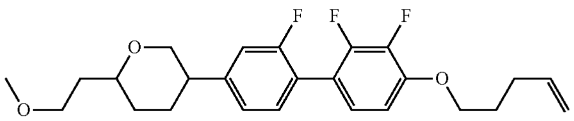

-continued
(1-6-143)
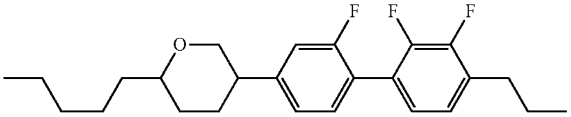
(1-7-1)
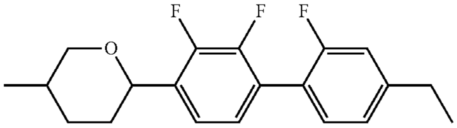
(1-7-2)
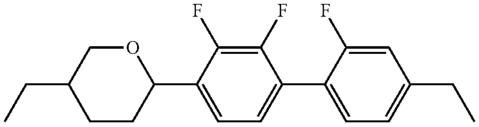
(1-7-3)
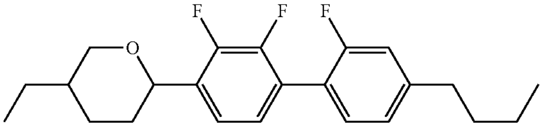
(1-7-4)
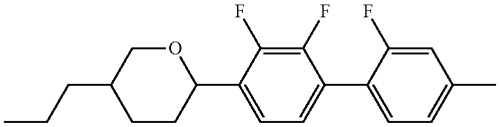
(1-7-5)
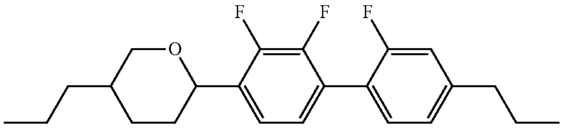
(1-7-6)
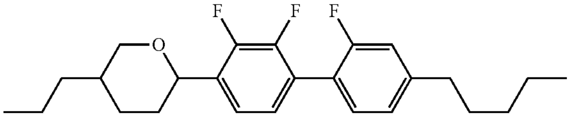
(1-7-7)
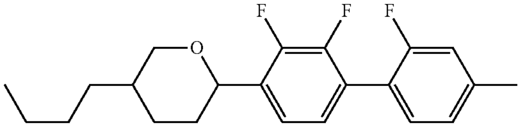
(1-7-8)
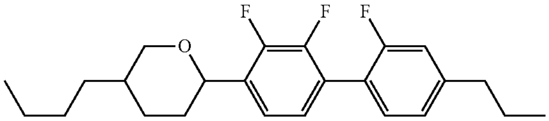
(1-7-9)
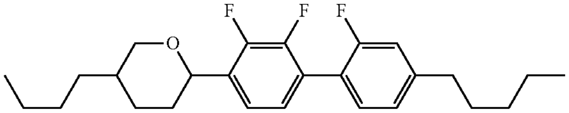
-continued
(1-7-10)
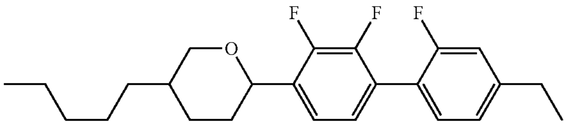
(1-7-11)
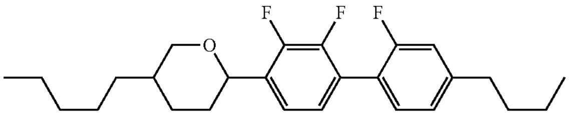
(1-7-12)
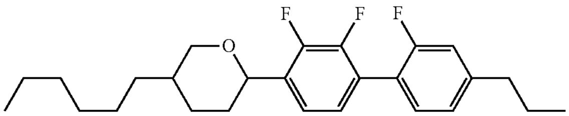
(1-7-13)
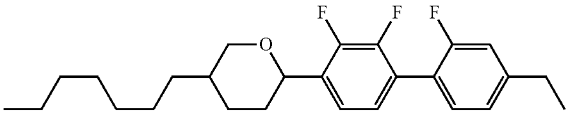
(1-7-14)
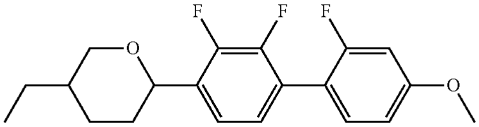
(1-7-15)
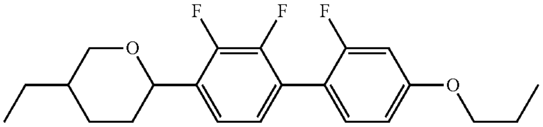
(1-7-16)
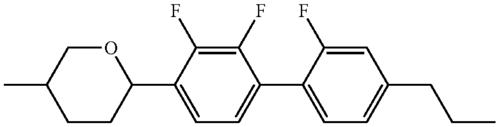
(1-7-17)
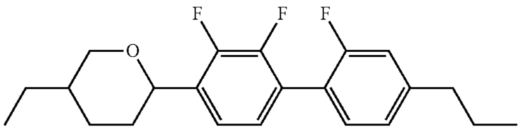
(1-7-18)
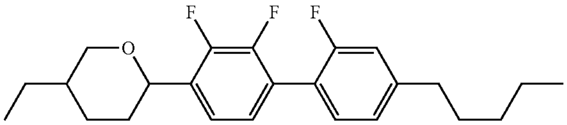
(1-7-19)
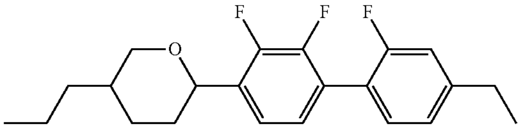

-continued
(1-7-20)
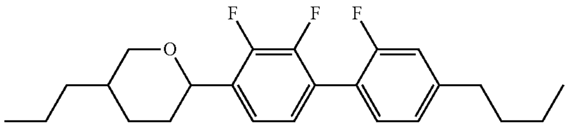
(1-7-21)
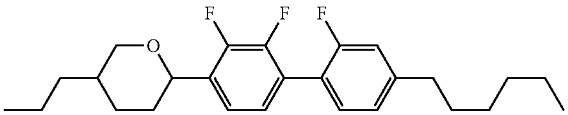
(1-7-22)
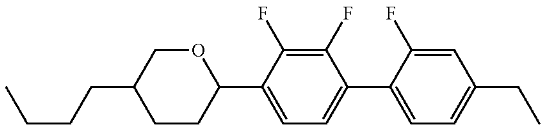
(1-7-23)
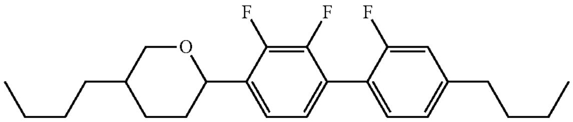
(1-7-24)
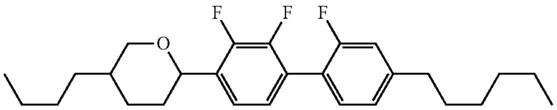
(1-7-25)
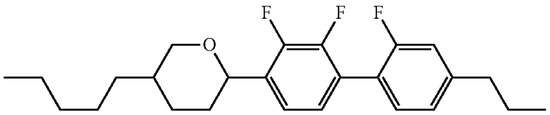
(1-7-26)
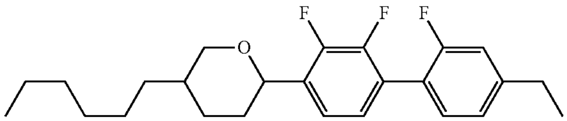
(1-7-27)
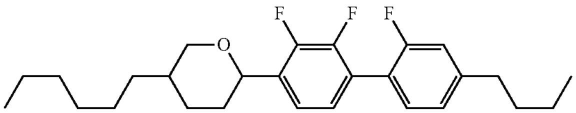
(1-7-28)
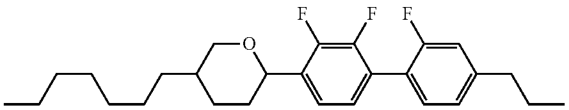
(1-7-29)
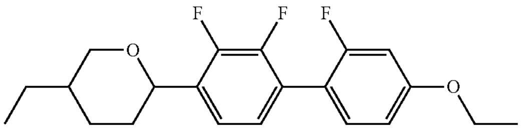
-continued
(1-7-30)
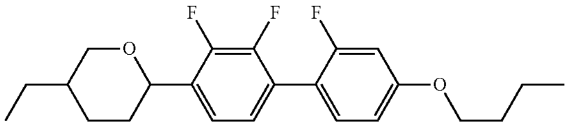
(1-7-31)
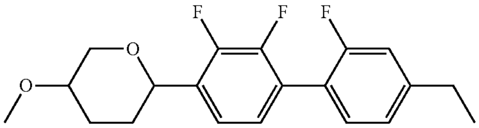
(1-7-32)
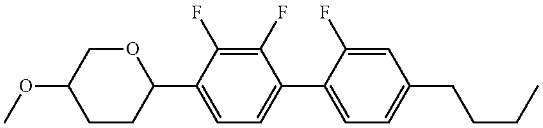
(1-7-33)
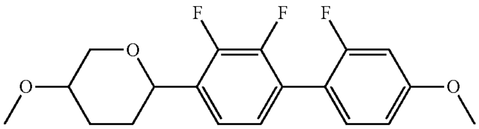
(1-7-34)
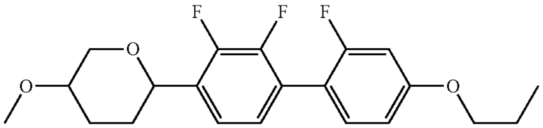
(1-7-35)
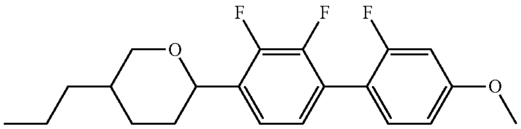
(1-7-36)
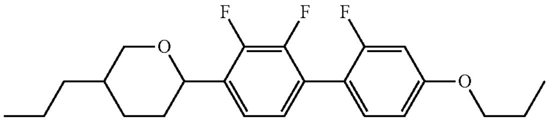
(1-7-37)
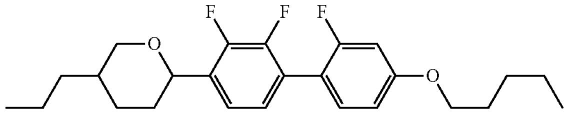
(1-7-38)
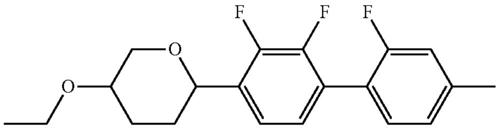
(1-7-39)
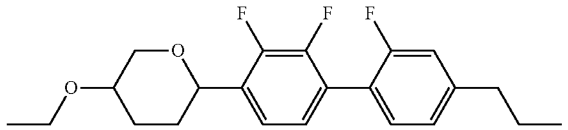

-continued
(1-7-40)
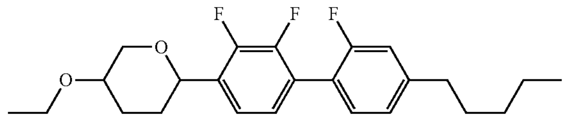
(1-7-41)
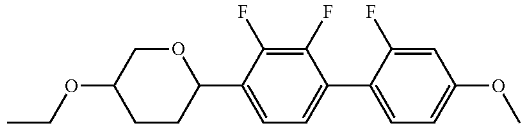
(1-7-42)
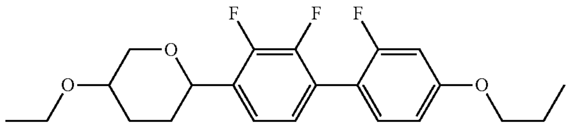
(1-7-43)
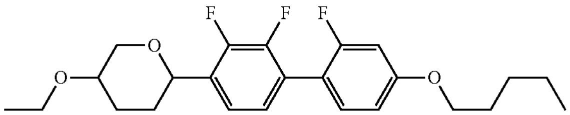
(1-7-44)
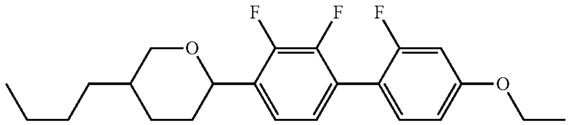
(1-7-45)
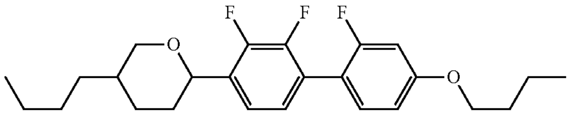
(1-7-46)
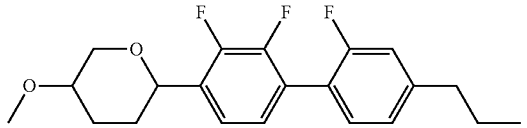
(1-7-47)
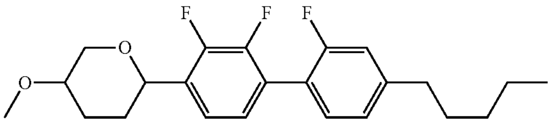
(1-7-48)
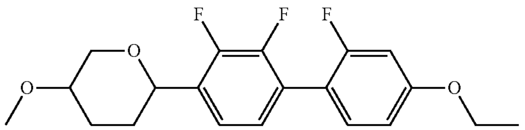
(1-7-49)
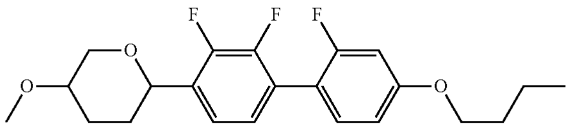
-continued
(1-7-50)
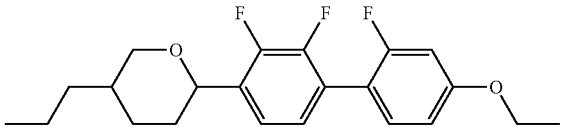
(1-7-51)
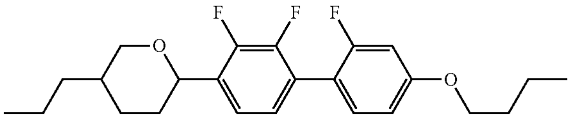
(1-7-52)
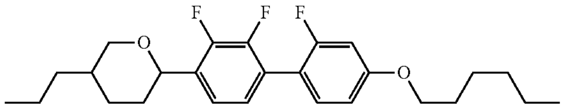
(1-7-53)
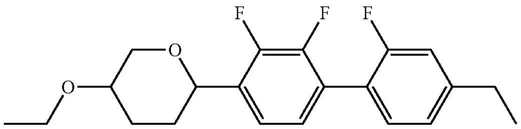
(1-7-54)
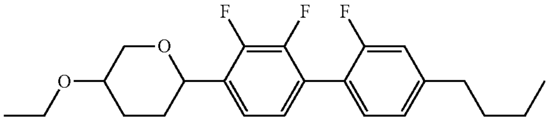
(1-7-55)
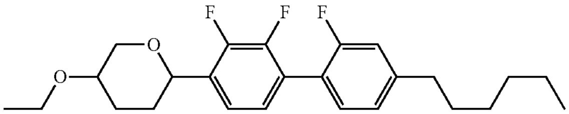
(1-7-56)
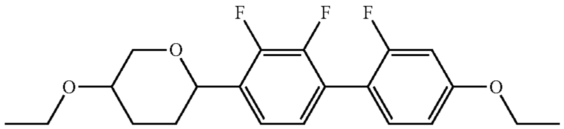
(1-7-57)
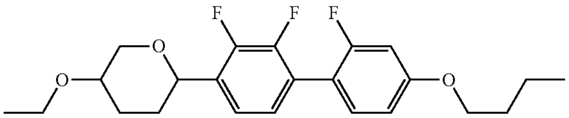
(1-7-58)
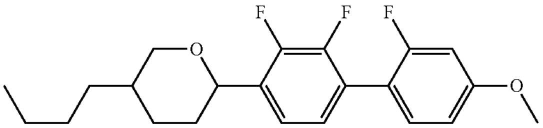
(1-7-59)
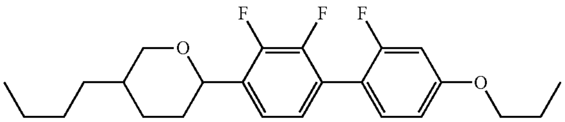

-continued
(1-7-60)
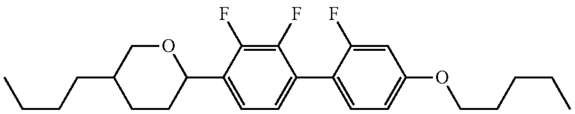
(1-7-61)
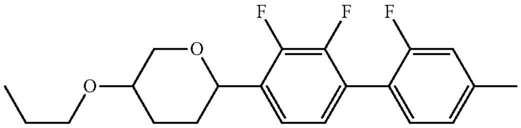
(1-7-62)
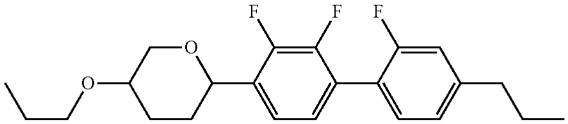
(1-7-63)
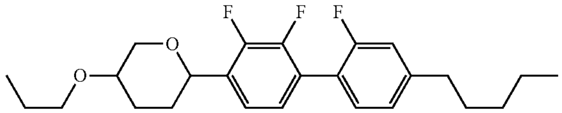
(1-7-64)
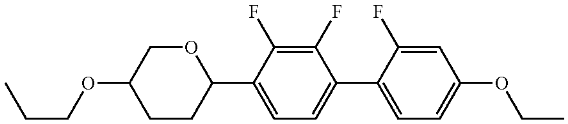
(1-7-65)
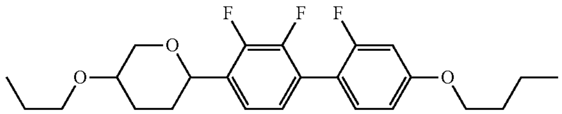
(1-7-66)
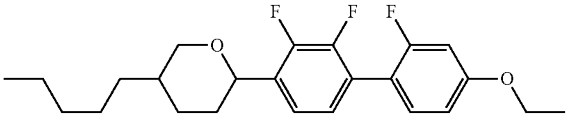
(1-7-67)
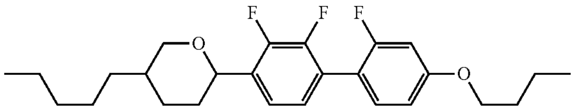
(1-7-68)
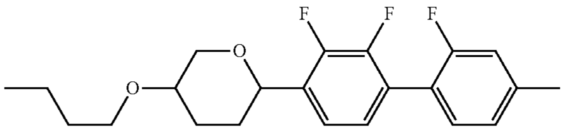
(1-7-69)
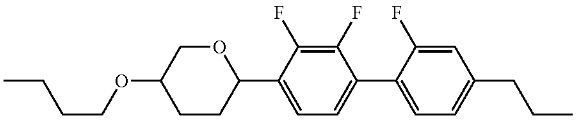
(1-7-70)
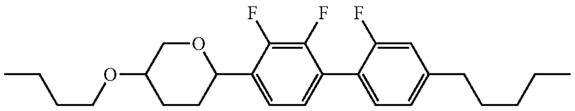
-continued
(1-7-71)
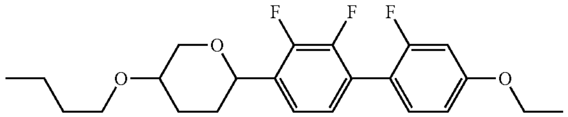
(1-7-72)
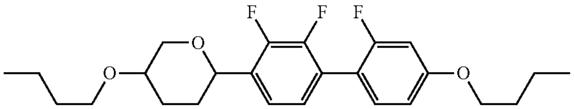
(1-7-73)
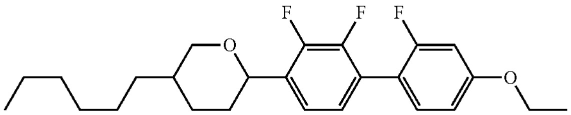
(1-7-74)
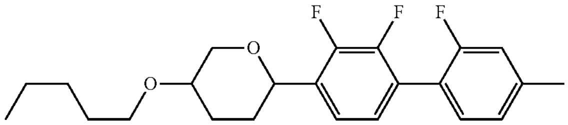
(1-7-75)
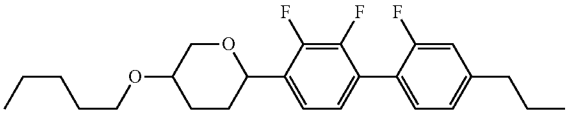
(1-7-76)
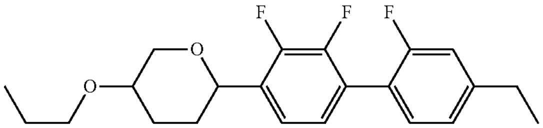
(1-7-77)
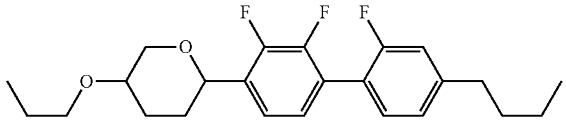
(1-7-78)
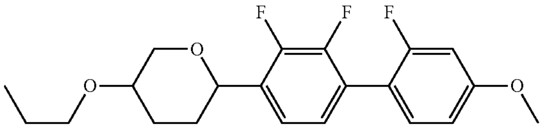
(1-7-79)
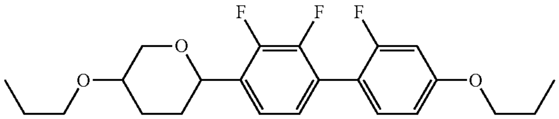
(1-7-80)
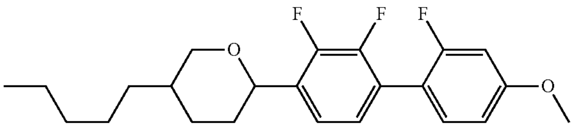

-continued
(1-7-81)
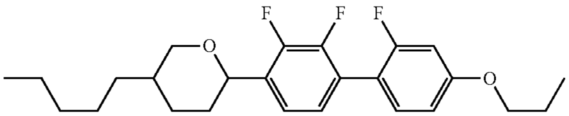
(1-7-82)
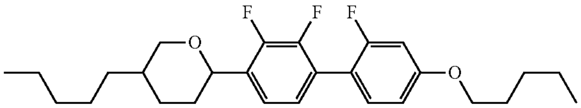
(1-7-83)
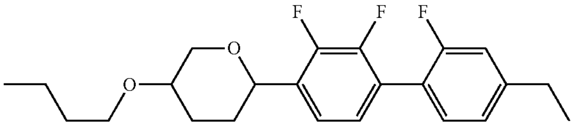
(1-7-84)
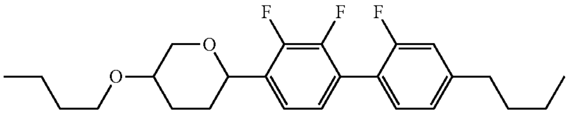
(1-7-85)
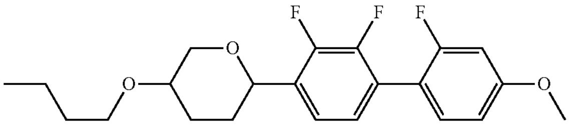
(1-7-86)
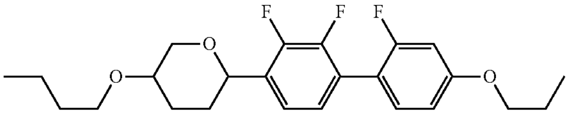
(1-7-87)
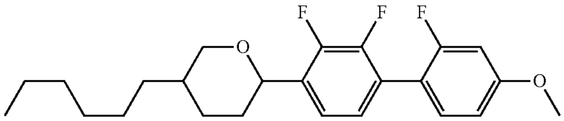
(1-7-88)
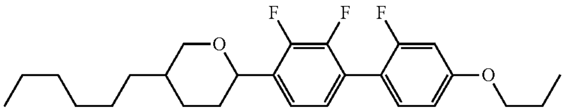
(1-7-89)
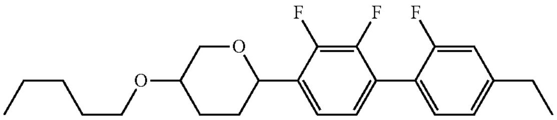
(1-7-90)
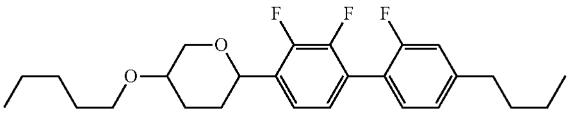
(1-7-91)
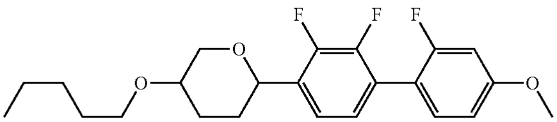
-continued
(1-7-92)
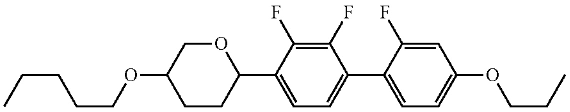
(1-7-93)
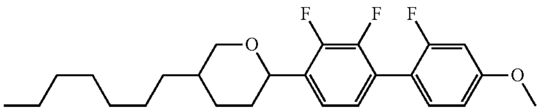
(1-7-94)
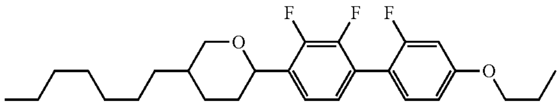
(1-7-95)
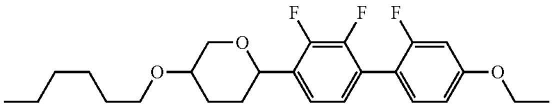
(1-7-96)
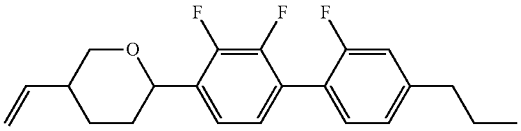
(1-7-97)
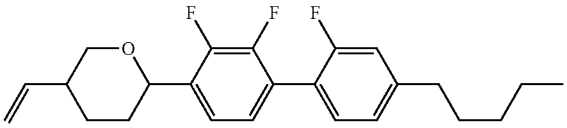
(1-7-98)
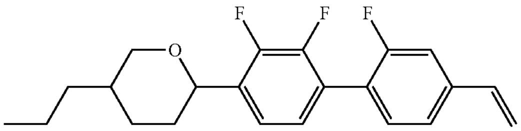
(1-7-99)
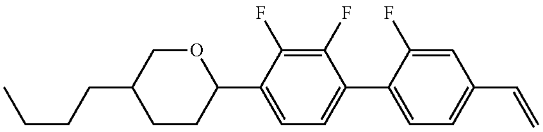
(1-7-100)
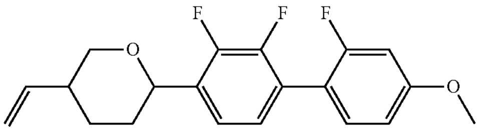
(1-7-101)
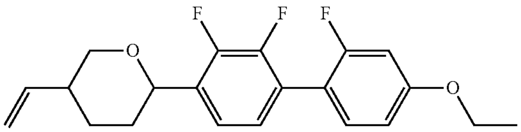

-continued
(1-7-102)
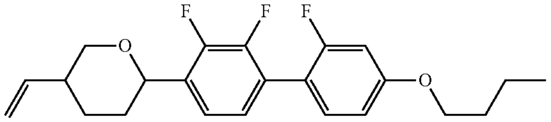
(1-7-103)
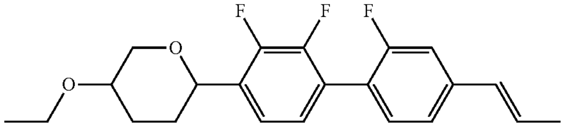
(1-7-104)
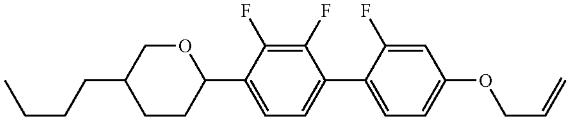
(1-7-105)
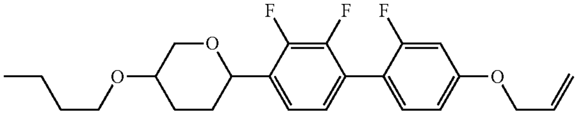
(1-7-106)
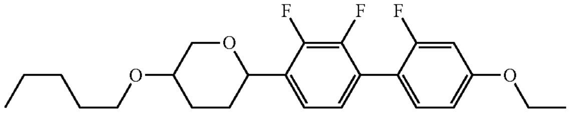
(1-7-107)
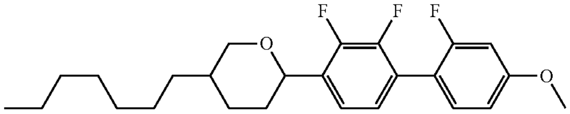
(1-7-108)
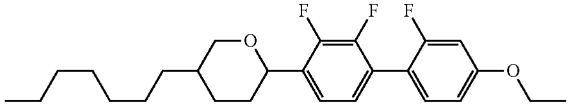
(1-7-109)
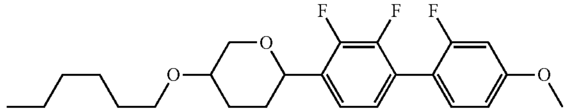
(1-7-110)
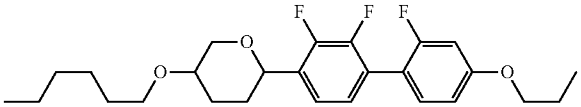
(1-7-111)
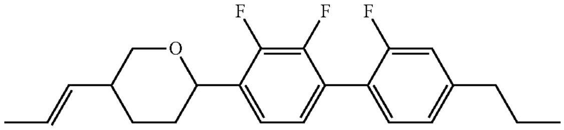
(1-7-112)
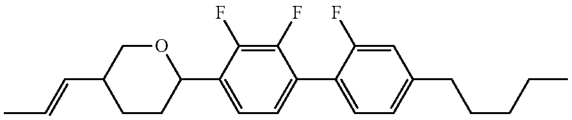
-continued
(1-7-113)
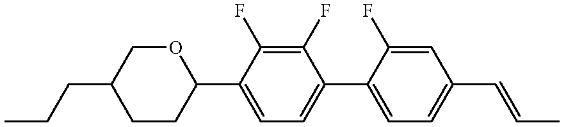
(1-7-114)
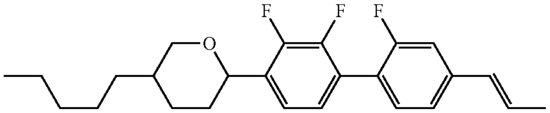
(1-7-115)
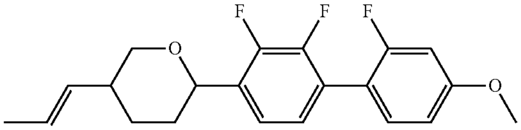
(1-7-116)
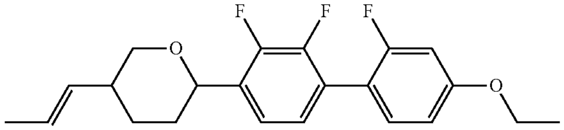
(1-7-117)
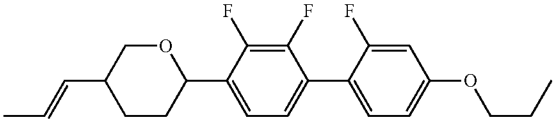
(1-7-118)
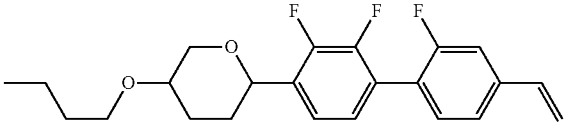
(1-7-119)
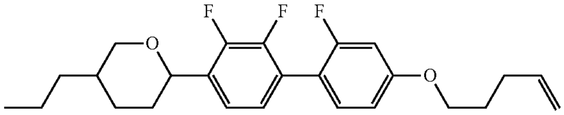
(1-7-120)
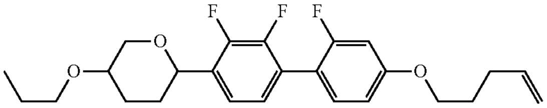
(1-7-121)
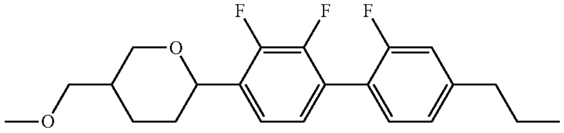
(1-7-122)
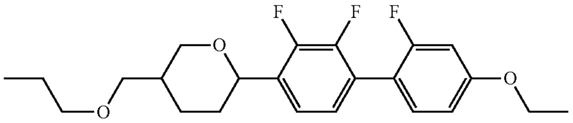

-continued
(1-7-123)
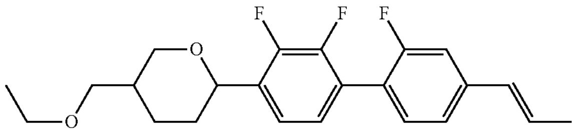
(1-7-124)
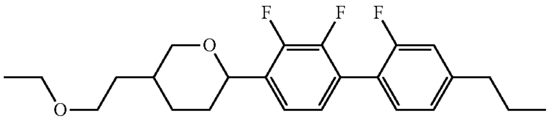
(1-7-125)
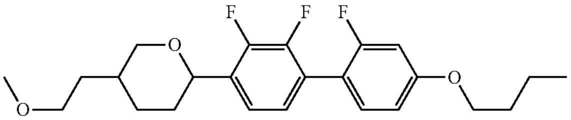
(1-7-126)
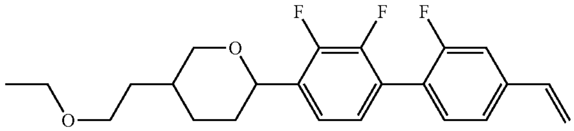
(1-7-127)
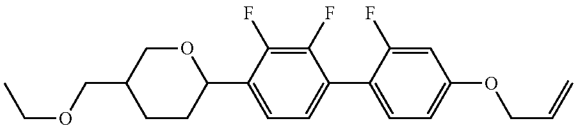
(1-7-128)
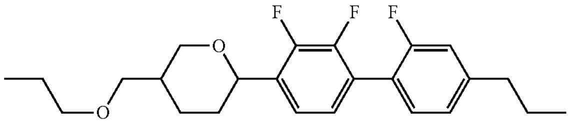
(1-7-129)
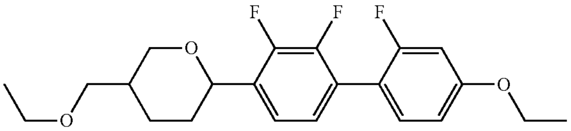
(1-7-130)
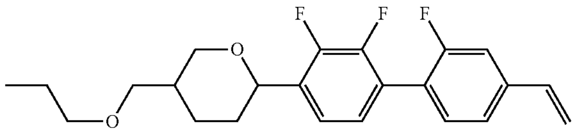
(1-7-131)
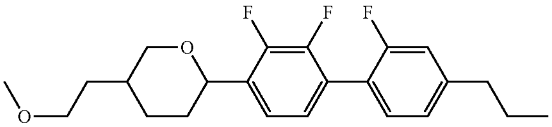
(1-7-132)
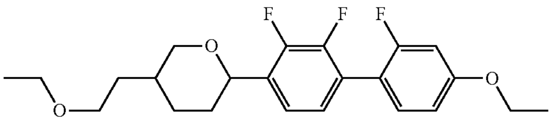
-continued
(1-7-133)
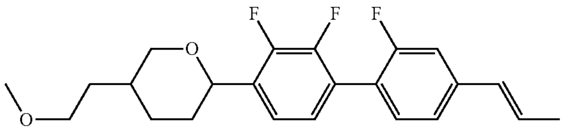
(1-7-134)
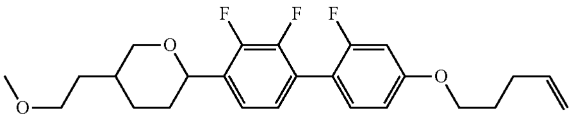
(1-8-1)
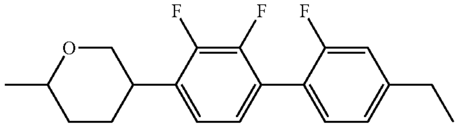
(1-8-2)
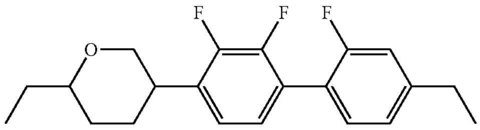
(1-8-3)
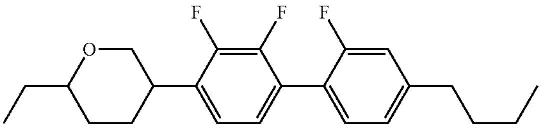
(1-8-4)
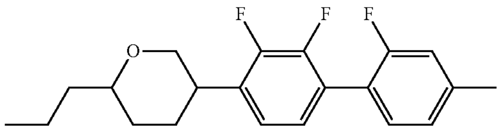
(1-8-5)
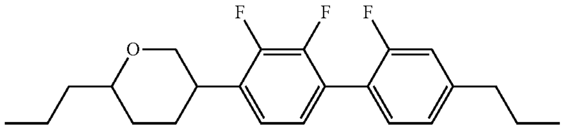
(1-8-6)
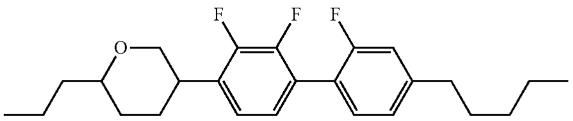
(1-8-7)
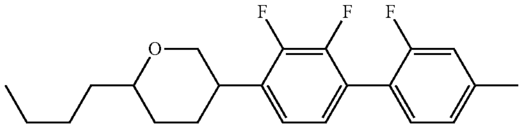
(1-8-8)
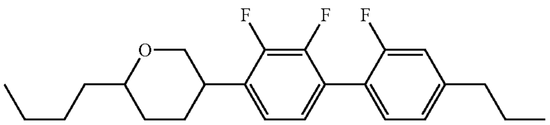

-continued
(1-8-9)
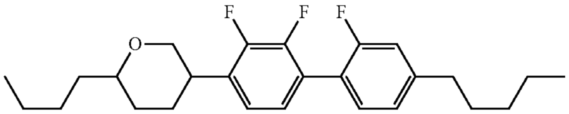
(1-8-10)
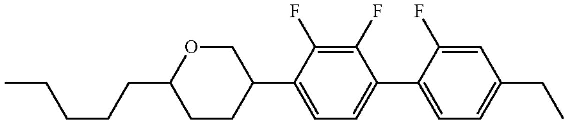
(1-8-11)
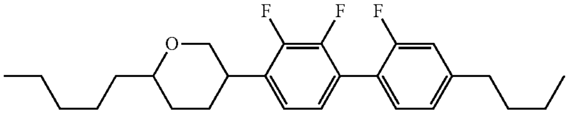
(1-8-12)
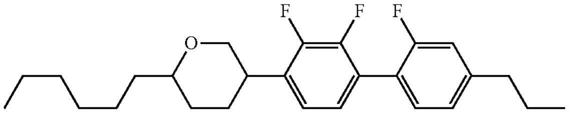
(1-8-13)
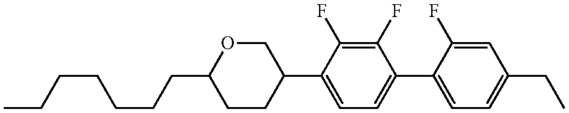
(1-8-14)
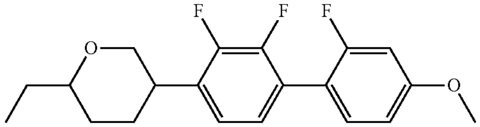
(1-8-15)
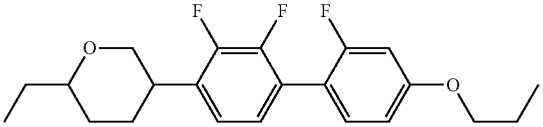
(1-8-16)
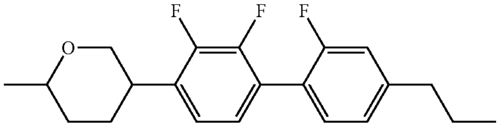
(1-8-17)
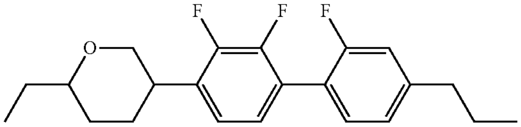
(1-8-18)
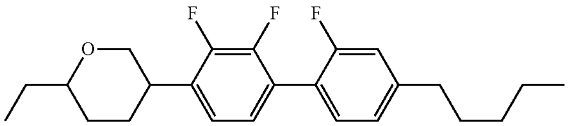
-continued
(1-8-19)
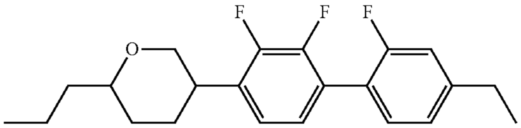
(1-8-20)
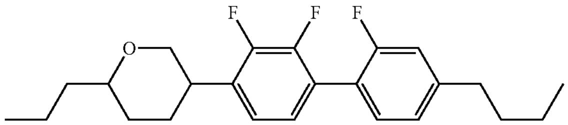
(1-8-21)
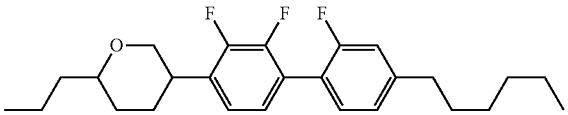
(1-8-22)
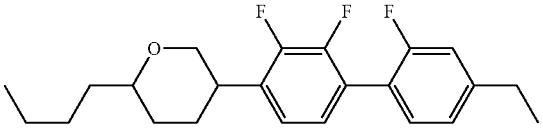
(1-8-23)
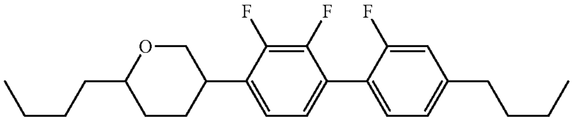
(1-8-24)
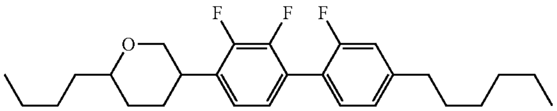
(1-8-25)
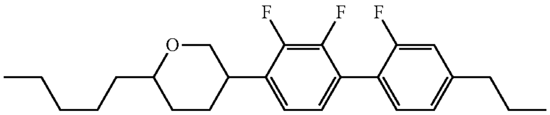
(1-8-26)
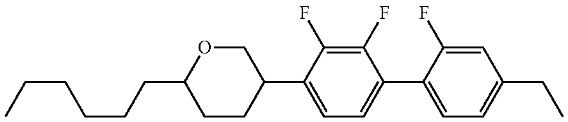
(1-8-27)
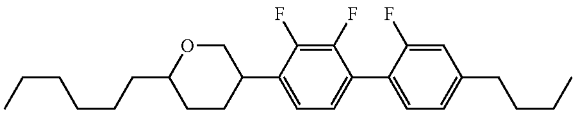
(1-8-28)
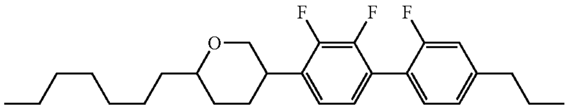

-continued
(1-8-29)
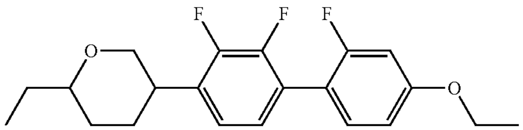
(1-8-30)
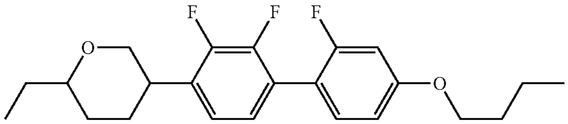
(1-8-31)
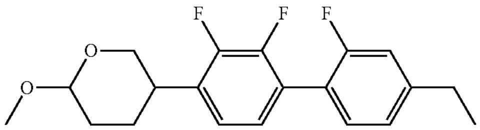
(1-8-32)
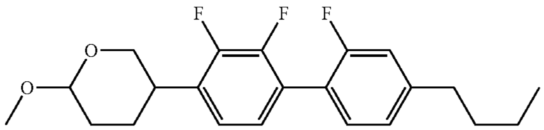
(1-8-33)
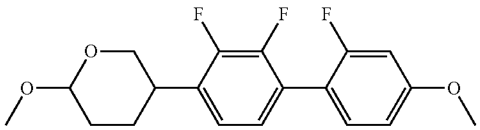
(1-8-34)
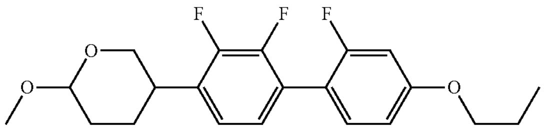
(1-8-35)
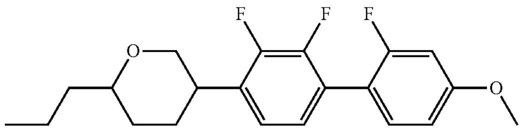
(1-8-36)
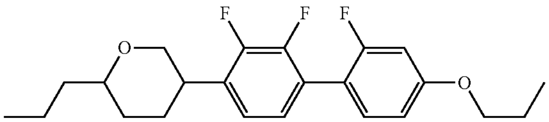
(1-8-37)
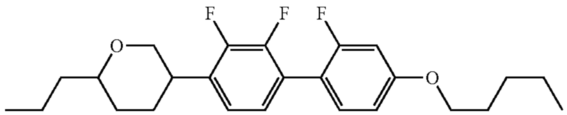
(1-8-38)
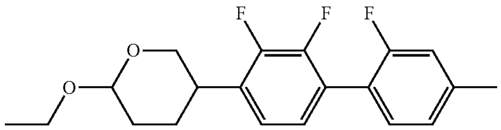
-continued
(1-8-39)
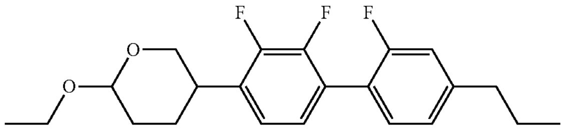
(1-8-40)
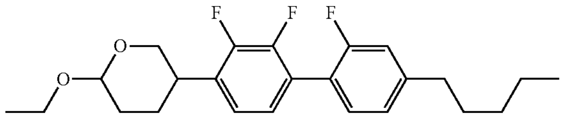
(1-8-41)
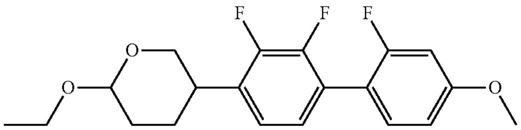
(1-8-42)
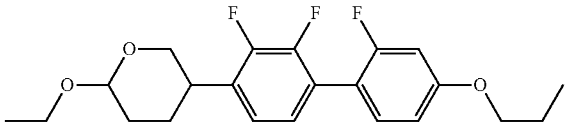
(1-8-43)
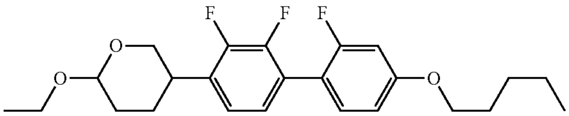
(1-8-44)
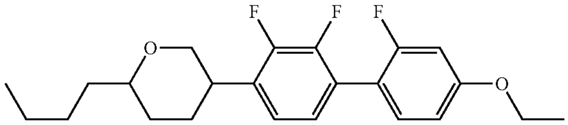
(1-8-45)
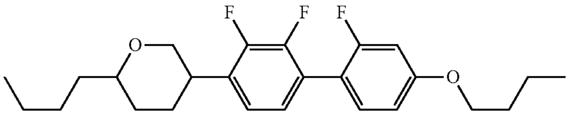
(1-8-46)
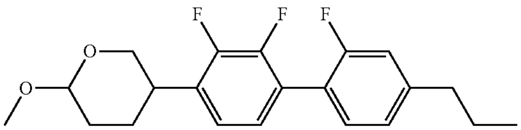
(1-8-47)
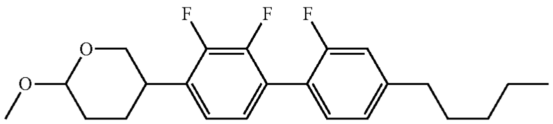
(1-8-48)
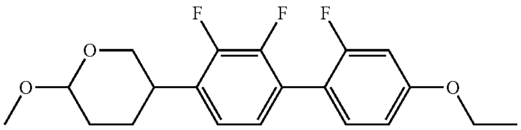

-continued
(1-8-49)
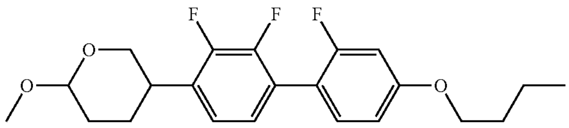
(1-8-50)
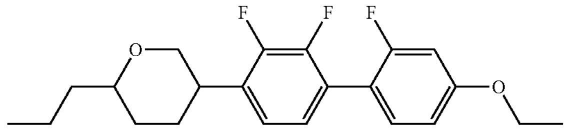
(1-8-51)
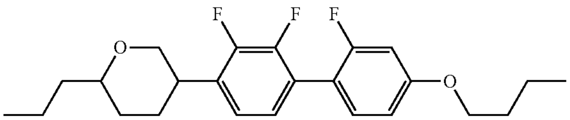
(1-8-52)
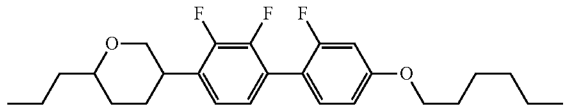
(1-8-53)
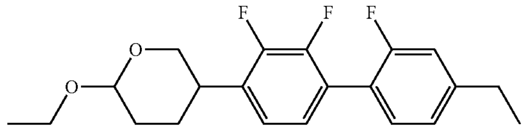
(1-8-54)
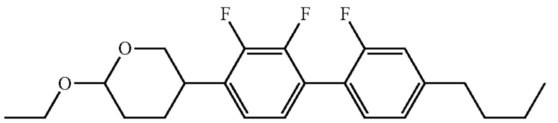
(1-8-55)
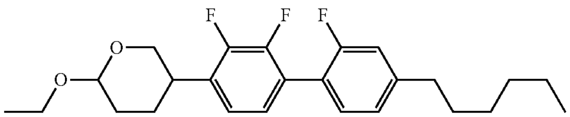
(1-8-56)
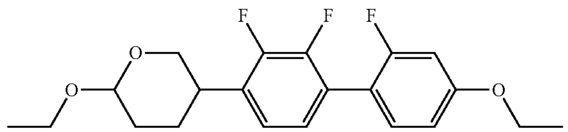
(1-8-57)
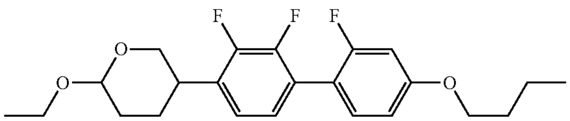
(1-8-58)
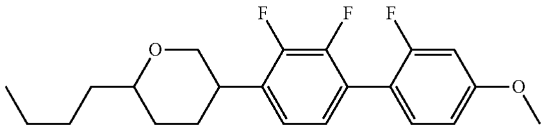
-continued
(1-8-59)
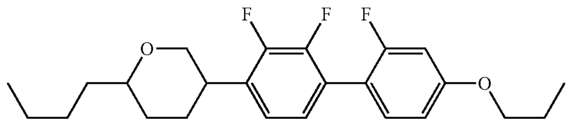
(1-8-60)
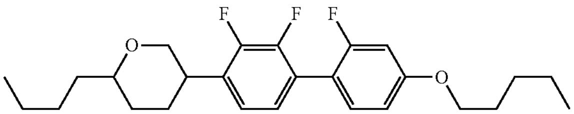
(1-8-61)
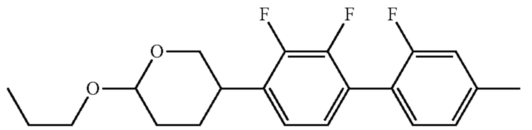
(1-8-62)
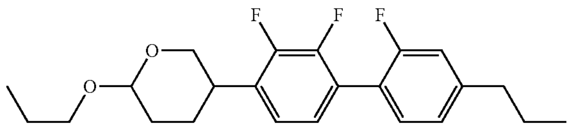
(1-8-63)
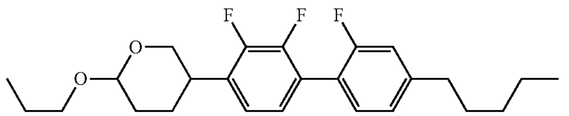
(1-8-64)
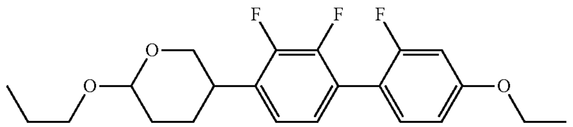
(1-8-65)
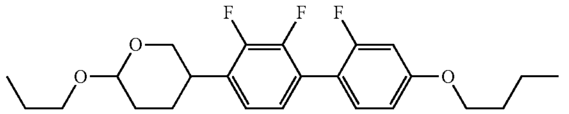
(1-8-66)
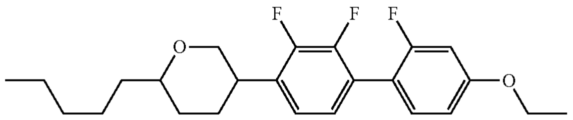
(1-8-67)
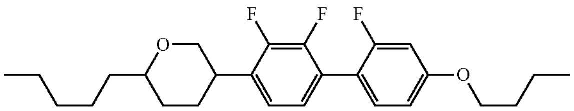
(1-8-68)
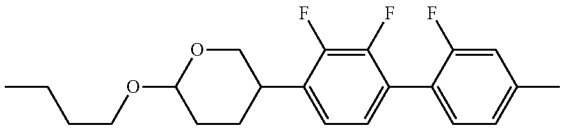

-continued
(1-8-69)
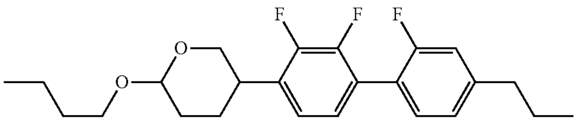
(1-8-70)
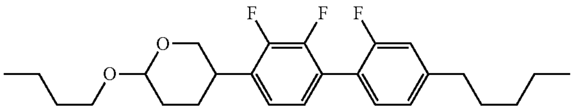
(1-8-71)
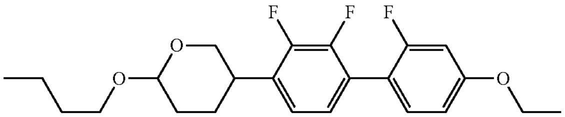
(1-8-72)
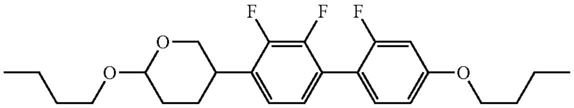
(1-8-73)
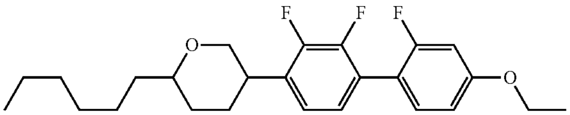
(1-8-74)
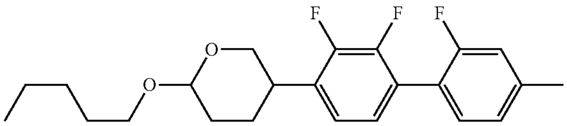
(1-8-75)
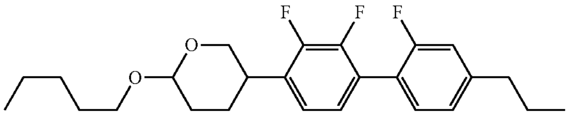
(1-8-76)
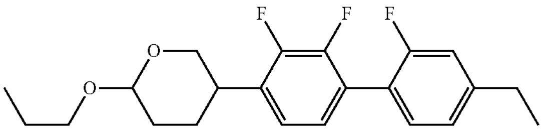
(1-8-77)
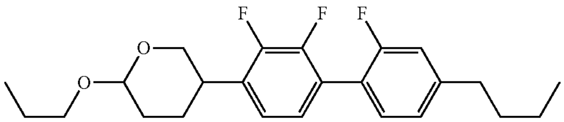
(1-8-78)
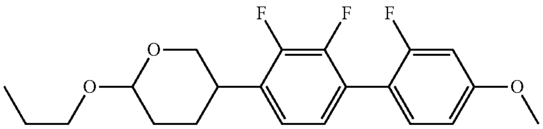
-continued
(1-8-79)
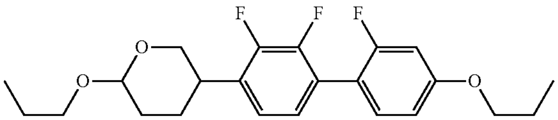
(1-8-80)
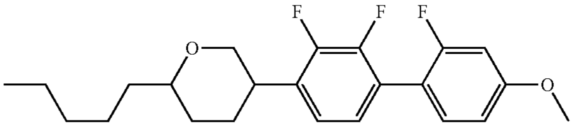
(1-8-81)
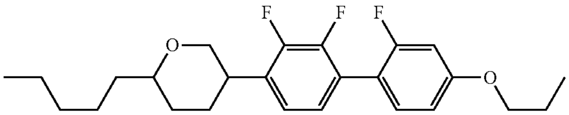
(1-8-82)
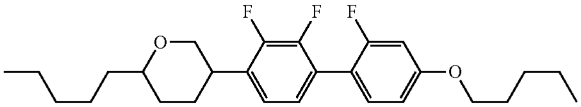
(1-8-83)
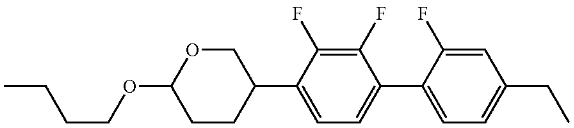
(1-8-84)
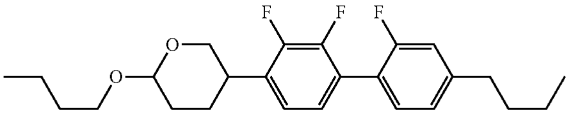
(1-8-85)
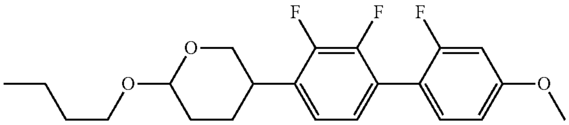
(1-8-86)
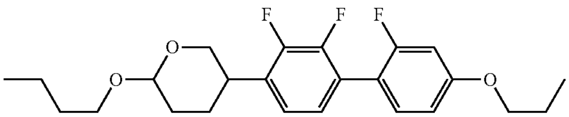
(1-8-87)
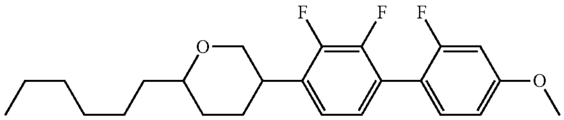
(1-8-88)
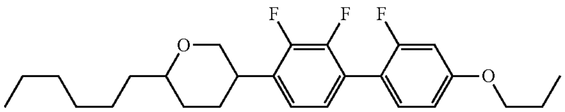

-continued
(1-8-89)
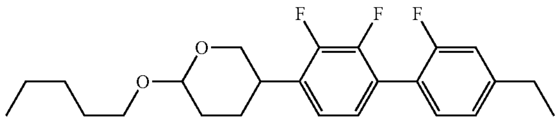
(1-8-90)
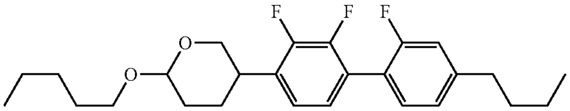
(1-8-91)
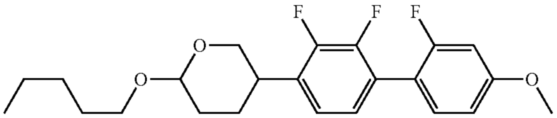
(1-8-92)
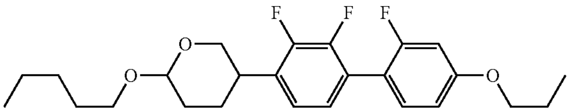
(1-8-93)
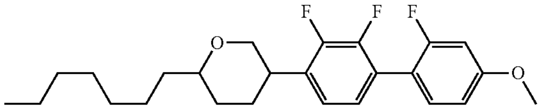
(1-8-94)
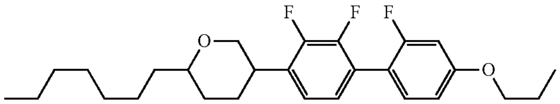
(1-8-95)
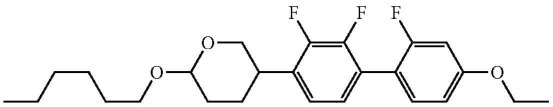
(1-8-96)
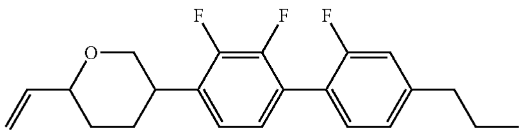
(1-8-97)
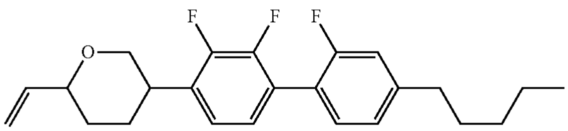
(1-8-98)
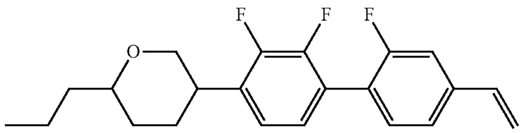
-continued
(1-8-99)
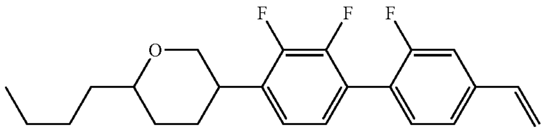
(1-8-100)
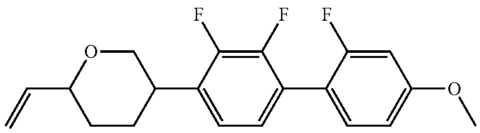
(1-8-101)
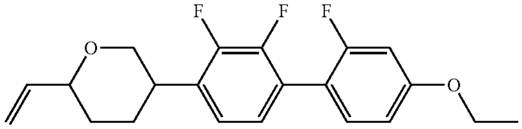
(1-8-102)
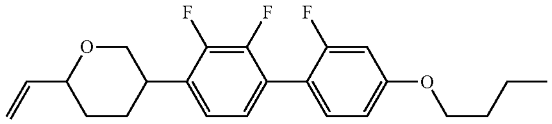
(1-8-103)
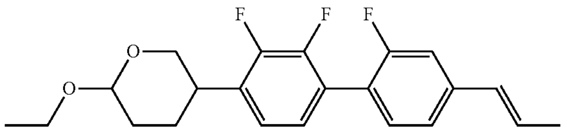
(1-8-104)
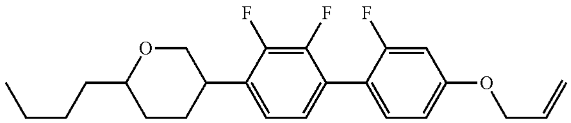
(1-8-105)
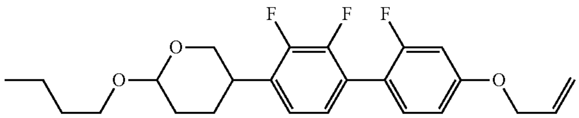
(1-8-106)
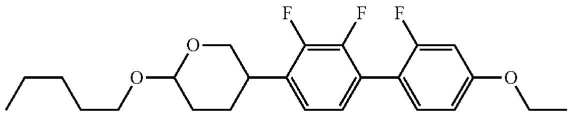
(1-8-107)
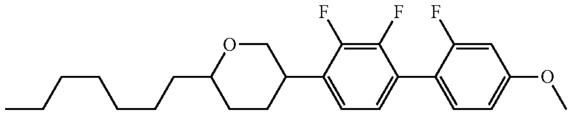
(1-8-108)
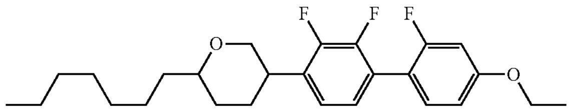

-continued
(1-8-109)
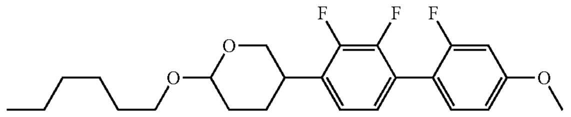
(1-8-110)
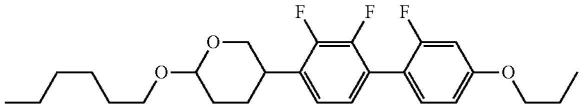
(1-8-111)
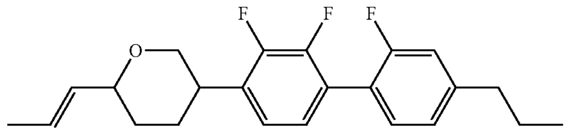
(1-8-112)
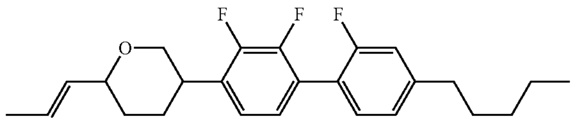
(1-8-113)
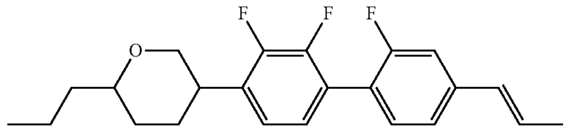
(1-8-114)
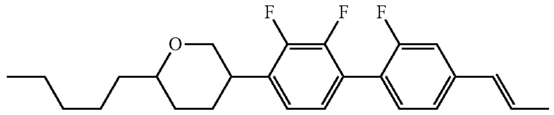
(1-8-115)
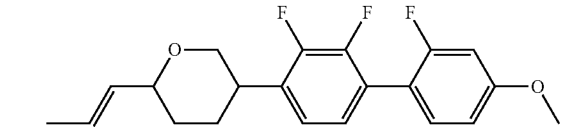
(1-8-116)
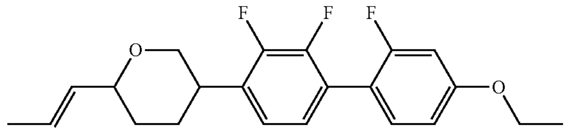
(1-8-117)
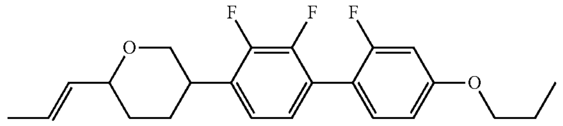
(1-8-118)
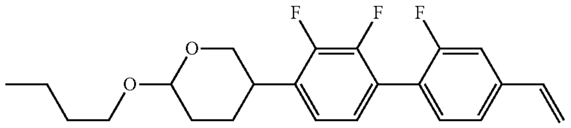
-continued
(1-8-119)
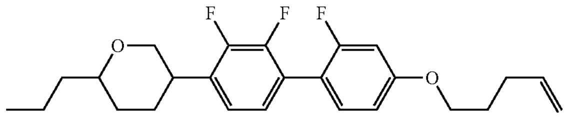
(1-8-120)
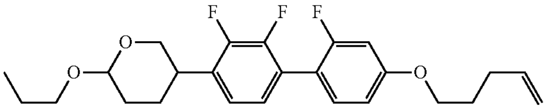
(1-8-121)
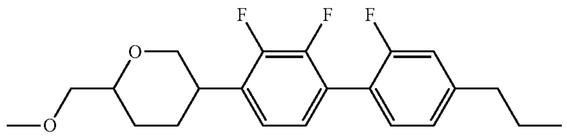
(1-8-122)
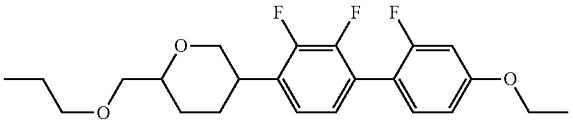
(1-8-123)
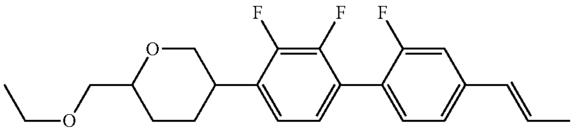
(1-8-124)
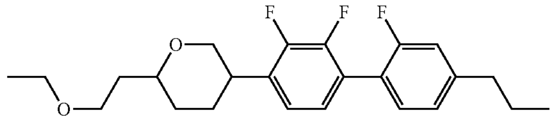
(1-8-125)
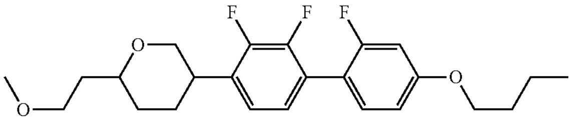
(1-8-126)
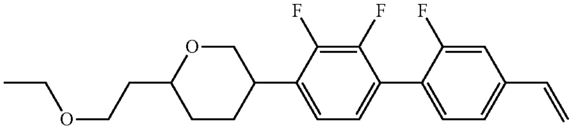
(1-8-127)
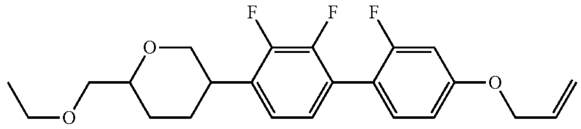
(1-8-128)
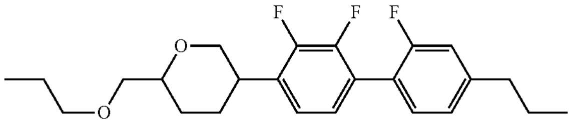

-continued
(1-8-129)
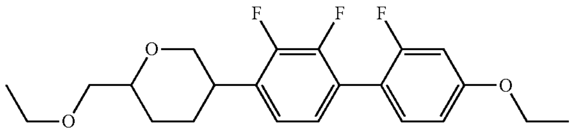
(1-8-130)
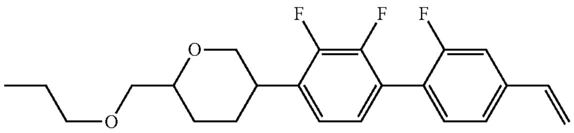
(1-8-131)
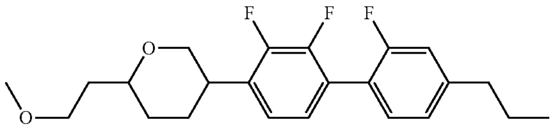
(1-8-132)
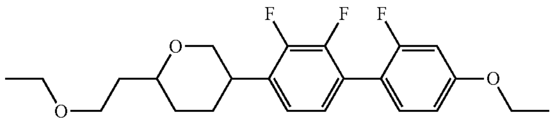
(1-8-133)
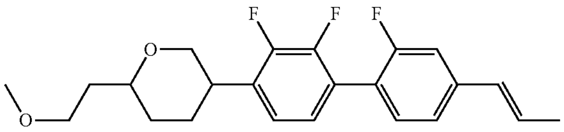
(1-8-134)
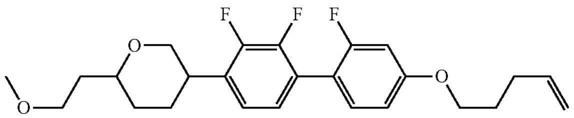
(1-9-1)
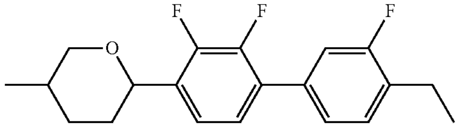
(1-9-2)
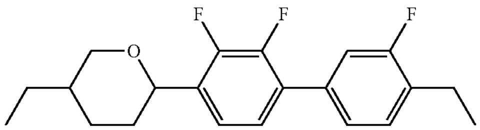
(1-9-3)
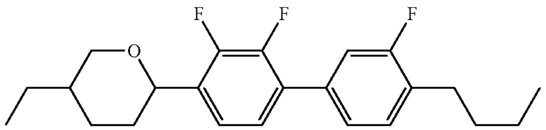
(1-9-4)
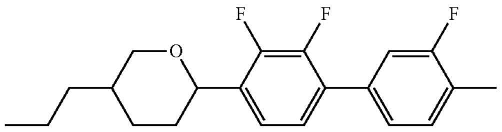
-continued
(1-9-5)
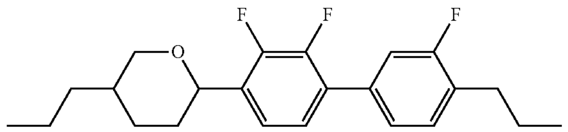
(1-9-6)
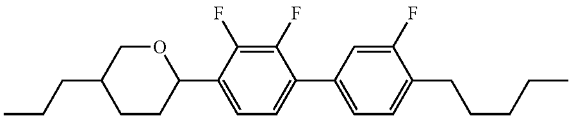
(1-9-7)
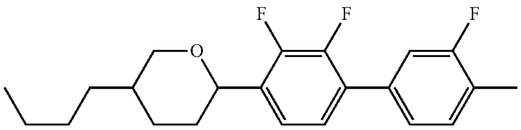
(1-9-8)
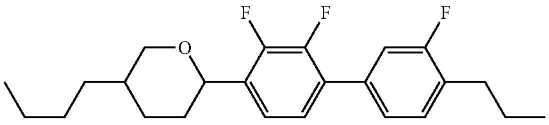
(1-9-9)
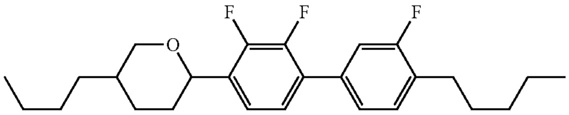
(1-9-10)
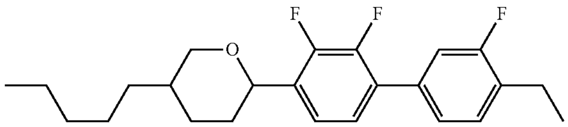
(1-9-11)
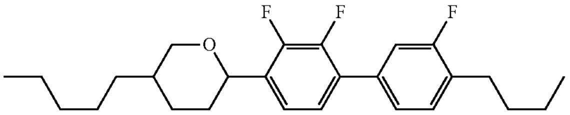
(1-9-12)
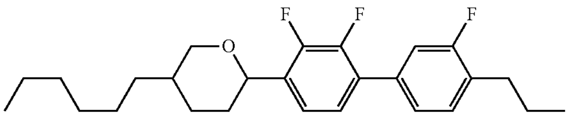
(1-9-13)
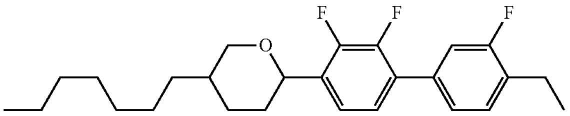
(1-9-14)
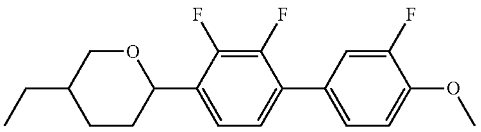

-continued
(1-9-15)
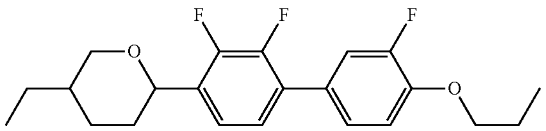
(1-9-16)
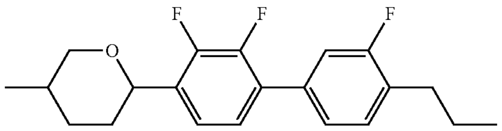
(1-9-17)
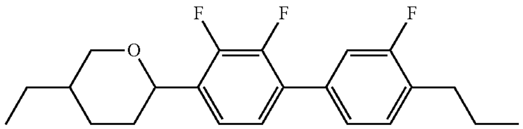
(1-9-18)
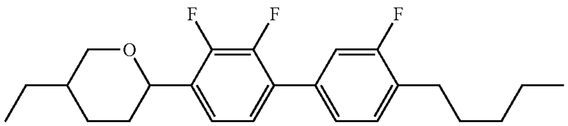
(1-9-19)
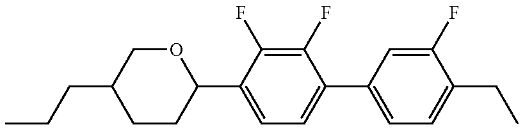
(1-9-20)
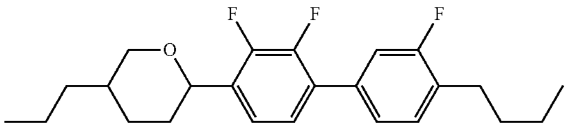
(1-9-21)
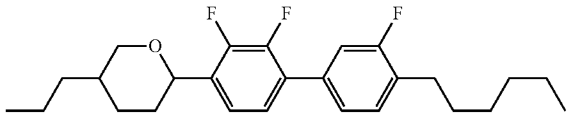
(1-9-22)
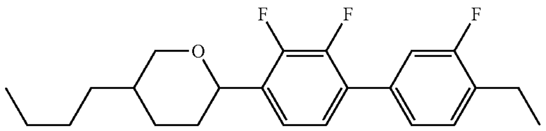
(1-9-23)
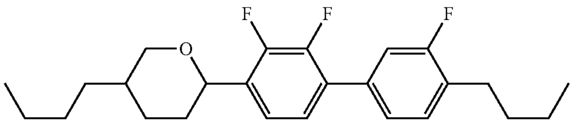
(1-9-24)
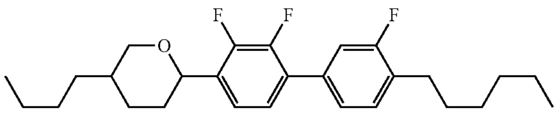
-continued
(1-9-25)
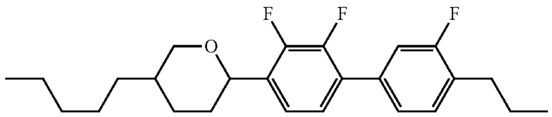
(1-9-26)
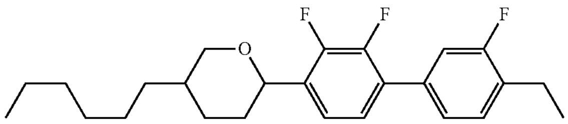
(1-9-27)
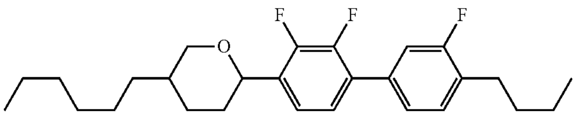
(1-9-28)
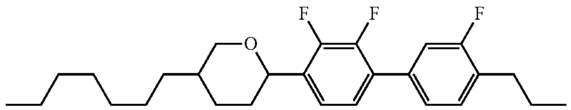
(1-9-29)
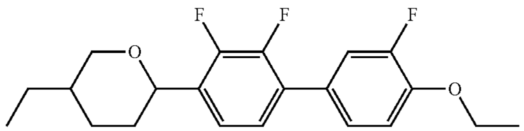
(1-9-30)
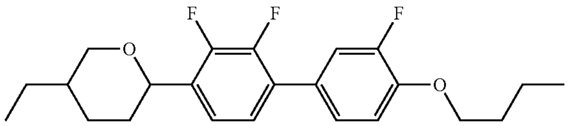
(1-9-31)
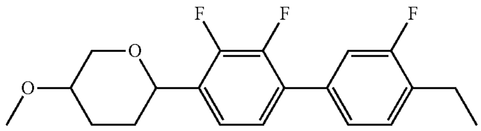
(1-9-32)
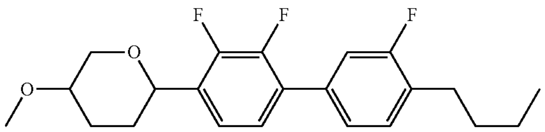
(1-9-33)
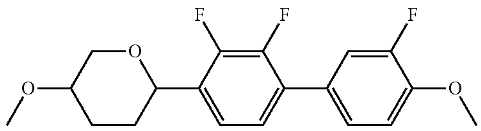
(1-9-34)
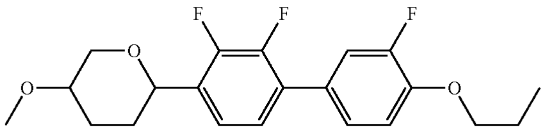

-continued
(1-9-35)
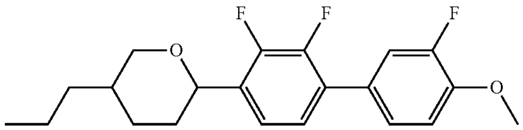
(1-9-36)
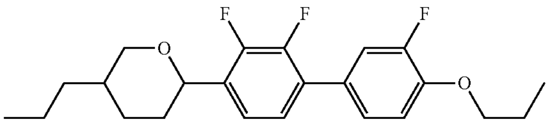
(1-9-37)
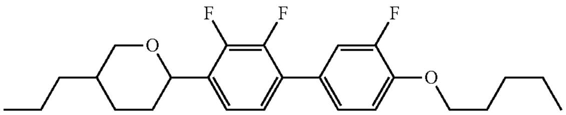
(1-9-38)
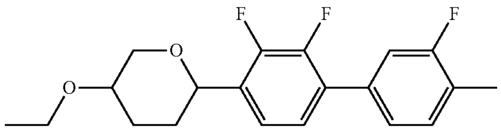
(1-9-39)
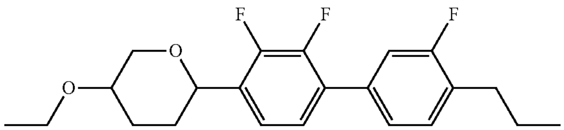
(1-9-40)
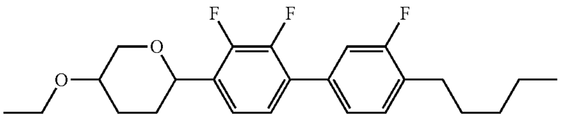
(1-9-41)
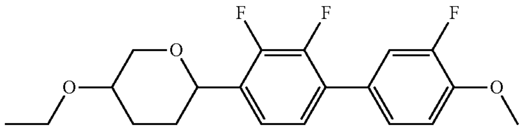
(1-9-42)
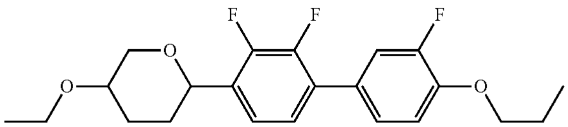
(1-9-43)
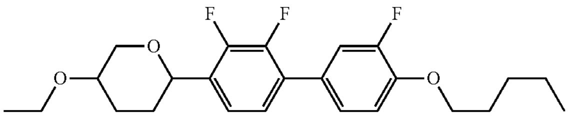
(1-9-44)
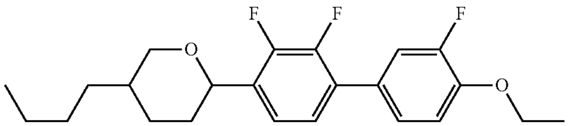
-continued
(1-9-45)
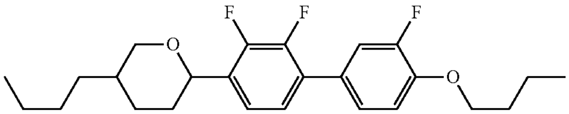
(1-9-46)
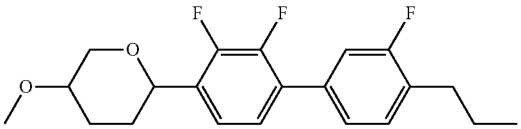
(1-9-47)
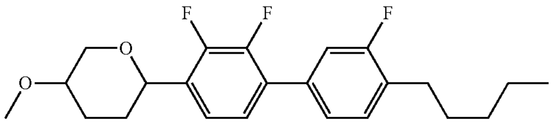
(1-9-48)
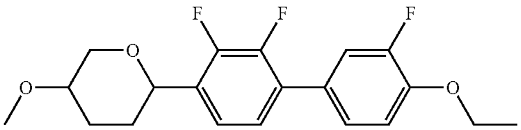
(1-9-49)
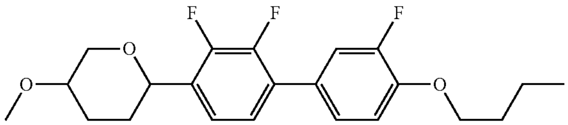
(1-9-50)
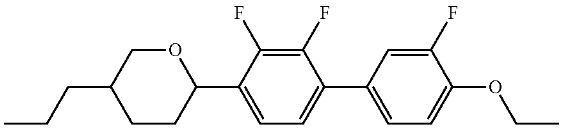
(1-9-51)
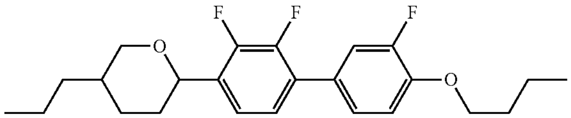
(1-9-52)
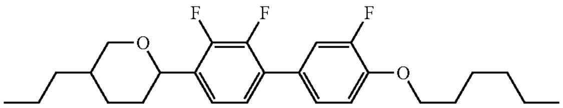
(1-9-53)
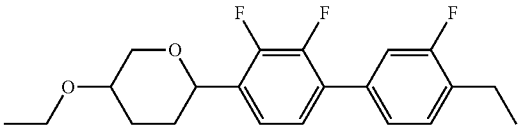
(1-9-54)
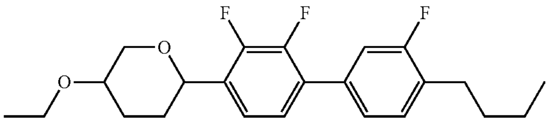

-continued
(1-9-55)
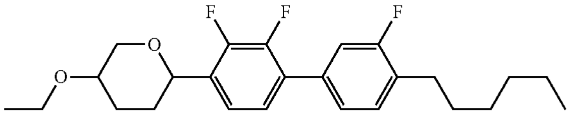
(1-9-56)
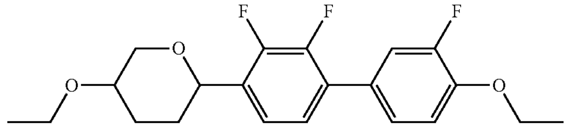
(1-9-57)
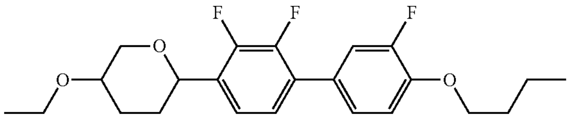
(1-9-58)
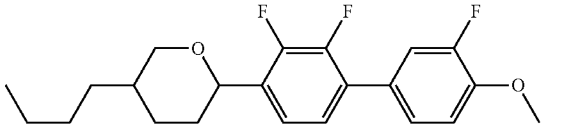
(1-9-59)
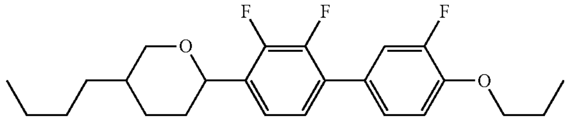
(1-9-60)
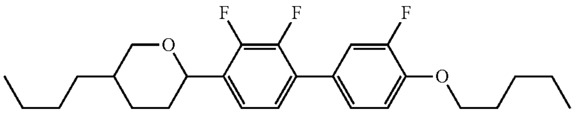
(1-9-61)
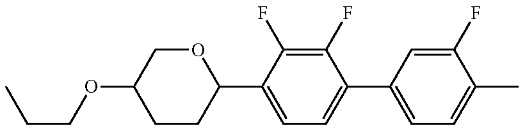
(1-9-62)
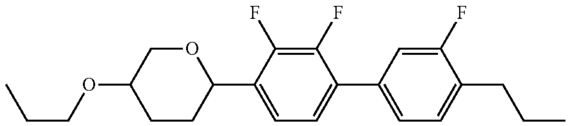
(1-9-63)
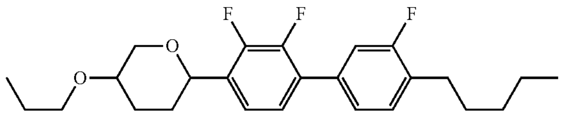
(1-9-64)
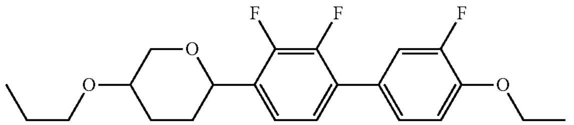
-continued
(1-9-65)
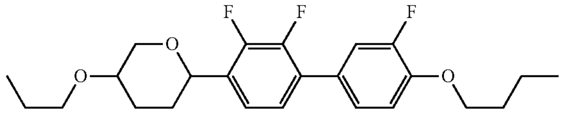
(1-9-66)
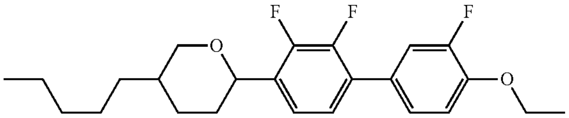
(1-9-67)
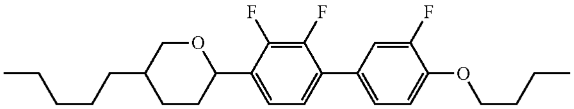
(1-9-68)
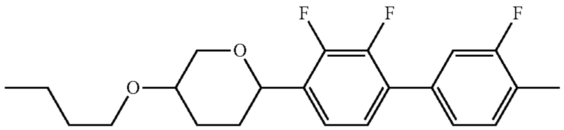
(1-9-69)
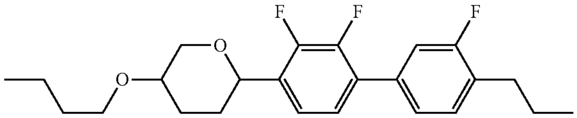
(1-9-70)
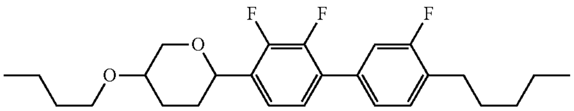
(1-9-71)
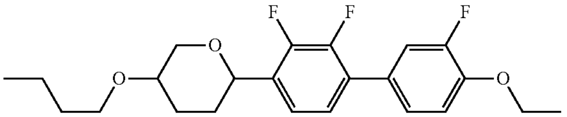
(1-9-72)
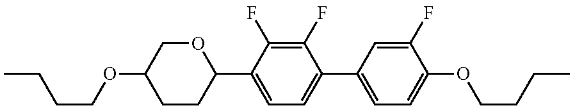
(1-9-73)
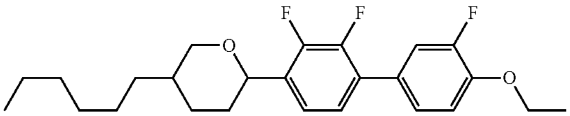
(1-9-74)
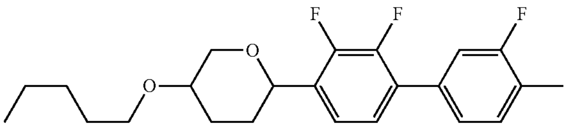
(1-9-75)
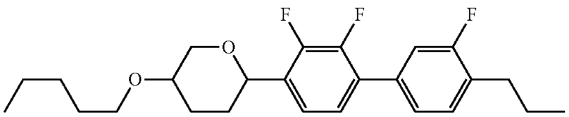

-continued
(1-9-76)
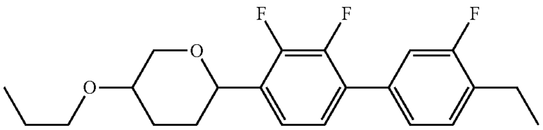
(1-9-77)
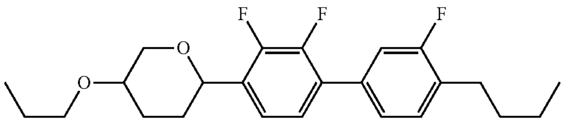
(1-9-78)
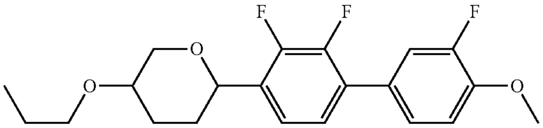
(1-9-79)
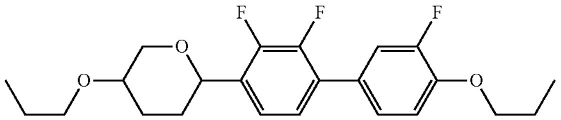
(1-9-80)
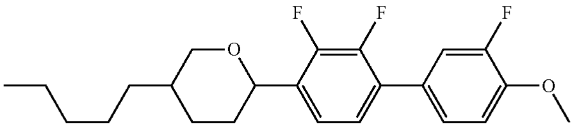
(1-9-81)
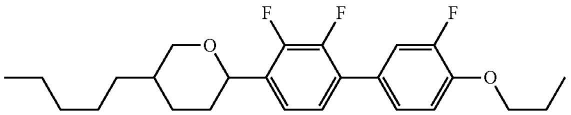
(1-9-82)
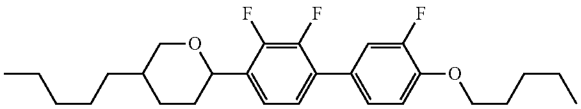
(1-9-83)
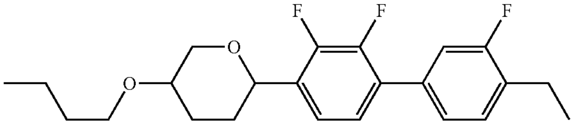
(1-9-84)
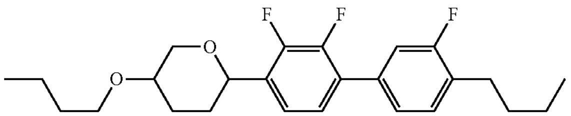
(1-9-85)
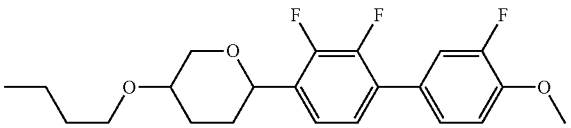
-continued
(1-9-86)
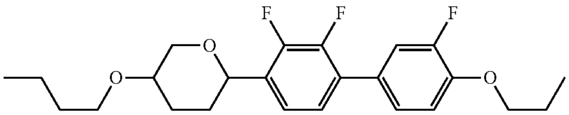
(1-9-87)
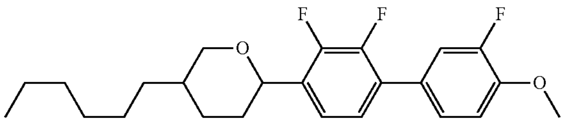
(1-9-88)
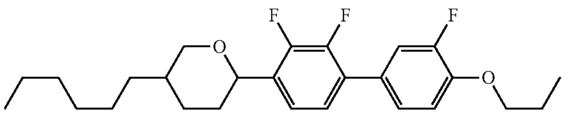
(1-9-89)
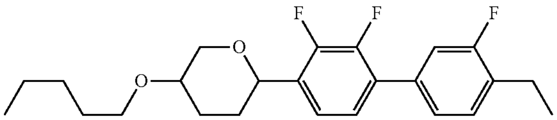
(1-9-90)
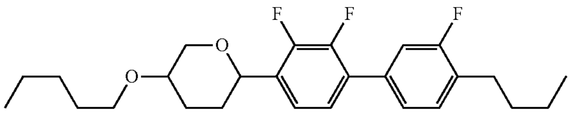
(1-9-91)
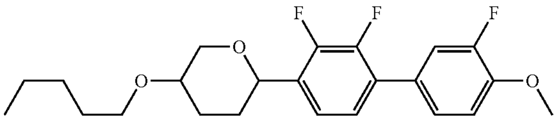
(1-9-92)
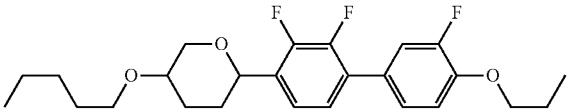
(1-9-93)
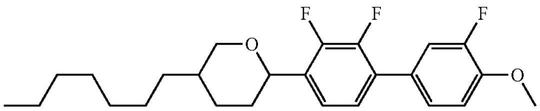
(1-9-94)
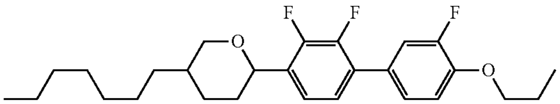
(1-9-95)
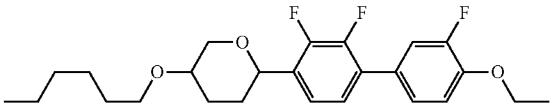
(1-9-96)
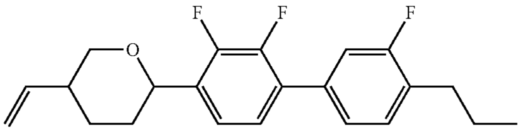

-continued
(1-9-97)
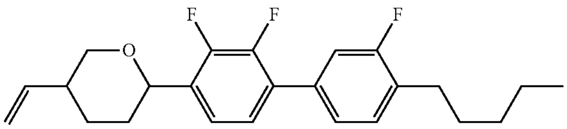
(1-9-98)
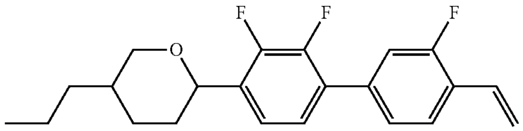
(1-9-99)
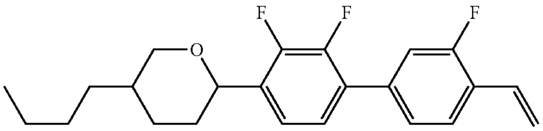
(1-9-100)
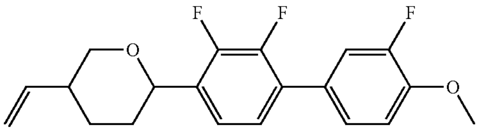
(1-9-101)
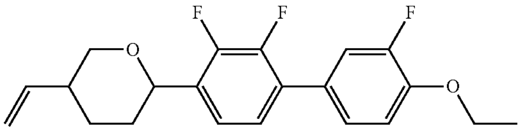
(1-9-102)
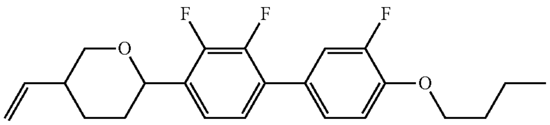
(1-9-103)
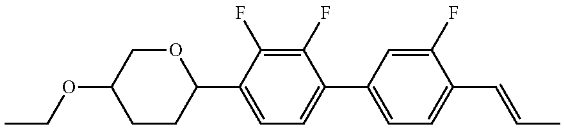
(1-9-104)
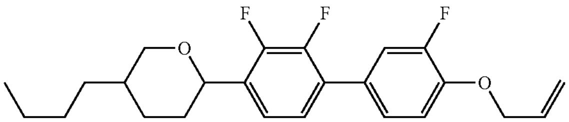
(1-9-105)
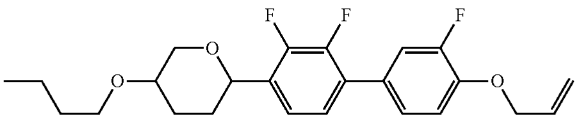
(1-9-106)
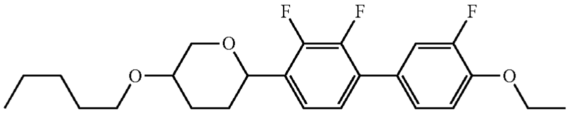
-continued
(1-9-107)
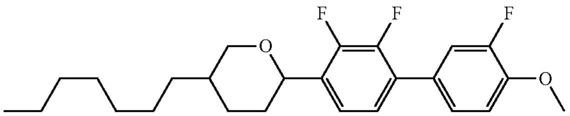
(1-9-108)
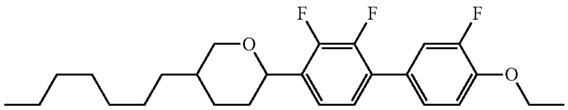
(1-9-109)
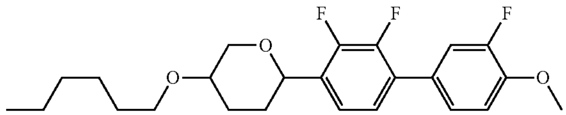
(1-9-110
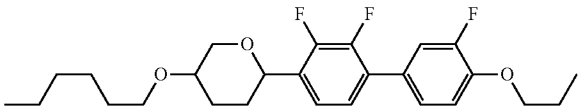
(1-9-111)
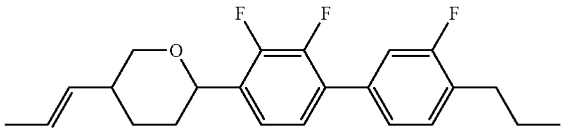
(1-9-112)
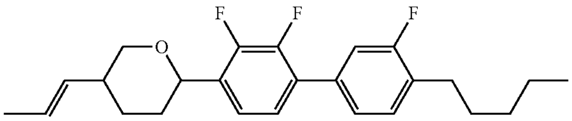
(1-9-113)
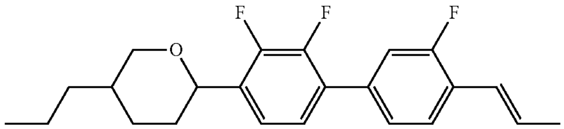
(1-9-114)
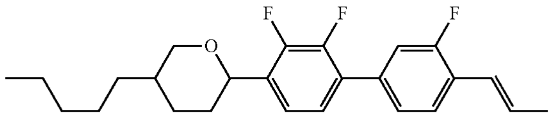
(1-9-115)
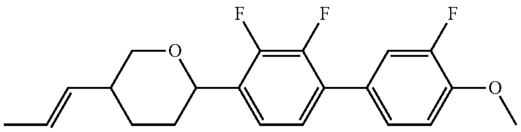
(1-9-116)
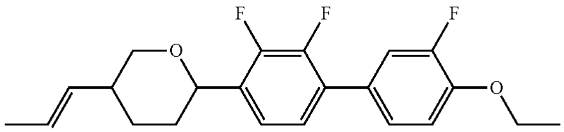

-continued
(1-9-117)
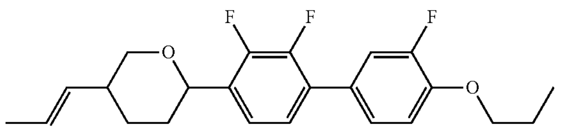
(1-9-118)
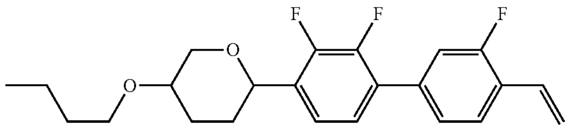
(1-9-119)
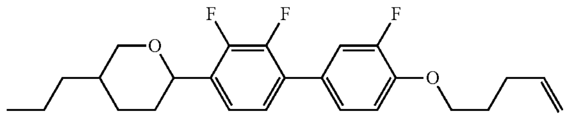
(1-9-120)
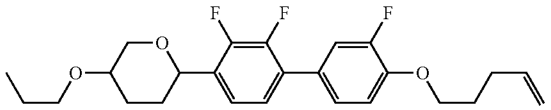
(1-9-121)
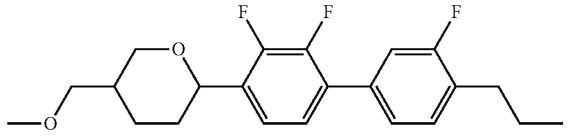
(1-9-122)
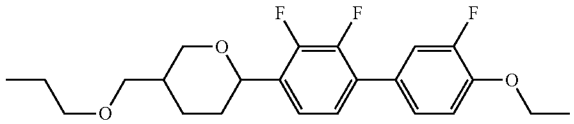
(1-9-123)
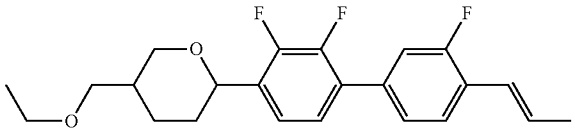
(1-9-124)
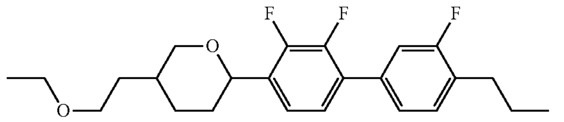
(1-9-125)
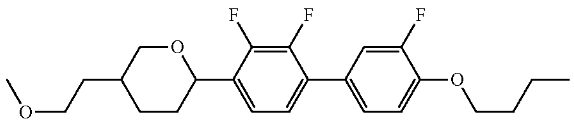
(1-9-126)
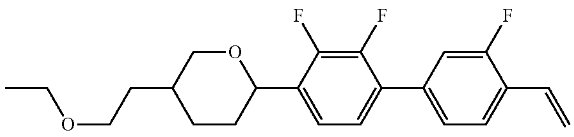
-continued
(1-9-127)
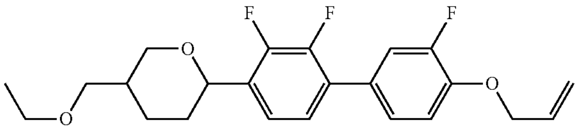
(1-9-128)
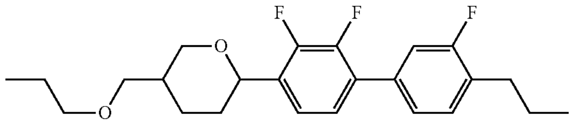
(1-9-129)
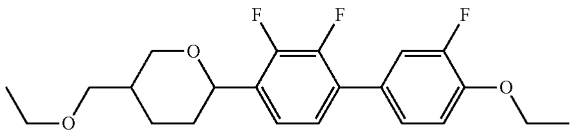
(1-9-130)
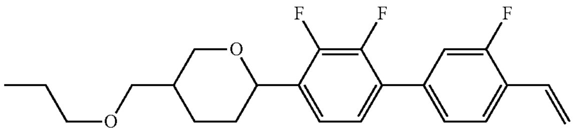
(1-9-131)
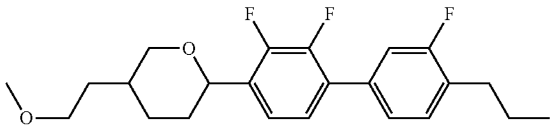
(1-9-132)
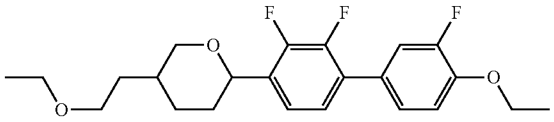
(1-9-133)
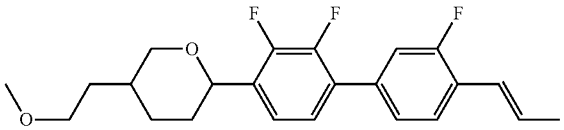
(1-9-134)
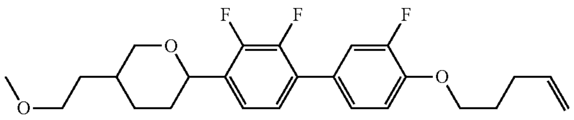
(1-10-1)
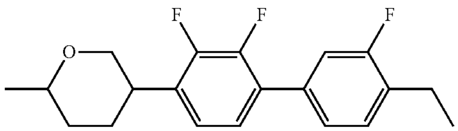
(1-10-2)
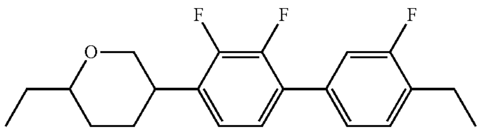

-continued
(1-10-3)
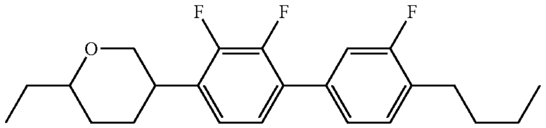
(1-10-4)
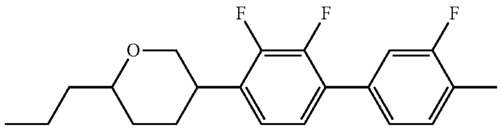
(1-10-5)
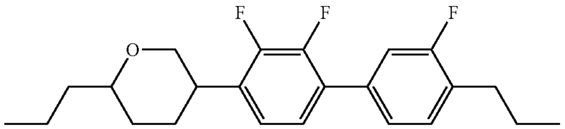
(1-10-6)
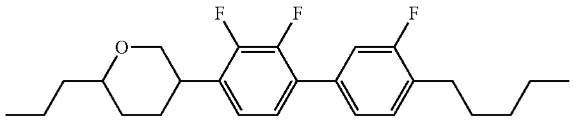
(1-10-7)
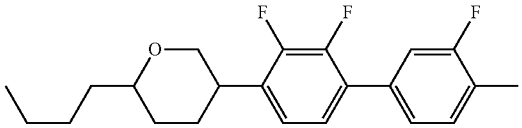
(1-10-8)
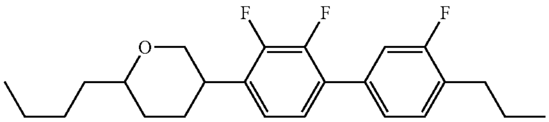
(1-10-9)
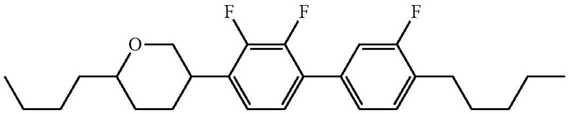
(1-10-10)
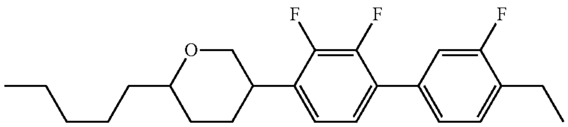
(1-10-11)
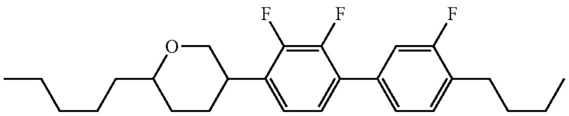
(1-10-12)
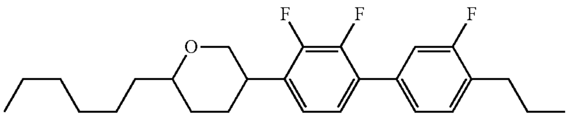
-continued
(1-10-13)
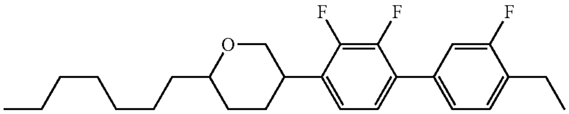
(1-10-14)
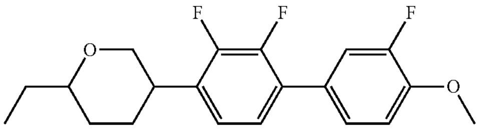
(1-10-15)
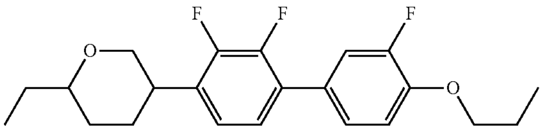
(1-10-16)
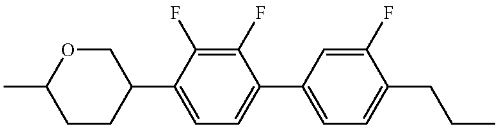
(1-10-17)
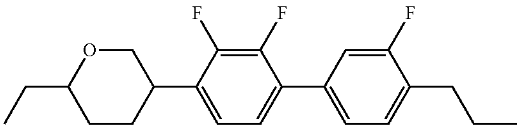
(1-10-18)
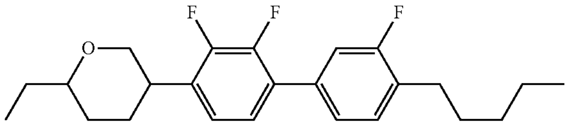
(1-10-19)
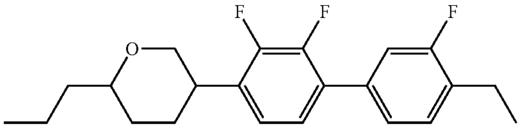
(1-10-20)
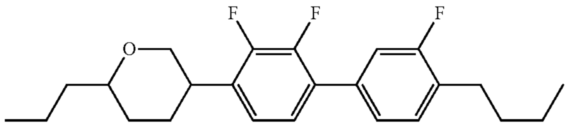
(1-10-21)
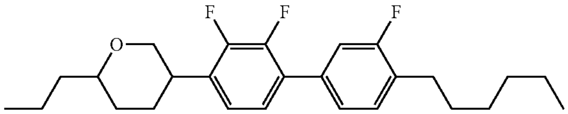
(1-10-22)
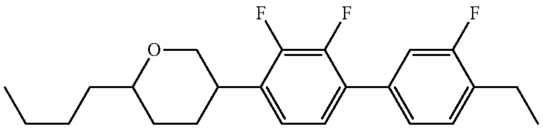

-continued
(1-10-23)
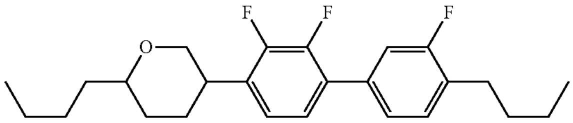
(1-10-24)
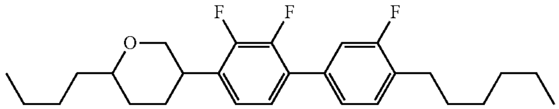
(1-10-25)
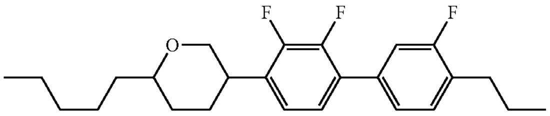
(1-10-26)
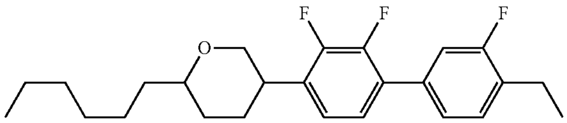
(1-10-27)
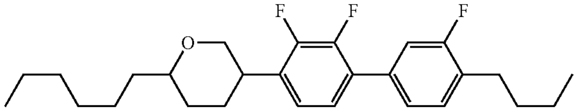
(1-10-28)
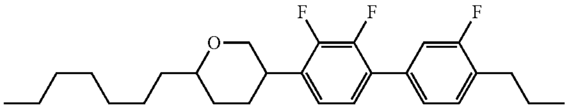
(1-10-29)
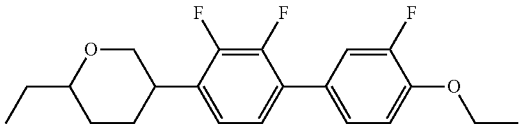
(1-10-30)
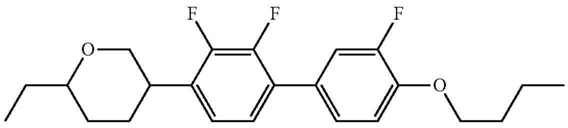
(1-10-31)
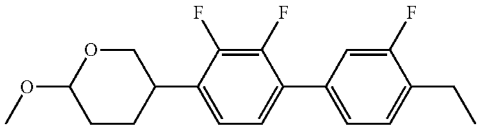
(1-10-32)
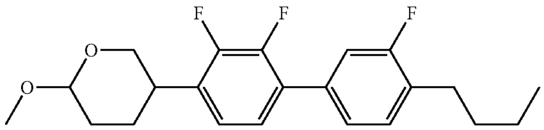
-continued
(1-10-33)
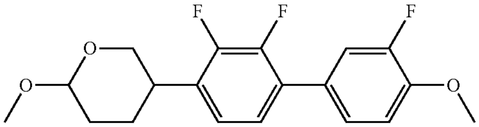
(1-10-34)
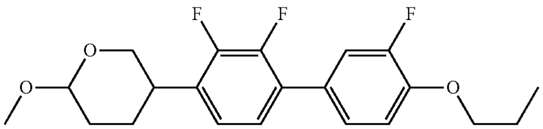
(1-10-35)
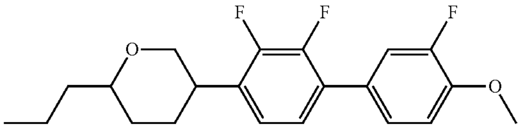
(1-10-36)
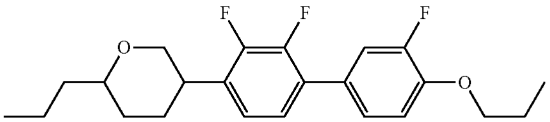
(1-10-37)
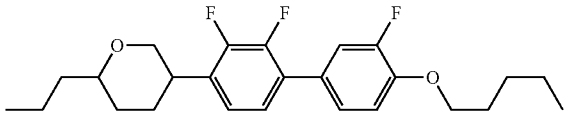
(1-10-38)
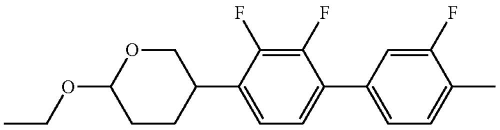
(1-10-39)
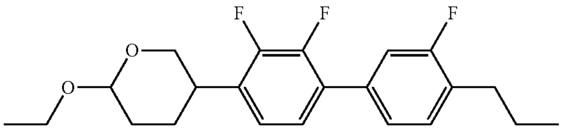
(1-10-40)
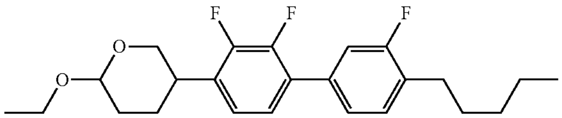
(1-10-41)
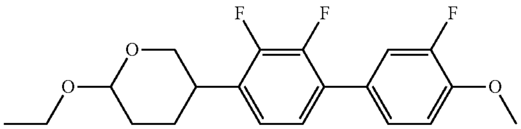
(1-10-42)
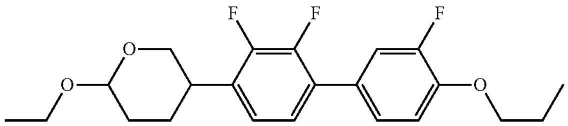

-continued
(1-10-43)
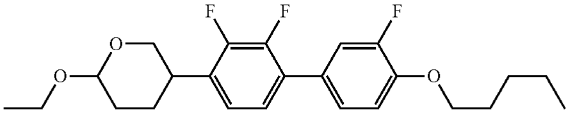
(1-10-44)
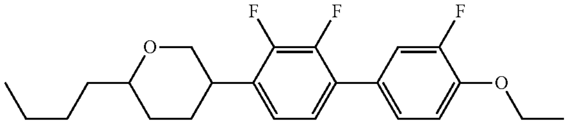
(1-10-45)
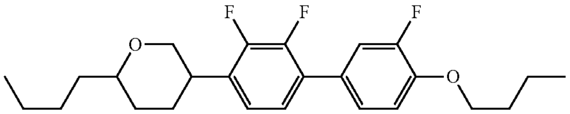
(1-10-46)
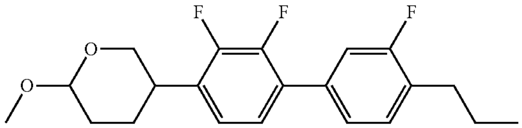
(1-10-47)
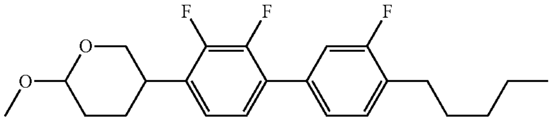
(1-10-48)
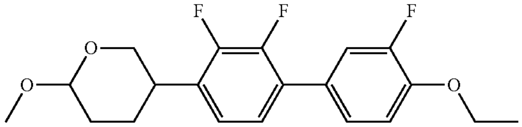
(1-10-49)
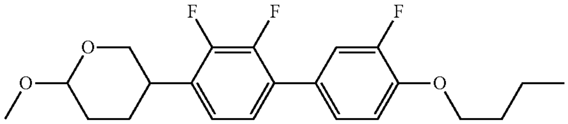
(1-10-50)
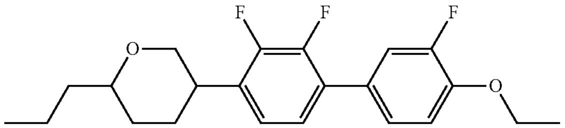
(1-10-51)
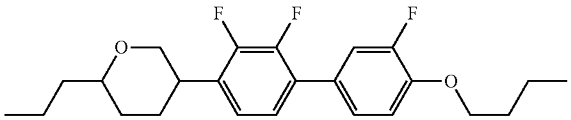
(1-10-52)
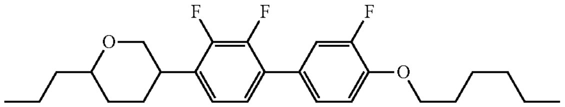
-continued
(1-10-53)
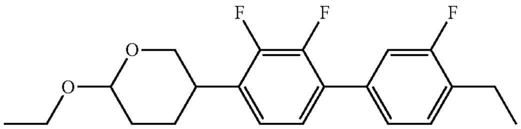
(1-10-54)
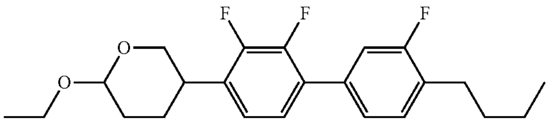
(1-10-55)
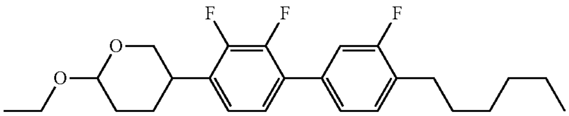
(1-10-56)
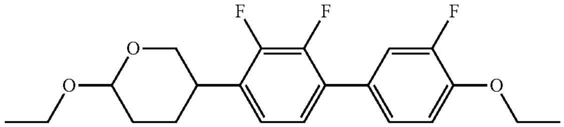
(1-10-57)
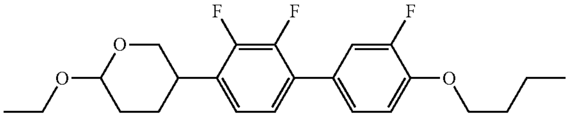
(1-10-58)
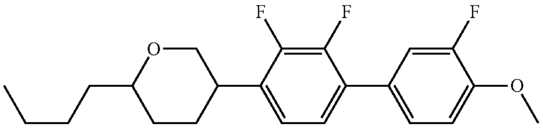
(1-10-59)
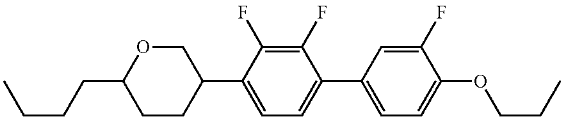
(1-10-60)
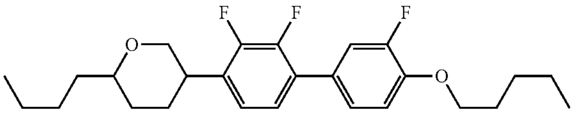
(1-10-61)
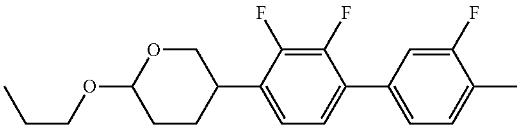
(1-10-62)
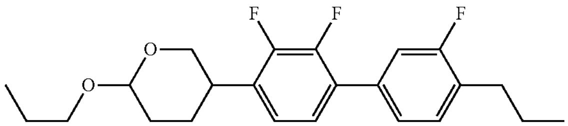

-continued
(1-10-63)
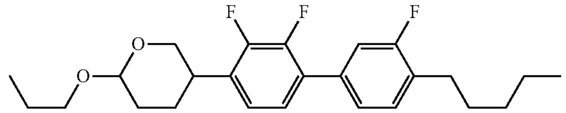
(1-10-64)
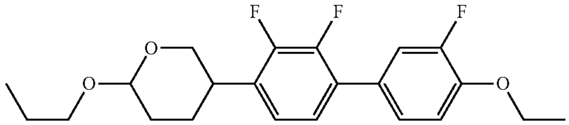
(1-10-65)
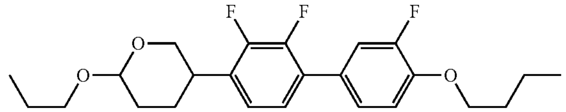
(1-10-66)
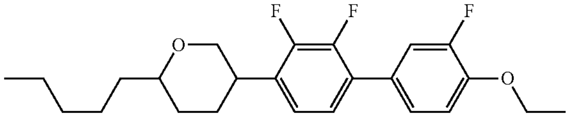
(1-10-67)
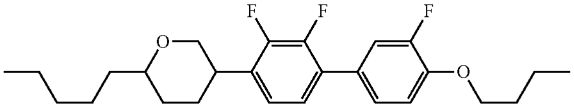
(1-10-68)
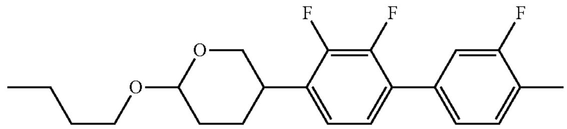
(1-10-69)
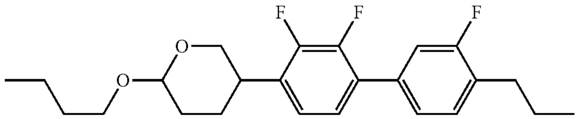
(1-10-70)
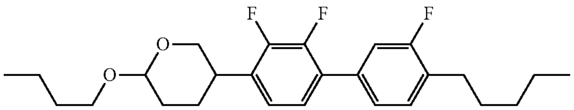
(1-10-71)
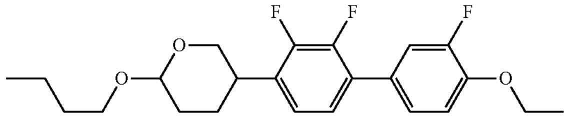
(1-10-72)
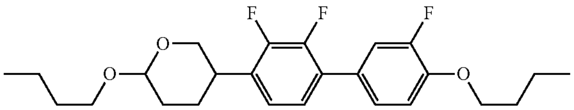
(1-10-73)
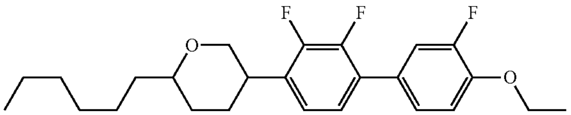
-continued
(1-10-74)
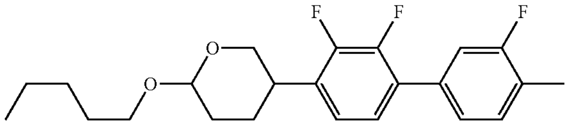
(1-10-75)
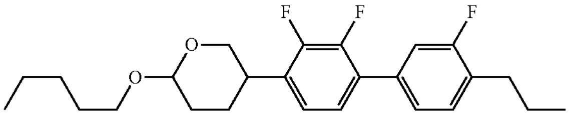
(1-10-76)
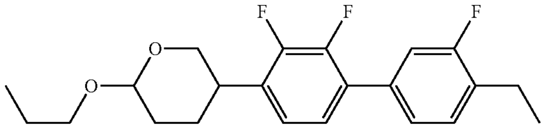
(1-10-77)
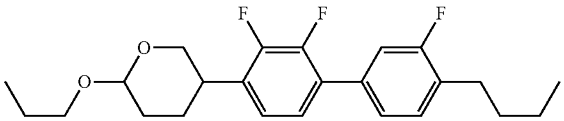
(1-10-78)
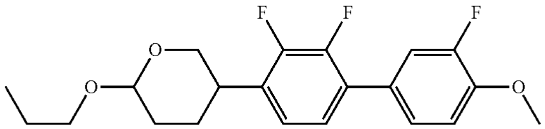
(1-10-79)
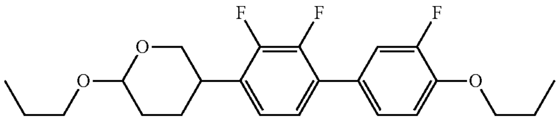
(1-10-80)
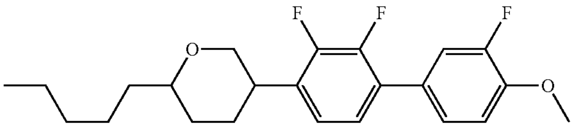
(1-10-81)
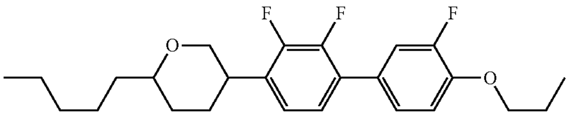
(1-10-82)
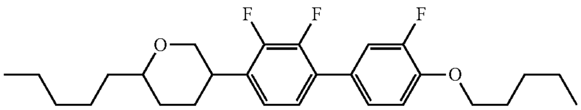
(1-10-83)
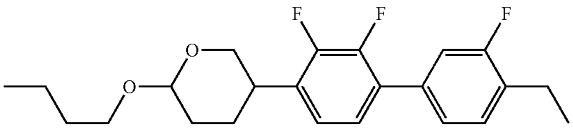

-continued
(1-10-84)
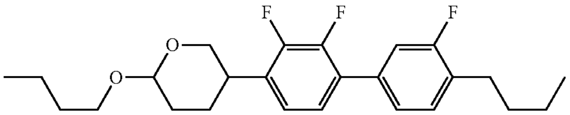
(1-10-85)
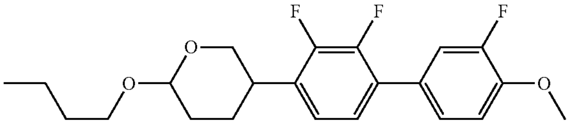
(1-10-86)
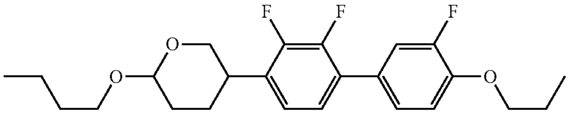
(1-10-87)
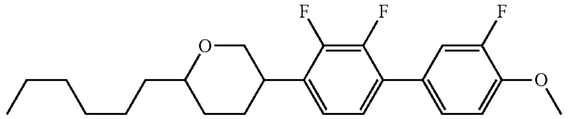
(1-10-88)
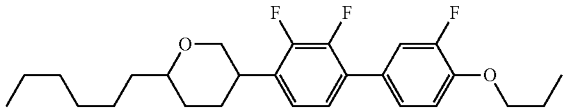
(1-10-89)
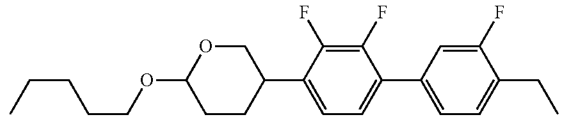
(1-10-90)
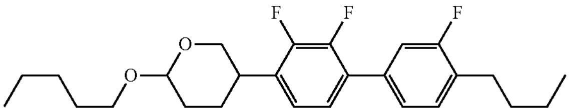
(1-10-91)
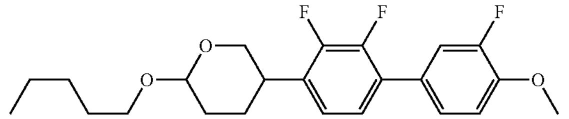
(1-10-92)
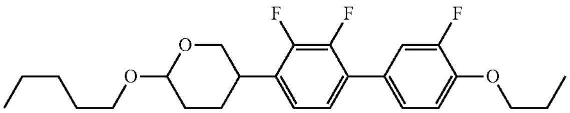
(1-10-93)
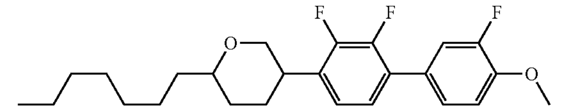
(1-10-94)
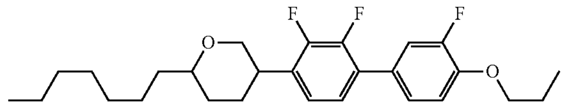
-continued
(1-10-95)
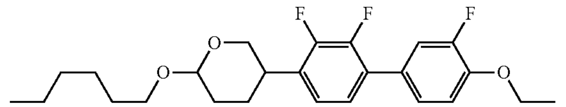
(1-10-96)
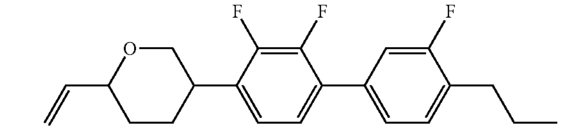
(1-10-97)
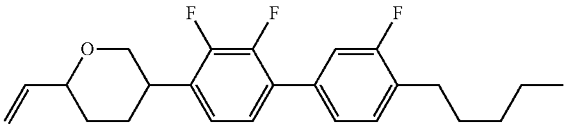
(1-10-98)
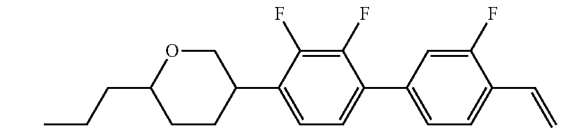
(1-10-99)
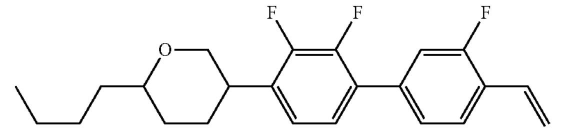
(1-10-100)
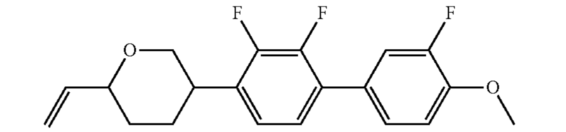
(1-10-101)
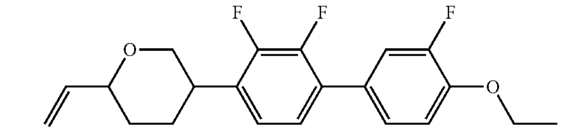
(1-10-102)
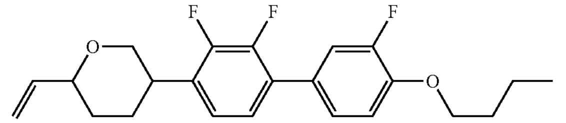
(1-10-103)
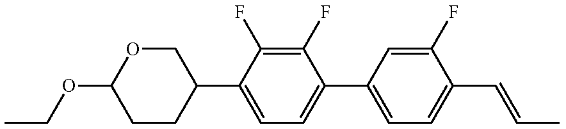
(1-10-104)
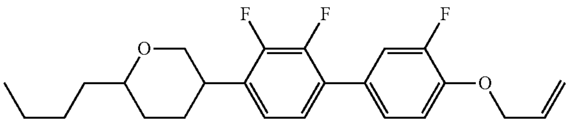

-continued
(1-10-105)
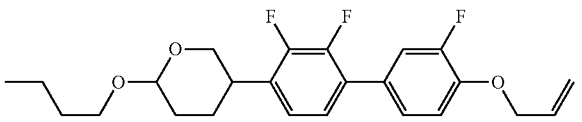
(1-10-106)
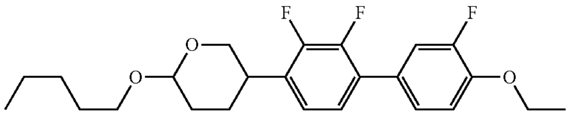
(1-10-107)
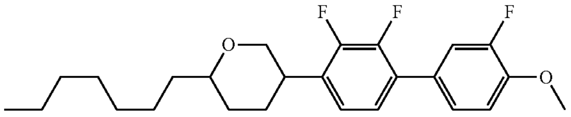
(1-10-108)
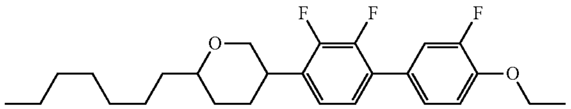
(1-10-109)
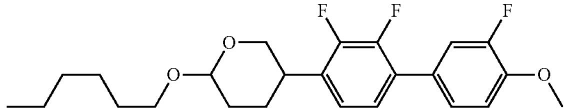
(1-10-110)
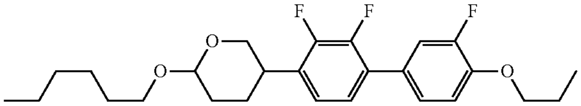
(1-10-111)
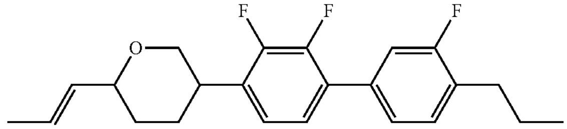
(1-10-112)
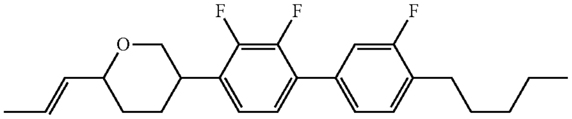
(1-10-113)
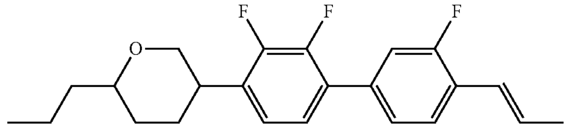
(1-10-114)
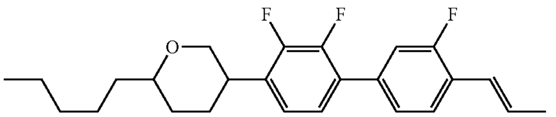
(1-10-115)
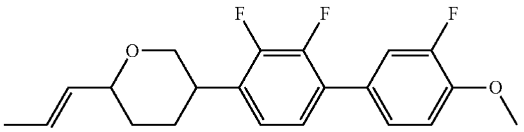
-continued
(1-10-116)
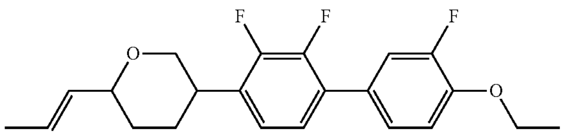
(1-10-117)
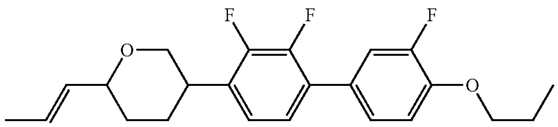
(1-10-118)
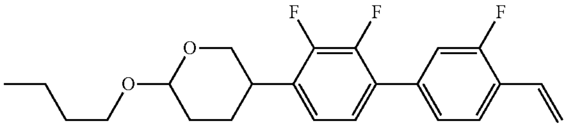
(1-10-119)
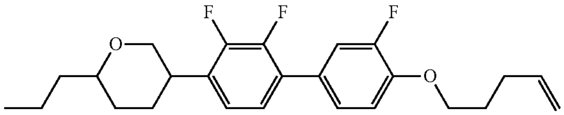
(1-10-120)
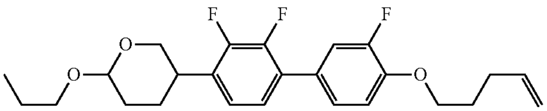
(1-10-121)
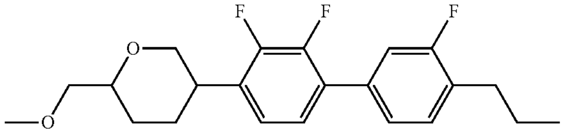
(1-10-122)
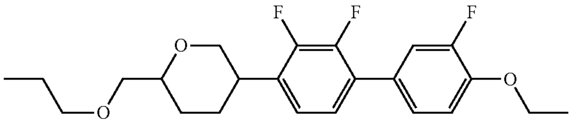
(1-10-123)
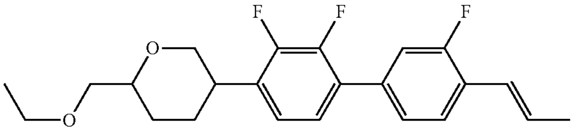
(1-10-124)
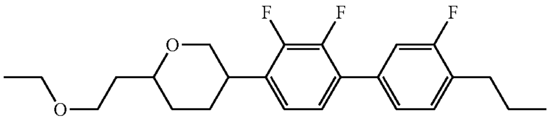
(1-10-125)
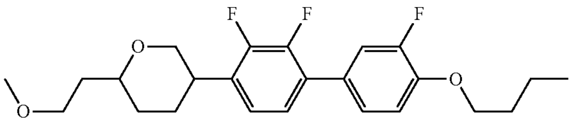

-continued (1-10-126)

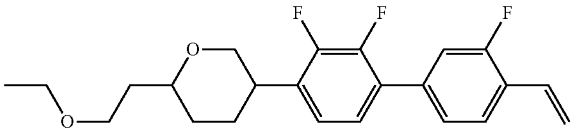

(1-10-127)

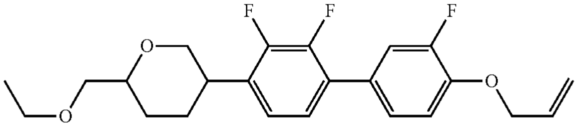

(1-10-128)

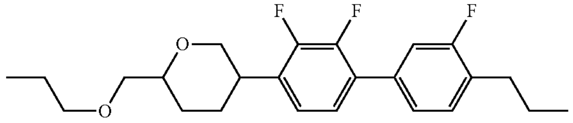

(1-10-129)

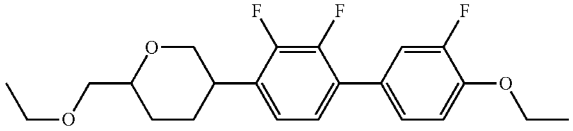

(1-10-130)

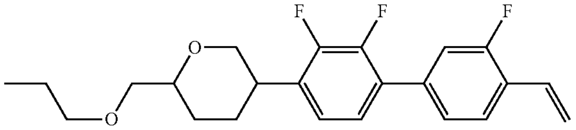

(1-10-131)

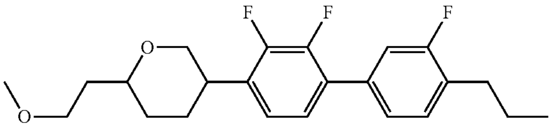

(1-10-132)

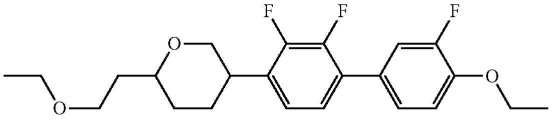

(1-10-133)

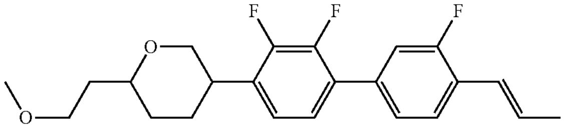

(1-10-134)

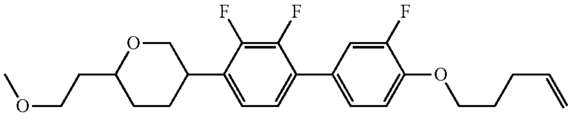

2. Examples of Composition

The invention will be described in greater detail by way of Examples. The Examples include a typical example, and therefore the invention is not limited by the Examples. For example, in addition to compositions in Use Examples, the invention includes a mixture of a composition in Use Example 1 and a composition in Use Example 2. The invention also includes a mixture prepared by mixing at least two of the compositions in the Use Examples. Compounds in the Use Examples were represented using symbols according to definitions in Table 2 described below. In Table 2, a configuration of 1,4-cyclohexylene is trans. A parenthesized number next to a symbolized compound in the Use Examples represents a chemical formula to which the compound belongs. A symbol (-) means a liquid crystal compound different from compounds (1) to (15). A proportion (percentage) of the liquid crystal compound is expressed in terms of weight percent (% by weight) based on the weight of the liquid crystal composition containing no additive. Values of the physical properties of the composition are summarized in a last part. The physical properties were measured according to the methods described above, and measured values are directly described (without extrapolation).

TABLE 3

| Method for Description of Compounds using Symbols | |
|---|---|
| R—(A$_1$)—Z$_1$- . . . . . -Z$_n$—(A$_n$)—R' | |
| 1) Left-terminal Group R— | Symbol |
| $FC_nH_{2n}$— | Fn- |
| $C_nH_{2n+1}$— | n- |
| $C_nH_{2n+1}O$— | nO— |
| $C_mH_{2m+1}OC_nH_{2n}$— | mOn- |
| $CH_2$=CH— | V— |
| $C_nH_{2n+1}$—CH=CH— | nV- |
| $CH_2$=CH—$C_nH_{2n}$— | Vn- |
| $C_mH_{2m+1}$—CH=CH—$C_nH_{2n}$— | mVn- |
| $CF_2$=CH— | VFF— |
| $CF_2$=CH—$C_nH_{2n}$— | VFFn- |
| 2) Right-terminal Group —R' | Symbol |
| —$C_nH_{2n+1}$ | -n |
| —$OC_nH_{2n+1}$ | —On |
| —$COOCH_3$ | —EMe |
| —CH=$CH_2$ | —V |
| —CH=CH—$C_nH_{2n+1}$ | —Vn |
| —$C_nH_{2n}$—CH=$CH_2$ | -nV |
| —$C_mH_{2m}$—CH=CH—$C_nH_{2n+1}$ | -mVn |
| —CH=$CF_2$ | —VFF |
| —F | —F |
| —Cl | —CL |
| —$OCF_3$ | —OCF3 |
| —$OCF_2H$ | —OCF2H |
| —$CF_3$ | —CF3 |
| —C≡N | —C |
| 3) Bonding Group —Z$_n$— | Symbol |
| —$C_nH_{2n}$— | n |
| —COO— | E |
| —CH=CH— | V |
| —$CH_2O$— | 1O |
| —$OCH_2$— | O1 |
| —$CF_2O$— | X |
| —C≡C— | T |
| 4) Ring Structure —A$_n$— | Symbol |
| 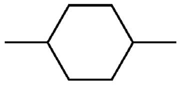 | H |
| 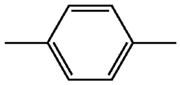 | B |

TABLE 3-continued

| Method for Description of Compounds using Symbols | |
|---|---|
| R—($A_1$)—$Z_1$- . . . . . -$Z_n$—($A_n$)—R' | |
| 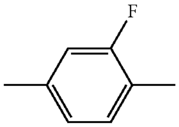 | B(F) |
| 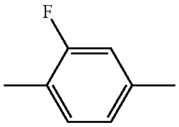 | B(2F) |
| 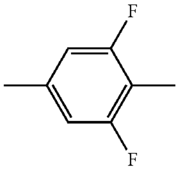 | B(F,F) |
| 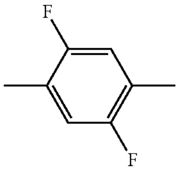 | B(2F,5F) |
| 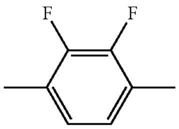 | B(2F,3F) |
| 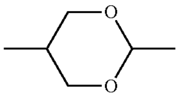 | G |
| 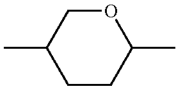 | dh |
| 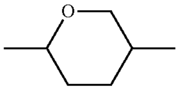 | Dh |
| 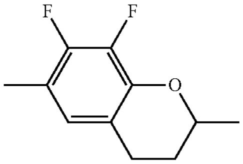 | Cro(7F,8F) |
| 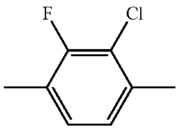 | B(2F,3CL) |

TABLE 3-continued

| Method for Description of Compounds using Symbols |
|---|
| R—($A_1$)—$Z_1$- . . . . . -$Z_n$—($A_n$)—R' |
| 5) Examples of Description |
| Example 1 3-DhB(F)B(2F,3F)-O2 |
| 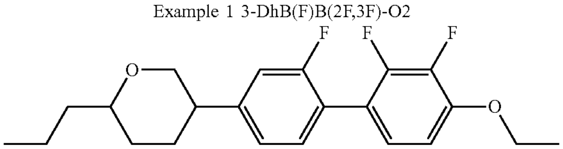 |
| Example 2 3-HBB(F,F)-F |
| 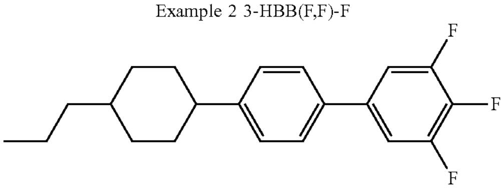 |

Use Example 1

| | | |
|---|---|---|
| 3-DhB(F)B(2F,3F)-O2 | (1-6-50) | 5% |
| 2-HB-C | (15-1) | 5% |
| 3-HB-C | (15-1) | 12% |
| 3-HB-O2 | (2-5) | 15% |
| 2-BTB-1 | (2-10) | 3% |
| 3-HHB-F | (13-1) | 4% |
| 3-HHB-1 | (3-1) | 8% |
| 3-HHB-O1 | (3-1) | 5% |
| 3-HHB-3 | (3-1) | 14% |
| 3-HHEB-F | (13-10) | 4% |
| 5-HHEB-F | (13-10) | 4% |
| 2-HHB(F)-F | (13-2) | 5% |
| 3-HHB(F)-F | (13-2) | 5% |
| 5-HHB(F)-F | (13-2) | 6% |
| 3-HHB(F,F)-F | (13-3) | 5% |

NI=99.9° C.; η=21.2 mPa·s; Δn=0.104; Δ∈=4.2.

Use Example 2

| | | |
|---|---|---|
| 3-DhB(2F)B(2F,3F)-O2 | (1-4-50) | 5% |
| 3-HB-CL | (12-2) | 13% |
| 3-HH-4 | (2-1) | 12% |
| 3-HB-O2 | (2-5) | 8% |
| 3-HHB(F,F)-F | (13-3) | 3% |
| 3-HBB(F,F)-F | (13-24) | 27% |
| 5-HBB(F,F)-F | (13-24) | 22% |
| 5-HBB(F)B-2 | (4-5) | 5% |
| 5-HBB(F)B-3 | (4-5) | 5% |

NI=72.8° C.; η=21.1 mPa·s; Δn=0.119; Δ∈=4.8.

Use Example 3

| | | |
|---|---|---|
| 3-dhB(F)B(2F,3F)-O2 | (1-5-50) | 5% |
| 7-HB(F,F)-F | (12-4) | 3% |
| 3-HB-O2 | (2-5) | 7% |
| 2-HHB(F)-F | (13-2) | 10% |
| 3-HHB(F)-F | (13-2) | 10% |
| 5-HHB(F)-F | (13-2) | 10% |
| 2-HBB(F)-F | (13-23) | 8% |

-continued

| | | |
|---|---|---|
| 3-HBB(F)-F | (13-23) | 8% |
| 5-HBB(F)-F | (13-23) | 13% |
| 2-HBB-F | (13-22) | 4% |
| 3-HBB-F | (13-22) | 4% |
| 5-HBB-F | (13-22) | 3% |
| 3-HBB(F,F)-F | (13-24) | 5% |
| 5-HBB(F,F)-F | (13-24) | 10% |

NI=86.7° C.; η=27.5 mPa·s; Δn=0.117; Δ∈=5.4.

Use Example 4

| | | |
|---|---|---|
| 3-dhB(2F)B(2F,3F)-O2 | (1-3-50) | 5% |
| 5-HB-CL | (12-2) | 16% |
| 3-HH-4 | (2-1) | 12% |
| 3-HH-5 | (2-1) | 4% |
| 3-HHB-F | (13-1) | 4% |
| 3-HHB-CL | (13-1) | 3% |
| 4-HHB-CL | (13-1) | 4% |
| 3-HHB(F)-F | (13-2) | 7% |
| 4-HHB(F)-F | (13-2) | 8% |
| 5-HHB(F)-F | (13-2) | 8% |
| 7-HHB(F)-F | (13-2) | 8% |
| 5-HBB(F)-F | (13-23) | 4% |
| 1O1-HBBH-5 | (4-1) | 3% |
| 3-HHBB(F,F)-F | (14-6) | 2% |
| 4-HHBB(F,F)-F | (14-6) | 3% |
| 5-HHBB(F,F)-F | (14-6) | 3% |
| 3-HH2BB(F,F)-F | (14-15) | 3% |
| 4-HH2BB(F,F)-F | (14-15) | 3% |

NI=115.4° C.; ηi=21.7 mPa·s; Δn=0.095; Δ∈=3.4.

Use Example 5

| | | |
|---|---|---|
| 3-DhB(F)B(2F,3F)-O2 | (1-6-50) | 5% |
| 3-HHB(F,F)-F | (13-3) | 9% |
| 3-H2HB(F,F)-F | (13-15) | 8% |
| 4-H2HB(F,F)-F | (13-15) | 8% |
| 5-H2HB(F,F)-F | (13-15) | 8% |
| 3-HBB(F,F)-F | (13-24) | 19% |
| 5-HBB(F,F)-F | (13-24) | 17% |
| 3-H2BB(F,F)-F | (13-27) | 10% |
| 5-HHBB(F,F)-F | (14-6) | 3% |
| 5-HHEBB-F | (14-17) | 2% |
| 3-HH2BB(F,F)-F | (14-15) | 3% |
| 1O1-HBBH-4 | (4-1) | 4% |
| 1O1-HBBH-5 | (4-1) | 4% |

NI=99.3° C.; η=37.7 mPa·s; Δn=0.118; Δ∈=8.1.

A pitch was 66.5 micrometers when compound (Op-05) was added to the composition described above in a proportion of 0.25% by weight.

Use Example 6

| | | |
|---|---|---|
| 3-DhB(2F,3F)B(2F)-O2 | (1-8-50) | 5% |
| 5-HB-F | (12-2) | 12% |
| 6-HB-F | (12-2) | 9% |
| 7-HB-F | (12-2) | 7% |
| 2-HHB-OCF3 | (13-1) | 7% |
| 3-HHB-OCF3 | (13-1) | 7% |
| 4-HHB-OCF3 | (13-1) | 7% |
| 5-HHB-OCF3 | (13-1) | 5% |
| 3-HH2B-OCF3 | (13-4) | 4% |
| 5-HH2B-OCF3 | (13-4) | 4% |

-continued

| | | |
|---|---|---|
| 3-HHB(F,F)-OCF2H | (13-3) | 4% |
| 3-HHB(F,F)-OCF3 | (13-3) | 5% |
| 3-HH2B(F)-F | (13-5) | 3% |
| 3-HBB(F)-F | (13-23) | 7% |
| 5-HBB(F)-F | (13-23) | 8% |
| 5-HBBH-3 | (4-1) | 3% |
| 3-HB(F)BH-3 | (4-2) | 3% |

Use Example 7

| | | |
|---|---|---|
| 3-dhB(2F,3F)B(F)-O2 | (1-9-50) | 5% |
| 5-HB-CL | (12-2) | 11% |
| 3-HH-4 | (2-1) | 8% |
| 3-HHB-1 | (3-1) | 5% |
| 3-HHB(F,F)-F | (13-3) | 8% |
| 3-HBB(F,F)-F | (13-24) | 17% |
| 5-HBB(F,F)-F | (13-24) | 13% |
| 3-HHEB(F,F)-F | (13-12) | 10% |
| 4-HHEB(F,F)-F | (13-12) | 3% |
| 5-HHEB(F,F)-F | (13-12) | 3% |
| 2-HBEB(F,F)-F | (13-39) | 3% |
| 3-HBEB(F,F)-F | (13-39) | 5% |
| 5-HBEB(F,F)-F | (13-39) | 3% |
| 3-HHBB(F,F)-F | (14-6) | 6% |

Use Example 8

| | | |
|---|---|---|
| 3-dhB(2F,3F)B(2F)-O2 | (1-7-50) | 5% |
| 3-HB-CL | (12-2) | 6% |
| 5-HB-CL | (12-2) | 4% |
| 3-HHB-OCF3 | (13-1) | 5% |
| 3-H2HB-OCF3 | (13-13) | 5% |
| 5-H4HB-OCF3 | (13-19) | 15% |
| V-HHB(F)-F | (13-2) | 5% |
| 3-HHB(F)-F | (13-2) | 5% |
| 5-HHB(F)-F | (13-2) | 5% |
| 3-H4HB(F,F)-CF3 | (13-21) | 8% |
| 5-H4HB(F,F)-CF3 | (13-21) | 10% |
| 5-H2HB(F,F)-F | (13-15) | 5% |
| 5-H4HB(F,F)-F | (13-21) | 7% |
| 2-H2BB(F)-F | (13-26) | 5% |
| 3-H2BB(F)-F | (13-26) | 5% |
| 3-HBEB(F,F)-F | (13-39) | 5% |

Use Example 9

| | | |
|---|---|---|
| 3-DhB(F)B(2F,3F)-O2 | (1-6-50) | 5% |
| 5-HB-CL | (12-2) | 17% |
| 7-HB(F,F)-F | (12-4) | 3% |
| 3-HH-4 | (2-1) | 10% |
| 3-HH-5 | (2-1) | 5% |
| 3-HB-O2 | (2-5) | 15% |
| 3-HHB-1 | (3-1) | 5% |
| 3-HHB-O1 | (3-1) | 3% |
| 2-HHB(F)-F | (13-2) | 7% |
| 3-HHB(F)-F | (13-2) | 7% |
| 5-HHB(F)-F | (13-2) | 7% |
| 3-HHB(F,F)-F | (13-3) | 6% |
| 3-H2HB(F,F)-F | (13-15) | 5% |
| 4-H2HB(F,F)-F | (13-15) | 5% |

NI=66.7° C.; η=16.9 mPa·s; Δn=0.076; Δ∈=2.7.

Use Example 10

| | | |
|---|---|---|
| 3-DhB(2F)B(2F,3F)-O2 | (1-4-50) | 5% |
| 5-HB-CL | (12-2) | 3% |
| 7-HB(F)-F | (12-3) | 7% |
| 3-HH-4 | (2-1) | 9% |
| 3-HH-5 | (2-1) | 10% |
| 3-HB-O2 | (2-5) | 11% |
| 3-HHEB-F | (13-10) | 8% |
| 5-HHEB-F | (13-10) | 5% |
| 3-HHEB(F,F)-F | (13-12) | 10% |
| 4-HHEB(F,F)-F | (13-12) | 5% |
| 3-GHB(F,F)-F | (13-109) | 5% |
| 4-GHB(F,F)-F | (13-109) | 6% |
| 5-GHB(F,F)-F | (13-109) | 7% |
| 2-HHB(F,F)-F | (13-3) | 4% |
| 3-HHB(F,F)-F | (13-3) | 5% |

NI=70.9° C.; η=22.0 mPa·s; Δn=0.072; Δε=5.7.

Use Example 11

| | | |
|---|---|---|
| 3-dhB(F)B(2F,3F)-O2 | (1-5-50) | 5% |
| 1V2-BEB(F,F)-C | (15-15) | 6% |
| 3-HB-C | (15-1) | 16% |
| 2-BTB-1 | (2-10) | 10% |
| 5-HH-VFF | (2-1) | 30% |
| 3-HHB-1 | (3-1) | 4% |
| VFF-HHB-1 | (3-1) | 5% |
| VFF2-HHB-1 | (3-1) | 11% |
| 3-H2BTB-2 | (3-17) | 5% |
| 3-H2BTB-3 | (3-17) | 4% |
| 3-H2BTB-4 | (3-17) | 4% |

NI=81.7° C.; η=14.9 mPa·s; Δn=0.132; Δε=6.1.

Use Example 12

| | | |
|---|---|---|
| 3-dhB(2F)B(2F,3F)-O2 | (1-3-50) | 5% |
| 5-HB(F)B(F,F)XB(F,F)-F | (14-41) | 5% |
| 3-BB(F)B(F,F)XB(F,F)-F | (14-47) | 3% |
| 4-BB(F)B(F,F)XB(F,F)-F | (14-47) | 7% |
| 5-BB(F)B(F,F)XB(F,F)-F | (14-47) | 3% |
| 3-HH-V | (2-1) | 41% |
| 3-HH-V1 | (2-1) | 7% |
| 3-HHEH-5 | (3-13) | 3% |
| 3-HHB-1 | (3-1) | 2% |
| V-HHB-1 | (3-1) | 2% |
| V2-BB(F)B-1 | (3-6) | 5% |
| 1V2-BB-F | (12-1) | 3% |
| 3-BB(F,F)XB(F,F)-F | (13-97) | 11% |
| 3-HHBB(F,F)-F | (14-6) | 3% |

NI=79.9° C.; η=14.6 mPa·s; Δn=0.108; Δε=6.2.

Use Example 13

| | | |
|---|---|---|
| 3-DhB(2F,3F)B(F)-O2 | (1-10-50) | 5% |
| 3-GB(F)B(F,F)XB(F,F)-F | (14-57) | 5% |
| 3-BB(F)B(F,F)XB(F,F)-F | (14-47) | 3% |
| 4-BB(F)B(F,F)XB(F,F)-F | (14-47) | 7% |
| 5-BB(F)B(F,F)XB(F,F)-F | (14-47) | 3% |
| 3-HH-V | (2-1) | 41% |
| 3-HH-V1 | (2-1) | 3% |
| 3-HHEH-5 | (3-13) | 3% |
| 3-HHB-1 | (3-1) | 4% |
| V-HHB-1 | (3-1) | 5% |

-continued

| | | |
|---|---|---|
| V2-BB(F)B-1 | (3-6) | 5% |
| 1V2-BB-F | (12-1) | 3% |
| 3-BB(F,F)XB(F,F)-F | (13-97) | 6% |
| 3-GB(F,F)XB(F,F)-F | (13-113) | 5% |
| 3-HHBB(F,F)-F | (14-6) | 2% |

INDUSTRIAL APPLICABILITY

A liquid crystal compound of the invention has good physical properties. A liquid crystal composition containing the compound can be widely applied to a liquid crystal display device used for a personal computer, a television and so forth.

What is claimed is:

1. A compound, represented by formula (1):

(1)

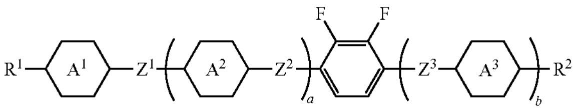

wherein, in formula (1), $R^1$ and $R^2$ are independently alkyl having 1 to 15 carbons, and in the alkyl, at least one piece of —$CH_2$— may be replaced by —O—, and at least one piece of —$CH_2CH_2$— may be replaced by —CH═CH—;

ring $A^1$ is tetrahydropyran-2,5-diyl, and ring $A^2$ and ring $A^3$ are independently 2-fluoro-1,4-phenylene or 2-chloro-1,4-phenylene;

$Z^1$, $Z^2$ and $Z^3$ are independently a single bond or alkylene having 1 to 4 carbons, and in the alkylene, at least one piece of —$CH_2$— may be replaced by —O—, —COO— or —OCO—, and at least one piece of —$CH_2CH_2$— may be replaced by —CH═CH— or —C≡C—; and a and b are independently 0 or 1, and a sum of a and b is 1.

2. The compound according to claim 1, wherein, in formula (1), $R^1$ and $R^2$ are independently alkyl having 1 to 12 carbons, alkoxy having 1 to 12 carbons, alkoxyalkyl having 2 to 12 carbons, alkenyl having 2 to 12 carbons or alkenyloxy having 2 to 12 carbons;

ring $A^1$ is tetrahydropyran-2,5-diyl, and ring $A^2$ and ring $A^3$ are independently 2-fluoro-1,4-phenylene or 2-chloro-1,4-phenylene;

$Z^1$, $Z^2$ and $Z^3$ are independently a single bond, —COO—, —OCO—, —$CH_2O$—, —$OCH_2$—, —$CH_2CH_2$—, —CH═CH—, —C≡C—, —$(CH_2)_4$— or —$CH_2CH$═$CHCH_2$—; and a and b are independently 0 or 1, and a sum of a and b is 1.

3. The compound according to claim 1, represented by formula (1-1) or (1-2):

(1-1)

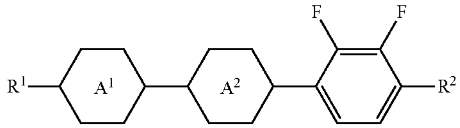

-continued (1-2)

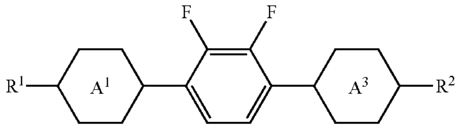

wherein, in formulas (1-1) and (1-2), $R^1$ and $R^2$ are independently alkyl having 1 to 12 carbons, alkoxy having 1 to 12 carbons, alkoxyalkyl having 2 to 12 carbons, alkenyl having 2 to 12 carbons or alkenyloxy having 2 to 12 carbons; and ring $A^1$ is tetrahydropyran-2,5-diyl, and ring $A^2$ and ring $A^3$ are 2-fluoro-1,4-phenylene.

4. The compound according to claim 1, represented by any one of formulas (1-3) to (1-10):

(1-3)

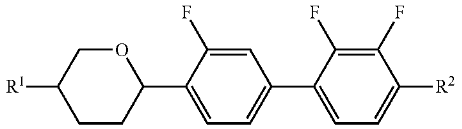

(1-4)

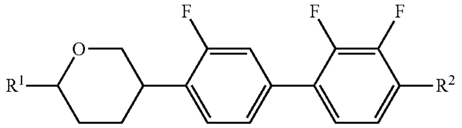

(1-5)

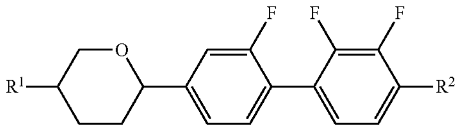

(1-6)

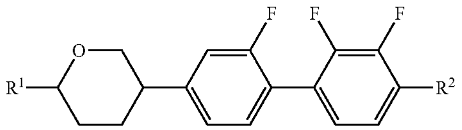

(1-7)

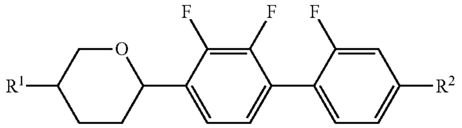

(1-8)

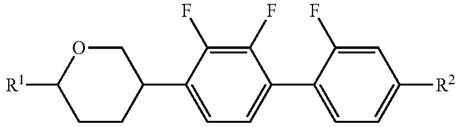

(1-9)

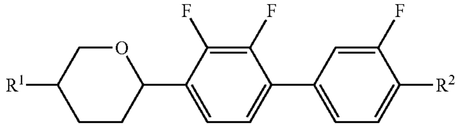

(1-10)

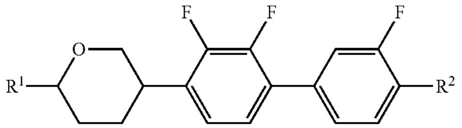

wherein, in formulas (1-3) to (1-10), $R^1$ and $R^2$ are independently alkyl having 1 to 12 carbons, alkoxy having 1 to 12 carbons, alkoxyalkyl having 2 to 12 carbons or alkenyl having 2 to 12 carbons.

5. The compound according to claim 4, wherein in formulas (1-3) to (1-10), $R^1$ is alkyl having 1 to 12 carbons, alkoxy having 1 to 12 carbons, alkoxyalkyl having 2 to 12 carbons or alkenyl having 2 to 12 carbons, and $R^2$ is alkoxy having 1 to 12 carbons.

6. The compound according to claim 4, represented by any one of formulas (1-3) to (1-6):

(1-3)

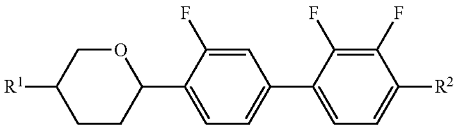

(1-4)

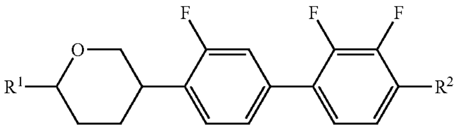

(1-5)

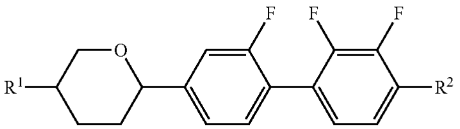

(1-6)

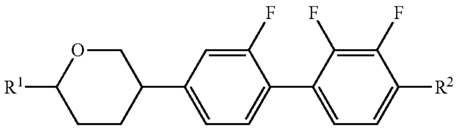

wherein, in formulas (1-3) to (1-6), $R^1$ is alkyl having 1 to 12 carbons or alkenyl having 2 to 12 carbons, and $R^2$ is alkoxy having 1 to 12 carbons.

7. A liquid crystal composition, containing at least one compound according to claim 1.

8. The liquid crystal composition according to claim 7, further containing at least one compound selected from the group of compounds represented by formulas (2) to (4):

(2)

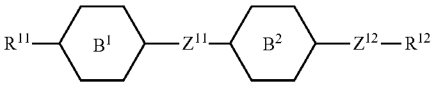

(3)

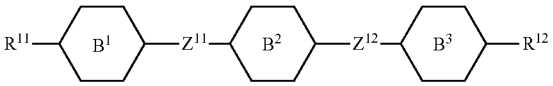

(4)

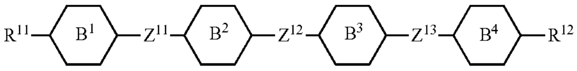

wherein, in formulas (2) to (4), $R^{11}$ and $R^{12}$ are independently alkyl having 1 to 10 carbons or alkenyl having 2 to 10 carbons, and in the alkyl and the alkenyl, at least one piece of $—CH_2—$ may be replaced by —O—, and in the groups, at least one piece of hydrogen may be replaced by fluorine;

ring $B^1$, ring $B^2$, ring $B^3$ and ring $B^4$ are independently 1,4-cyclohexylene, 1,4-phenylene, 2-fluoro-1,4-phenylene, 2,5-difluoro-1,4-phenylene or pyrimidino-2,5-diyl; and $Z^{11}$, $Z^{12}$, and $Z^{13}$ are independently a single bond, —COO—, —$CH_2CH_2$—, —CH═CH— or —C≡C—.

9. The liquid crystal composition according to claim 7, further containing at least one compound selected from the group of compounds represented by formulas (5) to (11):

(5)

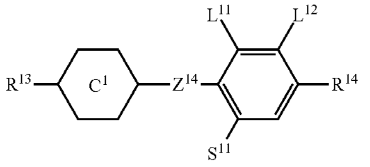

(6)

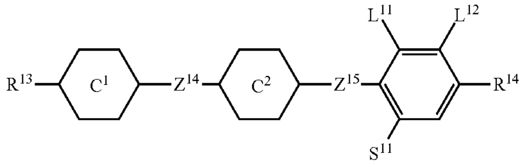

(7)

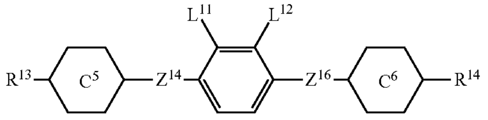

(8)

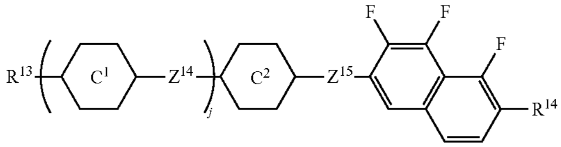

(9)

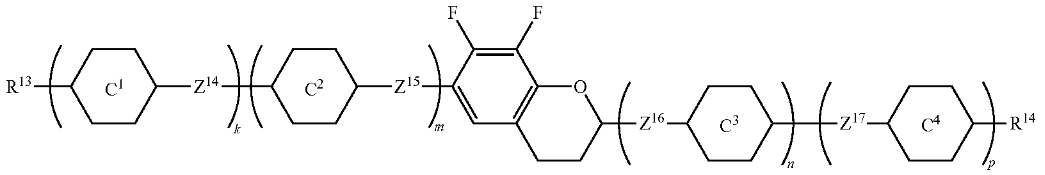

(10)

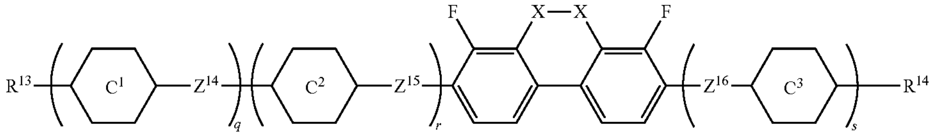

(11)

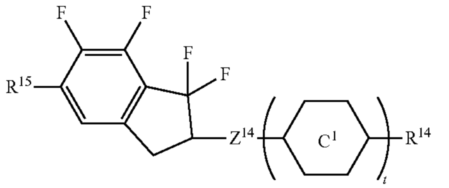

wherein, in formulas (5) to (11), $R^{13}$, $R^{14}$ and $R^{15}$ are independently alkyl having 1 to 10 carbons or alkenyl having 2 to 10 carbons, and in the alkyl and the alkenyl, at least one piece of —$CH_2$— may be replaced by —O—, and in the groups, at least one piece of hydrogen may be replaced by fluorine, and $R^{15}$ may be hydrogen or fluorine;

ring $C^1$, ring $C^2$, ring $C^3$ and ring $C^4$ are independently 1,4-cyclohexylene, 1,4-cyclohexenylene, 1,4-phenylene, 1,4-phenylene in which at least one piece of hydrogen is replaced by fluorine, tetrahydropyran-2,5-diyl or decahydronaphthalene-2,6-diyl;

ring $C^5$ and ring $C^6$ are independently 1,4-cyclohexylene, 1,4-cyclohexenylene, 1,4-phenylene, tetrahydropyran-2,5-diyl or decahydronaphthalene-2,6-diyl;

$Z^{14}$, $Z^{15}$, $Z^{16}$ and $Z^{17}$ are independently a single bond, —COO—, —$CH_2O$—, —$OCF_2$—, —$CH_2CH_2$— or —$OCF_2CH_2CH_2$—;

$L^{11}$ and $L^{12}$ are independently fluorine or chlorine;

$S^{11}$ is hydrogen or methyl;

X is —CHF— or —$CF_2$—; and j, k, m, n, p, q, r and s are independently 0 or 1, a sum of k, m, n and p is 1 or 2, a sum of q, r and s is 0, 1, 2 or 3, and t is 1, 2 or 3.

10. The liquid crystal composition according to claim 7, further containing at least one compound selected from the group of compounds represented by formulas (12) to (14):

(12)

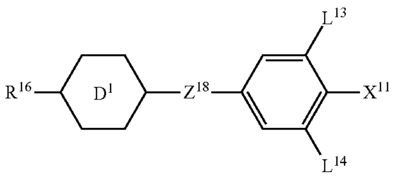

(13)

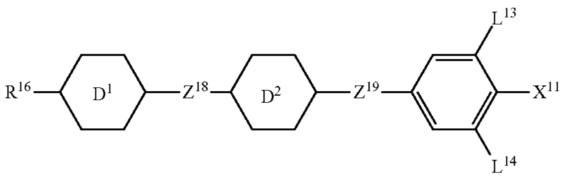

-continued (14)

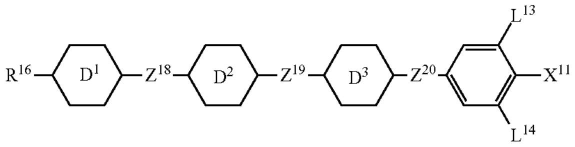

wherein, in formulas (12) to (14), $R^{16}$ is alkyl having 1 to 10 carbons or alkenyl having 2 to 10 carbons, and in the alkyl and the alkenyl, at least one piece of $—CH_2—$ may be replaced by —O—, and in the groups, at least one piece of hydrogen may be replaced by fluorine;

$X^{11}$ is fluorine, chlorine, $—CF_3$, $—CHF_2$, $—CH_2F$, $—OCF_3$, $—OCHF_2$, $—OCF_2CHF_2$ or $—OCF_2CHFCF_3$;

ring $D^1$, ring $D^2$ and ring $D^3$ are independently 1,4-cyclohexylene, 1,4-phenylene, 1,4-phenylene in which at least one piece of hydrogen is replaced by fluorine, tetrahydropyran-2,5-diyl, 1,3-dioxane-2,5-diyl or pyrimidine-2,5-diyl;

$Z^{18}$, $Z^{19}$ and $Z^{20}$ are independently a single bond, —COO—, $—CH_2O—$, $—CF_2O—$, $—OCF_2—$, $—CH_2CH_2—$, —CH═CH—, —C≡C— or $—(CH_2)_4—$; and $L^{13}$ and $L^{14}$ are independently hydrogen or fluorine.

11. The liquid crystal composition according to claim 7, further containing at least one compound selected from the group of compounds represented by formula (15):

(15)

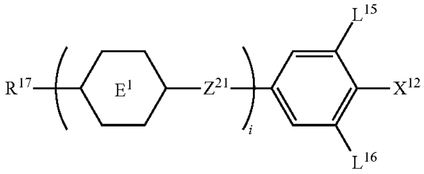

wherein, in formula (15), $R^{17}$ is alkyl having 1 to 10 carbons or alkenyl having 2 to 10 carbons, and in the alkyl and the alkenyl, at least one piece of $—CH_2—$ may be replaced by —O—, and in the groups, at least one piece of hydrogen may be replaced by fluorine;

$X^{12}$ is —C≡N or —C≡C—C≡N;

ring $E^1$ is 1,4-cyclohexylene, 1,4-phenylene, 1,4-phenylene in which at least one piece of hydrogen is replaced by fluorine, tetrahydropyran-2,5-diyl, 1,3-dioxane-2,5-diyl or pyrimidine-2,5-diyl;

$Z^{21}$ is a single bond, —COO—, $—CH_2O—$, $—CF_2O—$, $—OCF_2—$, $—CH_2CH_2—$ or —C≡C—;

$L^{15}$ and $L^{16}$ are independently hydrogen or fluorine; and i is 1, 2, 3 or 4.

12. A liquid crystal display device, including the liquid crystal composition according to claim 7.

* * * * *

UNITED STATES PATENT AND TRADEMARK OFFICE

CERTIFICATE OF CORRECTION

PATENT NO. : 9,909,064 B2
APPLICATION NO. : 15/285799
DATED : March 6, 2018
INVENTOR(S) : Gotoh et al.

It is certified that error appears in the above-identified patent and that said Letters Patent is hereby corrected as shown below:

In Column 199 (Claim 9), Formula 11:

“ 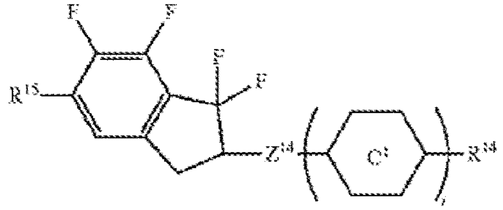 ”

Should read:

-- 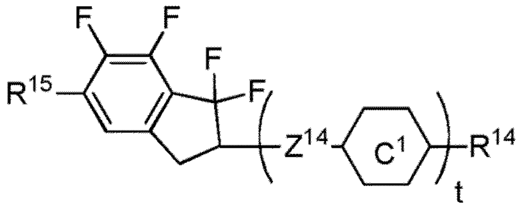 --

Signed and Sealed this
Second Day of October, 2018

Andrei Iancu
*Director of the United States Patent and Trademark Office*